(12) United States Patent
Nilvius et al.

(10) Patent No.: US 12,459,443 B2
(45) Date of Patent: Nov. 4, 2025

(54) LOAD CARRIER, SUCH AS A BIKE CARRIER

(71) Applicant: Thule Sweden AB, Hillerstorp (SE)

(72) Inventors: Anders Nilvius, Värnamo (SE); Magnus Ferman, Värnamo (SE); Hannes Ulvegard, Jönköping (SE); Jonas Ringdahl, Vaggeryd (SE); Fredrik Larsson, Vaggeryd (SE); Tobias Jönsson, Värnamo (SE); Klara Rosenqvist, Jönköping (SE); Simon Helmersson, Värnamo (SE); Johan Larsson, Jönköping (SE); Hannes Olaison, Falun (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 19/018,802

(22) Filed: Jan. 13, 2025

(65) Prior Publication Data

US 2025/0222875 A1    Jul. 10, 2025

Related U.S. Application Data

(63) Continuation of application No. 18/577,083, filed as application No. PCT/EP2022/067222 on Jun. 23, 2022, now Pat. No. 12,409,787.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/00; B60R 9/10
See application file for complete search history.

(56) References Cited

U.S. PATENT DOCUMENTS

| 8,640,888 | B2* | 2/2014 | Liu | B60R 9/10 |
| | | | | 224/501 |
| 9,108,574 | B1* | 8/2015 | Shen | B60R 9/10 |
| 9,802,549 | B1* | 10/2017 | Shen | B60R 9/10 |
| 11,952,065 | B2* | 4/2024 | Huang | B62H 3/00 |
| 12,071,204 | B1* | 8/2024 | Ramsdell | B63B 25/002 |

(Continued)

FOREIGN PATENT DOCUMENTS

| CN | 116461433 A | 7/2023 |
| DE | 102009022622 A1 | 12/2010 |

(Continued)

OTHER PUBLICATIONS

European Search Report for International Application No. 21184014. 5, European Patent Office, mailed on Feb. 15, 2022, 7 pages.

(Continued)

*Primary Examiner* — Brian D Nash
(74) *Attorney, Agent, or Firm* — STERNE, KESSLER, GOLDSTEIN & FOX P.L.L.C.

(57) ABSTRACT

The disclosure relates to a bicycle support arm for a bicycle carrier. The bicycle support arm includes a first arm rotatably coupled to the bicycle carrier, a second arm slidably coupled to the first arm, and a pivotable head coupled to the second arm and configured to secure a bicycle to the bicycle carrier. In some embodiments, the pivotable head at least partially encloses a distal end of the second arm.

19 Claims, 45 Drawing Sheets

(56) References Cited

U.S. PATENT DOCUMENTS

| | | | |
|---|---|---|---|
| 2008/0164292 A1* | 7/2008 | Farney | B60R 9/06 |
| | | | 224/324 |
| 2008/0230579 A1* | 9/2008 | Wang | B60R 9/10 |
| | | | 224/400 |
| 2009/0120984 A1 | 5/2009 | Sautter et al. | |
| 2012/0000952 A1* | 1/2012 | Dreger | B60R 9/10 |
| | | | 224/533 |
| 2013/0062383 A1* | 3/2013 | Jeli | B60R 9/10 |
| | | | 224/549 |
| 2014/0124551 A1* | 5/2014 | Condon | B60R 9/048 |
| | | | 224/324 |
| 2015/0115010 A1* | 4/2015 | Ziola | B60R 9/10 |
| | | | 224/549 |
| 2016/0068111 A1 | 3/2016 | Walker | |
| 2018/0072237 A1 | 3/2018 | Kuschmeader | |
| 2019/0315286 A1* | 10/2019 | Hallenbert | B60R 9/10 |
| 2022/0314895 A1* | 10/2022 | Wärnelöv | B60R 9/10 |
| 2024/0391394 A1* | 11/2024 | Kuschmeader | B60D 1/60 |

FOREIGN PATENT DOCUMENTS

| | | |
|---|---|---|
| DE | 202023100710 U1 | 3/2023 |
| EP | 2703224 A1 | 3/2014 |
| EP | 2995505 A1 | 3/2016 |
| WO | 2015040844 A1 | 3/2015 |

OTHER PUBLICATIONS

International Search Report and Written Opinion of the International Searching Authority for PCT/EP2022/067222, mailed on Sep. 26, 2022, 7 pages.

* cited by examiner

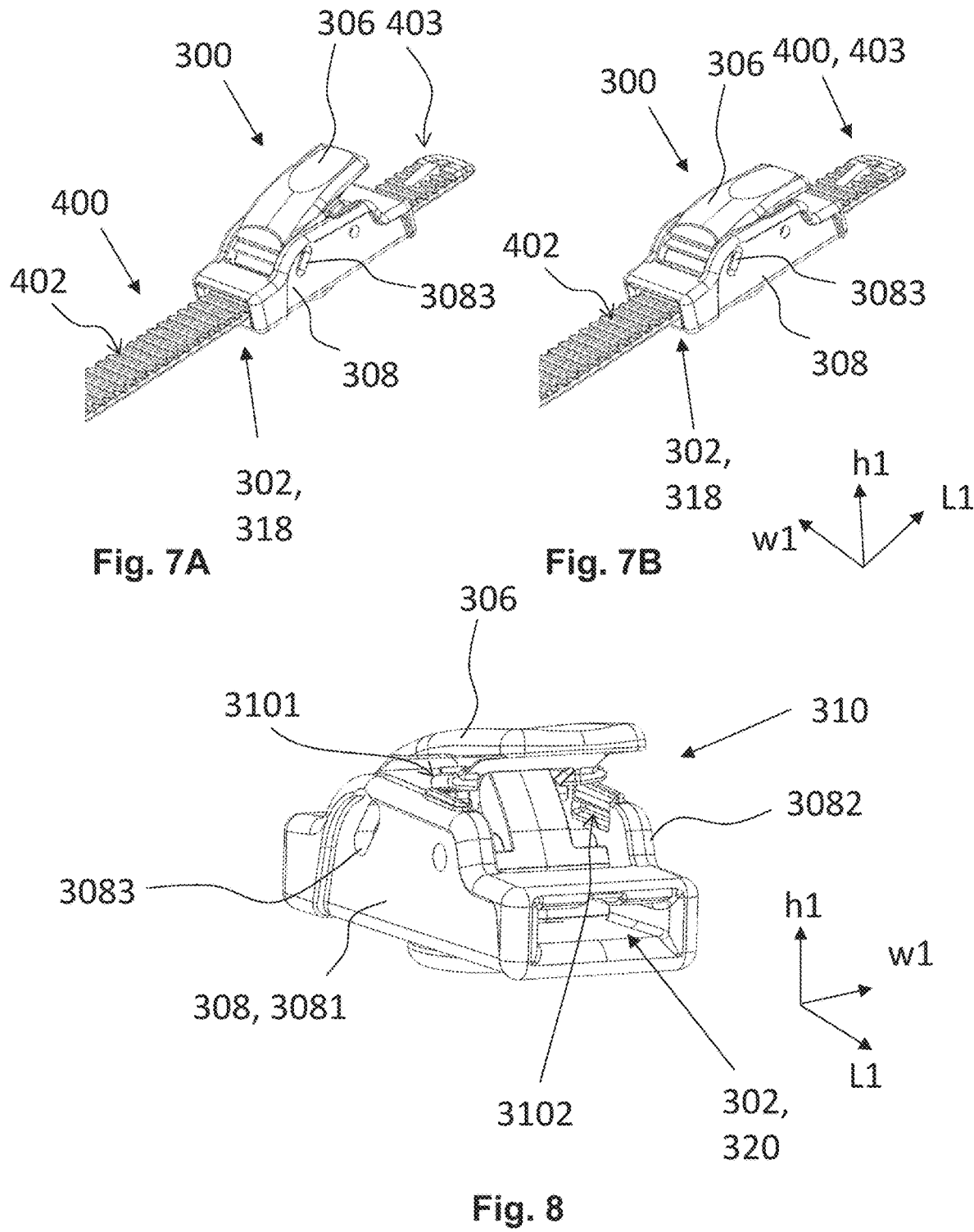

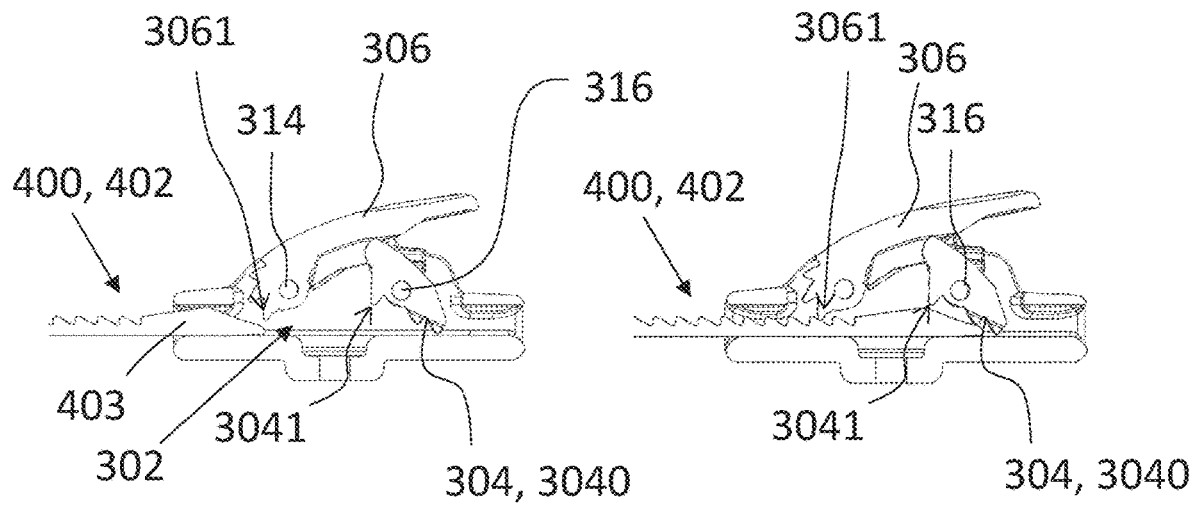
Fig. 11A    Fig. 11B
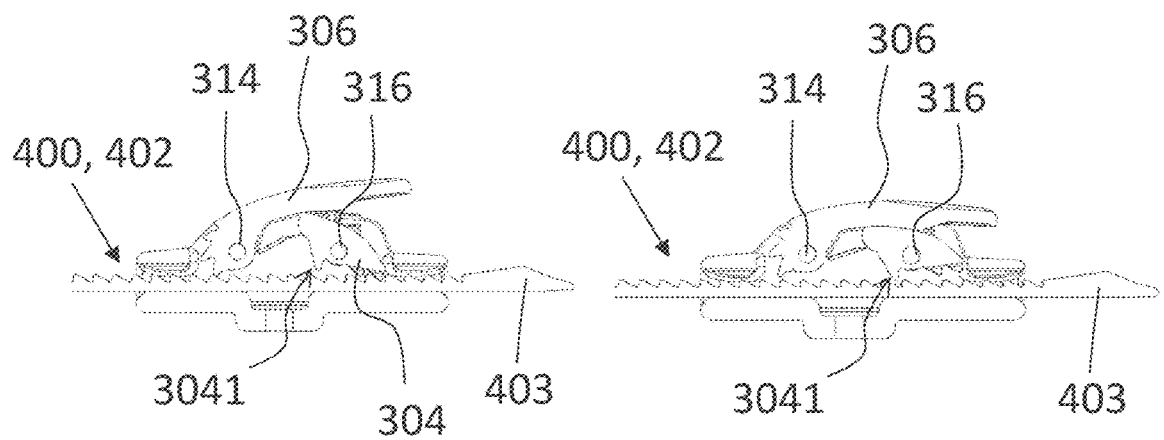
Fig. 11C    Fig. 11D
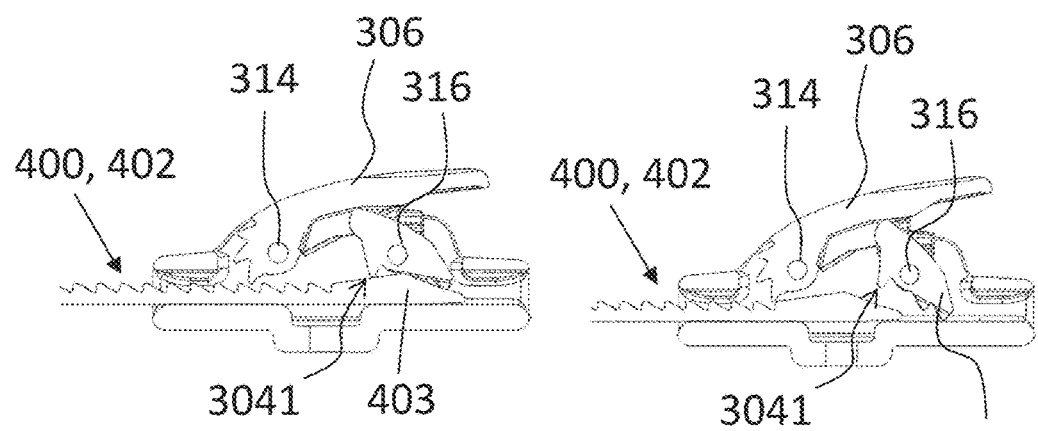
Fig. 11E    Fig. 11F
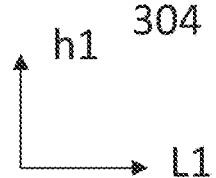

LOAD CARRIER, SUCH AS A BIKE CARRIER

CROSS REFERENCE TO RELATED APPLICATIONS

This application is a continuation of U.S. application Ser. No. 18/577,083, filed Jan. 5, 2024, which is a National Stage Entry of PCT Application No. PCT/EP2022/067222, filed Jun. 23, 2022, and which claims priority to EP Application No. 21184014.5, filed Jul. 6, 2021. Each of these applications is hereby incorporated herein in its entirety by reference.

TECHNICAL FIELD

The present disclosure relates to a load carrier, in particular a load carrier for a vehicle, such as a bike carrier for a vehicle. The present disclosure also relates to certain parts/elements which are preferably provided on a load carrier for a vehicle, such as a strap and a license plate holder.

BACKGROUND

Load carriers for carrying a load and adapted to be mounted to a vehicle may be mounted thereto at different sides of the vehicle. For example, it is well known to provide load carriers on the roof of the vehicle in the form of e.g. load carrying bars. The load carrying bars may also be connected to additional load carriers, such as connectable bike carriers adapted to carry one or more bicycles above the roof.

It is also known to mount load carriers to the rear side of the vehicle, such as coupling the load carrier to a tow bar of the vehicle, for example to a tow ball or any other type of tow bar coupling.

The rear-mounted load carriers may carry any type of load which is held and secured to the load carrier when the vehicle is driving. Typically, the rear-mounted load carrier may be configured as a bike carrier for carrying one or more bicycles. The bicycles may for example be stackable at the rear of the vehicle such that the length extension of each bicycle is extending in the vehicle's transverse extension.

The load carriers as mentioned in the above may also comprise one or more straps and ratchet buckles for securing the load(s) to the load carriers. For example, a bicycle may be secured by tensioning straps through the wheels and/or around the bicycle frame.

Even though there are numerous types of different load carriers, such as bike carriers, there is still a strive to develop improved load carriers, such as load carriers which are more user friendly, robust, cost effective, and/or which has an increased service life.

SUMMARY

In view of the above, an object of the present disclosure is to provide an improved load carrier, such as a bike carrier, which alleviates at least one of the drawbacks of the prior art, and/or to at least provide a suitable alternative. Other objects of the disclosure are to provide an improved strap for a ratchet buckle and an improved license plate holder for a load carrier.

According to a first aspect, the object is at least partly achieved by a bike carrier which is adapted to be mounted to a vehicle, wherein the bike carrier extends in a length extension, a width extension and a height extension. The bike carrier comprises:

a platform support arrangement for supporting at least one bicycle, the platform support arrangement comprising at least one wheel receiving member for receiving one or more wheels of the at least one bicycle, thereby supporting, such as laterally supporting, the bicycle;

at least one bicycle support arm member which is configured to hold and secure the at least one bicycle when being received in the at least one wheel receiving member, wherein the at least one bicycle support arm member is reconfigurable between a bicycle support state and a bicycle loading state.

By the provision of a bike carrier as disclosed herein, an improved bike carrier is achieved which is more user friendly. In particular, by providing a bicycle support arm member which is reconfigurable, adapted and/or positioned as disclosed herein, a more user-friendly loading and/or unloading procedure of one or more bicycles will be achieved. The improvement comprises e.g. faster loading/unloading procedure, less risk of damaging the bicycle(s), a more robust and long-lasting configuration, etc. In the below, advantageous embodiments and further advantages and technical effects related the bike carrier will be disclosed.

A "bicycle support state" for a bicycle support arm member as used herein means a state where the bicycle support arm member is positioned and/or configured m a state where it can hold and secure a bicycle. For example, such a state may be when the bicycle support arm member is in a substantially upright position as disclosed herein, and/or when the bicycle support arm member is angled, such as 45 degrees or less, with respect to a vertical extension, corresponding to the height extension when the bike carrier is mounted to a vehicle.

A "bicycle loading state" for a bicycle support arm member as used herein means a state where the bicycle support arm member is positioned and/or configured such that a bicycle can be loaded and/or unloaded to/from the bike carrier without interfering with the bicycle support arm member, such as when the bicycle support arm member extends in a plane defined by the length and width extension of the bike carrier. Preferably, the "bicycle loading state" is a state for a bicycle support arm member where a bicycle can be loaded to a bicycle support position on the platform support arrangement where the bicycle is intended, at least primarily, to be held and secured by another bicycle support arm member, without interfering with the bicycle support arm member which is in the bicycle loading state.

Optionally, the at least one reconfigurable bicycle support arm member may be reconfigurable by at least one of repositioning, pivoting, such as pivoting about a pivot axis which is substantially parallel to the length extension of the bike carrier, telescoping, thereby allowing a length of the reconfigurable bicycle support arm member to be adjusted, translating, detaching and/or attaching from/to the platform support arrangement, bending and sliding. Thereby, the reconfigurable bicycle support arm member may allow a user to adapt and/or achieve a position of the bicycle support arm member which is more favourable for the loading and/or unloading procedure.

Optionally, the platform support arrangement may be arranged to support a plurality of bicycles by stacking the bicycles one after the other along the length extension of the bike carrier, and wherein the platform support arrangement may be arranged such that a length extension of each bicycle, when the bicycle is supported by the platform support arrangement, is provided substantially perpendicular to the length extension of the bike carrier, such as along the width extension. Such configuration may be especially advantageous when the bike carrier is mounted at the rear of a vehicle, e.g. by a tow bar coupling.

Optionally, the bike carrier may comprise a plurality of bicycle support arm members, wherein the bike carrier is configured such that at least one single bicycle support arm member is used to hold and secure one single bicycle of the plurality of bicycles, and/or wherein at least one bicycle support arm member is configured to hold and secure more than one bicycle, such as one bicycle on each side of the at least one bicycle support arm member, as seen along the length extension of the bike carrier. For example, each one of the plurality of bicycle support arm members may comprise a head, such as a pivotable head, for securing a bike to the respective bicycle support arm member. The head may comprise a claw member and/or a strap for securing the bike to the bicycle support arm member. Each head may be arranged to face a user when the user loads a bike to the bike carrier. For example, the bike carrier may be arranged so that each head is facing in a rearward direction away from the vehicle when the bike carrier is mounted thereto, i.e. when mounted at the rear of the vehicle. This implies facilitated loading of bikes to the bike carrier.

Optionally, the platform support arrangement may comprise at least one pair of wheel receiving members for receiving wheels of at least one bicycle, wherein at least one of the wheel receiving members of the at least one pair of wheel receiving members is pivotable about a pivot axis which is substantially parallel to the length extension of the bike carrier, and wherein at least one reconfigurable bicycle support arm member is pivotable about the same pivot axis, such as co-axially pivotable with respect to each other. Additionally, or alternatively, at least one reconfigurable bicycle support arm member may be pivotable about a pivot axis which is parallel to, or substantially parallel to, the pivot axis of the at least one wheel receiving member. Thereby, in view of the aforementioned configurations, a more versatile bike carrier will be achieved, where for example the bike carrier may be folded to a stowing away/collapsed/non-use state. Still optionally, the bike carrier may further be configured so that the stowing away/collapsed/non-use state is achieved by folding, i.e. pivoting, the at least one reconfigurable bicycle support arm member and the at least one pair of wheel receiving members to a respective upright position, as seen in the height direction, or height extension. For example, the at least one bicycle support arm member may in the stowing away/collapsed/non-use state be provided in the bicycle support state as disclosed herein. This implies a compact stowing away/collapsed/non-use state. It also implies a bike carrier which is easy to carry and handle by a user. For example, it may thereby be easier to attach and/or remove the bike carrier to/from the vehicle when it is provided in the stowing away/collapsed/non-use state.

Optionally, the bike carrier may comprise a plurality of bicycle support arm members which are attachable and/or attached to the platform support arrangement at respective fixation points which are distributed and provided offset from each other along the length extension of the bike carrier. Each one of at least two bicycle support arm members is arranged such that a bicycle to be held and secured by the bicycle support arm member can be loaded to the bike carrier in a loading direction which is substantially parallel to the length extension of the bike carrier when the bicycle support arm member is provided in the bicycle support state, such as provided in a substantially upright position extending from the platform support arrangement in the height extension or at least provided in a position in which the bicycle support arm member is extending from the platform support arrangement in a direction which is 45 degrees or less from the upright position. The loading direction is the same loading direction for each bicycle for each one of the at least two bicycle support arm members, such as corresponding to a forward direction with respect to the vehicle when the bike carrier is mounted thereto. Thereby, a more user friendly loading can be achieved, implying reduced time of loading more than one bicycle to the bike carrier. It has namely been realized that it is advantageous if the bicycle support arm member is already provided in the bicycle support state when a user loads a bicycle to be held by the bicycle support arm member. More specifically, since the bicycle support arm member already will be in the right position when the bicycle is loaded, the user will not need to also reconfigure the bicycle support arm member when also holding the bicycle.

Optionally, one bicycle support arm member may be an innermost bicycle support arm member with respect to the vehicle when the bike carrier is mounted thereto, wherein the innermost bicycle support arm member is biased towards, or fixed in, a substantially upright position, as seen in the height extension. Thereby the innermost bicycle support arm member will be ready to hold a bicycle without any unnecessary action of a user. For example, the innermost bicycle support arm member may not need to be reconfigured before loading a bicycle to be held by the innermost bicycle support arm member. By way of example, the bike carrier may be configured so that each pair of wheel receiving members of the bike carrier is provided further away from the vehicle with respect to the innermost bicycle support arm member when the bike carrier is mounted to the vehicle, as seen in the length extension.

Optionally, the at least one bicycle support arm member may have a cross-sectional perimeter profile, wherein the cross-section is defined by a plane being perpendicular to a length extension of the at least one bicycle support arm member, wherein the cross-sectional perimeter profile is shaped, for example substantially rectangular shaped or oval shaped, such that a side surface thereof extending in the length extension of the bike carrier when it holds and secures a bicycle is longer than a side surface of the cross-sectional perimeter profile which extends in the width extension of the bike carrier, wherein the length extension corresponds to a travelling direction of the vehicle when the bike carrier is mounted thereto. Thereby, a more robust bicycle support arm member may be achieved. This is accomplished by having the longer side in the same direction as the moving direction of the vehicle. Accordingly, the bicycle support arm member will thereby be more suitable to handle impact forces in the vehicle's driving direction. It has been realized that such a shape may be more suitable than e.g. a circular shaped or a square shaped cross-sectional perimeter profile.

Optionally, the at least one reconfigurable bicycle support arm member may be reconfigurable such that it can be folded down, such as by a folding joint, to a position where it substantially extends in a plane defined by the width extension and the length extension of the bike carrier. The position may be the bicycle loading state.

Optionally, the bike carrier may further comprise a restriction arrangement configured to restrict a reconfiguring motion, such as a pivoting and/or telescoping motion, of the at least one reconfigurable bicycle support arm member. Thereby, the bicycle support arm member may be restricted from being reconfigured, implying a reduced risk of unnecessary/unwanted reconfiguration of the bicycle support arm member.

Optionally, the at least one reconfigurable bicycle support arm member may be reconfigurable by pivoting as mentioned herein, and wherein the restriction arrangement, such as a rotational lock, may be configured to prevent the at least one reconfigurable bicycle support arm member to pivot due to a force exerted thereon, w % ben the exerted force is below a threshold value. For example, the threshold value may be set such that a gravitational force exerted on the bicycle support arm member will not cause the bicycle support arm member to pivot, such as when the bicycle support arm member is in the upright position.

Optionally, the bike carrier may comprise a pair of wheel receiving members as mentioned herein, wherein the restriction arrangement may further be configured such that the at least one reconfigurable bicycle support arm member follows the pivotable wheel receiving member when it is pivoted, such as folded down, to a bicycle support position. Thereby, the bike carrier can more rapidly be provided in a state where one or more bicycles can be loaded thereto, implying reduced time for loading the bicycle(s). Preferably, all bicycle support arm members, except the innermost support arm member as e.g. mentioned in the above, are configured in this manner. Still optionally, the restriction arrangement and/or the wheel receiving member may further be configured such that the pivotable wheel receiving member is stationary when the at least one reconfigurable bicycle support arm member is pivoted, such as folded upwards, to a bicycle support position. Thereby, a user may not be required to hold and/or push on the wheel receiving member when the at least one reconfigurable bicycle support arm member is pivoted. This implies a facilitated bike mounting procedure.

Optionally, the restriction arrangement may comprise a spring-biasing member and a first and a second friction member which are arranged to rotate about the pivot axis of the pivotable reconfigurable bicycle support arm member. The restriction functionality is at least provided by the spring-biasing member pushing or pulling on at least one of the first and second friction members such that a frictional force is generated therebetween, thereby preventing the at least one pivotable reconfigurable bicycle support arm member to pivot due to a force exerted thereon, when the exerted force is below a threshold value.

Optionally, the restriction arrangement may comprise a spring-biasing member which is configured to exert a force in a radial and/or an axial direction with respect to the pivot axis. When the spring-biasing member exerts a radial force, the spring-biasing member is optionally a sleeve-formed member, such as a sleeve-formed member which can be compressed and/or expanded, as seen in the radial direction of the pivot axis. A spring-biasing member which exerts a force in the axial direction may e.g. be a coil spring. Alternatively, the spring biasing member may optionally be a member provided in-between two sleeve-formed members, as seen in the radial direction.

Optionally, the sleeve-formed member, i.e. the spring-biased sleeve-formed member, may comprise a compression prevention portion which is configured to prevent the sleeve-formed member from being compressed more than a predetermined compression distance. Thereby it can be assured that the spring-biasing sleeve-formed member is never compressed too much, which otherwise could reduce and compromise the restriction functionality.

Optionally, the at least one reconfigurable bicycle support arm member may be reconfigurable, such as further reconfigurable, by telescoping as mentioned herein, wherein the restriction arrangement, such as a frictional lock, is configured to prevent the at least one telescoping reconfigurable bicycle support arm member to adjust its length due to a force exerted thereon, when the exerted force is below a threshold value. The telescoping reconfigurable bicycle support arm member may optionally comprise a first and a second telescoping arm member, and wherein the frictional lock may optionally comprise a spring-biasing member, such as a blade spring, associated with the first telescoping arm member, w % herein the spring-biasing member is configured to engage with at least one groove associated with the second telescoping arm member, thereby preventing the at least one telescoping reconfigurable bicycle support arm member to adjust its length due to a force exerted thereon, when the exerted force is below a threshold value. For example, the spring-biasing member may be configured to engage with a corrugated, or rippled, profile, comprising a plurality of consecutive grooves, such as a corrugated profile provided on a length of material which extends along the second telescoping arm member.

Optionally, the bike carrier may comprise a plurality of bicycle support arm members which are attachable and/or attached to the platform support arrangement at respective fixation points which are distributed and provided offset from each other along the length extension of the bike carrier, wherein the fixation points are alternatingly positioned on respective opposite sides with respect to an axis of symmetry of the bike carrier. The axis of symmetry extends in the length extension of the bike carrier. Additionally, or alternatively, at least one wheel receiving member may be provided in-between two adjacent fixation points of adjacent bicycle support arm members, as seen along the length extension. Thereby, a further facilitated loading and/or unloading procedure may be realized. For example, providing the bicycle support arm members about the axis of symmetry as mentioned in the above may enable an easier folding of the bike carrier to a stow away state, reducing e.g. the risk of the bicycle support arm members colliding with each other during folding.

Optionally, the at least one bicycle support arm member may be a rigid arm, such as an arm made of a rigid low weight material, for example aluminium.

Optionally, the at least one bicycle support arm member may be configured to be provided in a substantially upright position extending from the platform support arrangement in the height extension when it holds and secures at least one bicycle, corresponding to the bicycle support state. Additionally, or alternatively, the at least one bicycle support arm member may be configured to be provided in a substantially angled position extending from the platform support arrangement with respect to the height extension when it holds and secures at least one bicycle, such as an angle of 45 degrees or less with respect to the height extension, corresponding to a vertical direction when the bike carrier is mounted to the vehicle.

Optionally, the at least one reconfigurable bicycle support arm member may be detachable from the bike carrier. Thereby, an even further versatile bike carrier is achieved, where e.g. a user may select how many bicycle support arm members that should be attached in a certain situation, i.e. depending on how many bicycles that shall be loaded to the bike carrier.

Preferably, the at least one bicycle support arm member is attached and/or attachable to the platform support arrangement, and configured to extend at least partly upwardly therefrom when bicycles are loaded thereon and when the bike carrier is mounted to a vehicle, such as at the rear of the vehicle, by a tow bar coupling.

Optionally, at least one bicycle support arm member and/or wheel receiving member may comprise a ratchet buckle for receiving and holding a strap, wherein the strap is used to hold and secure a bicycle, such as a bicycle frame, to the at least one bicycle support arm member.

Optionally, the at least one ratchet buckle may further be associated with at least one strap locking arrangement for locking the strap such that it is prevented from being released from the ratchet buckle. Still optionally, the strap locking arrangement may comprise a locking element which is arranged to engage with at least one buckle engagement member of the strap. The locking element may be adapted to engage with the at least one buckle engagement member by moving, such as by sliding and/or rotating, the locking element in a locking direction towards the at least one buckle engagement member of the strap. The locking element may thereafter be locked by use of a key which, after being rotated and released in a keyhole of the locking arrangement, prevents the locking element from moving to an unlocked position, i.e. sliding in an opposite direction with respect to the aforementioned locking direction.

Optionally, at least one bicycle support arm member may comprise a pivotable head. The pivotable head may comprise a ratchet buckle and/or a strap for holding and securing a bicycle. By providing a pivotable head a more versatile bike carrier may be achieved, implying increased possibility of holding and securing bicycles with different kinds of frame designs.

Optionally, at least one bicycle support arm member may be further configured to be reconfigurable, such as pivoted and/or telescoped, such that it can hold and/or support a bicycle on a ground surface adjacent the bike carrier when the bike carrier is mounted to the vehicle. Thereby, an even further versatile bicycle support arm member can be provided, which also can hold and support a bicycle which is standing on the ground surface.

According to a second aspect, the object is at least partly achieved by a bike carrier for a vehicle, such as a bike carrier according to any one of the embodiments of the first aspect, wherein the bike carrier comprises:
   a platform support arrangement for supporting two or more bicycles;
   a first bicycle support arm member for holding and securing a first bicycle;
   a second bicycle support arm member for holding and securing a second bicycle,
   wherein the second bicycle support arm member is arranged to be reconfigurable during use.

The bike carrier is configured such that:
   the first bicycle can initially be loaded onto the platform support arrangement and secured to the first bicycle support arm member, whereafter the second bicycle support arm member can be reconfigured, whereafter the second bicycle can be loaded onto the platform support arrangement and secured to the second bicycle support arm member.

Thereby, a facilitated loading procedure is achieved. For example, when loading the first bicycle, the second bicycle support arm member can be in a state/position where it is not interfering with the first bicycle when it is loaded. Further, by thereafter reconfiguring the second bicycle support arm member, it can be provided in a state/position where it is ready to hold and secure a bicycle, i.e. in a bicycle support state. Thereby, the user will more easily be able to load the second bicycle, with fewer operations and/or with a reduced risk of damaging any one of the bicycles during loading.

Advantages and effects of the second aspect of the disclosure are analogous to advantages and effects of the first aspect of the disclosure, and vice versa. It shall also be noted that all embodiments of the second aspect of the disclosure are combinable with all embodiments of the other aspects of the disclosure, and vice versa.

According to a third aspect, the object is at least partly achieved by a load carrier for a vehicle comprising a ratchet buckle for receiving and holding a strap. The ratchet buckle comprises:
   a strap receiving section,
   a strap engagement member configured to engage with at least one buckle engagement member of the strap to thereby hold the strap in the strap receiving section.

The load carrier with the ratchet buckle as disclosed herein provides an improved ratchet buckle which is easier to use, robust and/or safer than prior art load carrier ratchet buckles. It shall be noted that all embodiments of the third aspect of the disclosure are combinable with all embodiments of the other aspects of the disclosure, and vice versa.

Optionally, the ratchet buckle may further comprise an actuation lever for a user. The actuation lever may be configured to actuate the strap engagement member between an open state in which the strap is freely movable in the strap receiving section and an engaged state in which the strap engagement member is configured to be engaged with the at least one buckle engagement member of the strap.

Still optionally, the ratchet buckle may further comprise a ratchet buckle housing, wherein the actuation lever is configured to be moved, such as pivoted, with respect to the ratchet buckle housing when it actuates the strap engagement member between the open state and the engaged state.

Optionally, the ratchet buckle may further comprise a holding arrangement configured to hold the actuation lever in a holding position such that the strap engagement member is maintained in the open state. Thereby it will be easier for a user to tension the strap, e.g. by using only one hand for the tensioning instead of two. Accordingly, the other hand can be used to e.g. hold a load, such as a bicycle, preventing the load from falling off from the load carrier or being damaged during loading. The configuration also facilitates the unloading procedure in that less manual involvement is required.

Optionally, the holding arrangement may comprise a first holding portion associated with the actuation lever and a second holding portion associated with the ratchet buckle housing, wherein the first and second holding portions are configured to engage with each other to thereby hold the actuation lever in the holding position. Still optionally, the first holding portion may be any one of a protrusion, a groove, a hook, a bulging portion, configured to engage with the second holding portion, and/or the second holding portion may be any one of a protrusion, a groove, a hook, a bulging portion, configured to engage with the first holding portion.

Optionally, the ratchet buckle housing may comprise a first and a second wall, wherein each wall extends at least partly along a length extension and a height extension of the ratchet buckle, the length extension of the ratchet buckle corresponding to a length extension of the strap when it is received in the strap receiving section, wherein the walls are provided offset from each other as seen in a width extension of the ratchet buckle, thereby defining the strap receiving section therebetween. At least one of the first and second walls comprises the second holding portion, such as the second holding portion being provided on an inside surface of at least one of the walls and facing the other one of the walls. This implies an effective configuration for providing the holding functionality, such as reduced number of required components, an integrated configuration etc. Still optionally, the actuation lever may be provided in a space between the first and second walls and wherein the first holding portion may be provided on at least one outer surface of the actuation lever which faces an inside surface of one of the first and second walls of the ratchet buckle housing when the actuation lever is in the holding position. Still optionally, the holding arrangement may be configured to hold the actuation lever in the holding position by a snap-fit connection, implying a more effective, easy to use arrangement.

Optionally, the actuation lever may comprise a strap engagement portion configured to engage with at least one buckle engagement member of the strap, wherein the actuation lever is configured to be moved, such as pivoted, with respect to the ratchet buckle such that the strap engagement portion moves the strap in a strap tightening direction in the strap receiving section. Thereby the actuation lever may further be used for tensioning the strap, such as by moving the actuation lever in a back-and-forth movement pattern, e.g. a back-and-forth pivoting movement pattern. The back-and-forth movement pattern may also be denoted an actuation lever pumping pattern. This configuration(s) implies a facilitated an more time efficient tensioning procedure for the user.

Optionally, the actuation lever may be spring-biased towards a default position, such as spring-biased away from the holding position as mentioned in the above. Still optionally, the default position may be a position where the above-mentioned strap engagement portion is engaged with the at least one buckle engagement member of the strap when the strap is provided in the strap receiving section. Providing a default position for the actuation lever implies further facilitated use for the user. Accordingly, before using the ratchet buckle, the actuation lever can be provided in the default position and thereby the user may not need to make any initial correction/adjustment of the actuation lever.

Optionally, the strap engagement member may further comprise a buckle state switching portion, wherein the buckle state switching portion is configured to engage with a protruding element of the strap when the strap is inserted into and/or removed from the strap receiving section such that the strap engagement member is automatically switched from an open state to an engaged state, or vice versa, wherein in the open state the strap is freely movable in the strap receiving section and wherein in the engaged state the strap engagement member is configured to be engaged with the at least one buckle engagement member of the strap. Thereby, further facilitated use for the user can be provided, by automatically switching from the open state to the closed state, or vice versa, when the strap is inserted into and/or removed from the strap receiving section.

Optionally, the strap engagement member may be spring-biased towards the engaged state in which the strap engagement member is configured to be engaged with the at least one buckle engagement member of the strap.

Optionally, the ratchet buckle may comprise a common spring-biasing member for the actuation lever and the strap engagement member, implying reduced number of required parts for achieving the ratchet buckle functionality.

Optionally, the ratchet buckle may further comprise a strap guide portion provided at a strap entrance section of the strap receiving section and/or at a strap exit section of the strap receiving section, wherein the strap guide portion is an extension of the strap receiving section and/or a widened section of the strap receiving section ( ). Thereby, the strap can be prevented from getting stuck when it is e.g. bent too much. The strap guide section may further restrict bending of the strap when it is inserted and/or removed from the ratchet buckle. The strap guide portion may for example extend out from the ratchet buckle at the entrance and/or exit section by 1-5 cm, such as 2-5 cm.

Optionally, the load carrier may further comprise a strap for the ratchet buckle.

Optionally, the ratchet buckle may further comprise a visual and/or tactile indicator which is adapted to indicate for a user when the actuation lever is actuated such that the strap engagement member is in the open state and/or when the actuation lever is actuated such that the strap engagement member is in the engaged state. Still optionally, the visual and/or tactile indicator may be provided on the strap engagement member. For example, the ratchet buckle may be configured such that the visual and/or tactile indicator, when being provided on the strap engagement member, is extending through an aperture of the actuation lever when the strap engagement member is in the open state and/or when the strap engagement member is in the engaged state. Preferably, the ratchet buckle may be configured such that the visual and/or tactile indicator is extending through the aperture, such that it is visible for a user and/or such that it can be touched by a hand/finger of a user, when either the strap engagement member is in the open state or the engaged state. Further, when the strap engagement member is in the other state, the ratchet buckle may be configured such that the visual and/or tactile indicator is not visible for a user and/or such that it cannot be touched by a hand/finger of a user. In view of the above, it will be easier for a user to understand when the actuation lever is in the open or engaged state. The visual indicator may for example be colored with a different color than the actuation lever, such as in red. The tactile indicator may for example comprise a knurled surface.

According to the third aspect, the object may also at least partly be achieved by a strap for a ratchet buckle, preferably the above-mentioned ratchet buckle. The strap comprises:
  a plurality of buckle engagement members provided along a length extension of the strap,
  a protruding element provided at a free end of the strap, wherein the protruding element is configured to engage with a buckle state switching portion of a strap engagement member of the ratchet buckle when the strap is inserted into and/or removed from a strap receiving section of the ratchet buckle such that the strap engagement member is automatically switched from an open state to an engaged state, or vice versa. The protruding element may comprise at least one sloping surface, as seen along a length extension of the strap, such as a first and a second sloping surface with a respective sloping direction directed away from a top portion of the protruding element. The sloping surface(s) may be wedge-shaped, such as forming a triangle, as seen in a plane defined by the length extension and a height extension of the strap.

The buckle engagement members are preferably formed as teeth along the length extension of the strap. Advantages and effects of the strap according to the third aspect are similar to advantages and effects of the load carrier with the ratchet buckle according to the third aspect.

According to a fourth aspect, the object is at least partly achieved by a load carrier for a vehicle, such as a bike carrier, which is adapted to be mounted to a vehicle for transporting a load. The load carrier comprises:
- a base frame having a length extension, a width extension and a height extension, the base frame comprising a first and a second elongated member for carrying a load, wherein the first and a second elongated members are separate from each other and provided substantially parallel with respect to each other along the length extension,
- wherein the base frame further comprises:
- a first and a second bridging portion provided between the first and second elongated members and coupling the first and second elongated members together.

By the provision of a load carrier according to the fourth aspect of the disclosure, a more modular load carrier configuration is achieved. More specifically, by providing bridging portions as disclosed herein, the load carrier may be configured differently depending on specific demands, without requiring extensive redesign of the different parts. In other words, the bridging portions may be used for different types of load carriers, without changing the design and/or dimensions of the bridging portions. It shall be noted that all embodiments of the fourth aspect of the disclosure are combinable with all embodiments of the other aspects of the disclosure, and vice versa.

Optionally, the first and second bridging portions may be separate, such as separate and offset, from each other forming a coupling area therebetween as seen in the length extension of the base frame, wherein optionally a load receiving section of the load carrier is coupled to the base frame in the coupling area. The load receiving section may be a bicycle support arm member and/or a wheel receiving section as disclosed herein.

Optionally, the load receiving section may be coupled to each one of the separate first and second bridging portions and/or located in-between the separate first and second bridging portions.

Optionally, the load receiving section may be coupled to the base frame and further pivotable about a pivot axis with respect to the base frame which extends substantially in the length extension, optionally wherein the pivot axis is defined by a shaft, preferably a one-piece cylindrical rod extending through the first and the second bridging portions, for example at least one of the separate first and second bridging portions comprises a cylindrical portion, such as a cylindrical aperture and/or a cylindrical protrusion, forming a pivotable coupling with the coupled and pivotable load receiving section.

Optionally, the load receiving section may be configured to receive and hold a wheel of a bicycle, for example the load receiving section is a wheel tray, and/or wherein the load receiving section is a bicycle support arm member for holding and securing a bicycle to the load carrier.

Optionally, at least cross-sectional profiles of the first and second bridging portions are of identical shape, wherein the cross-sections are defined by planes being perpendicular to the length extension, wherein optionally the first and second bridging portions have identical or different lengths, as seen in the length extension of the load carrier. For example, the first and second bridging portion may be symmetrical with respect to a centre line of each bridging portion which extends in the height extension, i.e. a line defining two identical mirrored portions.

Optionally, each one of the first and second bridging portions may be extruded elements, such as made of a lightweight material, for example aluminium, optionally wherein the extruded first and second bridging portions have an extrusion extension which extends substantially in the length extension of the base frame. Thereby, light-weight, robust and cost-effective bridging portions can be provided. Preferably, the first and second bridging portions are extruded by the same extrusion tool, implying cost-effective manufacturing.

Optionally, each one of the first and second bridging portions may comprise a framework structure, such as a framework structure made of a lightweight material, for example aluminium. Thereby, further robust bridging portions may be provided. Still optionally, each one of the first and second bridging portions may be at least partly formed by an upwardly facing wall facing upwardly in the height extension of the base frame and a downwardly facing wall facing downwardly, wherein the upwardly and downwardly facing walls define a void therebetween, and optionally wherein at least one supportive wall is provided in-between and connecting the upwardly and downwardly facing walls, such that at least a first and a second sub-void is formed therebetween, wherein optionally at least one supportive wall is a diagonally extending wall, and/or wherein at least one supportive wall is a substantially vertically extending wall, as seen in a plane defined by the width extension and the height extension of the base frame. Thereby further robust bridging portions may be provided.

Optionally, at least one of the first and second bridging portions may be coupled to at least one of the first and second elongated members by at least one of a snap-in connection, welding, a screw and/or bolt connection, a rivet connection, clinching/pressing, such as clinching/pressing a flange or wall of the bridging portion with a flange or wall of the elongated member, hooks/engaging edges, such as hooks/engaging edges in an upper connection region and welding in a lower region of the respective bridging portion and elongated member, a rail-formed connection, such as by a rail-shaped extruded portion of the bridging portion and/or of the elongated member, wherein the rail-shaped extruded portion extends in the length extension. Additionally, or alternatively, e.g. as an alternative to welding in the upper and/or lower regions, one or more self-tapping screws may advantageously be used, providing a robust connection. The aforementioned coupling techniques and/or configurations have shown to provide more robust connections which also are cost-effective.

Optionally, at least one of the first and second bridging portions may be coupled to at least one of the first and second elongated members by at least one of an arc-shaped connection interface, a substantially diagonal connection interface, such as that the bridging portion rest on top of the elongated member, as seen in a cross-section of the base frame being defined by a plane being perpendicular to the length extension. This has also shown to provide more robust connections which also are cost-effective.

Optionally, at least one of the first and second elongated members may be an extruded element, such as made of a lightweight material, for example aluminium, and/or may comprise a framework structure, such as a framework structure made of a lightweight material, for example aluminium, wherein optionally the framework structure forms a triangular cross-sectional profile, preferably with a lower horizontal side and a first upper side for coupling/aligning with a side of at least one of the bridging portions, preferably at about 45 degrees from the horizontal side. For example, the elongated members may be identical, thereby providing a more cost-effective configuration. For example, the elongated members may be extruded from one piece of material in the same extrusion process.

Optionally, the load carrier may comprise a plurality of respective pairs of first and second bridging portions which are distributed along the length extension of the base frame, and/or the load carrier may comprise a plurality of load receiving sections which are distributed along the length extension of the base frame, such as a plurality of pairs of load receiving sections, e.g. a plurality of pairs of laterally extending wheel trays for a bicycle. Optionally, the respective pairs of first and second bridging portions and the plurality of load receiving sections may be alternatingly distributed, such as in the following order: a first bridging portion, a wheel tray, a second bridging portion and a bicycle support arm member, and then optionally repeated.

Optionally, the first and second elongated members may be provided in a common plane defined by the length extension and the width extension of the base frame, such as provided in a horizontal plane when the load carrier is mounted to a vehicle which is provided on a flat horizontally extending surface.

According to a fifth aspect, the object is at least partly achieved by a load carrier, such as a bike carrier, adapted to be mounted at a rear side of a vehicle. The load carrier has a length extension, a width extension and a height extension, and the load carrier comprises:

a housing for a light emitting and/or light reflecting member, and/or a holder for the housing.

The housing comprises a light emitting and/or light reflecting area which is at least partly directed in a rearward direction of the load carrier, corresponding to the length extension and to a rearward direction of the vehicle when the load carrier is mounted thereto.

By the provision of a load carrier comprising a housing for a light emitting and/or light reflecting member, and/or a holder for the housing, an improved load carrier is achieved. For example, a more robust light emitting and/or light reflecting member, and/or a holder for the housing, is provided, which also enables light to be emitted in more favourable directions, thereby also improving safety during use. The housing and/or the holder as disclosed herein also provides an improved connection interface. For example, the connection interface is configured such that it may conceal certain parts/elements, thereby e.g. protecting the parts/elements. It shall be noted that all embodiments of the fifth aspect of the disclosure are combinable with all embodiments of the other aspects of the disclosure, and vice versa.

Optionally, the light emitting and/or light reflecting area is of a three-dimensional shape. Still optionally, the light emitting and/or light reflecting area may comprise a first sub area having a first projection in a plane defined by the width extension and the height extension and a second projection in a plane defined by the length extension and the height extension, thereby forming a first light emitting and/or light reflecting portion of the first sub area which is directed in the rearward direction and a second light emitting and/or light reflecting portion of the first sub area which is directed in the width extension and away from the load carrier. Thereby, light can be emitted in more favourable directions, not only in the rearward direction, but also in the width extension away from the load carrier.

The load carrier may be any kind of load carrier, such as a bike carrier as disclosed herein. The load carrier may also for example be in the form of a rear-mounted cargo box.

Optionally, the first sub area may comprise a continuous surface with a main extension in the width extension formed by the first light emitting and/or light reflecting portion and another smaller extension in the length extension and/or the height extension formed by the second light emitting and/or light reflecting portion, wherein the first and second light emitting and/or light reflecting portions are connected via an edge, such as a smooth edge and/or an accentuated edge. Thereby the first light emitting and/or light reflecting portion may be able to emit more light, i.e. in the rearward direction, whilst the second light emitting and/or light reflecting portion may be smaller and better adapted for emitting laterally directed light, such as a flashing light. Consequently, more favourable light emitting portions may be achieved, implying e.g. increased safety.

Optionally, the light emitting and/or light reflecting area may further comprise a second sub area located below the first sub area, as seen in the height extension, wherein the first and second sub areas are divided by an edge. Still optionally, the edge dividing the first and second sub areas may extend outwardly from the first and second sub areas in the length extension such that it forms a second sub area overhang portion which at least partly covers the second sub area from above. Thereby, the second sub-area may for example be protected from above, reducing e.g. the risk of damaging the second sub-area. For example, if the first sub-area is damaged, such as by a falling object, it may however protect the second sub-area such that the light emitting and/or light reflecting area may not be completely out of function.

Optionally, at least one of the first and second sub areas is L-shaped, as seen from behind in the length extension L of the load carrier, such as two L-shaped oppositely arranged and interconnected sub areas extending in the width extension.

Optionally, the light emitting and/or light reflecting area may be made of transparent glass.

Optionally, the load carrier may further comprise an overhang portion provided at a top portion of the housing, and/or above the holder, as seen in a height extension of the load carrier, which corresponds to a height extension of the vehicle when the load carrier is mounted thereto. The overhang portion protrudes from the housing, and/or from the holder, such that it at least partly covers the light emitting and/or light reflecting area, and/or the holder, from above.

Optionally, the housing and/or the holder may comprise fastening elements for fastening the housing to the holder, and wherein the overhang portion encloses the fastening elements such that they are not visible when the housing is mounted to the holder.

Optionally, the housing and/or the holder may comprise fastening elements for fastening the light emitting and/or light reflecting area to the housing, and wherein the overhang portion encloses the fastening elements such that they are not visible when the housing is mounted to the holder. The fastening elements may e.g. be screws, bolts or any other type of fastening element, including also snap-fit connections.

Thereby, the fastening elements may be efficiently protected by the overhang portion, implying e.g. reduced corrosion risk for the fastening elements and/or reduced risk of theft.

Optionally, the load carrier may further comprise a load receiving section which is configured to receive and hold a wheel of a bicycle, for example the load receiving section is a wheel tray, wherein the overhang portion forms part of the load receiving section. Thereby a more integrated configuration is achieved, implying cost-effectiveness and less risk of damaging the housing.

Still optionally, the housing and/or the holder for the housing may be mounted to and/or be part of the load receiving section.

Optionally, the overhang portion and the housing may form a transition edge therebetween when the housing is mounted to the holder, wherein the overhang portion and the housing at the transition edge are shaped such that they are aligned, and/or flush with each other, along the transition edge.

Optionally, the light emitting and/or light reflecting area may have an outer contour of a parallelogram, as seen from behind in the length extension of the load carrier.

Optionally, the load carrier may further comprise a second housing for a light emitting and/or light reflecting member, and/or a second holder for the housing. The second housing and/or holder may be formed as the housing and holder according to any one of the preceding embodiments, and wherein each housing and/or holder is provided at a respective rear corner portion of the load carrier.

Optionally, the light emitting and/or light reflecting member preferably comprises one or more lights/lamps, such as LED (light emitting diode) lights.

According to a sixth aspect, the object is at least partly achieved by a load carrier, such as a bike carrier, adapted to be mounted to a vehicle for transporting a load, the load carrier having a length extension, a width extension and a height extension. The load carrier comprises:
  a base frame portion,
  a load receiving section for receiving and securing a load to the vehicle,
    wherein the load receiving section is movable with respect to the base frame portion such that the load receiving section can be moved away from the vehicle when the load carrier is mounted thereto.

By the provision of the load carrier according to the sixth aspect of the disclosure, an improved load carrier is achieved which is more user friendly, robust and which also provides a safe and secure connection of the movable load receiving section. It shall be noted that all embodiments of the sixth aspect of the disclosure are combinable with all embodiments of the other aspects of the disclosure, and vice versa.

Optionally, the movable load receiving section may be pivotable about a pivot axis, such as a pivot axis which substantially extends along one of the length extension, the width extension and the height extension.

The load carriers and/or bike carriers as disclosed herein are preferably mounted at the rear of a vehicle, such as to a tow bar, even though also other mounting positions may be possible for at least some embodiments disclosed herein, such as on the roof of the vehicle.

Optionally, the base frame portion may comprise at least one connection pin and/or connection hook member for holding and securing the load receiving section in a fixed state with respect to the base frame portion. A connection pin is herein defined as a protruding element, or protrusion, which is adapted to connect with a corresponding connection element/arrangement. A fixed state means in this respect that the load receiving section is unmovable with respect to the base frame portion, such as unpivotable. It has been realized that it may be advantageous to provide a connection pin and/or connection hook member on the base frame portion, i.e. the portion which is mounted to the vehicle. Thereby, the base frame portion can be made less complex, implying cost-effectiveness. In addition, it has been realized that the load receiving section may be more suitable for carrying a more complicated and/or more spacious connection arrangement as disclosed herein. It has further been realized that e.g. providing holes in the base frame portion weakens the construction, thereby requiring thicker walls of the base frame portion. Accordingly, by not having such holes in the base frame portion, thinner walls may be used, implying cost-effectiveness and reduced weight.

Optionally, the load receiving section may comprise at least one corresponding connection arrangement, such as a connection arrangement comprising an aperture, for receiving the at least one connection pin and/or connection hook member. The load receiving section may already require thicker walls and/or a more rigid configuration due to the load it is intended to carry. Therefore, providing one or more apertures on the load receiving section may not result in a need of providing e.g. thicker walls.

Optionally, the corresponding connection arrangement may comprise a spring-biased locking mechanism for locking the at least one connection pin and/or connection hook member to the load receiving section. Still optionally, the spring-biased locking mechanism may be arranged to lock the at least one connection pin and/or connection hook member to the load receiving section in a locking direction which is substantially perpendicular to a length extension of the at least one connection pin and/or connection hook member. Thereby, a more rigid and robust locking can be achieved, which also may be more easily provided inside an inner space of the load receiving section, implying a more compact configuration.

Optionally, the corresponding connection arrangement may be at least partly concealed in an inner space of the load receiving section. Still optionally, the corresponding connection arrangement may be provided in a separate cassette housing in the inner space, such as a cassette housing which can be slid into the inner space, such as slid into a base frame tube. By concealing the corresponding connection arrangement, the connection arrangement may be better protected from the outside. Furthermore, by concealing the corresponding connection arrangement, a more appealing configuration can be achieved where fewer parts are visible from the outside. In addition, by providing the corresponding connection arrangement in a separate cassette housing, a more flexible configuration may be achieved where it e.g. will be easier to repair the load carrier if the connection arrangement is damaged/broken. A separate cassette housing also implies a more modular configuration where the same or similar cassette housing can be used for different types of load carriers.

Optionally, the load carrier may further comprise a flexible elongated element, such as a wire, wherein the spring-biased locking mechanism is arranged to be released by a pulling or pushing force exerted on the flexible elongated element. A flexible elongated element implies a larger design freedom, requiring fewer adaptations of e.g. the load receiving section. Still optionally, the load carrier may comprise a rigid element, such as a rod or the like, wherein the spring-biased locking mechanism is arranged to be released by a pulling or pushing force exerted on the rigid element.

Optionally, the flexible elongated element may be connected to the spring-biased locking mechanism via a flexible element spring biasing member which exerts a tensioning force to the flexible elongated element. Thereby it can be assured that the flexible elongated element is tensioned such that e.g. a handle for a user for pulling in the flexible elongated element is biased towards a handle default position.

Optionally, the spring-biased locking mechanism may comprise at least one slidable plate element for locking the at least one connection pin and/or connection hook member to the load receiving section.

Optionally, the at least one connection pin may have a conical shape which tapers in a direction towards the load receiving section, such as a conical shape with at least one recess for receiving a locking element, such as the at least one slidable plate element mentioned in the above. Thereby a more rigid and robust connection can be provided, reducing the risk of unsafe release. The conical shape may be part of a mushroom-shaped connection pin, e.g. a shape with a profile which has a waist section and an outer larger portion with a larger diameter than the waist section. The conical shape enables easier fit and/or alignment of the connection pin in the above mentioned aperture.

Optionally, the base frame portion may extend along a base frame portion extension axis in the length extension of the load carrier, wherein the pivot axis is offset from the base frame portion extension axis, such as provided below the base frame portion extension axis, as seen in the height extension of the load carrier, and for example extending in the width extension of the load carrier. Thereby it will be easier to pivot the load receiving section without interfering with other parts of the load carrier and/or the vehicle. For example, it has been realized that a vehicle rear door or tailgate may be easier to open by providing the pivot axis as disclosed herein.

Optionally, the pivot axis may be provided on a separate member which is attached to the base frame portion, such as attached thereto by a plug-in connection. Thereby a more modular, adaptable and/or cost-effective configuration may be achieved. For example, the required offset of the pivot axis may differ for different vehicle types, and by providing it as a separate member this part can be adapted without adapting e.g. the base frame portion.

Optionally, the load carrier may further comprise a stop element for preventing the load receiving section to be moved further away from the base frame portion when it has been moved, such as pivoted, a maximum predetermined distance, wherein the stop element may be a flexible elongated element, such as a wire, connecting the base frame portion and the load receiving section. The maximum predetermined distance may be adapted with respect to the offset distance of the pivot axis.

Optionally, the at least one connection pin and/or connection hook member may further be configured to secure the load receiving section in the width extension when it is connected to the base frame section. e.g. such that a clearance free connection is achieved in the width extension. Thereby, no other guiding means, such as guiding pins for the width extension securement may be required, implying a more cost-effective configuration.

According to a seventh aspect of the disclosure, the object is at least partly achieved by a license plate holder for a load carrier for a vehicle. The license plate holder has a main extension in a license plate holder plane, and comprises:
- a license plate attachment side directed out from the license plate holder in a first transversal direction with respect to the license plate holder plane and a load carrier attachment side directed out from the license plate holder in a second opposite transversal direction.

The load carrier attachment side comprises an attachment guiding track adapted to attach the license plate holder to the load carrier and further adapted such that a pivoting movement of the license plate holder between a stowing position and a use position can be performed with respect to the load carrier when the license plate holder is attached to the load carrier. The attachment guiding track is provided on and/or in a protruding portion which protrudes out from the load carrier attachment side in the second opposite transversal direction.

By the provision of the license plate holder as disclosed herein, a more robust pivotable connection will be achieved. In particular, it has been realized that by providing a protruding portion for the attachment guiding track, the strength and/or stability of the connection can be improved. Also, the pivoting motion will be more reliable, reducing the risk that the license plate holder gets stuck when being pivoted. It shall be noted that all embodiments of the seventh aspect of the disclosure are combinable with all embodiments of the other aspects of the disclosure, and vice versa.

Optionally, the protruding portion may be at least partly an integral portion of the license plate holder and/or comprise a separate member with respect to the license plate holder.

Optionally, the separate member may be attached to the license plate holder by at least one of a snap-fit connection, such as by transversally extending and/or flexible arm members, a screw and/or bolt connection and a rivet connection.

Optionally, the license plate holder may comprise a receiving section for the separate member which is defined by a transversally extending wall which is integral with the license plate holder and at least partly encloses the separate member, as seen in the license plate holder plane.

Optionally, the protruding portion, such as the separate member, may comprise a transversal outer wall extending in the second opposite transversal direction out from the load carrier attachment side, wherein the transversal outer wall at least partly, or completely, encloses the attachment guiding track, thereby forming an at least partly enclosed space for the attachment guiding track, as seen in the license plate holder plane.

Optionally, the transversal outer wall may comprise at least one guiding flange extending substantially in a direction being perpendicular to the transversal outer wall and inwardly into the at least partly enclosed space, wherein the at least one guiding flange forms part of a guiding track surface of the attachment guiding track. Thereby the guiding track surface can be offset from the license plate holder plane, implying a more reliable pivoting motion.

Optionally, the transversal outer wall may extend in the second opposite transversal direction from an innermost end portion to an outermost end portion, wherein the at least one guiding flange is located proximate the outermost end portion, such that the at least one guiding flange is at least located closer to the outermost end portion than to the innermost end portion.

Preferably, the attachment guiding track extends in the license plate holder plane. Still preferably, the attachment guiding track is curve-shaped, such as S-shaped, as seen in the license plate holder plane.

According to the seventh aspect, a load carrier may also be provided, such as a bike carrier, which comprises the license plate holder as disclosed herein.

According to an eighth aspect, the object is at least partly achieved by a bike carrier for a vehicle, comprising:
- at least one strap for securing a bicycle to the bike carrier, wherein the bike carrier is adapted such that the strap secures the bicycle to the bike carrier when the strap is in a bicycle securing position,
- wherein the bike carrier further comprises a strap stowing away portion which is adapted to temporarily hold the strap in a stow away position which is different from the bicycle securing position.

By the provision of the bike carrier according to the eighth aspect, a more user-friendly bike carrier is achieved. For example, bicycles may be easier to load by using the stowing away portion for the strap as disclosed herein. In other words, the strap can be positioned such that it does not disturb the user during loading. Furthermore, the bike carrier according to the eighth aspect allows the strap(s) to be secured in a safe position, reducing the risk that the strap(s) is/are hanging loose, when not used. It shall be noted that all embodiments of the eighth aspect of the disclosure are combinable with all embodiments of the other aspects of the disclosure, and vice versa.

Optionally, the strap stowing away portion may comprise any one of a magnetic member and a slot, such as an open or closed slot, to temporarily hold the strap in the stow away position.

Optionally, the strap stowing away portion may be provided on any one of a frame member of the bike carrier, such as on a bicycle support arm member, and a wheel receiving section, such as a wheel tray, of the bike carrier.

Optionally, the strap may be coupled, such as undetachably coupled, to any one of the frame member and the wheel receiving section.

Optionally, the strap may be pivotably coupled, such as pivotably coupled about a pivot axis which is substantially perpendicular to a length extension and/or to a width extension of the strap, and/or slidably coupled.

Optionally, the strap may be arranged to substantially extend along and be aligned with a length extension of the frame member or the wheel receiving section when being provided in the stow away position.

Optionally, when the strap stowing away portion is provided on the frame member, the frame member may comprise a sleeve-formed member, such as a separate sleeve-formed member, wherein the strap stowing away portion is provided on the sleeve-formed member, and wherein the sleeve-formed member optionally encloses a portion of the frame member.

Optionally, the frame member may be a telescoping bicycle support arm member comprising at least a first and a second telescoping arm member, wherein the sleeve-formed member is provided proximate or at an intersection between the first and second telescoping arm members.

Optionally, when the strap stowing away portion is provided on the wheel receiving section, the strap stowing away portion may be provided on a user side of the wheel receiving section from which a user is intended to load/unload a bicycle, such as the strap stowing away portion is provided on a side of the wheel receiving section which is a side comprising a strap receiving member, such as a ratchet buckle, for holding the strap when it secures a bicycle thereto, for example a side which is opposite to a side where the strap is coupled, such as undetachably coupled, to the wheel receiving section.

Optionally, when the strap stowing away portion is provided on the wheel receiving section, the wheel receiving section may further comprise a strap receiving member, such as a ratchet buckle, for holding the strap when it secures a bicycle thereto, wherein the strap stowing away portion is separated at a specific distance away from the strap receiving member as seen along the length extension of the wheel receiving section. Thereby, when the strap is in the stow away position, the strap may not interfere with a wheel of a bicycle when the bicycle is loaded onto the wheel receiving member. Accordingly, the specific distance may be selected such that a bicycle wheel will not interfere with the strap when the bicycle is loaded and when the strap is in the stow away position.

Optionally, when the strap stowing away portion is provided on the wheel receiving section, the strap stowing away portion may be a slot which is substantially aligned with the length extension of the wheel receiving section.

According to a ninth aspect, the object is at least partly achieved by a bike carrier for a vehicle, adapted to be mounted to a vehicle for transporting a bicycle, comprising:
a bike stand member for holding the bicycle in a standing position when the bicycle is positioned on a ground surface adjacent the vehicle.

By the provision of a bike carrier according to the ninth aspect, a more flexible and user-friendly bike carrier is achieved in which a bicycle can be held on the ground surface adjacent the vehicle when the vehicle is standing still. Thereby, the bicycle can be held in a safe manner without e.g. damaging the bicycle and/or scratching the vehicle, and without a need to mount the bicycle to the bike carrier's loading platform, e.g. the above-mentioned platform support arrangement. It shall be noted that all embodiments of the ninth aspect of the disclosure are combinable with all embodiments of the other aspects of the disclosure, and vice versa.

Optionally, the bike stand member may be detachable from the bike carrier or non-removably integrated with the bike carrier. A detachable bike stand member implies a more flexible configuration, allowing e.g. the user to select if a bike stand member should be used or not. A non-removably integrated bike stand member implies a rigid and robust connection, also mitigating the risk of unwanted removal.

Optionally, the bike stand member may be configured to receive and hold a wheel, such as a tyre of the wheel, of the bicycle, such as being in the form of a crutch, a fork member, U-shaped or V-shaped.

Optionally, the bike stand member may be configured to be locked to the bike carrier when being attached thereto, such that it is prevented from unwanted removal when being attached.

Optionally, the bike stand member may comprise at least one arm member, such as a pivoting arm member with respect to the bike carrier, optionally wherein the at least one arm member is movable to e.g. clamp the wheel, such as by two C-shaped or J-shaped movable arm members. Thereby a more versatile bike stand member may be provided which is adapted to e.g. efficiently clamp a wheel.

Still optionally, the at least one arm member may comprise a lock or catch for preventing the at least one arm member from being forced open when the bike stand member holds the bicycle, such as a lock or catch which is adapted to pass through the wheel in-between the spokes of the wheel. Thereby the bicycle can be secured to the bike carrier, reducing the risk of theft.

Optionally, the bike carrier may further comprise at least one wheel tray for receiving a wheel of a bicycle, wherein the bike stand member is provided on or at the wheel tray, such as at an outer end portion of the wheel tray, and/or between two outer end portions of two adjacent wheel trays.

Optionally, the at least one arm member may be configured to be moved, such as pivoted, between a non-use position where the at least one arm member is substantially flush with a surface of the bike carrier, such as flush with a wheel receiving surface of the wheel tray, and a use position where the at least one arm member is extending away from the wheel receiving surface of the wheel tray.

Optionally, the bike carrier may be configured to be moved, such as pivoted, such that bicycles which are loaded thereon are moved away from the vehicle when the bike carrier is mounted thereto, wherein the bike stand member is configured such that the bicycle which is held by the bike stand member is kept in a standing position when the bike carrier is moved, such as pivoted, away from the vehicle.

Optionally, the bike stand member may be configured such that the bicycle can be held in a position which is substantially parallel with the vehicle's travel direction, substantially transversal to the vehicle's travel direction, or at an angle therebetween, such that at least a vehicle door can still be opened when the bicycle is held by the bike stand member and/or to avoid conflict with neighbouring vehicles.

Optionally, the bike stand member may be adjustable, such as by moving an arm member of the bike stand member, such that it can hold bicycle wheels of different shapes and/or thickness. Thereby a more flexible bike stand member may be provided, allowing more types of bicycles to be held.

Optionally, the bike stand member may comprise at least on roller, such as a roller provided on an outer portion of an arm member, adapted to roll on a bicycle wheel when the bicycle wheel is inserted into the bike stand member. Thereby it may be easier to insert a bicycle wheel into the bike stand member, e.g. it may result m a reduced friction force between the bike stand member and the bicycle wheel.

Optionally, the bike stand member may be configured, such as spring-biased, such that it can provide a clamping force around a portion of a bicycle wheel when the portion of the bicycle wheel is received in the bike stand member. Thereby a more robust and reliable holding of the bicycle may be provided. For example, the bike stand member may comprise two arm members which are spring-biased such that at least one of the arm members is biased towards the other arm member. Additionally, or alternatively, at least one of the arm members may be adjustable such that the bike stand member can clamp a bicycle wheel, for example by a user rotating on a screw or the like such that the at least one arm member is pivoted in a clamping direction.

Optionally, the bike stand member may comprises at least two portions which are offset from each other in a width direction of the bike stand member and configured to engage with a bicycle wheel on opposite sides thereof, wherein the at least two portions are further offset from each other in a height direction of the bike stand member, corresponding to a height direction of the bicycle, so as to prevent the bicycle from rotating about a longitudinal, or roll, axis of the bicycle.

Optionally, the bike stand member may comprise at least two portions which are offset from each other in a width direction of the bike stand member and configured to engage with a bicycle wheel on opposite sides thereof, wherein the at least two portions are further offset from each other in a length direction of the bike stand member, corresponding to a length direction of the bicycle, so as to prevent the bicycle from rotating about a yaw axis of the bicycle.

Optionally, the bike stand member may comprise at least four portions, wherein two portions are configured to engage with the bicycle wheel on one side thereof, and two portions are configured to engage with the bicycle wheel on the other side thereof, and wherein the at least four portions are configured to prevent the bicycle from rotating in any direction about the longitudinal, or roll, axis of the bicycle, and further configured to prevent the bicycle from rotating in any direction about the yaw axis of the bicycle.

Optionally, the bike stand member may be reconfigurable between a stow away state and a use state when the bike stand member can hold a bicycle, such as the bike stand member is pivotable between the stow away state and the use state.

According to a tenth aspect of the disclosure, the object is at least partly achieved by a bike carrier for a vehicle, adapted to be mounted to a vehicle for transporting a bicycle, comprising:

a locking anchor for locking a bicycle to the bike carrier.

By the provision of the bike carrier according to the tenth aspect, an improved bike carrier is achieved in which at least one bicycle can be locked to the bike carrier, thereby preventing theft of the bicycle. In particular, by the locking anchor configuration as disclosed herein, a robust and cost-effective locking anchor is provided. A locking anchor as used herein means a device which is configured to lock a bicycle to the bike carrier. The locking anchor may comprise a loop-formed rigid member in which a locking wire can be received. Additionally, or alternatively, the locking anchor may comprise a flexible element, such as a locking wire, which is attached and/or attachable to the locking anchor such that it can lock a bicycle thereto. The locking anchor may comprise a lock key arrangement for e.g. locking the locking wire to the locking anchor. It shall be noted that all embodiments of the tenth aspect are combinable with all embodiments of the other aspects, and vice versa.

Optionally, the locking anchor may be detachable with respect to the bike carrier. Thereby a more flexible configuration is achieved, allowing e.g. a user to select whether a locking anchor should be used or not. Still optionally, the locking anchor may be rigidly fixed to the bike carrier. For example, the locking anchor may be rigidly fixed, e.g. permanently fixed, so that it cannot be removed from the bike carrier. Still optionally, the lock key arrangement, for e.g. locking the locking wire to the locking anchor, may be detachable with respect to the bike carrier and the locking anchor, such as detachable when the lock key arrangement is in an unlocked state when e.g. the locking wire is not locked thereto, and non-detachable when the lock key arrangement is in an locked state when e.g. the locking wire is locked thereto. By way of example, the lock key arrangement for e.g. locking the locking wire may be a separate accessory which is attachable to the locking anchor.

Optionally, the bike carrier may further comprise a base frame having a length extension, a width extension and a height extension. The base frame comprises a first and a second elongated member for carrying a load, wherein the first and a second elongated members are separate from each other and provided substantially parallel with respect to each other along the length extension, wherein the locking anchor is provided in-between the first and second elongated members, as seen in the width extension. Thereby, a further robust configuration can be achieved, making it more difficult for e.g. a thief to detach the locking anchor.

Optionally, the bike carrier may further comprise at least one bridging portion provided between the first and second elongated members and coupling the first and second elongated members together, wherein the locking anchor is provided proximate, such as being coupled to, the at least one bridging portion. Thereby, a further robust configuration can be achieved.

Optionally, the bike carrier may comprise a first and a second bridging portion provided between the first and second elongated members and coupling the first and second elongated members together, wherein the first and second bridging portions are separate and offset from each other as seen in the length extension of the base frame, wherein the locking anchor is provided in-between the first and second bridging portions, as seen in the length extension of the base frame. It has been found that the position therebetween will provide a more robust configuration.

Optionally, the bike carrier may further comprise a cover, such as a polymer cover, which covers the at least one bridging portion between the first and second elongated members, wherein the locking anchor is mounted and/or mountable to the cover, and/or wherein the cover comprises an aperture, preferably facing upwardly in the height extension, which is adapted to receive the locking anchor, and/or wherein the locking anchor is integrated with the cover. Thereby a more appealing configuration may be achieved, where it also will be more difficult for a thief to access an inner space of the bike carrier.

Optionally, the locking anchor may be an extruded profile or a moulded profile, such as made from a light-weight material, for example a polymer and/or aluminium. Additionally, or alternatively, the locking anchor may be made from a sheet metal plate, such as an aluminium or steel plate.

Optionally, the locking anchor may be adapted to be inserted into a locking anchor opening of the bike carrier, such as an opening of the base frame, optionally wherein the locking anchor has a T-shaped profile, optionally wherein the locking anchor further comprises protruding flanges adapted to engage with a firm portion of the bike carrier to position the locking anchor in a predetermined support position in the locking anchor opening. Thereby, a safer locking anchor configuration may be achieved.

Optionally, the bike carrier, such as the base frame and/or the locking anchor, may be configured such that the locking anchor is prevented from being pulled out when being inserted into the locking anchor opening, such as prevented from being pulled out in an upward direction, such as by use of plastic cover sleeves which are inserted into the locking anchor opening and adapted to prevent the locking anchor from being pulled out from the locking anchor opening.

Optionally, the bike carrier may be configured to receive the locking anchor from below, i.e. the locking anchor may be insertable from below, such as between the first and second elongated members of the base frame, as seen in the height extension of the bike carrier. Preferably, the locking anchor may be prevented from being removed from the bike carrier when a bicycle is locked thereto.

According to an eleventh aspect of the disclosure, the object is at least partly achieved by a load carrier, such as a bike carrier, adapted to be mounted at a rear side of a vehicle, the load carrier having a length extension, a width extension and a height extension. The load carrier comprises:
- a housing for a light emitting and/or light reflecting member, and/or a holder for the housing,
- the housing comprising a light emitting and/or light reflecting area which is at least partly directed in a rearward direction of the load carrier, corresponding to the length extension and to a rearward direction of the vehicle when the load carrier is mounted thereto,
- a license plate holder, the license plate holder having a main extension in a license plate holder plane, the license plate holder comprising a license plate attachment side directed out from the license plate holder in a first transversal direction with respect to the license plate holder plane,
- wherein the housing and/or the holder is/are positioned such that the light emitting and/or light reflecting area is prohibited from emitting and/or reflecting light onto the license plate when the license plate is attached to the license plate holder.

By the provision of a load carrier according to the eleventh aspect, an improved load carrier is provided in which a larger design freedom will be achieved. In prior art load carriers, the light emitting and/or light reflecting area has been configured to emit light onto the license plate holder. It has been realized that this reduces the design freedom of the load carrier. It shall be noted that all embodiments of the eleventh aspect of the disclosure are combinable with all embodiments of the other aspects, and vice versa.

Preferably, the load carrier comprises an auxiliary light source for emitting light on the license plate, wherein the auxiliary light source is preferably provided on the license plate holder, such as above the license plate attachment position. The auxiliary light source comprises for example LED light(s).

Optionally, the housing and/or the holder may be positioned such that an outermost portion of the light emitting and/or light reflecting area is aligned with and/or located behind the license plate holder plane, as seen along the length extension. In particular, the housing and/or the holder may be positioned such that the light emitting and/or light reflecting area is aligned with and/or located behind the license plate when it is attached to the license plate holder.

Optionally, the load carrier may further comprise a load receiving section which is configured to receive and hold a wheel of a bicycle, for example the load receiving section is a wheel tray, wherein the housing and/or holder is/are attached to the load receiving section.

Optionally, the light emitting and/or light reflecting area may be of a three-dimensional shape.

Optionally, the light emitting and/or light reflecting area may be made of transparent glass.

According to a twelfth aspect of the disclosure, the object is at least partly achieved by a bicycle support arm member for a bike carrier, comprising:
- a ratchet buckle for receiving and holding a strap, and
- a strap locking arrangement associated with the ratchet buckle for locking the strap such that it is prevented from being released from the ratchet buckle.

By the provision of the bicycle support arm member according to the twelfth aspect, an improved bicycle support arm member is provided in which the strap can be efficiently locked when it holds a bicycle. The strap locking arrangement as disclosed herein provides an efficient lock which is easy to use, is more flexible, and which also has a cost-effective configuration, e.g. requiring fewer parts for achieving the locking functionality. The bicycle support arm member according to the twelfth aspect further reduces the risk of damaging the bicycle, especially the bicycle frame. It shall be noted that all embodiments of the twelfth aspect are combinable with all embodiments of the other aspects, and vice versa.

Optionally, the strap locking arrangement may comprise a locking element which is arranged to engage with at least one buckle engagement member of the strap.

Optionally, the locking element may be a frame-shaped element, such as a square-shaped element, with an opening for receiving the strap, wherein preferably a main extension plane of the frame-shaped element is adapted to be substantially perpendicular to a length extension of the strap when the strap is provided through the frame-shaped element.

Optionally, the locking element may be adapted to engage with the at least one buckle engagement member by moving, such as by sliding and/or rotating, the locking element in a locking direction towards the at least one buckle engagement member of the strap, thereby enabling a locked state for the strap.

Optionally, the locking element may be adapted to be locked by use of a key which, after being rotated and released in a keyhole of the strap locking arrangement, such as a keyhole of a locking cylinder, prevents the locking element from being moved to an unlocked state from the locked state.

Optionally, the keyhole, e.g. the locking cylinder, and the locking element may be arranged to move simultaneously together when the locking arrangement is moved from the unlocked state to the locked state, and vice versa.

Optionally, the locking arrangement, at least the locking element, may be spring-biased towards the unlocked state where the strap is freely movable in the locking arrangement.

Optionally, the strap locking arrangement may be provided at an outer end portion of the bicycle support arm member, such as on a pivotable head, wherein optionally the outer end portion, such as the pivotable head, comprises a bicycle support surface, such as a firm or cushioned surface, against which a bicycle is intended to rest against when the strap has tensioned the bicycle to the bicycle support arm member.

Optionally, the strap locking arrangement may be provided on a rotatable member, such as on a pivotable head, wherein the rotatable member may be substantially L-shaped or V-shaped.

According to a thirteenth aspect of the disclosure, the object is at least partly achieved by a load carrier for a vehicle comprising a ratchet buckle for receiving and holding a strap, the ratchet buckle comprising:
  a strap receiving section, the strap receiving section having a length direction corresponding to a length direction of the strap when it is received therein, a width direction and a height direction,
  a strap engagement member configured to engage with at least one buckle engagement member of the strap to thereby hold the strap in the strap receiving section,
  an actuation lever for a user, the actuation lever being configured to actuate the strap engagement member between an open state in which the strap is freely movable in the strap receiving section and an engaged state in which the strap engagement member is configured to be engaged with the at least one buckle engagement member of the strap, and
  wherein any one of the strap engagement member, the actuation lever and a ratchet buckle housing of the ratchet buckle comprises a strap guiding element which is configured to, in the open state, prevent a portion of the strap which is in the strap receiving section from being bent upwardly in the height direction.

By the provision of the load carrier according to the thirteenth aspect, an improved load carrier is provided in which the risk of damaging the strap, and/or the risk of the strap getting stuck in the strap receiving section, can be mitigated. More specifically, by the configuration and use of the at least one strap guiding element, the strap can be kept in its intended position also when the ratchet buckle is in the open state in which the strap is freely movable in the strap receiving section. It shall be noted that all embodiments of the thirteenth aspect are combinable with all embodiments of the other aspects, and vice versa.

Optionally, the strap guiding element may be configured to, in the open state, push downwardly on the portion of the strap, as seen in the height direction.

Optionally, the load carrier may further comprise the strap with at least one buckle engagement member, such as a tooth. The strap guiding element may be configured to contact the at least one buckle engagement member in the open state so that the portion of the strap which is in the strap receiving section is prevented from being bent upwardly in the height direction. Preferably, the strap guiding element is configured to contact at least two buckle engagement members, such as teeth, in the open state so that the portion of the strap which is in the strap receiving section is prevented from being bent upwardly in the height direction. Thereby, a compact and efficient configuration is achieved.

Optionally, the strap guiding element, as seen in a sectional plane defined by the height and length directions, may have a perimeter surface, such as a curve-shaped perimeter surface, for example a curve-shaped perimeter surface with a varying radius, wherein at least a portion of the perimeter surface is configured to, in the open state, prevent the portion of the strap which is in the strap receiving section from being bent upwardly in the height direction. A curved perimeter surface implies a smooth contact with the at least one buckle engagement member of the strap, reducing the risk of the strap getting stuck in the open state.

Optionally, the strap guiding element may comprise at least a first and a second guiding portion which are offset from each other, as seen in the width direction. This implies a light-weight configuration which also provides a reliable contact interface between the strap guiding element and the strap.

Optionally, at least two of, such as each one of the strap engagement member, the actuation lever and the ratchet buckle housing may comprise a respective strap guiding element, wherein each respective strap guiding element is a strap guiding element according to any one of the embodiments disclosed herein for the strap guiding element.

Still optionally, the respective strap guiding elements may be offset from each other, as seen in the length direction of the strap receiving section. This implies a further improved contact interface between the respective strap guiding elements and the strap. Thereby, the risk of the strap getting stuck and being bent when the ratchet buckle is in the open state can be reduced.

Optionally, the strap engagement member and the actuation lever may be separate parts with respective separate connection interfaces for connection to the ratchet buckle, such as respective separate pivot axes. The respective separate connection interfaces may be offset from each other, as seen in the length direction of the strap receiving section. Alternatively, the strap engagement member and the actuation lever as disclosed herein may be made in one single piece.

Optionally, the respective strap guiding elements may be provided in-between the respective separate connection interfaces.

Optionally, when the actuation lever comprises the strap guiding element, the strap guiding element of the actuation lever may be configured to be moved, such as pivoted, together with the actuation lever between the open state and the engaged state.

Optionally, when the strap engagement member comprises the strap guiding element, the strap guiding element of the strap engagement member may be configured to be moved, such as pivoted, together with the strap engagement member between the open state and the engaged state.

Optionally, the actuation lever may comprise a strap engagement portion configured to engage with at least one buckle engagement member of the strap, wherein the actuation lever is configured to be moved, such as pivoted, with respect to the ratchet buckle such that the strap engagement portion moves the strap in a strap tightening direction in the strap receiving section.

Optionally, the actuation lever may be spring-biased towards a default position, such as spring-biased towards the engaged state in which the strap engagement member is configured to be engaged with the at least one buckle engagement member of the strap, and/or the strap engagement member may be spring-biased towards the engaged state in which the strap engagement member is configured to be engaged with the at least one buckle engagement member of the strap.

Optionally, the ratchet buckle may further comprise a strap guide portion provided at a strap entrance section of the strap receiving section and/or at a strap exit section of the strap receiving section, wherein the strap guide portion is an extension of the strap receiving section and/or a widened section of the strap receiving section. Still optionally, the strap guide portion may comprise a floor section and a ceiling section for the strap, as seen in the height direction. By the provision of a strap guide portion, a further improved guiding of the strap buckle can be achieved, reducing the risk of the strap getting stuck and/or being bent so that the strap is damaged. Still optionally, the strap guide portion, such as the floor section and/or a ceiling section, may have a length which corresponds to, or is greater than, a length between two buckle engagement members of the strap. Thereby, a smooth contact is achieved, reducing the risk of the strap getting stuck and/or being unnecessarily bent when it is moved in the strap receiving section. Still optionally, the strap guide portion, such as the floor section and/or a ceiling section, may be convexly shaped. This implies a further improved guiding of the strap, reducing the risk of the strap getting stuck when it is moved in the strap receiving section.

According to a fourteenth aspect of the disclosure, the object is at least partly achieved by a load carrier for a vehicle comprising a bicycle support pad against which a bicycle is intended to rest when the bicycle is mounted to the load carrier. The bicycle support pad is releasably mounted to the load carrier.

By the provision of a bicycle support pad according to the fourteenth aspect of the disclosure, a more versatile load carrier is provided. In fact, by using a bicycle support pad which can be released from the load carrier, it is possible to equip the load carrier with different types of bicycle support pads depending on the current need. For example, the bicycle to be supported may have different types of frame material. e.g. aluminium, carbon fibre, etc., and thereby it may be advantageous to adapt the bicycle support pad material for the specific frame material. In addition, the shapes of different bicycle frames may also vary, and therefore it may be advantageous to use bicycle support pads with different shapes. Still further, the bicycle support pad may be worn during use, and therefore it may also be advantageous to replace worn bicycle support pads. It shall be noted that all embodiments of the fourteenth aspect are combinable with all embodiments of the other aspects, and vice versa.

Optionally, the bicycle support pad may be releasably mounted to the load carrier by a snap-fit connection. This implies a facilitated connection/releasing procedure, requiring no tools and/or less sophisticated tools for the attachment/releasing procedure.

Optionally, the bicycle support pad may comprise a first and a second mounting member for releasably mounting the bicycle support pad to the load carrier, and the load carrier may comprise corresponding first and second holding members for holding the first and second mounting members.

Still optionally, the bicycle support pad and/or the first and second holding members may be configured so that the bicycle support pad is releasably mounted to the load carrier by first engaging the first mounting member with the first holding member whereafter the bicycle support pad is pivoted with respect to the first mounting member until the second mounting member engages with the second holding member. This implies an easy and intuitive attachment procedure for a user.

Still optionally, the first and second mounting members and the corresponding first and second holding members may be configured so that the bicycle support pad is releasably mounted to the load carrier by simultaneously engaging the first and second mounting members with the corresponding first and second holding members.

Optionally, at least the second mounting member and the second holding member may be configured as a snap-fit connection.

Optionally, the first mounting member and the first holding member may be configured as a hinge connection.

Optionally, the bicycle support pad may comprise a releasing portion which is configured to be actuated for releasing the bicycle support pad from the load carrier when it is mounted thereto, wherein the releasing portion is concealed by the load carrier so that a user is prevented from accessing the releasing portion without the use of a separate tool. Thereby, the risk of theft or unwanted release of the bicycle support pad can be mitigated.

Optionally, the releasing portion may be accessible through an aperture of the load carrier, such as an aperture with a width or diameter which is less than 15 mm, for example less than 10 mm, and/or such as an aperture with a length from an opening thereof to the releasing portion which is greater than 5 mm, for example greater than 10. Thereby, it can be assured that the releasing portion cannot be accessed by e.g. a finger.

Optionally, the bicycle support pad may comprise a first material which forms a surface against which a bicycle is intended to rest when the bicycle is mounted to the load carrier, and further comprising a second material which forms a mounting interface for mounting to the load carrier, wherein preferably the first material is softer than the second material. Thereby, a reliable and robust connection can be achieved while the contact surface for the bicycle can be kept soft enough for not damaging e.g. a bicycle frame.

Optionally, the first material may be a thermoplastic elastomer, such as thermoplastic polyurethan, and/or the second material may be a glass fibre reinforced polymer, such as glass fibre reinforced polyamide.

Optionally, the bicycle support pad may be provided on any one of a bicycle support arm, a wheel receiving member, a gripping claw and a pivotable head on a bicycle support arm of the load carrier.

Still optionally, the load carrier may be a roof mounted load carrier or a rear mounted load carrier for a vehicle.

According to a fifteenth aspect of the disclosure, the object is at least partly achieved by a load carrier, such as a bike carrier, adapted to be mounted to a vehicle for transporting a load. The load carrier has a length extension, a width extension and a height extension.

The load carrier comprises:
a base frame portion, a load receiving section for receiving and securing a load to the vehicle,
wherein the base frame portion comprises two separate elongated members extending in the length extension, the two separate elongated members being offset from each other in the width extension, and
wherein the load carrier further comprises a holder for holding auxiliary equipment, such as for holding a loading ramp arrangement for a bicycle, wherein the holder for holding auxiliary equipment is releasably attached to the load carrier in-between the separate elongated members.

By the provision of a load carrier according to the fifteenth aspect, an improved load carrier is achieved in which auxiliary equipment, such as a loading ramp for a bicycle, can be efficiently stored on the load carrier during use of the load carrier. More specifically, a compact storage is achieved in-between the two separate elongated members, which may be cylinder shaped beam elements. In addition, the load carrier of the fifteenth aspect facilitates the mounting and dismounting procedure of the holder for holding auxiliary equipment. According to an example embodiment, the holder for holding auxiliary equipment comprises a receptacle for receiving the auxiliary equipment.

Optionally, the holder for holding auxiliary equipment may be releasably attached to the load carrier below the load receiving section, as seen when the load carrier is mounted to a vehicle which is provided on a flat horizontally extending surface. This implies a compact and efficient storage of the auxiliary equipment.

Optionally, the load receiving section may be movable with respect to the base frame portion such that the load receiving section can be moved away from the vehicle when the load carrier is mounted thereto. Thereby, the holder can be more easily accessible for a user, also implying facilitated mounting/dismounting of the holder.

Optionally, the movable load receiving section may be pivotable about a pivot axis, such as a pivot axis which substantially extends along one of the length extension, the width extension and the height extension.

Optionally, the load carrier and/or the holder for holding auxiliary equipment is/are arranged so that the holder for holding auxiliary equipment is attachable to the load carrier from above, such as when the load receiving section is moved away from the vehicle as mentioned in the above, as seen when the load carrier is mounted to a vehicle which is provided on a flat horizontally extending surface.

Optionally, the holder for holding auxiliary equipment may be attached to the two separate elongated members by a snap-fit connection. This implies a facilitated mounting/dismounting procedure.

Optionally, at least one of the two separate elongated members and/or the holder for holding auxiliary equipment may comprise a fixing member, such as a pin member, for fixing the holder for holding auxiliary equipment so that the holder for holding auxiliary equipment is prevented from being moved along the length extension. Thereby, a robust and reliable connection is achieved, preventing the holder from moving during travelling of the vehicle.

Optionally, the load carrier and/or the holder for holding auxiliary equipment may be configured so that the holder for holding auxiliary equipment is attachable to the load carrier by substantially simultaneously attaching the holder for holding auxiliary equipment to each one of the two separate elongated members. This implies a facilitated mounting procedure, e.g. avoiding to perform any additional rotational movement of the holder when it is mounted to the load carrier.

In the following, possible features and feature combinations of the first and second aspects of the disclosure are presented as a list of items and form part of the present disclosure:

1. A bike carrier (1) adapted to be mounted to a vehicle, wherein the bike carrier (1) extends in a length extension (L), a width extension (w) and a height extension (h), the bike carrier (1) comprising:
   a platform support arrangement (10) for supporting at least one bicycle, the platform support arrangement (10) comprising at least one wheel receiving member (12, 14, 16) for receiving one or more wheels of the at least one bicycle, thereby supporting, such as laterally supporting, the bicycle;
   at least one bicycle support arm member (20, 24, 26) which is configured to hold and secure the at least one bicycle when being received in the at least one wheel receiving member (12, 14, 16), wherein the at least one bicycle support arm member (20, 24, 26) is reconfigurable between a bicycle support state and a bicycle loading state.

2. The bike carrier (1) according to item 1, wherein the at least one reconfigurable bicycle support arm member (20, 24, 26) is reconfigurable by at least one of repositioning, pivoting, such as pivoting about a pivot axis (P1, P2) which is substantially parallel to the length extension (L) of the bike carrier (1), telescoping, thereby allowing a length of the reconfigurable bicycle support arm member (20, 24, 26) to be adjusted, translating, detaching and/or attaching from/to the platform support arrangement (10), bending and sliding.

3. The bike carrier (1) according to any one of the preceding items, wherein the platform support arrangement (10) comprises at least one pair of wheel receiving members (12', 12", 14', 14", 16', 16") for receiving wheels of at least one bicycle, wherein at least one of the wheel receiving members (12', 12", 14', 14", 16', 16") of the at least one pair of wheel receiving members is pivotable about a pivot axis (P1, P2) which is substantially parallel to the length extension (L) of the bike carrier (1), and wherein at least one reconfigurable bicycle support arm member (20, 24, 26) is pivotable about the same pivot axis, such as co-axially pivotable with respect to each other.

4. The bike carrier (1) according to any one of the preceding items, wherein the bike carrier (1) comprises a plurality of bicycle support arm members (20, 24, 26) which are attachable and/or attached to the platform support arrangement (10) at respective fixation points (f1, f2, f3) which are distributed and provided offset from each other along the length extension (L) of the bike carrier (1), wherein each one of at least two bicycle support arm members (20, 24, 26) is arranged such that a bicycle to be held and secured by the bicycle support arm member (20, 24, 26) can be loaded to the bike carrier (1) in a loading direction (L1) which is substantially parallel to the length extension (L) of the bike carrier ( ) when the bicycle support arm member (20, 24, 26) is provided in the bicycle support state, such as provided in a substantially upright position extending from the platform support arrangement (10) in the height extension (h) or at least provided in a position in which the bicycle support arm member is extending from the platform support arrangement in a direction which is 45 degrees or less from the upright position, wherein the loading direction (L1) is the same loading direction for each bicycle for each one of the at least two bicycle support arm members (20, 24,

26), such as corresponding to a forward direction with respect to the vehicle when the bike carrier (1) is mounted thereto.

5. The bike carrier (1) according to any one of the preceding items, wherein one bicycle support arm member (20) is an innermost bicycle support arm member with respect to the vehicle when the bike carrier (1) is mounted thereto, wherein the innermost bicycle support arm member (20) is biased towards, or fixed in, a substantially upright position, as seen in the height extension (h).

6. The bike carrier (1) according to any one of the preceding items, wherein the at least one bicycle support arm member (20, 24, 26) has a cross-sectional perimeter profile, wherein the cross-section is defined by a plane being perpendicular to a length extension of the at least one bicycle support arm member (20, 24, 26), wherein the cross-sectional perimeter profile is shaped, for example substantially rectangular shaped or oval shaped, such that a side surface thereof extending in the length extension (L) of the bike carrier (1) when it holds and secures a bicycle is longer than a side surface of the cross-sectional perimeter profile which extends in the transverse extension (w) of the bike carrier, wherein the length extension corresponds to a travelling direction of the vehicle when the bike carrier (1) is mounted thereto.

7. The bike carrier (1) according to any one of the preceding items, wherein the at least one reconfigurable bicycle support arm member (20, 24, 26) is reconfigurable such that it can be folded down, such as by a folding joint, to a position where it substantially extends in a plane defined by the width extension (w) and the length extension (L) of the bike carrier (1), the position being the bicycle loading state.

8. The bike carrier (1) according to any one of the preceding items, further comprising a restriction arrangement (210, 220) configured to restrict a reconfiguring motion, such as a pivoting and/or telescoping motion, of the at least one reconfigurable bicycle support arm member (20, 24, 26).

9. The bike carrier (1) according to item 8, wherein the at least one reconfigurable bicycle support arm member (20, 24, 26) is reconfigurable by pivoting according to claim 2, and wherein the restriction arrangement, such as a rotational lock (210), is configured to prevent the at least one reconfigurable bicycle support arm member (20, 24, 26) to pivot due to a force exerted thereon, when the exerted force is below a threshold value.

10. The bike carrier (1) according to item 9, wherein the bike carrier comprises a pair of wheel receiving members (12', 12'', 14', 14'', 16', 16'') according to claim 3, wherein the restriction arrangement (210) is further configured such that the at least one reconfigurable bicycle support arm member (20, 24, 26) follows the pivotable wheel receiving member when it is pivoted, such as folded down to a bicycle support position.

11. The bike carrier (1) according to any one of items 8-10, wherein the restriction arrangement (210) comprises a spring-biasing member (211) and a first and a second friction member (212, 213) which are arranged to rotate about the pivot axis of the pivotable reconfigurable bicycle support arm member (20, 24, 26), wherein the restriction functionality is at least provided by the spring-biasing member pushing or pulling on at least one of the first and second friction members (212, 213) such that a frictional force is generated therebetween, thereby preventing the at least one pivotable reconfigurable bicycle support arm member (20, 24, 26) to pivot due to a force exerted thereon, when the exerted force is below a threshold value.

12. The bike carrier ( ) according to any one of items 8-11, wherein the restriction arrangement (210) comprises a spring-biasing member which is configured to exert a force in a radial and/or an axial direction with respect to the pivot axis, and wherein, when the spring-biasing member exerts a radial force, the spring-biasing member is optionally a sleeve-formed member ( ), such as a sleeve-formed member which can be compressed and/or expanded, as seen in the radial direction of the pivot axis, or the spring biasing member is optionally a member provided in-between two sleeve-formed members (2142', 2144'), as seen in the radial direction.

13. The bike carrier (according to item 12, wherein the sleeve-formed member ( ) comprises a compression prevention portion (which is configured to prevent the sleeve-formed member from being compressed more than a predetermined compression distance.

14. The bike carrier (1) according to any one of items 8-13, wherein the at least one reconfigurable bicycle support arm member (20, 24, 26) is reconfigurable, such as further reconfigurable, by telescoping according to claim 2, wherein the restriction arrangement (220), such as a frictional lock, is configured to prevent the at least one telescoping reconfigurable bicycle support arm member (20, 24, 26) to adjust its length due to a force exerted thereon, when the exerted force is below a threshold value, wherein the telescoping reconfigurable bicycle support arm member (20, 24, 26) may optionally comprise a first and a second telescoping arm member (241, 242), and wherein the frictional lock may optionally comprise a spring-biasing member (243), such as a blade spring, associated with the first telescoping arm member (241), wherein the spring-biasing member is configured to engage with at least one groove (244) associated with the second telescoping arm member (242), thereby preventing the at least one telescoping reconfigurable bicycle support arm member (20, 24, 26) to adjust its length due to a force exerted thereon, when the exerted force is below a threshold value.

15. A bike carrier (1) for a vehicle, such as a bike carrier (1) according to any one of the preceding items, comprising:
a platform support arrangement (10) for supporting two or more bicycles;
a first bicycle support arm member (20) for holding and securing a first bicycle;
a second bicycle support arm member (22) for holding and securing a second bicycle, wherein the second bicycle support arm member (22) is arranged to be reconfigurable during use;
wherein the bike carrier (1) is configured such that:
the first bicycle can initially be loaded onto the platform support arrangement (10) and secured to the first bicycle support arm member (20), whereafter the second bicycle support arm member (22) can be reconfigured, whereafter the second bicycle can be loaded onto the platform support arrangement (10) and secured to the second bicycle support arm member (22).

In the following, possible features and feature combinations of the third aspect are presented as a list of items and form part of the present disclosure:

1. A load carrier (1) for a vehicle comprising a ratchet buckle (300) for receiving and holding a strap (400), the ratchet buckle comprising:
a strap receiving section (302),
a strap engagement member (304) configured to engage with at least one buckle engagement member (402) of the strap (400) to thereby hold the strap (400) in the strap receiving section (302).

2. The load carrier (1) according to item 1, wherein the ratchet buckle (300) further comprises an actuation lever (306) for a user, the actuation lever (306) being configured to actuate the strap engagement member (304) between an open state in which the strap (400) is freely movable in the strap receiving section (302) and an engaged state in which the strap engagement member (304) is configured to be engaged with the at least one buckle engagement member (402) of the strap (400).

3. The load carrier (1) according to item 2, wherein the ratchet buckle (300) further comprises a ratchet buckle housing (308) and wherein the actuation lever (306) is configured to be moved, such as pivoted, with respect to the ratchet buckle housing (308) when it actuates the strap engagement member (304) between the open state and the engaged state.

4. The load carrier (1) according to item 2 or 3, wherein the ratchet buckle (300) further comprises a holding arrangement (310) configured to hold the actuation lever (306) in a holding position such that the strap engagement member (304) is maintained in the open state, optionally wherein the holding arrangement (310) comprises a first holding portion (3101) associated with the actuation lever (306) and a second holding portion (3102) associated with the ratchet buckle housing (308), wherein the first and second holding portions (3101, 3102) are configured to engage with each other to thereby hold the actuation lever (306) in the holding position, and/or optionally wherein the first holding portion (3101) is any one of a protrusion, a groove, a hook, a bulging portion, configured to engage with the second holding portion (3102), and/or wherein the second holding portion (3102) is any one of a protrusion, a groove, a hook, a bulging portion, configured to engage with the first holding portion (3101).

5. The load carrier (1) according to item 4, wherein the ratchet buckle housing (308) comprises a first and a second wall (3081, 3082), wherein each wall extends at least partly along a length extension (L1) and a height extension (h1) of the ratchet buckle (300), the length extension of the ratchet buckle (300) corresponding to a length extension of the strap (400) when it is received in the strap receiving section (302), wherein the walls are provided offset from each other as seen in a width extension (w1) of the ratchet buckle (300), thereby defining the strap receiving section (302) therebetween, and wherein at least one of the first and second walls (3081, 3082) comprises the second holding portion (3102), such as the second holding portion (3102) being provided on an inside surface of at least one of the walls and facing the other one of the walls.

6. The load carrier (1) according to item 5, wherein the actuation lever (306) is provided in a space between the first and second walls (3081, 3082) and wherein the first holding portion (3101) is provided on at least one outer surface of the actuation lever (306) which faces an inside surface of one of the first and second walls (3081, 3082) of the ratchet buckle housing (308) when the actuation lever (306) is in the holding position.

7. The load carrier (1) according to any one of items 4-6, wherein the holding arrangement (310) is configured to hold the actuation lever (306) in the holding position by a snap-fit connection.

8. The load carrier (1) according to any one of items 2-7, wherein the actuation lever (306) comprises a strap engagement portion (3061) configured to engage with at least one buckle engagement member (402) of the strap (400), wherein the actuation lever (306) is configured to be moved, such as pivoted, with respect to the ratchet buckle (300) such that the strap engagement portion (3061) moves the strap in a strap tightening direction in the strap receiving section (302).

9. The load carrier (1) according to any one of items 2-8, wherein the actuation lever (306) is spring-biased towards a default position, such as spring-biased away from the holding position according to item 4.

10. The load carrier (1) according to any one of the preceding items, wherein the strap engagement member (304) further comprises a buckle state switching portion (3041), wherein the buckle state switching portion (3041) is configured to engage with a protruding element (403) of the strap (400) when the strap (400) is inserted into and/or removed from the strap receiving section (302) such that the strap engagement member (304) is automatically switched from an open state to an engaged state, or vice versa, wherein in the open state the strap (400) is freely movable in the strap receiving section (302) and wherein in the engaged state the strap engagement member (304) is configured to be engaged with the at least one buckle engagement member (402) of the strap (400).

11. The load carrier (1) according to any one of the preceding items, wherein the strap engagement member (304) is spring-biased towards the engaged state in which the strap engagement member (304) is configured to be engaged with the at least one buckle engagement member (402) of the strap (400).

12. The load carrier (1) according to items 9 and 11, wherein the ratchet buckle (300) comprises a common spring-biasing member (312) for the actuation lever (306) and the strap engagement member (304).

13. The load carrier (1) according to any one of the preceding items, wherein the ratchet buckle (300) further comprises a strap guide portion (318, 320) provided at a strap entrance section of the strap receiving section (302) and/or at a strap exit section of the strap receiving section (302), wherein the strap guide portion (318, 320) is an extension of the strap receiving section (302) and/or a widened section of the strap receiving section (302).

14. The load carrier (1) according to any one of the preceding items, further comprising a strap (400) for the ratchet buckle (300).

15. A strap (400) for a ratchet buckle (300), comprising:
a plurality of buckle engagement members (402) provided along a length extension (L1) of the strap (400),
a protruding element (403) provided at a free end of the strap (400), wherein the protruding element (403) is configured to engage with a buckle state switching portion (3041) of a strap engagement member (304) of the ratchet buckle when the strap (400) is inserted into and/or removed from a strap receiving section (302) of the ratchet buckle (300) such that the strap engagement member (304) is automatically switched from an open state to an engaged state, or vice versa, wherein the protruding element (403) may comprise at least one sloping surface, as seen along the length extension of the strap (400), such as a first and a second sloping surface with a respective sloping direction directed away from a top portion of the protruding element (403).

In the following, possible features and feature combinations of the fourth aspect are presented as a list of items and form part of the present disclosure:

1. A load carrier (1) for a vehicle, such as a bike carrier (1), adapted to be mounted to a vehicle for transporting a load, the load carrier (1) comprising:
   a base frame (500) having a length extension (L), a width extension (w) and a height extension (h), the base frame (500) comprising a first and a second elongated member (510, 520) for carrying a load, wherein the first and a second elongated members (510, 520) are separate from each other and provided substantially parallel with respect to each other along the length extension (L),
   wherein the base frame (500) further comprises:
   a first and a second bridging portion (530, 540) provided between the first and second elongated members (510, 520) and coupling the first and second elongated members (510, 520) together.

2. The load carrier (1) according to item 1, wherein the first and second bridging portions (530, 540) are separate, such as separate and offset, from each other forming a coupling area (C1) therebetween as seen in the length extension (L) of the base frame (500), wherein optionally a load receiving section of the load carrier is coupled to the base frame in the coupling area.

3. The load carrier (1) according to item 2, wherein the load receiving section is coupled to each one of the separate first and second bridging portions and/or located in-between the separate first and second bridging portions.

4. The load carrier (1) according to any one of items 2-3, wherein the load receiving section is coupled to the base frame (500) and further pivotable about a pivot axis (P1, P2) with respect to the base frame (500) which extends substantially in the length extension (L), optionally wherein the pivot axis is defined by a shaft, preferably a one-piece cylindrical rod extending through the first and the second bridging portions (530, 540), for example at least one of the separate first and second bridging portions comprises a cylindrical portion, such as a cylindrical aperture and/or a cylindrical protrusion, forming a pivotable coupling with the coupled and pivotable load receiving section.

5. The load carrier (1) according to any one of items 2-4, wherein the load receiving section is configured to receive and hold a wheel of a bicycle, for example the load receiving section is a wheel tray, and/or wherein the load receiving section is a bicycle support arm member for holding and securing a bicycle to the load carrier.

6. The load carrier (1) according to any one of the preceding items, wherein at least cross-sectional profiles of the first and second bridging portions (530, 540) are of identical shape, wherein the cross-sections are defined by planes being perpendicular to the length extension (L), wherein optionally the first and second bridging portions have identical or different lengths, as seen in the length extension (L) of the load carrier ( ).

7. The load carrier (1) according to any one of the preceding items, wherein each one of the first and second bridging portions (530, 540) are extruded elements, such as made of a lightweight material, for example aluminium, optionally wherein the extruded first and second bridging portions (530, 540) have an extrusion extension which extends substantially in the length extension (L) of the base frame (500).

8. The load carrier (1) according to any one of the preceding claims, wherein each one of the first and second bridging portions (530, 540) comprises a framework structure, such as a framework structure made of a lightweight material, for example aluminium.

9. The load carrier (1) according to item 8, wherein each one of the first and second bridging portions (530, 540) is at least partly formed by an upwardly facing wall facing upwardly in the height extension (h) of the base frame (500) and a downwardly facing wall facing downwardly, wherein the upwardly and downwardly facing walls define a void therebetween, and optionally wherein at least one supportive wall is provided in-between and connecting the upwardly and downwardly facing walls, such that at least a first and a second sub-void is formed therebetween, wherein optionally at least one supportive wall is a diagonally extending wall, and/or wherein at least one supportive wall is a substantially vertically extending wall, as seen in a plane defined by the width extension (w) and the height extension (h) of the base frame (500).

10. The load carrier (1) according to any one of the preceding items, wherein at least one of the first and second bridging portions (530, 540) is coupled to at least one of the first and second elongated members (510, 520) by at least one of a snap-in connection, welding, a screw and/or bolt connection, a rivet connection, clinching/pressing, such as clinching/pressing a flange or wall of the bridging portion with a flange or wall of the elongated member, hooks/engaging edges, such as hooks/engaging edges in an upper connection region and welding in a lower region of the respective bridging portion and elongated member, a rail-formed connection, such as by a rail-shaped extruded portion of the bridging portion and/or of the elongated member, wherein the rail-shaped extruded portion extends in the length extension (L).

11. The load carrier (1) according to any one of the preceding items, wherein at least one of the first and second bridging portions (530, 540) is coupled to at least one of the first and second elongated members (510, 520) by at least one of an arc-shaped connection interface, a substantially diagonal connection interface, such as that the bridging portion rest on top of the elongated member, as seen in a cross-section of the base frame being defined by a plane being perpendicular to the length extension (L).

12. The load carrier (1) according to any one of the preceding items, wherein at least one of the first and second elongated members (510, 520) is an extruded element, such as made of a lightweight material, for example aluminium, and/or comprises a framework structure, such as a framework structure made of a lightweight material, for example aluminium, wherein optionally the framework structure forms a triangular cross-sectional profile, preferably with a lower horizontal side and a first upper side for coupling/aligning with a side of at least one of the bridging portions, preferably at about 45 degrees from the horizontal side.

13. The load carrier (1) according to any one of the preceding items, comprising a plurality of respective pairs of first and second bridging portions which are distributed along the length extension of the base frame (500), and/or comprising a plurality of load receiving sections which are distributed along the length extension of the base frame (500), such as a plurality of pairs of load receiving sections, e.g. a plurality of pairs of laterally extending wheel trays for a bicycle, wherein optionally the respective pairs of first and second bridging portions and the plurality of load receiving sections are alternatingly distributed, such as in the following order: a first bridging portion, a wheel tray, a second bridging portion and a bicycle support arm member, and then optionally repeated.

14. The load carrier (1) according to any one of the preceding items, wherein the first and second elongated members (510, 520) are provided in a common plane defined by the length extension (L) and the width extension (w) of the base frame (500).

In the following, possible features and feature combinations of the fifth aspect are presented as a list of items and form part of the present disclosure.

1. A load carrier (1), such as a bike carrier, adapted to be mounted at a rear side of a vehicle, the load carrier having a length extension (L), a width extension (w) and a height extension (h), the load carrier (1) comprising:
   a housing (600) for a light emitting and/or light reflecting member, and/or a holder (602, 602') for the housing (600),
   the housing (600) comprising a light emitting and/or light reflecting area (604) which is at least partly directed in a rearward direction of the load carrier (1), corresponding to the length extension (L) and to a rearward direction of the vehicle when the load carrier (1) is mounted thereto.

2. The load carrier (1) according to item 1, wherein the light emitting and/or light reflecting area is of a three-dimensional shape.

3. The load carrier (1) according to item 2, wherein the light emitting and/or light reflecting area comprises a first sub area (606) having a first projection (606') in a plane defined by the width extension (w) and the height extension (h) and a second projection (606") in a plane defined by the length extension (L) and the height extension (h), thereby forming a first light emitting and/or light reflecting portion (6061) of the first sub area which is directed in the rearward direction and a second light emitting and/or light reflecting portion (6062) of the first sub area which is directed in the width extension (w) and away from the load carrier (1).

4. The load carrier (1) according to item 3, wherein the first sub area (606) comprises a continuous surface with a main extension in the width extension (w) formed by the first light emitting and/or light reflecting portion (6061) and another smaller extension in the length extension (L) and/or the height extension (h) formed by the second light emitting and/or light reflecting portion (6062), wherein the first and second light emitting and/or light reflecting portions are connected via an edge (6063), such as a smooth edge and/or an accentuated edge.

5. The load carrier (1) according to item 3 or 4, further comprising a second sub area (608) located below the first sub area (606), as seen in the height extension (h), wherein the first and second sub areas are divided by an edge (610).

6. The load carrier (1) according to item 5, wherein the edge (610) dividing the first and second sub areas extends outwardly from the first and second sub areas in the length extension (L) such that it forms a second sub area overhang portion (610) which at least partly covers the second sub area from above.

7. The load carrier (1) according to any one of items 3-6, wherein at least one of the first and second sub areas is L-shaped, as seen from behind in the length extension (L) of the load carrier (1), such as two L-shaped oppositely arranged and interconnected sub areas extending in the width extension (w).

8. The load carrier (1) according to any one of the preceding items, wherein the light emitting and/or light reflecting area (604) is made of transparent glass.

9. The load carrier (1) according to any one of the preceding items, further comprising an overhang portion (612, 612') provided at a top portion of the housing, and/or above the holder, as seen in a height extension (h) of the load carrier (1), which corresponds to a height extension of the vehicle when the load carrier is mounted thereto, wherein the overhang portion (612, 612') protrudes from the housing, and/or from the holder, such that it at least partly covers the light emitting and/or light reflecting area (604), and/or the holder, from above.

10. The load carrier (1) according to item 9, wherein the housing comprises fastening elements for fastening the light emitting and/or light reflecting area (604) to the housing, and wherein the overhang portion encloses the fastening elements such that they are not visible when the housing is mounted to the holder.

11. The load carrier (1) according to any one of items 9-10, further comprising a load receiving section which is configured to receive and hold a wheel of a bicycle, for example the load receiving section is a wheel tray, wherein the overhang portion forms part of the load receiving section.

12. The load carrier (1) according to any one of items 9-11, wherein the overhang portion and the housing forms a transition edge (614) therebetween when the housing is mounted to the holder, wherein the overhang portion and the housing at the transition edge are shaped such that they are aligned, and/or flush with each other, along the transition edge.

13. The load carrier (1) according to any one of the preceding items, wherein the light emitting and/or light reflecting area (604) has an outer contour of a parallelogram, as seen from behind in the length extension (L) of the load carrier (1).

14. The load carrier (1) according to any one of the preceding claims, further comprising a second housing for a light emitting and/or light reflecting member, and/or a second holder for the housing, wherein the second housing and/or holder is formed as the housing and holder according to any one of the preceding items, and wherein each housing and/or holder is provided at a respective rear corner portion of the load carrier.

In the following, possible features and feature combinations of the sixth aspect are presented as a list of items and form part of the present disclosure:

1. A load carrier (1), such as a bike carrier, adapted to be mounted to a vehicle for transporting a load, the load carrier having a length extension (L), a width extension (w) and a height extension (h), the load carrier (1) comprising:
   a base frame portion (700),
   a load receiving section (702) for receiving and securing a load to the vehicle,
   wherein the load receiving section (702) is movable with respect to the base frame portion (700) such that the load receiving section can be moved away from the vehicle when the load carrier (1) is mounted thereto.

2. The load carrier (1) according to item 1, wherein the movable load receiving section (702) is pivotable about a pivot axis (P3), such as a pivot axis which substantially extends along one of the length extension (L), the width extension (w) and the height extension (h).

3. The load carrier (1) according to any one of the preceding items, wherein the base frame portion (700) comprises at least one connection pin (708, 710) and/or connection hook member for holding and securing the load receiving section (702) in a fixed state with respect to the base frame portion (700).

4. The load carrier (1) according to item 3, wherein the load receiving section (702) comprises at least one corresponding connection arrangement (712), such as a connection arrangement (712) comprising an aperture (714), for receiving the at least one connection pin (708) and/or connection hook member.

5. The load carrier (1) according to item 4, wherein the corresponding connection arrangement (712) comprises a spring-biased locking mechanism (716) for locking the at least one connection pin (708) and/or connection hook member to the load receiving section (702).

6. The load carrier according to item 5, wherein the spring-biased locking mechanism (716) is arranged to lock the at least one connection pin (708) and/or connection hook member to the load receiving section (702) in a locking direction which is substantially perpendicular to a length extension of the at least one connection pin (708) and/or connection hook member.

7. The load carrier (1) according to any one of items 4-6, wherein the corresponding connection arrangement (712) is at least partly concealed in an inner space of the load receiving section (702), optionally wherein the corresponding connection arrangement (712) is provided in a separate cassette housing (718) in the inner space, such as a cassette housing which can be slid into the inner space, such as slid into a base frame tube.

8. The load carrier (1) according to any one of items 5-7, further comprising a flexible elongated element (720), such as a wire, wherein the spring-biased locking mechanism (716) is arranged to be released by a pulling or pushing force exerted on the flexible elongated element.

9. The load carrier (1) according to item 8, wherein the flexible elongated element is connected to the spring-biased locking mechanism (716) via a flexible element spring biasing member (722) which exerts a tensioning force to the flexible elongated element.

10. The load carrier (1) according to any one of items 5-9, wherein the spring-biased locking mechanism comprises at least one slidable plate element (724) for locking the at least one connection pin (708) and/or connection hook member to the load receiving section (702).

11. The load carrier (1) according to any one of items 3-10, wherein the at least one connection pin (708) has a conical shape which tapers in a direction towards the load receiving section (702), such as a conical shape with at least one recess for receiving a locking element, such as the at least one slidable plate element of item 10.

12. The load carrier (1) according to any one of the items 2-11, wherein the base frame portion (700) extends along a base frame portion extension axis (A3) in the length extension (L) of the load carrier ( ), wherein the pivot axis (P3) is offset from the base frame portion extension axis, such as provided below the base frame portion extension axis, as seen in the height extension of the load carrier (1), and for example extending in the width extension (w) of the load carrier (1).

13. The load carrier (1) according to item 12, wherein the pivot axis is provided on a separate member (726) which is attached to the base frame portion (700), such as attached thereto by a plug-in connection.

14. The load carrier (1) according to any one of the preceding items, further comprising a stop element for preventing the load receiving section (702) to be moved further away from the base frame portion (700) when it has been moved, such as pivoted, a maximum predetermined distance, wherein the stop element may be a flexible elongated element, such as a wire, connecting the base frame portion (700) and the load receiving section (702).

In the following, possible features and feature combinations of the seventh aspect are presented as a list of items and form part of the present disclosure:

1. A license plate holder (800) for a load carrier (1) for a vehicle, the license plate holder having a main extension in a license plate holder plane, the license plate holder (800) comprising:
a license plate attachment side (802) directed out from the license plate holder (800) in a first transversal direction with respect to the license plate holder plane and a load carrier attachment side (804) directed out from the license plate holder (800) in a second opposite transversal direction,
wherein the load carrier attachment side (804) comprises an attachment guiding track (806) adapted to attach the license plate holder (800) to the load carrier (1) and further adapted such that a pivoting movement of the license plate holder (800) between a stowing position and a use position can be performed with respect to the load carrier (1) when the license plate holder (800) is attached to the load carrier (1), wherein the attachment guiding track (806) is provided on and/or in a protruding portion (808) which protrudes out from the load carrier attachment side (804) in the second opposite transversal direction.

2. The license plate holder (800) according to item 1, wherein the protruding portion (808) is at least partly an integral portion of the license plate holder (800) and/or comprises a separate member (808") with respect to the license plate holder (800).

3. The license plate holder (800) according to item 2, wherein the separate member (808") is attached to the license plate holder by at least one of a snap-fit connection, such as by transversally extending and/or flexible arm members (810), a screw and/or bolt connection, a rivet connection.

The license plate holder (800) according to any one of items 2 or 3, wherein the license plate holder (800) comprises a receiving section (812) for the separate member (808") which is defined by a transversally extending wall which is integral with the license plate holder and at least partly encloses the separate member (808"), as seen in the license plate holder plane.

5. The license plate holder (800) according to any one of the preceding items, wherein the protruding portion (808), such as the separate member (808"), comprises a transversal outer wall extending in the second opposite transversal direction out from the load carrier attachment side, wherein the transversal outer wall at least partly, or completely, encloses the attachment guiding track (806), thereby forming an at least partly enclosed space for the attachment guiding track (806), as seen in the license plate holder plane.

6. The license plate holder (800) according to item 5, wherein the transversal outer wall (808") comprises at least one guiding flange (8081) extending substantially in a direction being perpendicular to the transversal outer wall and inwardly into the at least partly enclosed space, wherein the at least one guiding flange forms part of a guiding track surface of the attachment guiding track.

7. The license plate holder (800) according to item 6, wherein the transversal outer wall (808") extends in the second opposite transversal direction from an innermost end portion to an outermost end portion, wherein the at least one guiding flange is located proximate the outermost end portion, such that the at least one guiding flange is at least located closer to the outermost end portion than to the innermost end portion.

8. The license plate holder (800) according to any one of the preceding items, wherein the attachment guiding track (806) extends in the license plate holder plane.

9. The license plate holder (800) according to any one of the preceding items, wherein the attachment guiding track (806) is curve-shaped, such as S-shaped, as seen in the license plate holder plane.

10. A load carrier (1), such as a bike carrier, comprising the license plate holder (8(*x*)) according to any one of the preceding items.

In the following, possible features and feature combinations of the eighth aspect are presented as a list of items and form part of the present disclosure:

1. A bike carrier (1) for a vehicle, comprising:
   at least one strap (400) for securing a bicycle to the bike carrier (1), wherein the bike carrier (1) is adapted such that the strap (400) secures the bicycle to the bike carrier (1) when the strap (400) is in a bicycle securing position (420),
   wherein the bike carrier (1) further comprises a strap stowing away portion (430) which is adapted to temporarily hold the strap (400) in a stow away position which is different from the bicycle securing position.

2. The bike carrier (1) according to item 1, wherein the strap stowing away portion (430) comprises any one of a magnetic member and a slot, such as an open or closed slot, to temporarily hold the strap (400) in the stow away position.

3. The bike carrier (1) according to any one of the preceding items, wherein the strap stowing away portion (430) is provided on any one of a frame member of the bike carrier (1), such as on a bicycle support arm member, and a wheel receiving section, such as a wheel tray, of the bike carrier.

4. The bike carrier (1) according to item 3, wherein the strap is coupled, such as undetachably coupled, to any one of the frame member and the wheel receiving section.

5. The bike carrier (1) according to and one of items 3 or 4, wherein the strap is pivotably coupled, such as pivotably coupled about a pivot axis which is substantially perpendicular to a length extension (L1) and/or to a width extension (w1) of the strap, and/or slidably coupled.

6. The bike carrier (1) according to any one of claims 4-5, wherein the strap is arranged to substantially extend along and be aligned with a length extension of the frame member or the wheel receiving section when being provided in the stow away position.

7. The bike carrier (1) according to any one of items 3-6, wherein, when the strap stowing away portion is provided on the frame member, the frame member comprises a sleeve-formed member, such as a separate sleeve-formed member, wherein the strap stowing away portion is provided on the sleeve-formed member, and wherein the sleeve-formed member optionally encloses a portion of the frame member.

8. The bike carrier (1) according to item 7, wherein the frame member is a telescoping bicycle support arm member comprising at least a first and a second telescoping arm member, wherein the sleeve-formed member is provided proximate or at an intersection between the first and second telescoping arm members.

9. The bike carrier (1) according to any one of items 4-6, wherein, when the strap stowing away portion (430) is provided on the wheel receiving section, the strap stowing away portion (430) is provided on a user side of the wheel receiving section from which a user is intended to load/unload a bicycle, such as the strap stowing away portion (430) is provided on a side of the wheel receiving section which is a side comprising a strap receiving member, such as a ratchet buckle (300), for holding the strap when it secures a bicycle thereto, for example a side which is opposite to a side where the strap is coupled, such as undetachably coupled, to the wheel receiving section according to item 4.

10. The bike carrier (1) according to any one of items 3-6 or 9, wherein, when the strap stowing away portion (430) is provided on the wheel receiving section, the wheel receiving section further comprises a strap receiving member, such as a ratchet buckle, for holding the strap when it secures a bicycle thereto, wherein the strap stowing away portion (430) is separated at a specific distance away from the strap receiving member as seen along the length extension of the wheel receiving section.

11. The bike carrier (1) according to any one of the of items 3-6 or 9-10, wherein, when the strap stowing away portion (430) is provided on the wheel receiving section, the strap stowing away portion (430) is a slot which is substantially aligned with the length extension of the wheel receiving section.

In the following, possible features and feature combinations of the ninth aspect are presented as a list of items and form part of the present disclosure:

1. A bike carrier (1) for a vehicle, adapted to be mounted to a vehicle for transporting a bicycle, comprising:
   a bike stand member (900) for holding the bicycle in a standing position when the bicycle is positioned on a ground surface adjacent the vehicle.

2. The bike carrier (1) according to item 1, wherein the bike stand member (900) is detachable from the bike carrier (1) or non-removably integrated with the bike carrier.

3. The bike carrier (1) according to any one of the preceding items, wherein the bike stand member is configured to receive and hold a wheel, such as a tyre of the wheel, of the bicycle, such as being in the form of a crutch, a fork member, U-shaped or V-shaped.

4. The bike carrier (1) according to any one of the preceding items, wherein the bike stand member (900) is configured to be locked to the bike carrier when being attached thereto, such that it is prevented from unwanted removal when being attached.

5. The bike carrier (1) according to any one of the preceding items, wherein the bike stand member (900) comprises at least one arm member (910), such as a pivoting arm member with respect to the bike carrier (1), optionally wherein the at least one arm member is movable to e.g. clamp the wheel, such as by two C-shaped or J-shaped movable arm members.

6. The bike carrier (1) according to item 5, wherein the at least one arm member comprises a lock or catch for preventing the at least one arm member from being forced open when the bike stand member holds the bicycle, such as a lock or catch which is adapted to pass through the wheel in-between the spokes of the wheel.

7. The bike carrier (1) according to any one of the preceding items, further comprising at least one wheel tray for receiving a wheel of a bicycle, wherein the bike stand member (900) is provided on or at the wheel tray, such as at an outer end portion of the wheel tray, and/or between two outer end portions of two adjacent wheel trays.

8. The bike carrier (1) according to item 7, when being dependent to any one of items 5-6, wherein the at least one arm member (910) is configured to be moved, such as pivoted, between a non-use position where the at least one arm member (910) is substantially flush with a surface of the bike carrier, such as flush with a wheel receiving surface of the wheel tray, and a use position where the at least one arm member (910) is extending away from the wheel receiving surface of the wheel tray.

9. The bike carrier (1) according to any one of the preceding items, wherein the bike carrier is configured to be moved, such as pivoted, such that bicycles which are loaded thereon are moved away from the vehicle when the bike carrier is mounted thereto, wherein the bike stand member is configured such that the bicycle which is held by the bike stand member is kept in a standing position when the bike carrier is moved, such as pivoted, away from the vehicle.

10. The bike carrier (1) according to any one of the preceding items, wherein the bike stand member is configured such that the bicycle can be held in a position which is substantially parallel with the vehicle's travel direction, substantially transversal to the vehicle's travel direction, or at an angle therebetween, such that at least a vehicle door can still be opened when the bicycle is held by the bike stand member and/or to avoid conflict with neighbouring vehicles.

11. The bike carrier (1) according to any one of the preceding items, wherein the bike stand member (900) is adjustable, such as by moving an arm member (910) of the bike stand member, such that it can hold bicycle wheels of different shapes and/or thickness.

12. The bike carrier (1) according to any one of the preceding items, wherein the bike stand member comprises at least on roller (911), such as a roller provided on an outer portion of an arm member (910), adapted to roll on a bicycle wheel when the bicycle wheel is inserted into the bike stand member.

13. The bike carrier (1) according to any one of the preceding items, wherein the bike stand member is configured, such as spring-biased, such that it can provide a clamping force around a portion of a bicycle wheel when the portion of the bicycle wheel is received in the bike stand member.

14. The bike carrier (1) according to any one of the preceding items, wherein the bike stand member comprises at least two portions which are offset from each other in a width direction of the bike stand member and configured to engage with a bicycle wheel on opposite sides thereof, wherein the at least two portions are further offset from each other in a height direction of the bike stand member, corresponding to a height direction of the bicycle, so as to prevent the bicycle from rotating about a longitudinal, or roll, axis of the bicycle.

15. The bike carrier (1) according to any one of the preceding items, wherein the bike stand member comprises at least two portions which are offset from each other in a width direction of the bike stand member and configured to engage with a bicycle wheel on opposite sides thereof wherein the at least two portions are further offset from each other in a length direction of the bike stand member, corresponding to a length direction of the bicycle, so as to prevent the bicycle from rotating about a yaw axis of the bicycle.

16. The bike carrier (1) according to items 14 and 15, wherein the bike stand member comprises at least four portions, wherein two portions are configured to engage with the bicycle wheel on one side thereof, and two portions are configured to engage with the bicycle wheel on the other side thereof, and wherein the at least four portions are configured to prevent the bicycle from rotating in any direction about the longitudinal, or roll, axis of the bicycle, and further configured to prevent the bicycle from rotating in any direction about the yaw axis of the bicycle.

17. The bike carrier (1) according to any one of the preceding items, wherein the bike stand member is reconfigurable between a stow away state and a use state when the bike stand member can hold a bicycle, such as the bike stand member is pivotable between the stow away state and the use state.

In the following, possible features and feature combinations of the tenth aspect are presented as a list of items and form part of the present disclosure:

1. A bike carrier (1) for a vehicle, adapted to be mounted to a vehicle for transporting a bicycle, comprising:
    a locking anchor (920) for locking a bicycle to the bike carrier (1).

2. The bike carrier (1) according to item 1, wherein the locking anchor (920) is detachable with respect to the bike carrier (1).

3. The bike carrier (1) according to any one of the preceding items, further comprising a base frame (500) having a length extension (L), a width extension (w) and a height extension (h), the base frame (500) comprising a first and a second elongated member (510, 520) for carrying a load, wherein the first and a second elongated members are separate from each other and provided substantially parallel with respect to each other along the length extension (L), wherein the locking anchor is provided in-between the first and second elongated members (510, 520), as seen in the width extension (w).

4. The bike carrier (1) according to item 3, further comprising at least one bridging portion (530, 540) provided between the first and second elongated members (510, 520) and coupling the first and second elongated members together, wherein the locking anchor (920) is provided proximate, such as being coupled to, the at least one bridging portion (530, 540).

5. The bike carrier (1) according to item 4, comprising a first and a second bridging portion (530, 540) provided between the first and second elongated members and coupling the first and second elongated members together, wherein the first and second bridging portions are separate and offset from each other as seen in the length extension (L) of the base frame, wherein the locking anchor (920) is provided in-between the first and second bridging portions, as seen in the length extension (L) of the base frame.

6. The bike carrier (1) according to any one of items 4 or 5, further comprising a cover (922), such as a polymer cover, which covers the at least one bridging portion (530, 540) between the first and second elongated members, wherein the locking anchor is mounted and/or mountable to the cover, and/or wherein the cover comprises an aperture, preferably facing upwardly in the height extension, which is adapted to receive the locking anchor, and/or wherein the locking anchor is integrated with the cover.

7. The bike carrier (1) according to any one of the preceding items, wherein the locking anchor is an extruded profile or a moulded profile, such as made from a lightweight material, for example a polymer and/or aluminium.

8. The bike carrier (1) according to any one of the preceding items, wherein the locking anchor is adapted to be inserted into a locking anchor opening of the bike carrier, such as an opening of the base frame (500), optionally wherein the locking anchor has a T-shaped profile, optionally wherein the locking anchor further comprises protruding flanges (924, 926) adapted to engage with a firm portion of the bike carrier to position the locking anchor in a predetermined support position in the locking anchor opening.

9. The bike carrier (1) according to item 8, wherein the bike carrier, such as the base frame and/or the locking anchor, is/are configured such that the locking anchor is prevented from being pulled out when being inserted into the locking anchor opening, such as prevented from being pulled out in an upward direction, such as by use of plastic cover sleeves which are inserted into the locking anchor opening and adapted to prevent the locking anchor from being pulled out from the locking anchor opening.

10. The bike carrier (1) according to any one of the preceding items, configured to receive the locking anchor from below, i.e. the locking anchor being insertable from below, such as between the first and second elongated members of the base frame (500), as seen in the height extension (h) of the bike carrier.

In the following, possible features and feature combinations of the eleventh aspect are presented as a list of items and form part of the present disclosure:

1. A load carrier (1), such as a bike carrier, adapted to be mounted at a rear side of a vehicle, the load carrier having a length extension (L), a width extension (w) and a height extension (h), the load carrier (1) comprising:
- a housing (600) for a light emitting and/or light reflecting member, and/or a holder (602, 602') for the housing (600),
- the housing (600) comprising a light emitting and/or light reflecting area (604) which is at least partly directed in a rearward direction of the load carrier (1), corresponding to the length extension (L) and to a rearward direction of the vehicle when the load carrier (1) is mounted thereto.
- a license plate holder (800), the license plate holder having a main extension in a license plate holder plane (PL), the license plate holder (800) comprising a license plate attachment side (802) directed out from the license plate holder (800) in a first transversal direction with respect to the license plate holder plane,
- wherein the housing and/or the holder is/are positioned such that the light emitting and/or light reflecting area (604) is prohibited from emitting and/or reflecting light onto the license plate when the license plate is attached to the license plate holder.

2. The load carrier (1) according to item 1, wherein the housing and/or the holder is/are positioned such that an outermost portion of the light emitting and/or light reflecting area (604) is aligned with and/or located behind the license plate holder plane (PL), as seen along the length extension (L).

3. The load carrier (1) according to any one of the preceding items, further comprising a load receiving section which is configured to receive and hold a wheel of a bicycle, for example the load receiving section is a wheel tray, wherein the housing and/or holder is/are attached to the load receiving section.

4 The load carrier (1) according to any one of the preceding items, wherein the light emitting and/or light reflecting area is of a three-dimensional shape.

5. The load carrier (1) according to any one of the preceding items, wherein the light emitting and/or light reflecting area is made of transparent glass.

In the following, possible features and feature combinations of the twelfth aspect are presented as a list of items and form part of the present disclosure:

1. A bicycle support arm member (24) for a bike carrier (1), comprising:
- a ratchet buckle (300) for receiving and holding a strap (400), and
- a strap locking arrangement (350) associated with the ratchet buckle (300) for locking the strap (400) such that it is prevented from being released from the ratchet buckle.

2. The bicycle support arm member (24) according to item 1, wherein the strap locking arrangement (350) comprises a locking element (351) which is arranged to engage with at least one buckle engagement member (402) of the strap (400).

3. The bicycle support arm member (24) according to item 2, wherein the locking element (351) is a frame-shaped element, such as a square-shaped element, with an opening for receiving the strap (400), wherein preferably a main extension plane of the frame-shaped element is adapted to be substantially perpendicular to a length extension (L1) of the strap (400) when it is provided through the frame-shaped element.

4. The bicycle support arm member (24) according to any one of the preceding items, wherein the locking element (351) is adapted to engage with the at least one buckle engagement member (402) by moving, such as by sliding and/or rotating, the locking element (351) in a locking direction towards the at least one buckle engagement member (402) of the strap (400), thereby enabling a locked state for the strap (400).

5. The bicycle support arm member (24) according to item 4, wherein the locking element (351) is adapted to be locked by use of a key which, after being rotated and released in a keyhole of the strap locking arrangement, such as a keyhole of a locking cylinder, prevents the locking element (351) from being moved to an unlocked state from the locked state.

6. The bicycle support arm member (24) according to item 5, wherein the keyhole (353), e.g. the locking cylinder, and the locking element (351) are arranged to move simultaneously together when the locking arrangement (350) is moved from the unlocked state to the locked state, and vice versa.

7. The bicycle support arm member (24) according to any one of the preceding items, wherein the locking arrangement (350), at least the locking element (351), is spring-biased towards the unlocked state where the strap (400) is freely movable in the locking arrangement (350).

8. The bicycle support arm member (24) according to any one of the preceding items, wherein the strap locking arrangement (350) is provided at an outer end portion of the bicycle support arm member (24), such as on a pivotable head, wherein optionally the outer end portion, such as the pivotable head, comprises a bicycle support surface, such as a firm or cushioned surface, against which a bicycle is intended to rest against when the strap (400) has tensioned the bicycle to the bicycle support arm member (24).

9. The bicycle support arm member (24) according to any one of the preceding items, wherein the strap locking arrangement (350) is provided on a rotatable member, such as on a pivotable head, wherein the rotatable member may be substantially L-shaped or V-shaped.

In the following, possible features and feature combinations of the thirteenth aspect are presented as a list of items and form part of the present disclosure:

1. A load carrier (1) for a vehicle comprising a ratchet buckle (300) for receiving and holding a strap (400), the ratchet buckle comprising:
- a strap receiving section (302), the strap receiving section (302) having a length direction (L1) corresponding to a length direction of the strap (400) when it is received therein, a width direction (w1) and a height direction (h1), a strap engagement member (304') configured to engage with at least one buckle engagement member (402) of the strap (400) to thereby hold the strap (400) in the strap receiving section (302), an actuation lever (306') for a user, the actuation lever (306') being configured to actuate the strap engagement member (304') between an open state in which the strap (400) is freely movable in the strap receiving section (302) and an engaged state in which the strap engagement member (304') is configured to be engaged with the at least one buckle engagement member (402) of the strap (400), and wherein any one of the strap engagement member (304'), the actuation lever (306') and a ratchet buckle housing (308) of the ratchet buckle (300) comprises a strap guiding element (3044, 3064) which is configured to, in the open state, prevent a portion of the strap (400) which is in the strap receiving section (302) from being bent upwardly in the height direction (h1).

2. The load carrier (1) according to item 1, wherein the strap guiding element (3044, 3064) is configured to, in the open state, push downwardly on the portion of the strap (400), as seen in the height direction (h1).

3. The load carrier (1) according to any one of the preceding items, further comprising the strap (400) with at least one buckle engagement member (402), such as a tooth, wherein the strap guiding element (3044, 3064) is configured to contact the at least one buckle engagement member (402) in the open state so that the portion of the strap (400) which is in the strap receiving section (302) is prevented from being bent upwardly in the height direction (h1).

4. The load carrier (1) according to any one of the preceding items, wherein the strap guiding element (3044, 3064), as seen in a sectional plane defined by the height and length directions (h1, L1), has a perimeter surface, such as a curve-shaped perimeter surface, for example a curve-shaped perimeter surface with a varying radius, wherein at least a portion of the perimeter surface is configured to, in the open state, prevent the portion of the strap (400) which is in the strap receiving section (302) from being bent upwardly in the height direction (h1).

5. The load carrier (1) according to any one of the preceding items, wherein the strap guiding element (3044, 3064) comprises at least a first and a second guiding portion (30441, 30442; 30641, 30642) which are offset from each other, as seen in the width direction (w1).

6. The load carrier (1) according to any one of the preceding items, wherein at least two of, such as each one of, the strap engagement member (304'), the actuation lever (306') and the ratchet buckle housing (308) comprises a respective strap guiding element (3044, 3064), wherein each respective strap guiding element (3044, 3064) is a strap guiding element (3044, 3064) according to any one of the preceding items.

7. The load carrier (1) according to item 6, wherein the respective strap guiding elements (3044, 3064) are offset from each other, as seen in the length direction (L1) of the strap receiving section (302).

8. The load carrier (1) according to any one of the preceding items, wherein the strap engagement member (304') and the actuation lever (306) are separate parts with respective separate connection interfaces for connection to the ratchet buckle (300), such as respective separate pivot axes (314, 316), wherein the respective separate connection interfaces are offset from each other, as seen in the length direction (L1) of the strap receiving section (302).

9. The load carrier (1) according to item 8 when also being dependent to any one of item 6 or 7, wherein the respective strap guiding elements (3044, 3064) are provided in-between the respective separate connection interfaces (314, 316).

10. The load carrier (1) according to any one of the preceding items, wherein, when the actuation lever (306') comprises the strap guiding element (3064), the strap guiding element (3064) of the actuation lever (306') is configured to be moved, such as pivoted, together with the actuation lever (306') between the open state and the engaged state.

11. The load carrier (1) according to any one of the preceding items, wherein, when the strap engagement member (304') comprises the strap guiding element (3044), the strap guiding element (3044) of the strap engagement member (304') is configured to be moved, such as pivoted, together with the strap engagement member (304') between the open state and the engaged state.

12. The load carrier (1) according to any one of the preceding items, wherein the actuation lever (306') comprises a strap engagement portion (3061) configured to engage with at least one buckle engagement member (402) of the strap (400), wherein the actuation lever (306') is configured to be moved, such as pivoted, with respect to the ratchet buckle (300) such that the strap engagement portion (3061) moves the strap in a strap tightening direction in the strap receiving section (302).

13. The load carrier (1) according to any one of the preceding items, wherein the actuation lever (306') is spring-biased towards a default position, such as spring-biased towards the engaged state in which the strap engagement member (304) is configured to be engaged with the at least one buckle engagement member (402) of the strap (400), and/or wherein the strap engagement member (304') is spring-biased towards the engaged state in which the strap engagement member (304') is configured to be engaged with the at least one buckle engagement member (402) of the strap (400).

14. The load carrier (1) according to any one of the preceding items, wherein the ratchet buckle (300) further comprises a strap guide portion (318, 320) provided at a strap entrance section of the strap receiving section (302) and/or at a strap exit section of the strap receiving section (302), wherein the strap guide portion (318, 320) is an extension of the strap receiving section (302) and/or a widened section of the strap receiving section (302).

15. The load carrier (1) according to item 14, wherein the strap guide portion (318, 320) comprises a floor section (3181, 3201) and a ceiling section (3182, 3202) for the strap (400), as seen in the height direction (h).

In the following, possible features and feature combinations of the fourteenth aspect are presented as a list of items and form part of the present disclosure:

1. A load carrier (1) for a vehicle comprising a bicycle support pad (355) against which a bicycle is intended to rest when the bicycle is mounted to the load carrier (1), wherein the bicycle support pad (355) is releasably mounted to the load carrier (1).

2. The load carrier (I) according to item 1, wherein the bicycle support pad (355) is releasably mounted to the load carrier (1) by a snap-fit connection (3552).

3. The load carrier (1) according to any one of the preceding items, wherein the bicycle support pad (355) comprises a first and a second mounting member (3551, 3552) for releasably mounting the bicycle support pad (355) to the load carrier (1), and wherein the load carrier (1)

comprises corresponding first and second holding members (3541, 3542) for holding the first and second mounting members (3551, 3552).

4. The load carrier (1) according to item 3, wherein the bicycle support pad (355) and/or the first and second holding members (3541, 3542) is/are configured so that the bicycle support pad (355) is releasably mounted to the load carrier (1) by first engaging the first mounting member (3551) with the first holding member (3541) whereafter the bicycle support pad (355) is pivoted with respect to the first mounting member (3551) until the second mounting member (3552) engages with the second holding member (3542).

5. The load carrier (1) according to item 3, wherein the first and second mounting members and the corresponding first and second holding members are configured so that the bicycle support pad (355) is releasably mounted to the load carrier (1) by simultaneously engaging the first and second mounting members with the corresponding first and second holding members.

6. The load carrier (1) according to any one of items 3-5, wherein at least the second mounting member (3552) and the second holding member (3542) are configured as a snap-fit connection.

7. The load carrier (1) according to item 6, wherein the first mounting member (3551) and the first holding member (3541) are configured as a hinge connection.

8. The load carrier (1) according to any one of the preceding items, wherein the bicycle support pad (355) comprises a releasing portion (35521) which is configured to be actuated for releasing the bicycle support pad (355) from the load carrier (1) when it is mounted thereto, wherein the releasing portion (35521) is concealed by the load carrier (1) so that a user is prevented from accessing the releasing portion (35521) without the use of a separate tool.

9. The load carrier (1) according to item 8, wherein the releasing portion (35521) is accessible through an aperture (35421) of the load carrier (1), such as an aperture with a width or diameter which is less than 15 mm, for example less than 10 mm, and/or such as an aperture with a length from an opening thereof to the releasing portion (35521) which is greater than 5 mm, for example greater than 10 mm.

10. The load carrier (1) according to any one of the preceding items, wherein the bicycle support pad (355) comprises a first material which forms a surface against which a bicycle is intended to rest when the bicycle is mounted to the load carrier (1), and further comprising a second material which forms a mounting interface for mounting to the load carrier (1), wherein preferably the first material is softer than the second material.

11. The load carrier (1) according to item 10, wherein the first material is a thermoplastic elastomer, such as thermoplastic polyurethan, and/or wherein the second material is a glass fibre reinforced polymer, such as glass fibre reinforced polyamide.

12. The load carrier (1) according to any one of the preceding items, wherein the bicycle support pad (355) is provided on any one of a bicycle support arm (20, 24, 26), a wheel receiving member, a gripping claw and a pivotable head (354) on a bicycle support arm of the load carrier (1).

13. The load carrier (1) according to any one of the preceding items, wherein the load carrier (1) is a roof mounted load carrier or a rear mounted load carrier (1) for a vehicle.

In the following, possible features and feature combinations of the fifteenth aspect are presented as a list of items and form part of the present disclosure:

1. A load carrier (1), such as a bike carrier, adapted to be mounted to a vehicle for transporting a load, the load carrier having a length extension (L), a width extension (w) and a height extension (h), the load carrier (1) comprising:
a base frame portion (700),
a load receiving section (702) for receiving and securing a load to the vehicle,
wherein the base frame portion (700) comprises two separate elongated members (704, 706) extending in the length extension (L), the two separate elongated members (704, 706) being offset from each other in the width extension (w), and
wherein the load carrier further comprises a holder (740) for holding auxiliary equipment, such as for holding a loading ramp arrangement for a bicycle, wherein the holder for holding auxiliary equipment is releasably attached to the load carrier (1) in-between the separate elongated members (704, 706).

2. The load carrier (1) according to item 1, wherein the holder for holding auxiliary equipment is releasably attached to the load carrier (1) below the load receiving section (702), as seen when the load carrier is mounted to a vehicle which is provided on a flat horizontally extending surface.

3. The load carrier (1) according to any one of the preceding items, wherein the load receiving section (702) is movable with respect to the base frame portion (700) such that the load receiving section can be moved away from the vehicle when the load carrier (1) is mounted thereto.

4. The load carrier (1) according to item 3, wherein the movable load receiving section (702) is pivotable about a pivot axis (P3), such as a pivot axis which substantially extends along one of the length extension (L), the width extension (w) and the height extension (h).

5. The load carrier (1) according to any one of the preceding items, wherein the load carrier (1) and/or the holder for holding auxiliary equipment is/are arranged so that the holder for holding auxiliary equipment is attachable to the load carrier (1) from above, such as when the load receiving section (702) is moved away from the vehicle according to item 3, as seen when the load carrier is mounted to a vehicle which is provided on a flat horizontally extending surface.

6. The load carrier (1) according to any one of the preceding items, wherein the holder for holding auxiliary equipment is attached to the two separate elongated members by a snap-fit connection.

7. The load carrier (1) according to any one of the preceding items, wherein at least one of the two separate elongated members and/or the holder for holding auxiliary equipment comprises a fixing member, such as a pin member, for fixing the holder for holding auxiliary equipment so that the holder for holding auxiliary equipment is prevented from being moved along the length extension (L).

8. The load carrier (1) according to any one of the preceding items, wherein the load carrier (1) and/or the holder for holding auxiliary equipment is/are configured so that the holder for holding auxiliary equipment is attachable to the load carrier (1) by substantially simultaneously attaching the holder for holding auxiliary equipment to each one of the two separate elongated members.

BRIEF DESCRIPTION OF THE DRAWINGS

With reference to the appended drawings, below follows a more detailed description of embodiments of the disclosure cited as examples.

In the drawings:

FIG. 7A shows a perspective view of a ratchet buckle and a strap according to example embodiment of the present disclosure;

FIG. 7B shows a perspective view of a ratchet buckle and a strap according to example embodiment of the present disclosure;

FIG. 8 shows the ratchet buckle as shown in FIGS. 7A-B:

FIG. 11A shows a step of a sequence to insert and remove a strap from a ratchet buckle according to an example embodiment of the present disclosure;

FIG. 11B shows a step of a sequence to insert and remove a strap from a ratchet buckle according to an example embodiment of the present disclosure:

FIG. 11C shows a step of a sequence to insert and remove a strap from a ratchet buckle according to an example embodiment of the present disclosure;

FIG. 11D shows a step of a sequence to insert and remove a strap from a ratchet buckle according to an example embodiment of the present disclosure;

FIG. 11E shows a step of a sequence to insert and remove a strap from a ratchet buckle according to an example embodiment of the present disclosure:

FIG. 11F shows a step of a sequence to insert and remove a strap from a ratchet buckle according to an example embodiment of the present disclosure;

Figure 1:
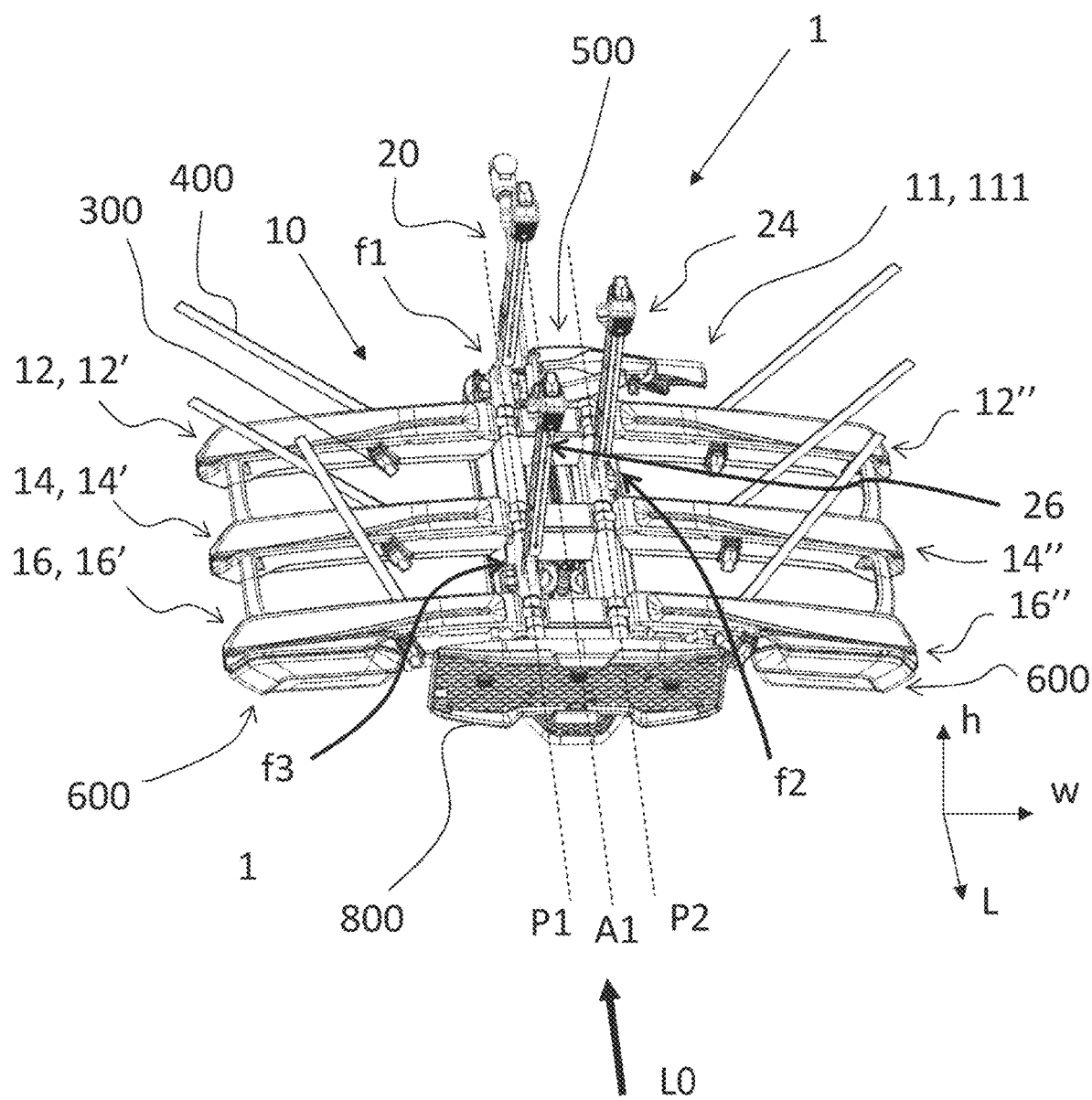
FIG. 1 shows a perspective view of a bike carrier according to an example embodiment of the present disclosure.

The drawings are schematic and not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters throughout the drawings refer to the same, or similar, type of element unless expressed otherwise.

DETAILED DESCRIPTION

FIG. 1 depicts a perspective view of a bike carrier 1 according to an example embodiment of the present disclosure. The bike carrier 1 is adapted to be mounted to a vehicle (not shown). In the shown embodiment, the bike carrier 1 is mountable to a rear side of a vehicle, preferably by connecting the bike carrier 1 to a tow bar, such as to a tow ball (not shown) of the vehicle. It shall be noted that the bike carrier 1 as disclosed herein may also be mountable to a vehicle at other positions, such as above the roof. However, it has been found that the disclosed bike carrier 1 is especially suitable to be provided at the rear side of the vehicle. In the shown embodiment, the bike carrier 1 is connectable to a tow bar via a coupling device 11, which as shown may comprise an arm 111 which is rotatable about an axis extending in a length extension L of the bike carrier 1. The bike carrier 1 is firmly attached to the tow bar by rotating the arm 111. Accordingly, the bike carrier 1 can be easily attached to the vehicle by a user rotating the arm 111.

The bike carrier 1 extends in a length extension L, a width extension w and a height extension h. In the shown embodiment, the length extension L corresponds to a length extension of the vehicle and the width extension corresponds to a transverse extension of the vehicle.

The bike carrier 1 comprises:
  a platform support arrangement 10 for supporting at least one bicycle (not shown), the platform support arrangement 10 comprising at least one wheel receiving member 12, 14, 16 for receiving one or more wheels of the at least one bicycle, thereby supporting, such as laterally supporting, the bicycle;
  at least one bicycle support arm member 20, 24, 26 which is configured to hold and secure the at least one bicycle when being received in the at least one wheel receiving member 12, 14, 16, wherein the at least one bicycle support arm member 20, 24, 26 is reconfigurable between a bicycle support state and a bicycle loading state.

In the shown embodiment, the bike carrier 1 comprises three bicycle support arm members 20, 24, 26 and three corresponding wheel receiving members 12, 14, 16. As further shown, the bike carrier 1 is arranged to laterally support the bicycles. i.e. the bicycles' length extension will extend in the width extension w of the bike carrier 1. It shall be noted that the bike carrier 1 may be configured to hold fewer and also more bicycles. Accordingly, the bike carrier 1 may have fewer and also more bicycle support arm members and wheel receiving members than illustrated in FIG. 1.

As shown, the reconfigurable bicycle support arm members 20, 24, 26 may be reconfigurable by pivoting about a first and second pivot axis P1, P2 which are substantially parallel to the length extension L of the bike carrier 1. More specifically, the bicycle support arm members 20 and 26 are pivotable about the pivot axis P1 and the bicycle support arm member 24 is pivotable about the pivot axis P2. The bicycle support arm members 20, 24, 26 may additionally or alternatively be reconfigurable in other ways as disclosed herein, such as by telescoping as will be described with respect to FIGS. 3a-b.

As further shown in FIG. 1, the platform support arrangement 10 may comprise at least one pair of wheel receiving members 12', 12", 14', 14", 16', 16" for receiving wheels of at least one bicycle, wherein at least one of the wheel receiving members 12', 12", 14', 14", 16', 16" of the at least one pair of wheel receiving members is pivotable about a pivot axis P1, P2 which is substantially parallel to the length extension L of the bike carrier 1, and wherein at least one reconfigurable bicycle support arm member 20, 24, 26 is pivotable about the same pivot axis, such as co-axially pivotable with respect to each other. In the shown embodiment, each wheel receiving member of each pair of wheel receiving members is pivotable about the pivot axis P1 or P2.

Accordingly, as described in the above, the bike carrier 1 as shown in FIG. 1 comprises a plurality of bicycle support arm members 20, 24, 26, and they are attachable and/or attached to the platform support arrangement 10 at respective fixation points f1, 2, f3.

The fixation points f1, f2, f3 are distributed and provided offset from each other along the length extension L of the bike carrier 1. Further, as shown, each one of at least two bicycle support arm members 20, 24, 26 may be arranged such that a bicycle to be held and secured by the bicycle support arm member 20, 24, 26 can be loaded to the bike carrier 1 in a loading direction L0 which is substantially parallel to the length extension L of the bike carrier 1 when the bicycle support arm member 20, 24, 26 is provided in the bicycle support state. The bicycle support state is here a substantially upright position extending from the platform support arrangement 10 in the height extension h. As shown, the loading direction L0 is the same loading direction for each bicycle for each one of the at least two bicycle support arm members 20, 24, 26, such as corresponding to a forward direction with respect to the vehicle when the bike carrier 1 is mounted thereto. Thereby, a bicycle can be loaded to its position, such as to the wheel receiving members 14', 14" when the bicycle support arm member 24 is already provided in its upright bicycle support state. Accordingly, the bicycle support arm member 24 does not need to be reconfigured after the bicycle has been loaded to the wheel receiving members 14', 14". Some minor adjustments of the bicycle support arm member 24 may however be performed after the loading, but these adjustments can for example be done after the bicycle has been at least partly secured, such as by a strap (not shown) connected to the bicycle support arm member. By this configuration, the loading procedure will be significantly easier for a user, implying faster loading and reduced risk of damaging the bicycle(s).

The bike carrier 1 as shown is configured such that at least one single bicycle support arm member 20, 24, 26 is used to hold and secure one single bicycle of the plurality of bicycles.

In the shown embodiment, the fixation points f1, f2, f3 are alternatingly positioned on respective opposite sides with respect to an axis of symmetry A1 of the bike carrier 1, the axis of symmetry A1 extending in the length extension L of the bike carrier 1. In addition, each wheel receiving members 12', 12", 14', 14", 16', 16" is provided in-between two adjacent fixation points of adjacent bicycle support arm members, as seen along the length extension L.

Figure 51:
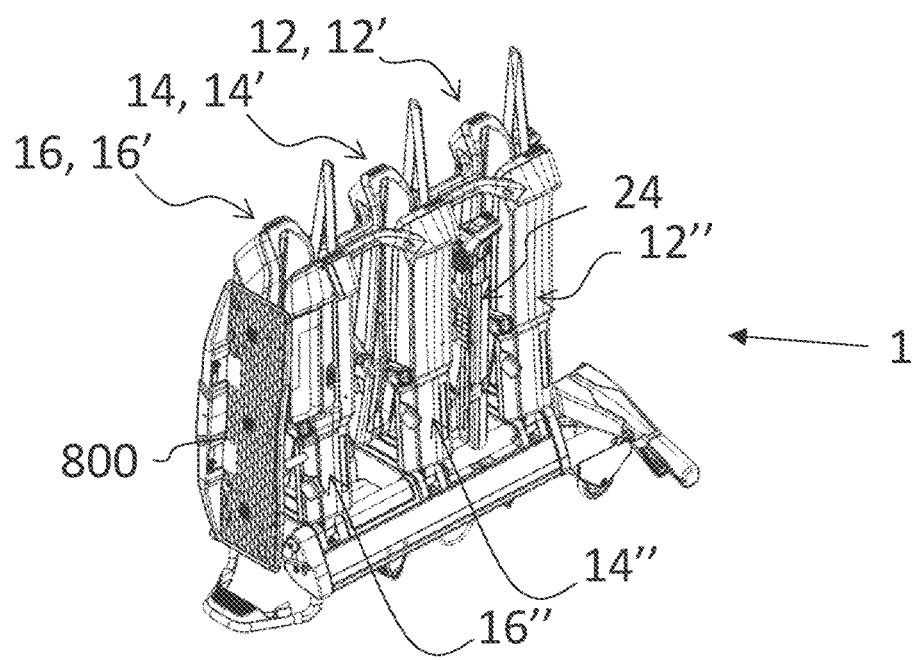
FIG. 51 shows a perspective view of the bike carrier in FIG. 1 when it is provided in a collapsed state.

The pivot axes P1, P2 are preferably provided close to each other, such as 50 centimetres (cm), 40 cm, 30 cm or less from each other, thereby enabling a facilitated folding of the bike carrier 1 to a collapsed state, such as a stowing away state, when it is not used for carrying bicycles. The wheel receiving members 12', 12", 14', 14", 16', 16" and the bicycle support arm members 20, 24, 26 are preferably provided in an upright position when they are folded to the collapsed state. An example of the collapsed state, or stowing away state, is shown in FIG. 51. The area between the pivot axes P1 and P2, when in the collapsed state, may result in a substantially flat surface which can be beneficially used as a support surface when stowing away the bike carrier 1 such that the bike carrier 1 can be in an upright position when stowed away.

As shown, the bike carrier 1 is preferably configured so that the bicycle support arm members 24, 26 are folded, in this case pivoted, away from the axis of symmetry A1 when they are folded to the bicycle loading state. Accordingly, the bicycle support arm members 24, 26 are folded, in this case pivoted, towards the axis of symmetry A1 when they are folded to the bicycle support state. This folding configuration has shown to provide an efficient and simple loading of bikes to the bike carrier 1, requiring few steps for a user during the bike loading procedure.

In addition, as shown, the bike carrier 1 may be configured so that there is only one bicycle support arm member 24, 26 between each pair of wheel receiving members 12', 12", 14', 14", 16'. 16". This may also imply a facilitated bike loading procedure.

The bicycle support arm members 20, 24, 26 are preferably rigid arms, such as an arm made of a rigid low weight material, for example aluminium.

Furthermore, at least one of the reconfigurable bicycle support arm members 20, 24, 26 may be detachable from the bike carrier 1. For example, the at least one detachable bicycle support arm member may thereby be moved between different positions on the platform arrangement 10, enabling the bicycle support arm member to be moved to a more suitable position where it can better hold and secure a bicycle. This also enables for increased space if e.g. another load carrying device is attached, e.g. a cargo box. The detachability can be prevented by a lock (not shown).

The bicycle support arm member 20 is an innermost bicycle support arm member with respect to the vehicle when the bike carrier 1 is mounted thereto. The innermost bicycle support arm member 20 may be biased towards, or fixed in, a substantially upright position, as seen in the height extension h. For example, when the bike carrier 1 is unfolded, the bicycle support arm member 20 may stay in the upright position by a biasing member, such as by a spring-biasing member (not shown).

The reconfigurable bicycle support arm members 20, 24, 26 may be reconfigurable such that they can be folded down, such as by a folding joint (not shown), to a position where they substantially extend in a plane defined by the width extension w and the length extension L of the bike carrier 1. This position may be denoted the bicycle loading state.

Each one of the bicycle support arm members 20, 24, 26 may comprise a head, such as a pivotable head 354, for securing a bike to the respective bicycle support arm member. The head may comprise a claw member and/or a strap 400 for securing the bike to the bicycle support arm member. Each head may be arranged to face a user when the user loads a bike to the bike carrier 1. For example, the bike carrier 1 may be arranged so that each head is facing in a rearward direction away from the vehicle when the bike carrier 1 is mounted thereto, i.e. when mounted at the rear of the vehicle. This implies facilitated loading of bikes to the bike carrier.

Figures 2A, 2B:
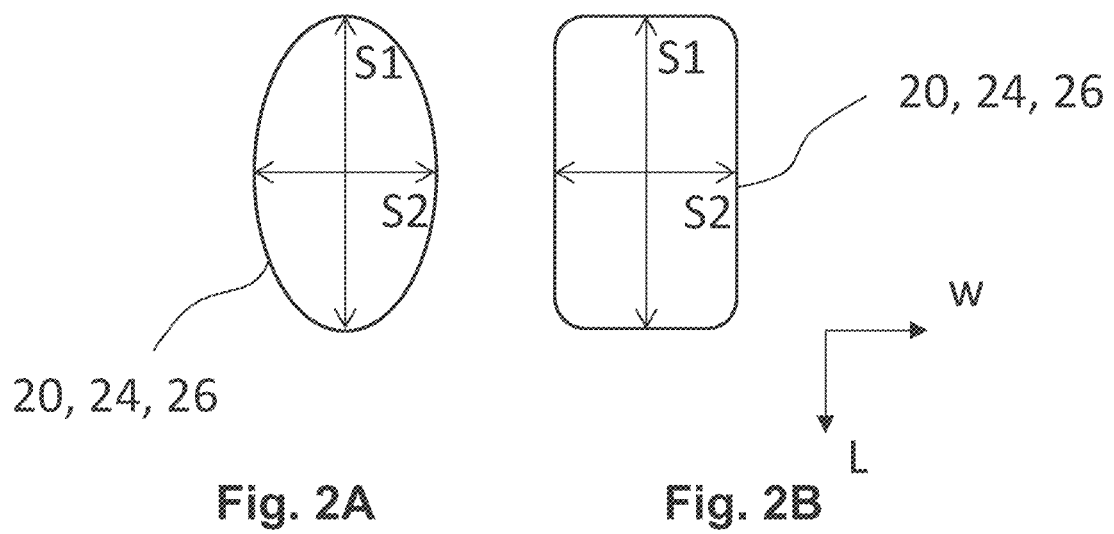
FIG. 2A shows a cross-sectional view of a bicycle support arm member according to an embodiment of the present disclosure.
FIG. 2B shows a cross-sectional view of a bicycle support arm member according to an embodiment of the present disclosure.

Referring to especially FIGS. 2A-2B, embodiments are depicted where the at least one bicycle support arm member 20, 24, 26 has a cross-sectional perimeter profile, wherein the cross-section is defined by a plane being perpendicular to a length extension of the at least one bicycle support arm member 20, 24, 26, and wherein the cross-sectional perimeter profile is shaped, for example substantially rectangular shaped (FIG. 2B) or oval shaped (FIG. 2A), such that a side surface S1 thereof extending in the length extension L of the bike carrier 1 when it holds and secures a bicycle is longer than a side surface S2 of the cross-sectional perimeter profile which extends in the width extension w of the bike carrier 1, wherein the length extension L corresponds to a travelling direction of the vehicle when the bike carrier 1 is mounted thereto.

Referring to especially FIGS. 3-6, the bike carrier 1 may further comprise a restriction arrangement 210, 220 configured to restrict a reconfiguring motion, such as a pivoting and/or telescoping motion, of the at least one reconfigurable bicycle support arm member 24. In the following it will be referred to the bicycle support arm member 24. It shall however be noted that the disclosed configurations are applicable to any one of the bicycle support arm members 20, 24, 26.

Figure 3A:
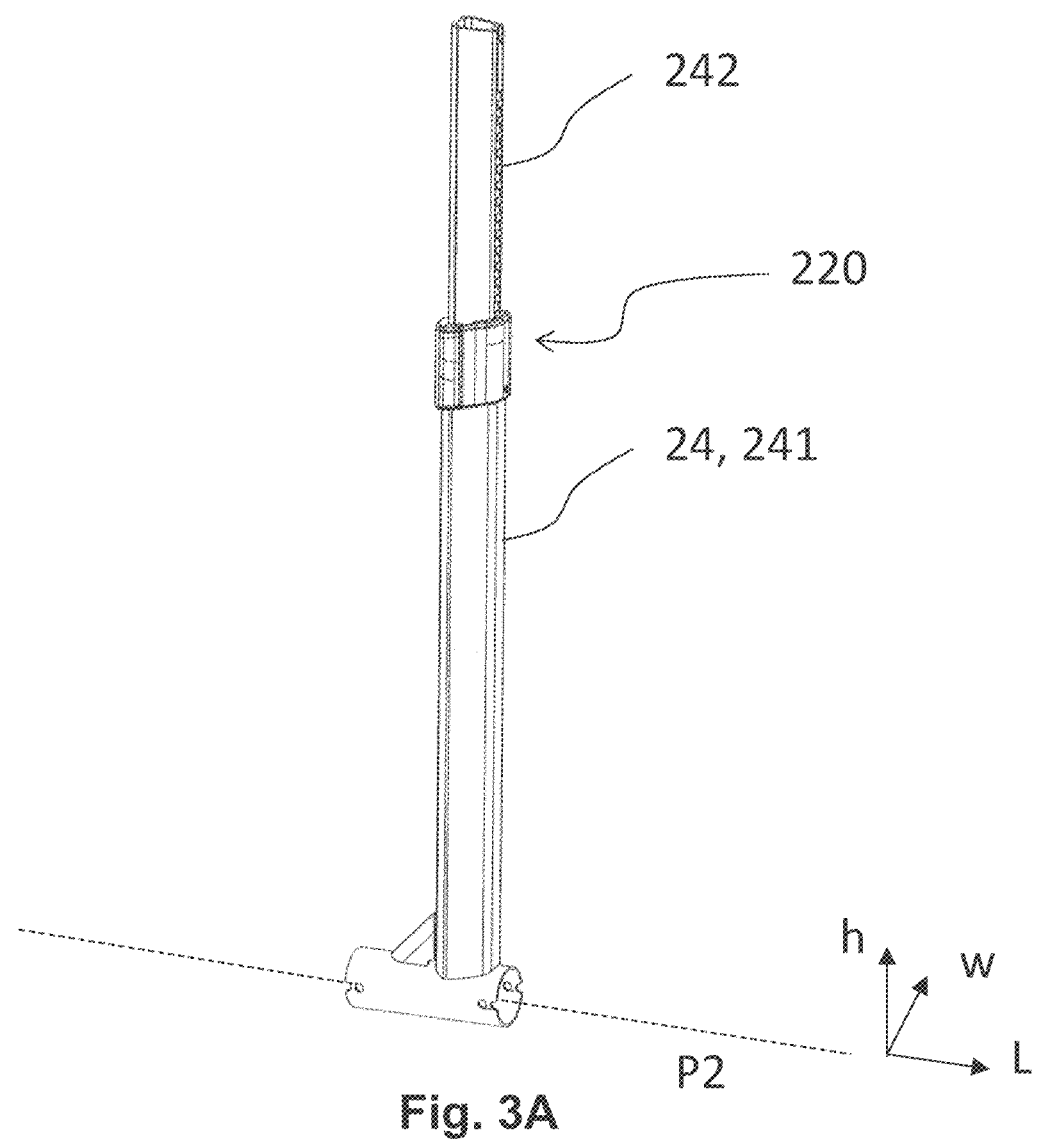
FIG. 3A shows an example embodiment, in perspective view, of a bicycle support arm member according to an embodiment of the present disclosure.
Figure 3B:
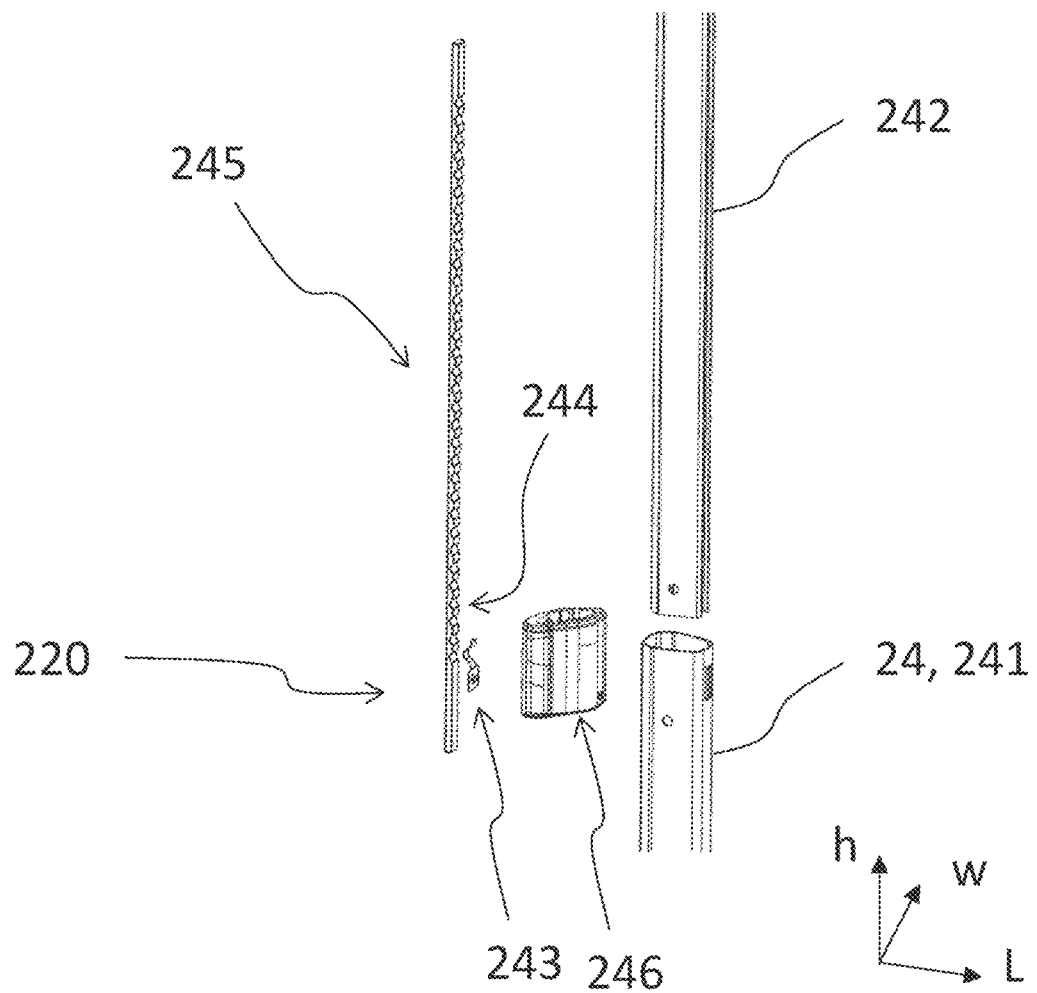
FIG. 3B shows an exploded view, of a bicycle support arm member according to an example embodiment of the present disclosure.

For example, as shown in FIGS. 3A-3B, the at least one reconfigurable bicycle support arm member 24 may be reconfigurable, such as further reconfigurable, by telescoping as mentioned in the above, wherein the restriction arrangement 220, such as a frictional lock, is configured to prevent the at least one telescoping reconfigurable bicycle support arm member 24 to adjust its length due to a force exerted thereon, when the exerted force is below a threshold value. The telescoping reconfigurable bicycle support arm member 24 may optionally comprise a first and a second telescoping arm member 241, 242, and wherein the frictional lock 220 may optionally comprise a spring-biasing member 243, such as the shown blade spring, associated with the first telescoping arm member 241. The spring-biasing member 243 is configured to engage with at least one groove 244 associated with the second telescoping arm member 242, thereby preventing the at least one telescoping reconfigurable bicycle support arm member 24 to adjust its length due to a force exerted thereon, when the exerted force is below a threshold value. The groove 244 is preferably part of a plurality of grooves, such as by the shown length of material 245 which presents a corrugated, or rippled profile. Thereby, the second telescoping arm member 242 which runs inside the first telescoping arm member 241, can be adjusted between a plurality of predetermined positions, thereby adjusting the length of the bicycle support arm member 24. The spring-biasing member 243 is here provided in a sleeve-formed member 246 which is attached to and enclosing the first telescoping arm member 241.

As mentioned in the above, the at least one reconfigurable bicycle support arm member 24 may be reconfigurable by pivoting, such as about the pivot axes P1, P2. Referring to especially FIGS. 4-6, the restriction arrangement 210, such as a rotational lock 210, may be configured to prevent the at least one reconfigurable bicycle support arm member 24 to pivot due to a force exerted thereon, when the exerted force is below a threshold value. In the shown embodiments, only a lower portion 2401 of the bicycle support arm member 24 is shown. Accordingly, an arm extending from the lower portion 2401 has here been omitted. The arm is preferably attached to the lower portion 2401 by welding, even though it may be attached in any other suitable way. Alternatively, the lower portion 2401 and the arm may together be one single part, such as a moulded member.

The restriction arrangement 210 may be configured such that the at least one reconfigurable bicycle support arm member 24 follows the pivotable wheel receiving member 14 when it is pivoted, such as folded down, to a bicycle support position. Still optionally, the restriction arrangement and/or the wheel receiving member 14 may further be configured such that the pivotable wheel receiving member 14 is stationary when the at least one reconfigurable bicycle support arm member 24 is pivoted, such as folded upwards, to a bicycle support position. Thereby, a user may not be required to hold and/or push on the wheel receiving member when the at least one reconfigurable bicycle support arm member is pivoted. This implies a facilitated bike mounting procedure.

In the shown embodiments, the at least one bicycle support arm member 24 is rotatably coupled to the platform support arrangement 10 (shown in FIG. 1) via a shaft 12. As shown, the at least one bicycle support arm member 24 may be coupled to the shaft 12 by enclosing the shaft 12. The wheel receiving members which are pivotable about the pivot axis P2 may be non-rotatably coupled to the same shaft 12. The bicycle support arm members and wheel receiving members which are pivotable about the other pivot axis P1 are preferably configured in the same or similar way.

Figure 4A:
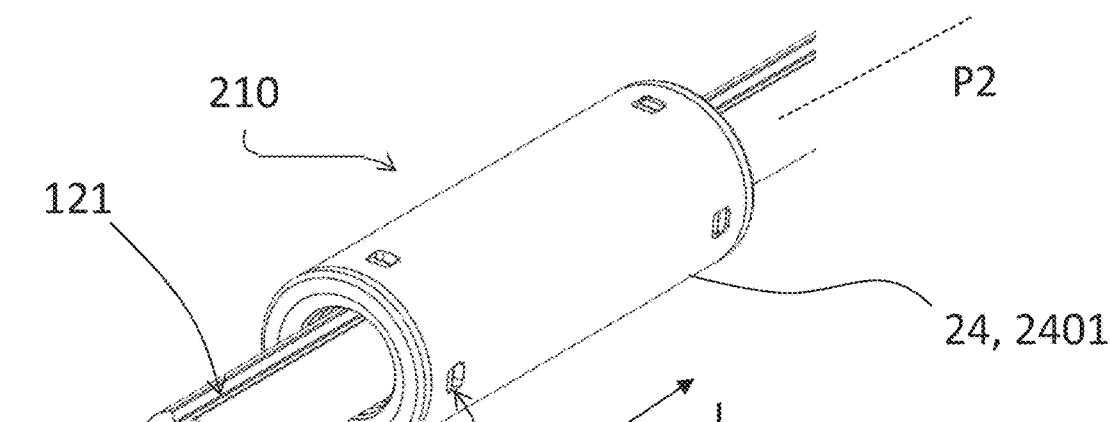
FIG. 4A shows a perspective view of a connection and a restriction arrangement according to an example embodiment of the present disclosure.
Figure 4B:
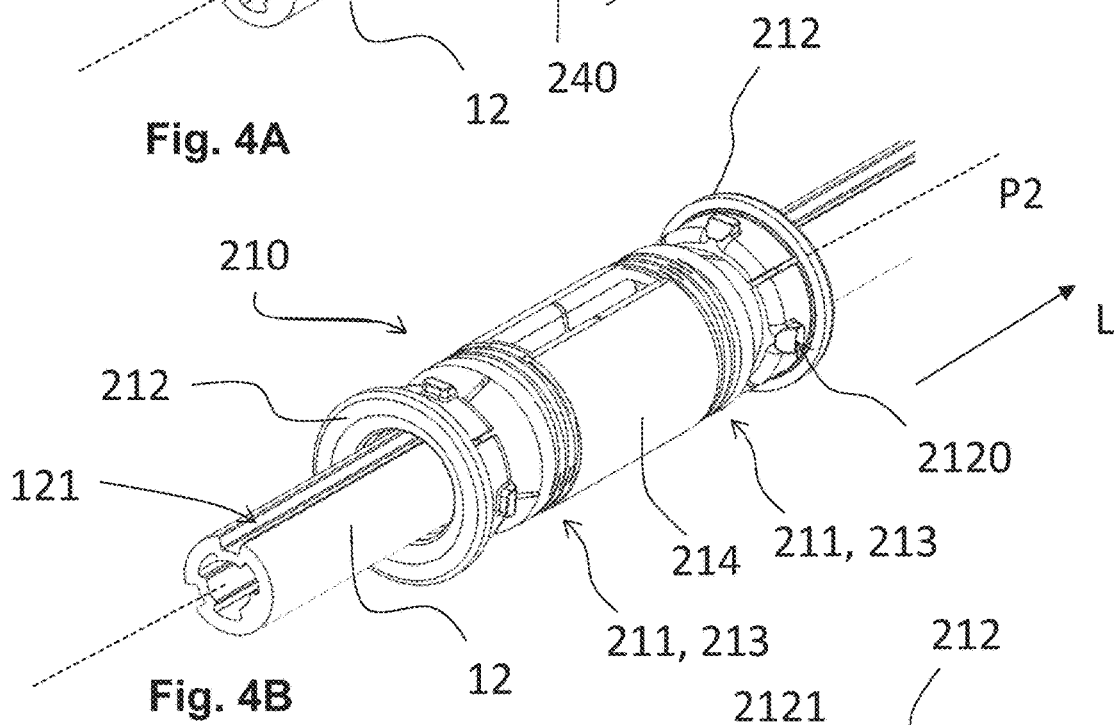
FIG. 4B shows a perspective view of a connection and a restriction arrangement according to an example embodiment of the present disclosure.
Figure 4C:
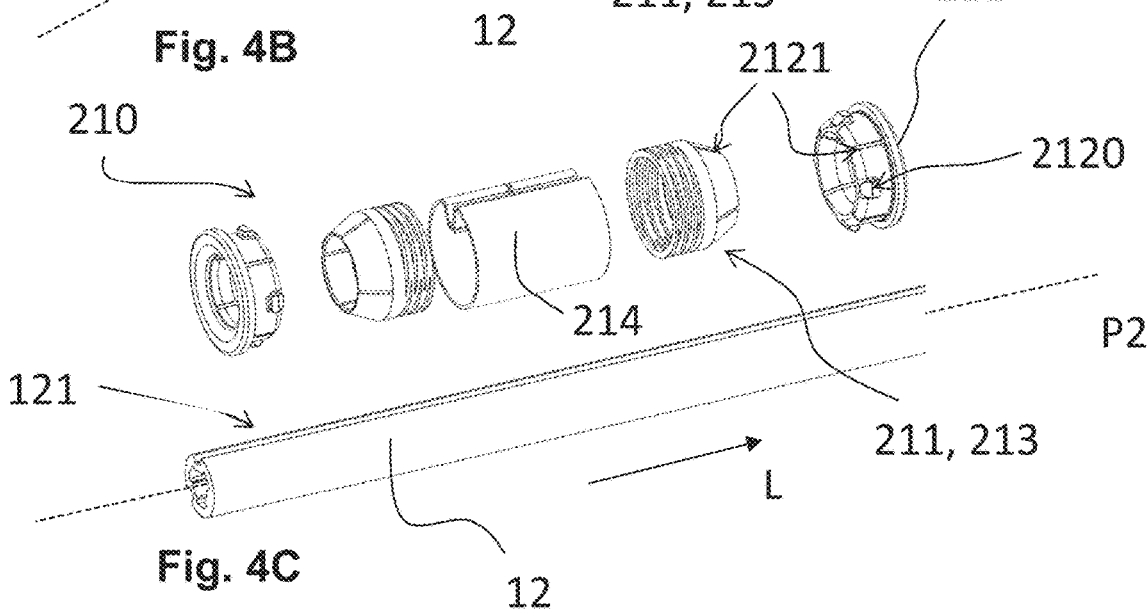
FIG. 4C shows an exploded view of a connection and a restriction arrangement according to an example embodiment of the present disclosure.

The restriction arrangement 210 may as shown in e.g. FIGS. 4A-4C comprise a spring-biasing member 211 and a first and a second friction member 212, 213 which are arranged to rotate about the pivot axis P2 of the pivotable reconfigurable bicycle support arm member 24, wherein the restriction functionality is at least provided by the spring-biasing member 211 pushing or pulling on at least one of the first and second friction members 212, 213 such that a frictional force is generated therebetween, thereby preventing the at least one pivotable reconfigurable bicycle support arm member 24 to pivot due to a force exerted thereon, when the exerted force is below a threshold value, first and a second friction member 212, 213 comprises conical mating surfaces between which a frictional force is generated.

In the embodiment shown in FIGS. 4A-4D, it can be seen that there may be two pairs of first and a second friction members 212, 213 with one spring-biasing member 211 each. The spring-biasing member 211 is integrated with the second friction member 212. The friction members 212, 213 may as shown be sleeve-formed members which encloses the shaft 12. The integrated spring-biasing member 211, which also may be a separate part, is here in the form of a coil spring enclosing the shaft 12 which exerts a force in the axial direction with respect to the pivot axis P2.

The friction member(s) 212 is/are attached to the bicycle support arm member 24 such that the friction member(s) 212 rotate with the bicycle support arm member 24. The friction member(s) 213 preferably rotates with the shaft 12.

The friction member(s) 212 may as shown be attached to the bicycle support arm member 24 by a snap-fit connection, such as shown via one or more apertures 240, or grooves, on the bicycle support arm member 24. The friction member(s) may as shown comprise corresponding flexing portions 2120, such as protruding flexing portions, which are snap-fitted into each respective aperture 240. The friction members 212, 213 may further as shown comprise one or more axially extending slits 2121, for e.g. enabling a better and firm fit to the shaft 12.

In the shown embodiment, the restriction arrangement 210 further comprises an intermediate spring-biasing member 214 provided between the two pairs of friction members 212, 213. The spring biasing member 214 is configured to exert a force in a radial direction with respect to the pivot axis P2. The spring-biasing member 214 is as shown optionally a sleeve-formed member. The sleeve-formed member 214 as shown can be compressed and/or expanded, as seen in the radial direction of the pivot axis P2. The sleeve-formed member 214 is split along a split-line 2141 extending along the pivot axis P2, thereby enabling it to be compressed and/or expanded.

Figure 4D:
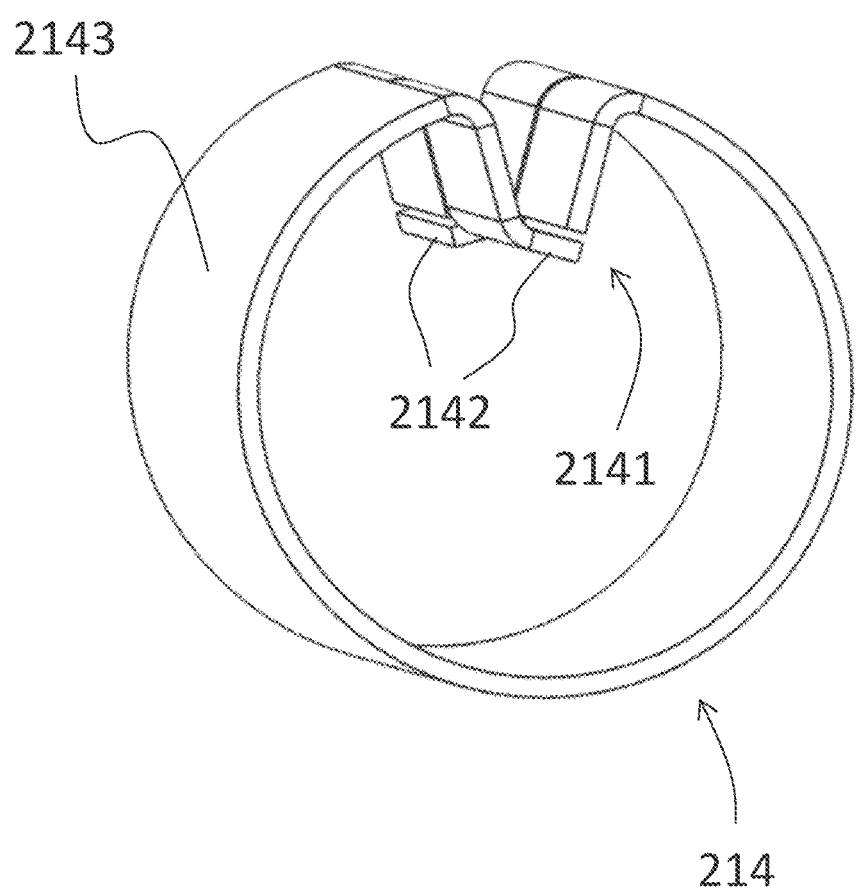
FIG. 4D shows a perspective view of a connection and a restriction arrangement according to an example embodiment of the present disclosure.

The sleeve-formed member 214 as shown in FIGS. 4B-4D further comprises a compression prevention portion 2142 (see FIG. 4D) which is configured to prevent the sleeve-formed member 214 from being compressed more than a predetermined compression distance. The compression prevention portion 2142 is configured to abut a surface of an axially extending groove 121, or the like, of the shaft 12. Thereby, the spring-biasing sleeve-formed member 214 will rotate with the shaft 12, and it will further, by being biased towards an expanded state, generate a friction force between an outer peripheral surface 2143 of the spring-biasing member 214 and a corresponding inner surface of the lower portion 2401 of the bicycle support arm member 24. The lower portion 2401 is, as shown, preferably a cylindrically formed portion adapted to enclose the shaft 12.

Figure 5A:
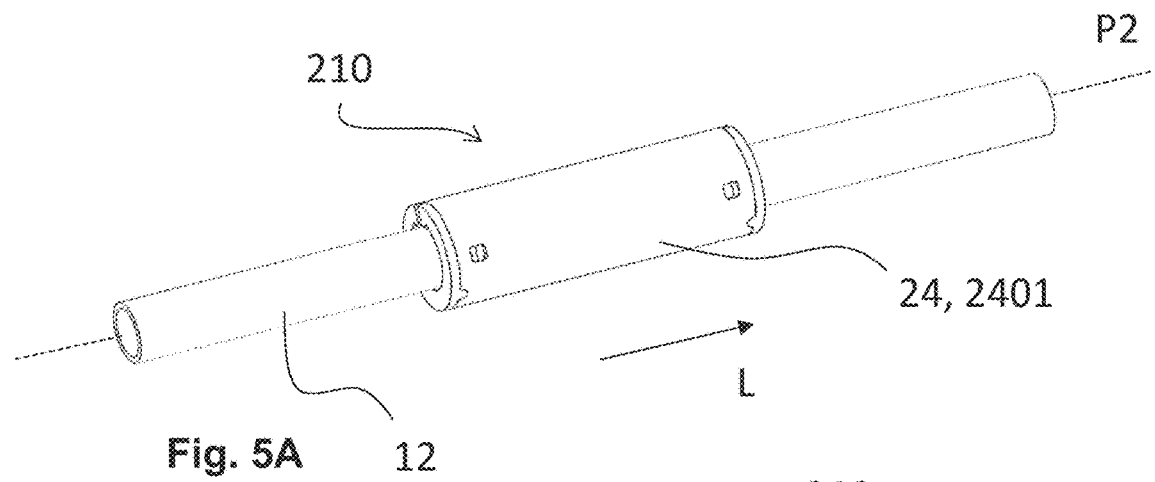
FIG. 5A shows a perspective view of a connection and a restriction arrangement according to an example embodiment of the present disclosure.
Figure 5B:
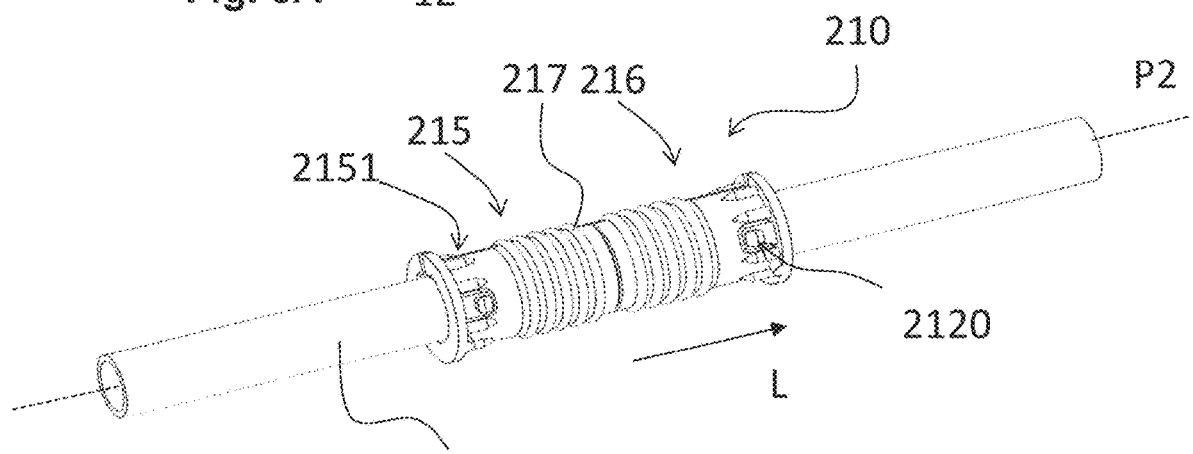
FIG. 5B shows a perspective view of a connection and a restriction arrangement according to an example embodiment of the present disclosure.
Figure 5C:
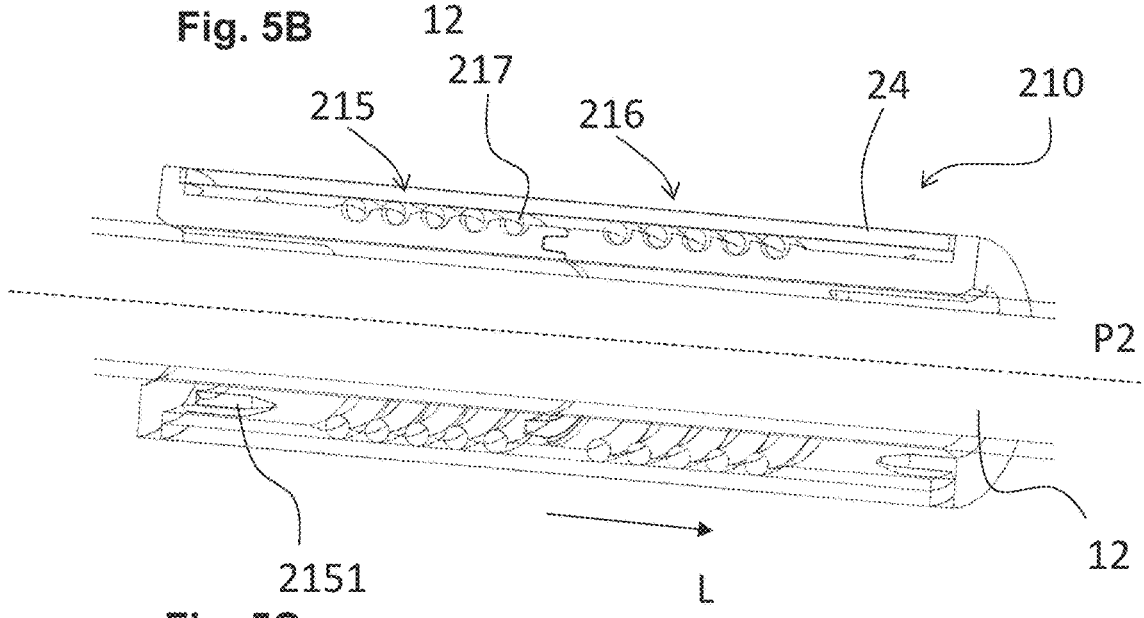
FIG. 5C shows a cross-sectional view of a connection and a restriction arrangement according to an example embodiment of the present disclosure.

FIGS. 5-6 depict other examples of connection and restriction arrangements 210 according to example embodiments of the present disclosure. As shown in FIGS. 5A-5C, the restriction arrangement 210 comprises two sleeve-formed members 215, 216, which are preferably press-fitted onto the shaft 12 such that a frictional force can be generated between the sleeve-formed members 215, 216 and the shaft. Accordingly, the sleeve-formed members 215, 216 may be denoted "friction members" as disclosed herein. The compression force against the shaft is at least partly provided by a plurality of rings 217, such as O-rings, e.g. made of rubber, which are enclosing the sleeve-formed members 215, 216. It shall however be noted that additionally, or alternatively, the sleeve-formed members 215, 216 may be configured such that they are biased towards a compressed state, thereby enabling a press-fit connection with the shaft 12. The sleeve-formed members 215, 216 are attached to the lower portion 2401 of the bicycle support arm member 24 such that they rotate with the lower portion 2401. The sleeve-formed members 215, 216 may, similar to the above, comprise corresponding flexing portions 2120, such as protruding flexing portions, which are snap-fitted into a respective aperture 240. Additionally, or alternatively, the sleeve-formed members 215, 216 may comprise press-fitting portions 2151 which are adapted to provide a press-fit connection between the lower portion 2401 and each sleeve, implying a further robust connection. The press-fitting portions 2151 are here compressible portions which will be compressed when the sleeve-formed member 215, 216 is inserted into the cylindrically formed lower portion 2401, thereby enabling a firm, clearance free, fit therebetween. The press-fitting portions 2151 may as shown be bulging portions of the sleeve-formed members 215, 216.

Figure 6A:
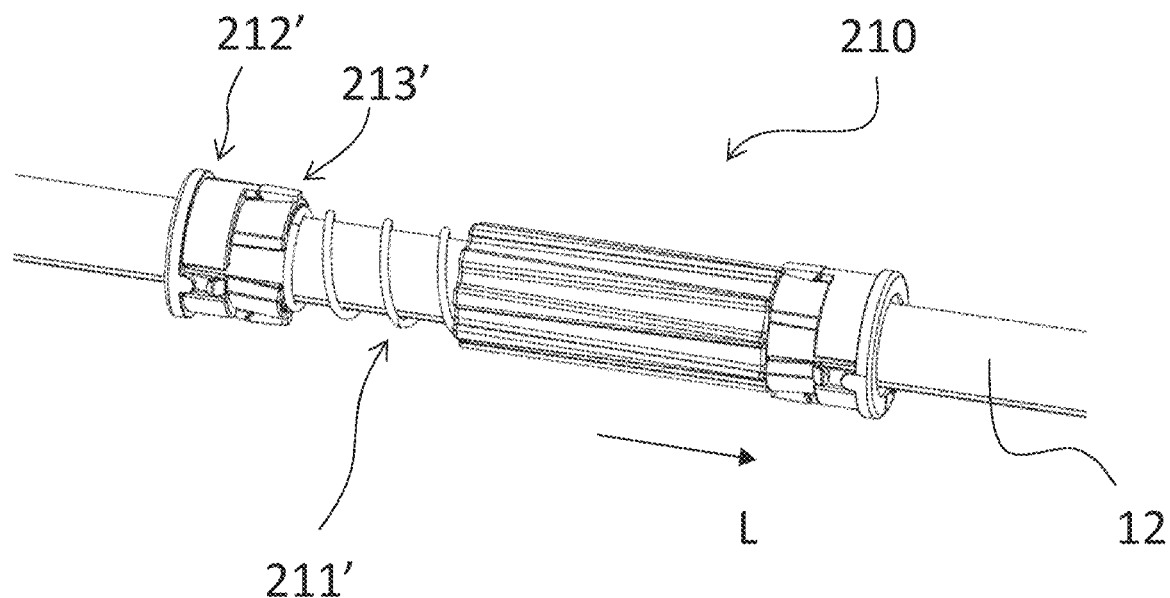
FIG. 6A shows a perspective view of a connection and a restriction arrangement according to an example embodiment of the present disclosure.
Figure 6B:
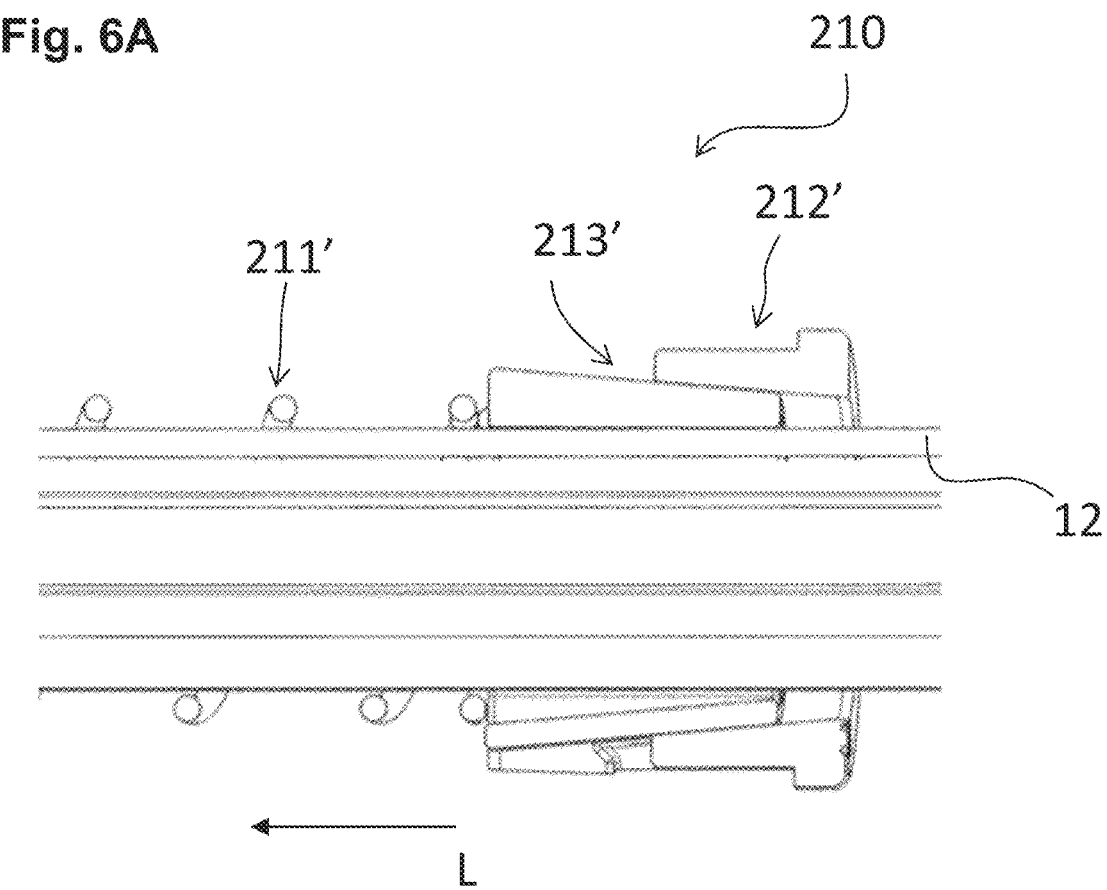
FIG. 6B shows a cross-sectional view of a connection and a restriction arrangement according to an example embodiment of the present disclosure.

In FIGS. 6A-6B, the connection and restriction arrangements 210 comprises a spring-biasing member 211' in the form of a coil spring and a first and a second friction member 212', 213', in the form of sleeves, which are arranged to rotate about the pivot axis P2 of the pivotable reconfigurable bicycle support arm member 24, wherein the restriction functionality is at least provided by the spring-biasing member 211' pushing on the second friction member 213' such that a frictional force is generated therebetween, thereby preventing the at least one pivotable reconfigurable bicycle support arm member 24 (not shown) to pivot due to a force exerted thereon, when the exerted force is below a threshold value. The coil-spring 211' is an axial spring which exerts an axial force on the second friction member 213'. The friction members 212', 213' comprise mating conical friction surfaces, see especially FIG. 6B, similar as explained in the above. The restriction arrangement 210 is also here attached to the lower portion (not shown) of the bicycle support arm member 24, i.e. it rotates with the lower portion. Also this restriction arrangement 210 is preferably configured to have a firm fit with the lower portion, similar as explained with respect to the other embodiments.

Figure 39A:
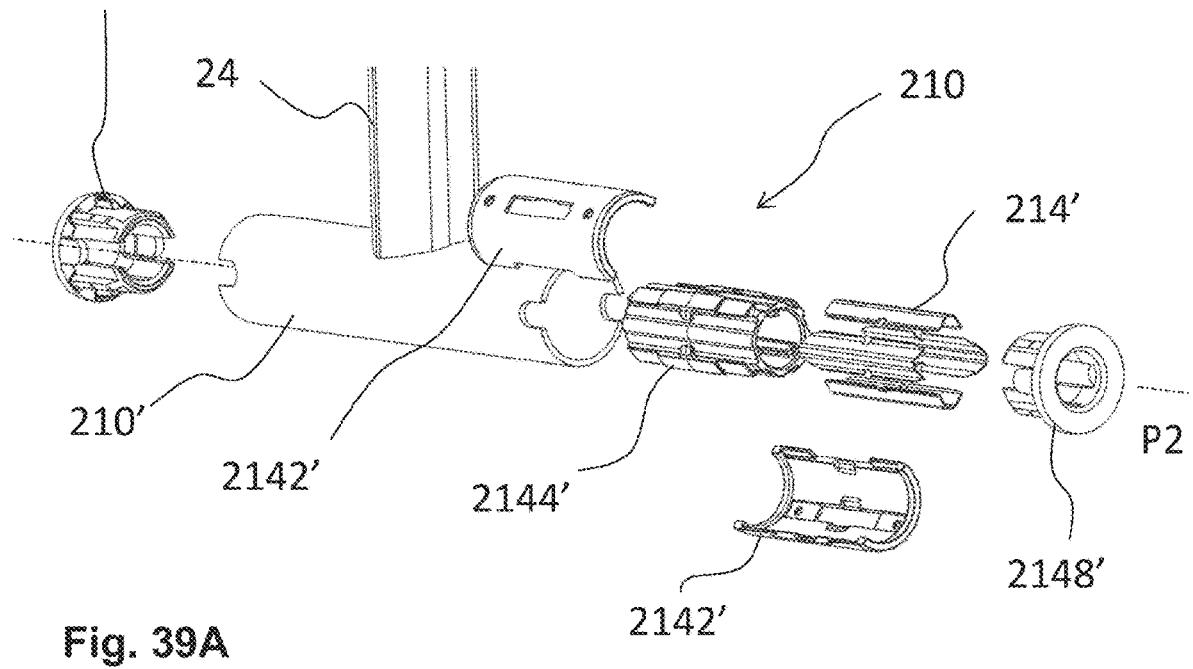
FIG. 39A shows an exploded view of a restriction arrangement according to an example embodiment of the present disclosure.
Figure 39B:
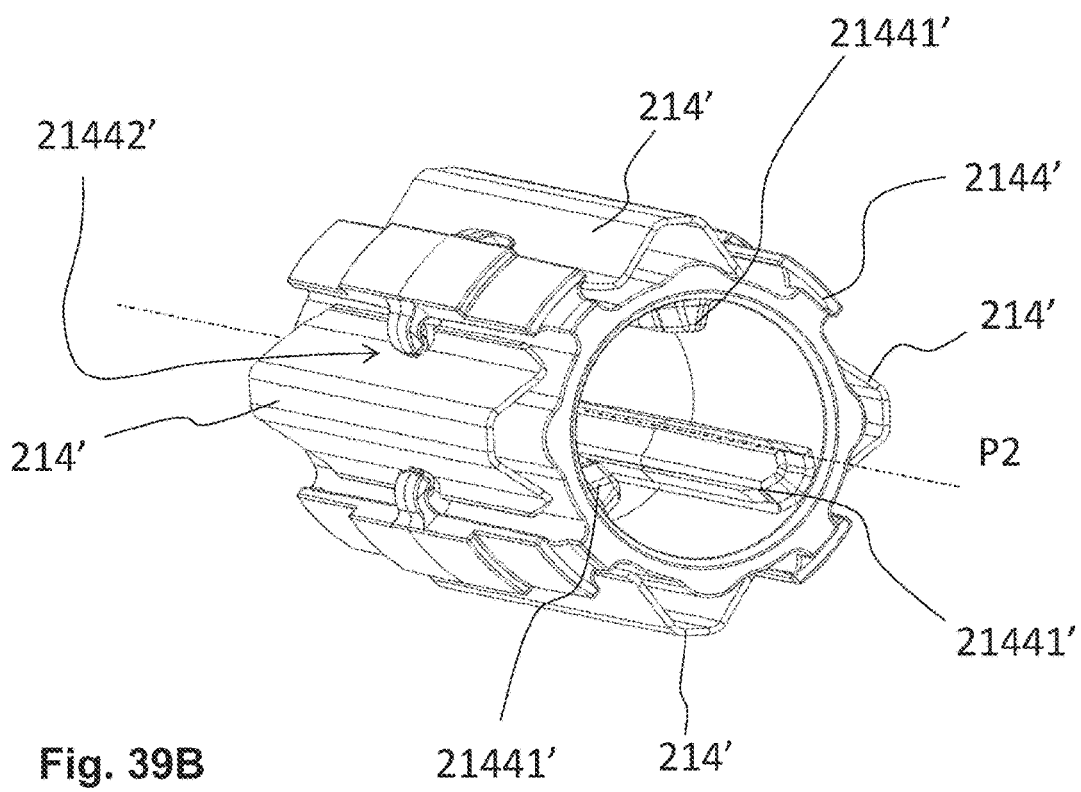
FIG. 39B shows a perspective view of a restriction arrangement according to an example embodiment of the present disclosure.
Figure 39C:
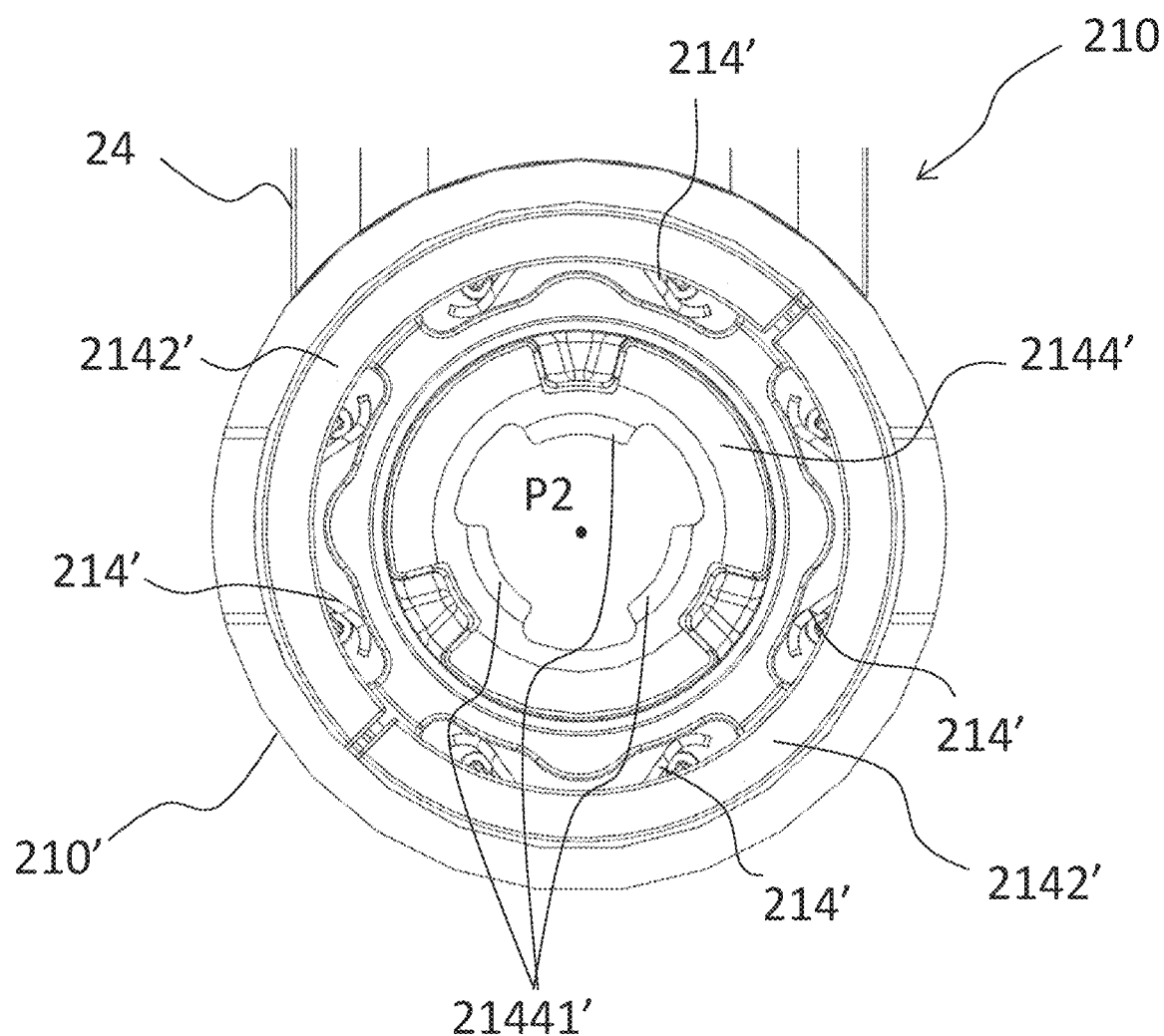
FIG. 39C shows a cross sectional view of a restriction arrangement according to an example embodiment of the present disclosure.

With reference to FIGS. 39A-39C, another embodiment of a restriction arrangement 210 for a bicycle support arm member 24 is shown. FIG. 39A depicts an exploded view of the restriction arrangement 210, FIG. 39B depicts a perspective view of a portion of the restriction arrangement 210 and FIG. 39C depicts a sectional view of the restriction arrangement 210. The restriction arrangement 210 in FIGS. 39A-39C is configured to prevent the at least one reconfigurable bicycle support arm member 24 to pivot due to a force exerted thereon, when the exerted force is below a threshold value. In this embodiment, this is achieved in that the restriction arrangement 210 comprises a spring-biasing member 214' which is configured to exert a force in a radial direction with respect to the pivot axis P2. The spring-biasing member 214' is provided in-between two sleeve-formed members 2142', 2144', i.e. an outer 2142' and an inner 2144' sleeve-formed member, respectively, as seen in the radial direction.

The inner sleeve-formed member 2144' is configured to enclose and be rotatably locked to e.g. the aforementioned shaft 12 (not shown here), such as rotatably locked thereto via the aforementioned axially extending groove 121, or the like, of the shaft 12. Accordingly, the inner sleeve-formed member 2144' may as shown comprise one or more corresponding protruding portions 21441' on its inner envelope surface which are configured to engage with the axially extending groove 121, or the like, of the shaft 12. In the shown embodiment, the protruding portions 21441' extend inwardly in the radial direction and further longitudinally along the pivot axis P2. Other configurations are of course possible, even though this embodiment has shown to provide a secure and reliable connection with the shaft 12.

The outer sleeve formed member 2142', the inner sleeve formed member 2144' and the spring-biasing member 214' are configured so that the spring-biasing member 214' is compressed in the radial direction when the restriction arrangement 210 is in an assembled state, i.e. when the different parts are assembled together. Thereby, the outer sleeve formed member 2142' will be biased away in the radial direction from the pivot axis P2.

The outer sleeve formed member 2142', the inner sleeve formed member 2144' and the spring-biasing member 214' are in the assembled state provided inside a tube formed member 210' of the bicycle support arm member 24. A rotational axis of the tube formed member 210' corresponds to the pivot axis P2.

Accordingly, the outer sleeve formed member 2142' is thereby configured to exert a force radially outwards on an inner envelope surface of the tube formed member 210' when provided therein. As such, the restriction arrangement 210 will thereby prevent the at least one reconfigurable bicycle support arm member 24 to pivot due to a force exerted thereon, when the exerted force is below a threshold value. The outer surface of the outer sleeve formed member 2142' and the inner envelope surface of the tube formed member 210' are circular, thereby enabling a rotation therebetween when the exerted force is above the threshold value.

As shown in FIGS. 39A-39C, the restriction arrangement 210 may further comprise two end caps 2146', 2148' provided on opposite sides of the tube formed member 210'. The end caps 2146', 2148' are configured to be rotatably locked with respect to the tube formed member 210' and configured to enclose the inner parts of the restriction arrangement 210. The end caps 2146', 2148' may be configured to provide an additional friction force between surfaces of the end caps 2146', 2148' and e.g. the inner sleeve formed member 2144'.

The spring-biasing member 214' may as shown comprise more than one spring element, such as four spring elements distributed around the circumference of the inner sleeve formed member 2144'. Each spring element 214' may be substantially V-shaped, or U-shaped, as seen in a sectional plane which is perpendicular to the pivot axis P2. In addition, as shown, each spring element 214' may extend longitudinally along the pivot axis P2. For example, each spring element 214' may be made of sheet metal for providing a reliable and robust biasing effect.

Furthermore, as shown, each spring element 214' and/or the inner sleeve formed member 2144' may further comprise means 21442' for axially and/or circumferentially locating and/or locking the spring element 214' with respect to the inner sleeve formed member 2144'. The means 21442' may as shown be formed by a recess, or cut-out, on the spring element 214', and a corresponding protruding portion on the inner sleeve formed member 2144'. An opposite configuration is of course also possible. Thereby, a reliable and robust connection is provided therebetween, avoiding that the spring element 214' is axially and/or circumferentially displaced. This configuration implies a reduced risk of losing the restriction functionality of the bicycle support arm member 24 during use.

To facilitate the assembly procedure, and to allow for the biasing effect exerted on the inner envelope surface of the tube formed member 210' as mentioned in the above, the outer sleeve formed member 2142' is as shown preferably split into at least two segments, forming a respective portion of a circle, as seen in a sectional view which is perpendicular to the pivot axis P2. In the shown embodiment, the outer sleeve formed member 2142' is split into two segments. However, the outer sleeve formed member 2142' may be formed by any number of such segments, such as three, four, five or six segments, forming a respective portion of a circle, as seen in a sectional view which is perpendicular to the pivot axis P2.

It shall be noted that the restriction arrangements as disclosed herein may alternatively be configured to restrict a pivoting motion of any one of the wheel receiving members 12', 12", 14', 14", 16', 16".

FIG. 1 further depicts a bike carrier 1 according to the second aspect of the disclosure.

Accordingly, the bike carrier 1 is configured such that:
  a first bicycle can initially be loaded onto the platform support arrangement 10 and secured to the first bicycle support arm member 20, whereafter the second bicycle support arm member 24 can be reconfigured, e.g. provided to the upright bicycle support state, whereafter the second bicycle can be loaded onto the platform support arrangement 10 and secured to the second bicycle support arm member 24. Thereafter, the bicycle support arm member 26 can be reconfigured, e.g. provided to the upright bicycle support state, whereafter a third bicycle can be loaded onto the platform support arrangement 10 and secured to the bicycle support arm member 26.

Referring to FIGS. 7-11, a ratchet buckle 300 of a load carrier for a vehicle is depicted, according to example embodiments of the third aspect of the disclosure. The load carrier may e.g. be the bike carrier 1 as shown in FIG. 1, and the ratchet buckle 300 may be provided on any one of the bicycle support arm members 20, 24, 26, and on the wheel receiving members 12', 12", 14', 14", 16', 16". Accordingly, the ratchet buckle 30) may be used for holding and securing wheels and/or a frame of a bicycle to the bike carrier 1. The bike carrier as shown in FIG. 1 may further comprise one or more straps 400.

The ratchet buckle 300 comprises:
a strap receiving section 302,
a strap engagement member 304 (see e.g. FIGS. 9-11) configured to engage with at least one buckle engagement member 402 of the strap 400 to thereby hold the strap 400 in the strap receiving section 302.

The buckle engagement member(s) 402 of the strap may as shown be in the form of teeth.

The ratchet buckle 300 further comprises an actuation lever 306 for a user. The actuation lever 306 is configured to actuate the strap engagement member 304 between an open state in which the strap 400 is freely movable in the strap receiving section 302 and an engaged state in which the strap engagement member 304 is configured to be engaged with the at least one buckle engagement member 402 of the strap 400.

As shown, the ratchet buckle 300 may further comprise a ratchet buckle housing 308 and the actuation lever 306 may be configured to be moved, in this case pivoted, with respect to the ratchet buckle housing 308 when it actuates the strap engagement member 304 between the open state and the engaged state.

The ratchet buckle may as shown in e.g. FIG. 8 further comprise a holding arrangement 310 configured to hold the actuation lever 306 in a holding position such that the strap engagement member 304 is maintained in the open state. As further shown, the holding arrangement 310 may comprise a first holding portion 3101 associated with the actuation lever 306 and a second holding portion 3102 associated with the ratchet buckle housing 308, wherein the first and second holding portions 3101, 3102 are configured to engage with each other to thereby hold the actuation lever 306 in the holding position. In the shown embodiment, the first holding portion 3101 is a protrusion configured to engage with the second holding portion 3102. The second holding portion 3102 is here a groove configured to engage with the first holding portion 3101.

Further, as shown, the ratchet buckle housing 308 may comprise a first and a second wall 3081, 3082, wherein each wall extends at least partly along a length extension L1 and a height extension h1 of the ratchet buckle 300. The length extension L1 of the ratchet buckle 300 corresponds to a length extension of the strap 400 when it is received in the strap receiving section 302. The walls 3081, 3082 are provided offset from each other as seen in a width extension w1 of the ratchet buckle 300, thereby defining the strap receiving section 302 therebetween. The first and second walls 3081, 3082 comprises the second holding portion 3102. More specifically, the second holding portion 3102 is provided on an inside surface of each one of the walls 3081, 3082, facing the other one of the walls.

The actuation lever 306 may as shown preferably be provided in a space between the first and second walls 3081, 3082 and the first holding portion 3101 may as shown be provided on at least one outer surface of the actuation lever 306 which faces an inside surface of one of the first and second walls 3081, 3082 of the ratchet buckle housing 308 when the actuation lever 306 is in the holding position. The holding arrangement 310 is here configured to hold the actuation lever 306 in the holding position by a snap-fit connection.

The actuation lever 306 may as further shown comprise a strap engagement portion 3061 configured to engage with at least one buckle engagement member 402 of the strap 400, and wherein the actuation lever 306 is configured to be moved, in this case pivoted, with respect to the ratchet buckle 300 such that the strap engagement portion 3061 moves the strap 400 in a strap tightening direction in the strap receiving section 302. The strap tightening direction is here the L1 direction as shown in the FIGS. Accordingly, by moving the actuation lever 306 in a counter-clockwise pivoting motion, the strap 400 will be moved in the L1 direction. Further, by moving the actuation lever 306 back and forth, such as in a pumping pattern, the strap 400 will be moved in the L1 direction, thereby tightening the strap 400. In the shown embodiments, the actuation lever 306 comprises three strap engagement portions 3061 in the form of teeth which are configured to engage with at least one buckle engagement member 402 of the strap 400. As shown, the teeth 3061 are provided on an outer curved surface of the actuation lever 306.

In the shown embodiments, the actuation lever 306 is spring-biased towards a default position, in this case spring-biased away from the holding position.

Referring to especially FIGS. 11A-11F, which show cross sectional views of the ratchet buckle 300, the strap engagement member 304 may further comprise a buckle state switching portion 3041. The strap engagement member 304 is configured to engage with a protruding element 403 of the strap 400 when the strap 400 is removed from the strap receiving section 302 such that the strap engagement member 304 is automatically switched from an open state to an engaged state. In the open state the strap 400 is freely movable in the strap receiving section 302 and in the engaged state the strap engagement member 304 is configured to be engaged with the at least one buckle engagement member 402 of the strap 400. The strap engagement member 304 may for example as shown comprise teeth 3040, or only one tooth, which engages with at least one buckle engagement member 402 of the strap 400, such as shown corresponding teeth on the strap 400. The cross-section as shown in the sequence of drawings of FIG. 11A-11F is a cross-section of a plane defined by the length extension L1 and the height extension h1 of the ratchet buckle 300.

For example, as shown, the strap engagement member 304 may be pivoted in a clockwise direction towards the engaged state and in a counter-clockwise direction towards the open state. A vice versa configuration is of course also possible. The pivot axis is here an axis which is substantially parallel to the width extension w1 and is defined by a pivot pin 316. The pivoting motion is achieved by the buckle state switching portion 3041 engaging with the protruding element 403 when the strap 400 is removed, i.e. moved to the left as shown in FIGS. 11E-11F. Thereby, the strap engagement member 304 will be pivoted in a clockwise direction when the strap 400 is removed from the strap receiving section 302. The strap engagement 304 member is arranged to push on the actuation lever 306 when it is pivoted to the engaged state such that the actuation lever 306 is moved away from the holding position. The buckle state switching portion 3041 is here a protruding portion in the form of a tooth of the strap engagement member 304, and the protruding element 403 is here in the form of a wedge-shaped portion.

Figure 10:
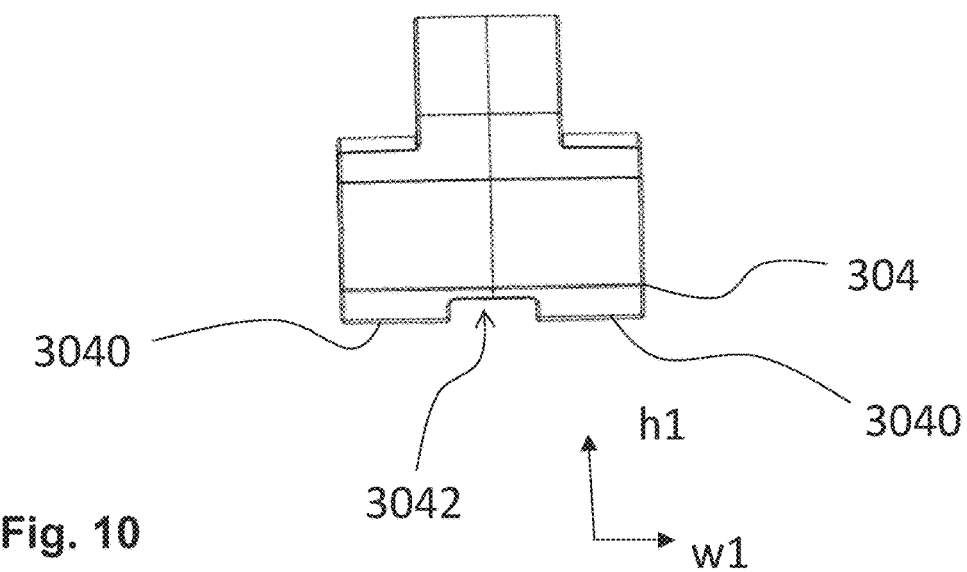
FIG. 10 shows a side view of a strap engagement member according to an example embodiment of the present disclosure.

In the sequence of drawings of FIG. 11, starting from the top left drawing, i.e. FIG. 11A, the strap 400 is inserted into the strap receiving section 302 when the strap engagement member 304 is in the engaged state. The protruding element 403 can be inserted and freely pass by the strap engagement member 304 since the strap engagement member 304 comprises an engagement free section 3042 as shown in FIG. 10. The engagement free section 3042 is here a recess, or groove, provided midway between outer end portions of the above-mentioned teeth 3040, as seen in the width extension w1. It shall be noted that this free section may not necessarily be provided midway between but could be placed differently as long as it corresponds to the position and shape of the protruding element 403. In the top right drawing, FIG. 11B, it is shown when the strap 400 is about to freely pass the strap engagement member 304.

In the next two drawings, FIGS. 11C-11D, it is shown when the actuation lever 306 is actuated in a clockwise direction towards the holding position. This may at least partly be done by a user. When in the holding position, the strap can be freely moved in the strap receiving section 302, as mentioned in the above. When the strap 400 is removed, FIGS. 11E-11F, the buckle state switching portion 3041 engages with the protruding element 403, thereby the strap engagement member 304 will automatically switch from the open state to the engaged state.

The strap engagement member 304 is spring-biased towards the engaged state in which the strap engagement member 304 is configured to be engaged with the at least one buckle engagement member 402 of the strap 400.

Figure 9:
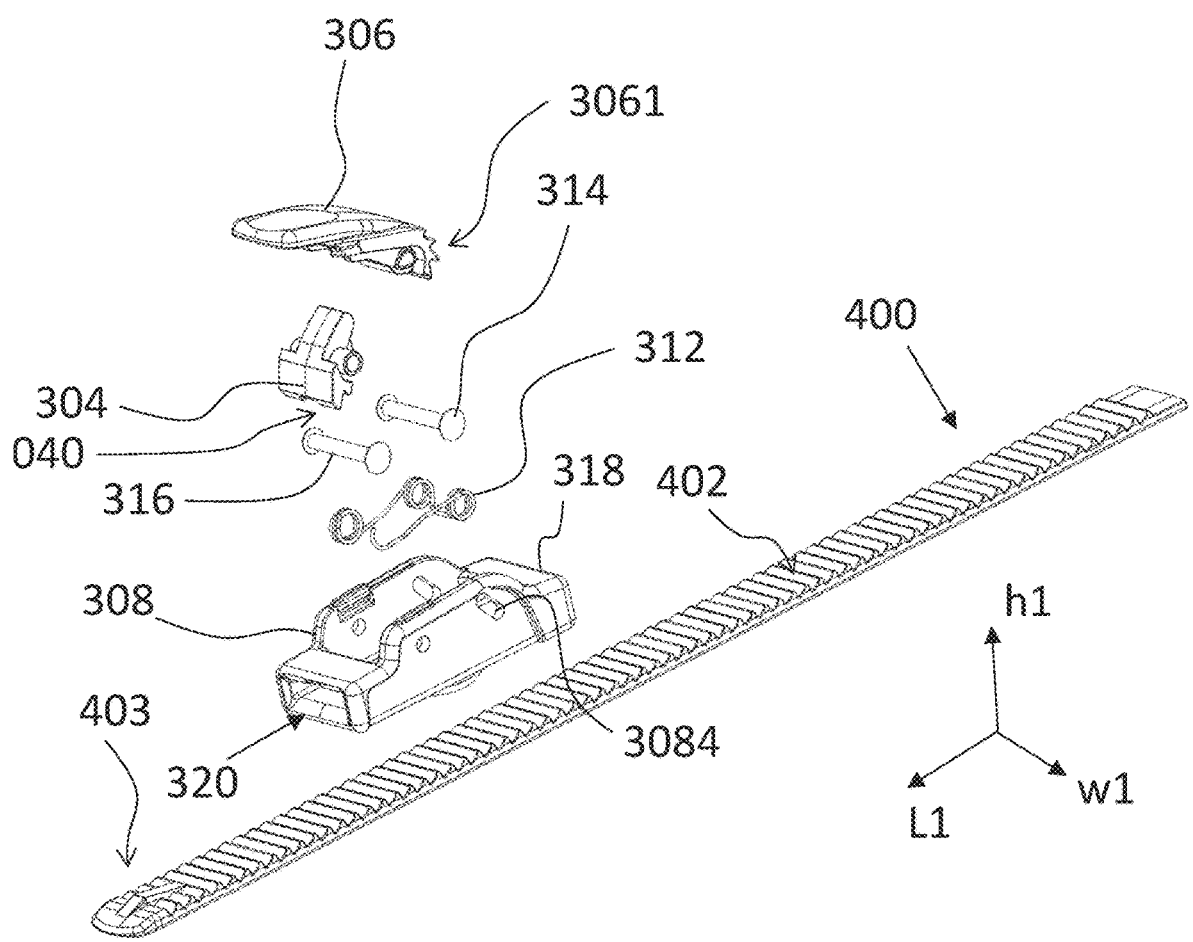
FIG. 9 shows a perspective and exploded view of a ratchet buckle and a strap according to an example embodiment of the present disclosure.

In the shown embodiments, see FIG. 9, the ratchet buckle 300 comprises a common spring-biasing member 312 for the actuation lever 306 and the strap engagement member 304. The common spring-biasing member 312 connects the actuation lever 306 and the strap engagement member 304 via respective pivot pins 314, 316. The common spring-biasing member 312 is here a coil-shaped spring, formed from a wire, such as a metal wire, and is configured to exert a biasing force in a direction which is substantially perpendicular to the pivot axes of the actuation lever 306 and the strap engagement member 304.

The pivot pin 316 is provided in slots 3083, 3084 of the respective walls 3081, 3082. The slots 3083, 3084 may as shown extend at least partly upwardly in the height extension h1, such as upwardly with a certain inclination. Thereby, the actuation lever 306 may be moved upwardly in the height direction h1 when e.g. the strap 400 is inserted into the strap receiving section 302, by engaging with the wedge-shaped protruding element 403. For example, referring to FIG. 11A, when the strap 400 is moved to the right, i.e. in the L1 direction, the actuation lever 306 will be pushed upwardly by the first sloping surface of the wedge-shaped protruding element 403.

The ratchet buckle 300 may as shown further comprise a strap guide portion 318, 320 provided at a strap entrance section of the strap receiving section 302 and at a strap exit section of the strap receiving section 302, wherein the strap guide portions 318, 320 are an extension of the strap receiving section 302 and, as shown in e.g. FIG. 8, a widened section of the strap receiving section 302. The section is widened as seen in the height extension h1, resulting in an entrance which tapers towards the exit and an exit which tapers towards the entrance.

Figure 12:
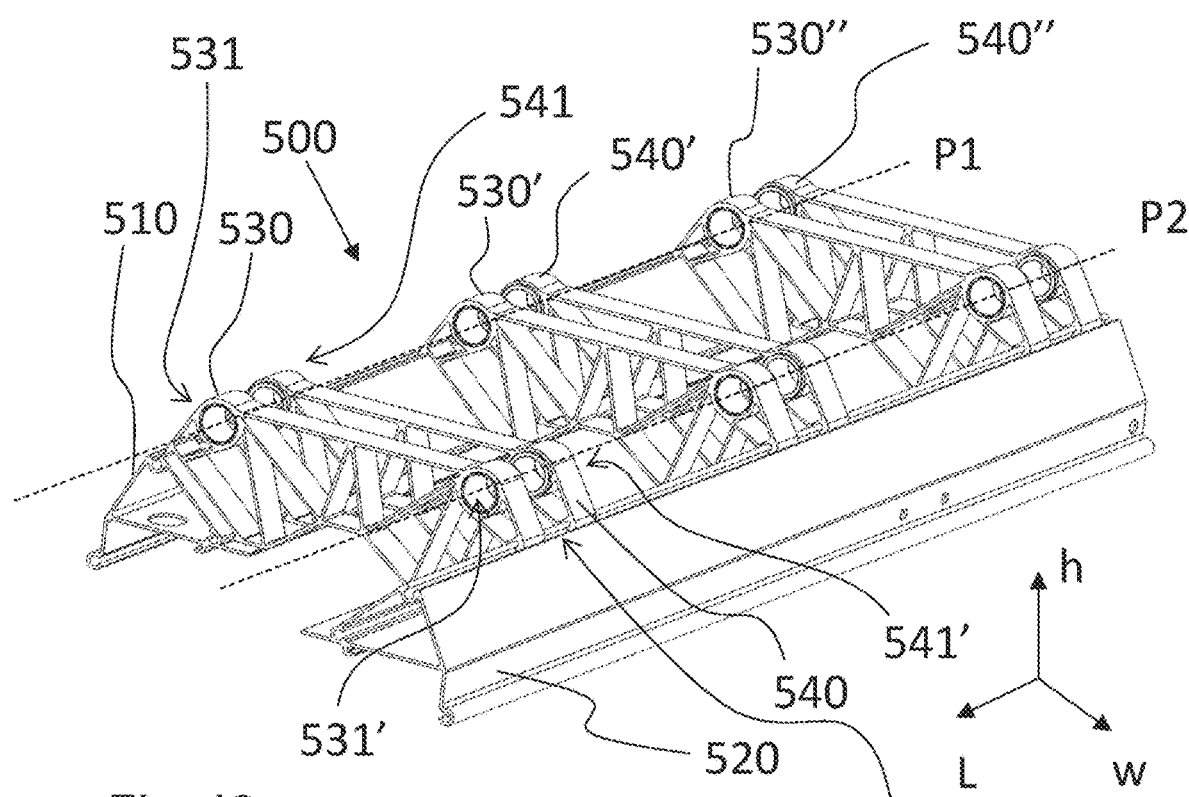
FIG. 12 shows a perspective view of a base frame of a load carrier according to an example embodiment of the present disclosure.

Referring to e.g. FIG. 12, a portion of a load carrier for a vehicle, such as a bike carrier 1 as shown in FIG. 1, is shown in perspective view. The load carrier is adapted to be mounted to a vehicle for transporting a load. The load carrier comprises:

a base frame 500 having a length extension L, a width extension w and a height extension h. The base frame 500 as shown is part of the platform support arrangement 10 as shown in FIG. 1. Accordingly, the length extension L, the width extension w and the height extension h are here the same as in FIG. 1.

The base frame 500 comprises a first and a second elongated member 510, 520 for carrying a load, wherein the first and a second elongated members 510, 520 are separate from each other and provided substantially parallel with respect to each other along the length extension L.

The base frame 500 further comprises:

a first and a second bridging portion 530, 540 provided between the first and second elongated members 510, 520 and coupling the first and second elongated members 510, 520 together.

The first and second bridging portions 530, 540 are here separate and offset from each other forming a coupling area C1 therebetween as seen in the length extension L of the base frame 500, wherein optionally a load receiving section of the load carrier is coupled to the base frame 400 in the coupling area C1. As shown in FIG. 1, the coupling area C1 as shown in FIG. 12 may comprise one of the wheel receiving members 12', 12", 14', 14", 16', 16". In this embodiment, the wheel receiving members 16', 16" are coupled to the base frame 500 in the coupling area C1. The coupling is in this case achieved by a shaft 12 as e.g. shown in FIGS. 5A-5B.

The load receiving section. i.e. the wheel receiving members 16', 16", are here coupled to each one of the separate first and second bridging portions 530, 540 and located in-between the separate first and second bridging portions 530, 540.

More particularly, in the shown embodiment the wheel receiving members 16, 16" are coupled to the base frame 500 and further pivotable about a respective pivot axis P1, P2 with respect to the base frame 500 which extends substantially in the length extension L. The pivot axes P1, P2 are here consequently the same as shown in FIG. 1.

Each pivot axis P1, P2 is defined by a shaft, such as the shaft 12, which is here a one-piece cylindrical rod which extends through the first and the second bridging portions 530, 540. In the shown embodiment, the separate first and second bridging portions 530, 540 comprise respective cylindrical portions 531, 541, 531', 541, in this case respective cylindrical apertures, which form respective pivotable couplings with the coupled and pivotable wheel receiving members 16', 16". The coupled and pivotable wheel receiving members 16', 16' are provided on opposite lateral sides with respect to the base frame 500.

Additionally, or alternatively, the load receiving section may be a bicycle support arm for holding and securing a bicycle to the load carrier.

The base frame 500 as shown in FIG. 12 comprises a plurality of respective pairs of first and second bridging portions, i.e. 530, 540, 530', 540', 530", 540" which are distributed along the length extension L of the base frame 500.

As shown in FIG. 1, It may further comprise a plurality of load receiving sections which are distributed along the length extension L of the base frame 500, such as a plurality of pairs of load receiving sections, i.e. the wheel receiving members 12', 12", 14', 14", 16', 16".

The respective pairs of first and second bridging portions 530, 540, 530', 540', 530", 540" and the plurality of load receiving sections 12', 12", 14', 14", 16', 16" are alternatingly distributed in the following order: a first bridging portion 530, a wheel receiving member 16', a second bridging portion 540 and a bicycle support arm member 26, and then optionally repeated. In the embodiment shown in FIG. 1, no bicycle support arm member is provided between the bridging portions 540' and 530" as shown in FIG. 12.

The first and second elongated members 510, 520 are here also provided in a common plane defined by the length extension L and the width extension w of the base frame 400. The common plane corresponds to a substantially horizontal plane when the load carrier 1 is mounted to a vehicle.

Figure 13:
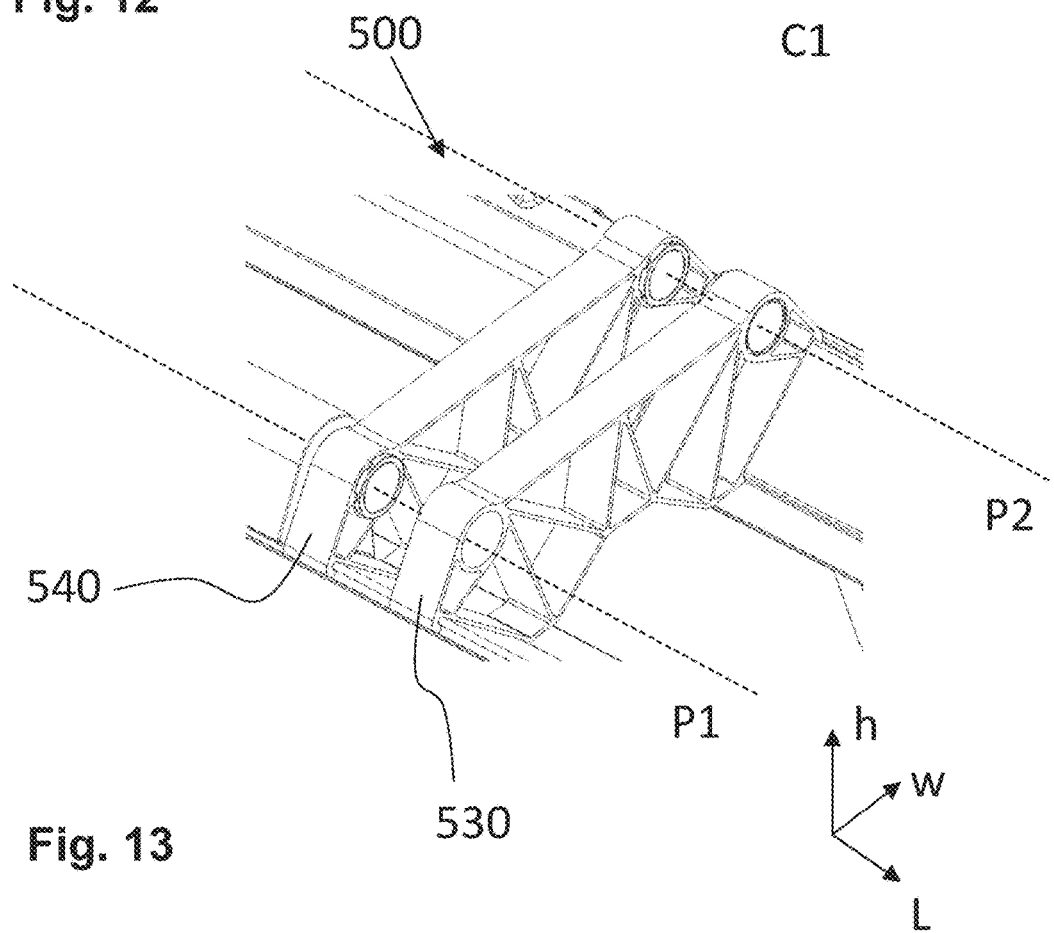
FIG. 13 show another perspective view of a base frame of a load carrier according to an example embodiment of the present disclosure.

In FIG. 13, another perspective view of the base frame 500 as shown in FIG. 12 is depicted, focusing on the first and second bridging portions 530, 540.

With respect to especially FIGS. 12 and 13, it is shown that cross-sectional profiles of the first and second bridging portions 530, 540 are of identical shape, wherein the cross-sections are defined by planes being perpendicular to the length extension L. In the shown embodiment, the first and second bridging portions 530, 540, and also the other bridging portions 530', 540', 530", 540", have identical lengths, as seen in the length extension L. of the load carrier. The bridging portions 530, 540, 530', 540', 530", 540" are here also symmetrical with respect to a centre line A2, see FIG. 14A of each bridging portion which extends in the height extension h, i.e. the line A2 define two identical mirrored portions for each bridging portion.

Furthermore, as shown, each one of the first and second bridging portions 530, 540 are extruded elements, here made of aluminium. The extruded first and second bridging portions 530, 540 have an extrusion extension which extends substantially in the length extension L of the base frame 500. In the shown embodiment of FIG. 12, all bridging portions 530, 540, 530', 540', 530", 540" are configured like this.

Figure 14A:
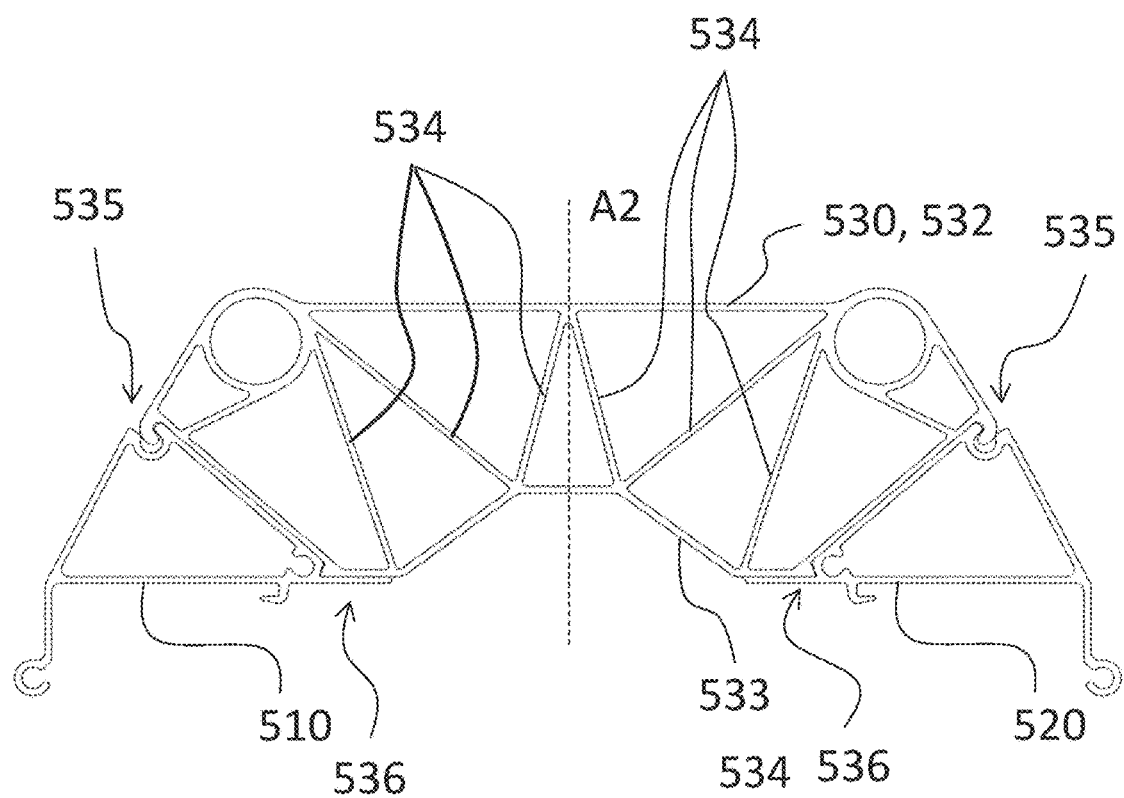
FIG. 14A shows a cross-sectional view of a base frame of a load carrier according to an example embodiment of the present disclosure.
Figure 14B:
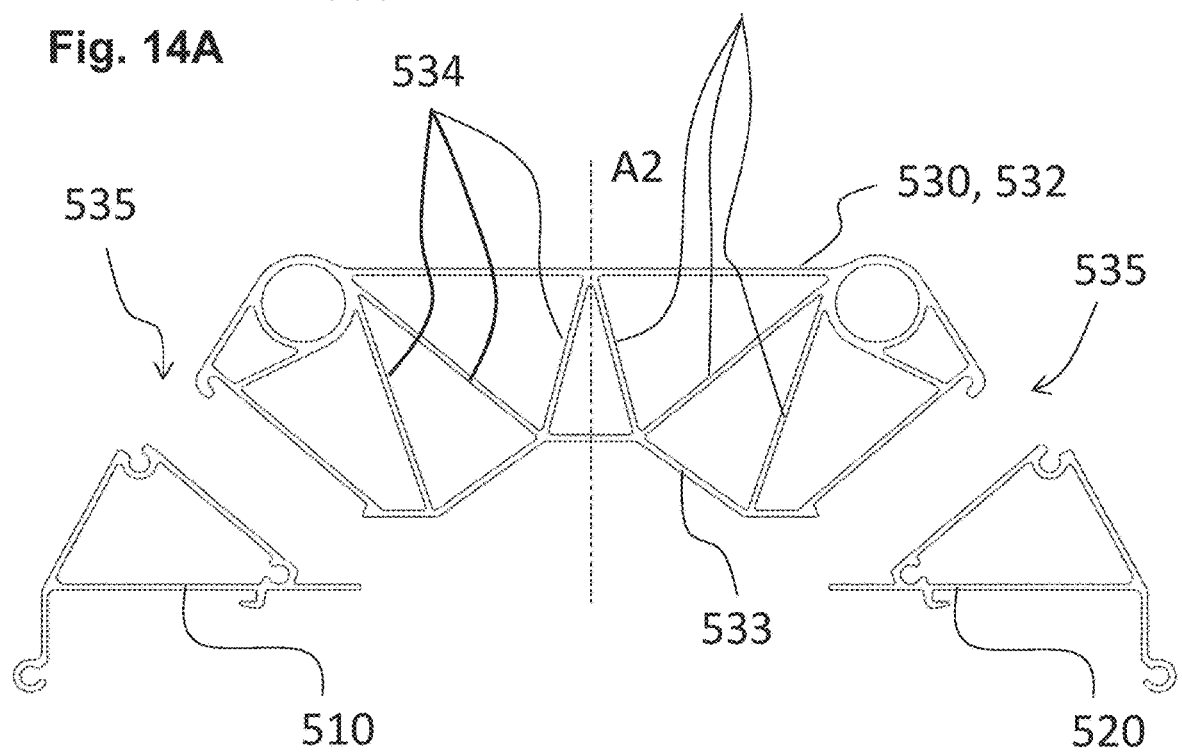
FIG. 14B shows a cross-sectional view of a base frame of a load carrier according to an example embodiment of the present disclosure.

With respect to FIGS. 14A-14B, one of the bridging portions 530 is shown in cross-section. The cross section is perpendicular to the length extension L. It shall be understood that even though only one bridging portion is shown, the other bridging portions of the base frame 500 may be configured in the same way. The bridging portion 530 comprises a framework structure made of aluminium. More particularly, the first bridging portion 530 is formed by an upwardly facing wall 532 facing upwardly in the height extension h of the base frame 500 and a downwardly facing wall 533 facing downwardly, wherein the upwardly and downwardly facing walls 532, 533 define a void therebetween. A plurality of supportive walls 534 are provided in-between and connecting the upwardly and downwardly facing walls 532, 533, such that several sub-voids are formed therebetween. The supportive walls 534 are diagonally extending walls, as seen in a plane defined by the width extension w and the height extension h of the base frame 500. Thereby, the sub-voids are substantially triangular shaped, implying a more rigid framework structure.

As further shown, the first bridging portion 530 is coupled to the first and second elongated members 510, 520 by welding, hooks/engaging edges 535, which here are hooks/engaging edges in an upper connection region. Welds 536 are provided in a lower region of the first bridging portion 530 and the respective elongated member 510, 520.

The respective connections to the elongated members 510, 520 are rail-formed connections. In particular, the rail-formed connections are formed by rail-shaped extruded portions of the bridging portion 530 and of the elongated members 510, 520, wherein the rail-shaped extruded portions extend in the length extension L.

The connection interface as shown is a substantially diagonal connection interface. More specifically, as shown, the first bridging portion 530 rest on top of the respective elongated member 510, 520, as seen in a cross-section of the base frame 5X) being defined by a plane being perpendicular to the length extension L. Thereby, a robust connection and support for the bridging portion 530 is provided.

Furthermore, as shown, the first and second elongated members 510, 520 may be extruded elements, such as made of aluminium. They also comprise a framework structure, wherein the framework structure forms a triangular cross-sectional profile, with a lower horizontal side and a first upper side for coupling/aligning with a side of the first bridging portion 530. In the shewn embodiment, the sides are provided at about 45 degrees from the horizontal lower side.

Figure 14C:
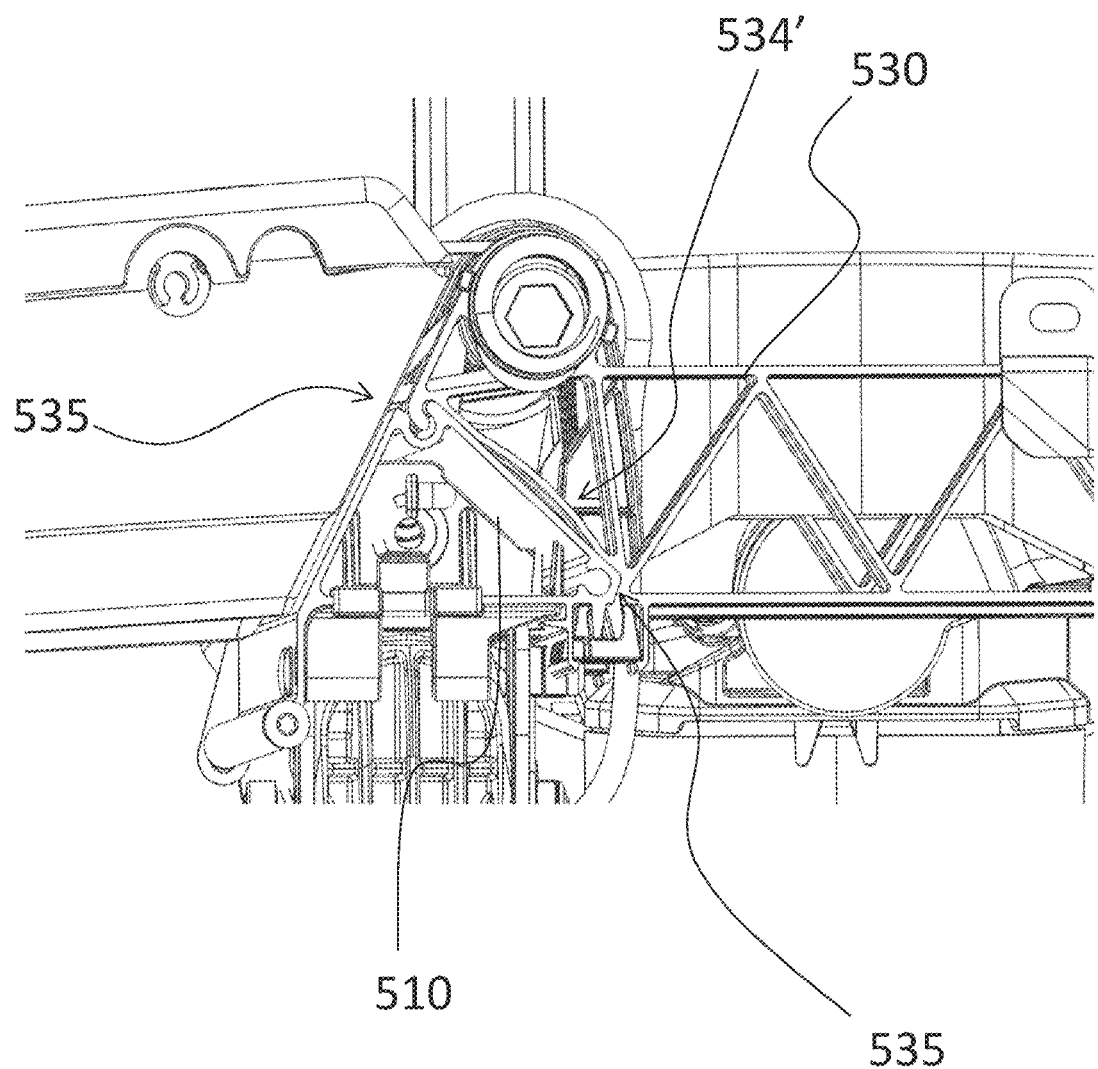
FIG. 14C shows a cross-sectional view of a base frame of a load carrier according to an example embodiment of the present disclosure.

Referring to FIG. 14C, a configuration similar to the one shown in FIGS. 14A-14B is shown. In particular, the connection interface as shown is also here a substantially diagonal connection interface. Accordingly, the first bridging portion 530 rest on top of the respective elongated member 510, 520, as seen in a cross-section of the base frame 500 being defined by a plane being perpendicular to the length extension L. In the shown embodiment, one of the connection surfaces, in this case the surface 534' of the bridging portion 530, is bent and/or curved such that a gap is formed between the two facing surfaces. Thereby, it may be easier to connect the two parts together since one of the facing surfaces, in this case the surface 534' of the bridging portion 530, will be allowed to flex. Thereby a tight fit can be achieved therebetween without requiring high precision tolerances. Accordingly, a reliable and cost-effective connection is achieved. In this embodiment, hooks/engaging edges 535 are provided in the upper and in lower connection region.

Figure 15A:
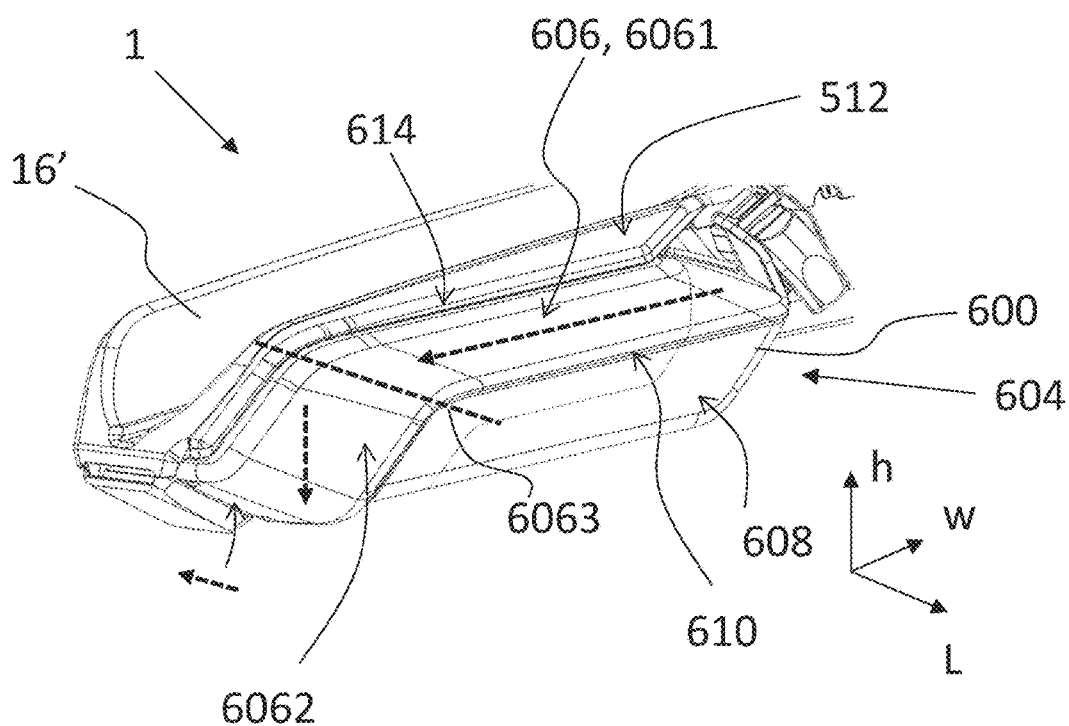
FIG. 15A shows a perspective view of a housing for a light emitting and/or light reflecting member of a load carrier according to an example embodiment of the present disclosure.
Figure 15B:
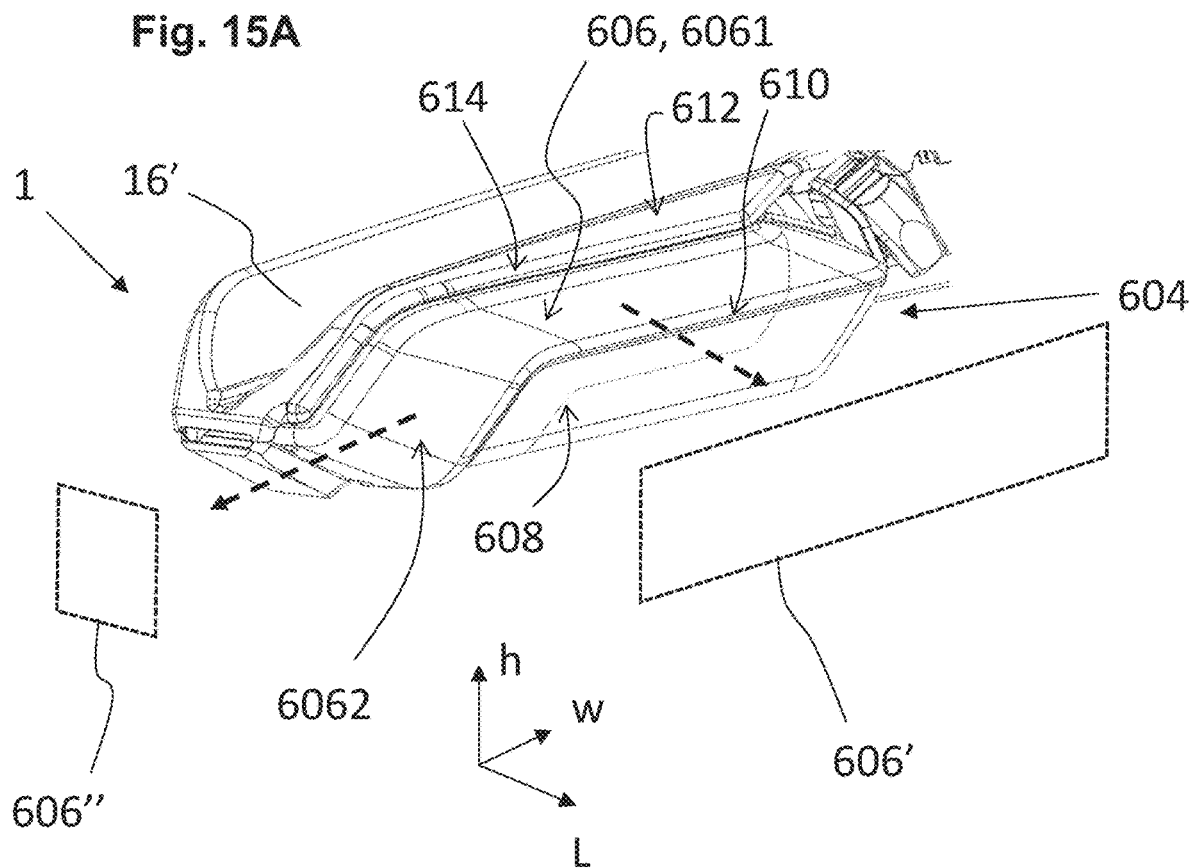
FIG. 15B shows a perspective view of a housing for a light emitting and/or light reflecting member of a load carrier according to an example embodiment of the present disclosure.
Figure 16:
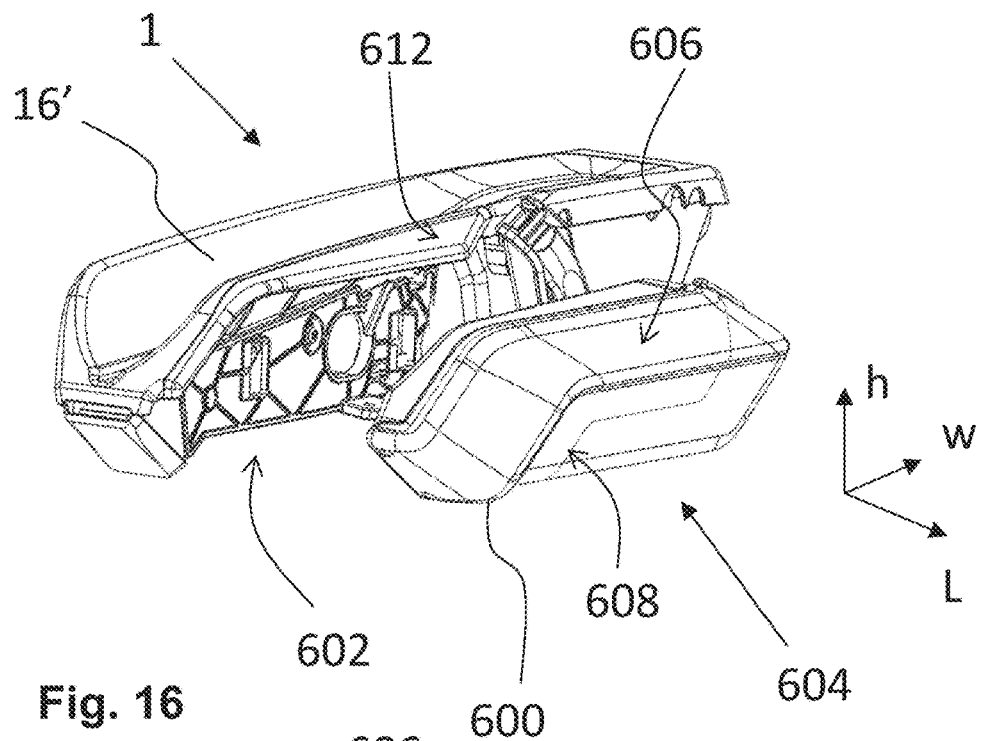
FIG. 16 shows a perspective view of a housing for a light emitting and/or light reflecting member of a load carrier according to an example embodiment of the present disclosure.
Figure 17:
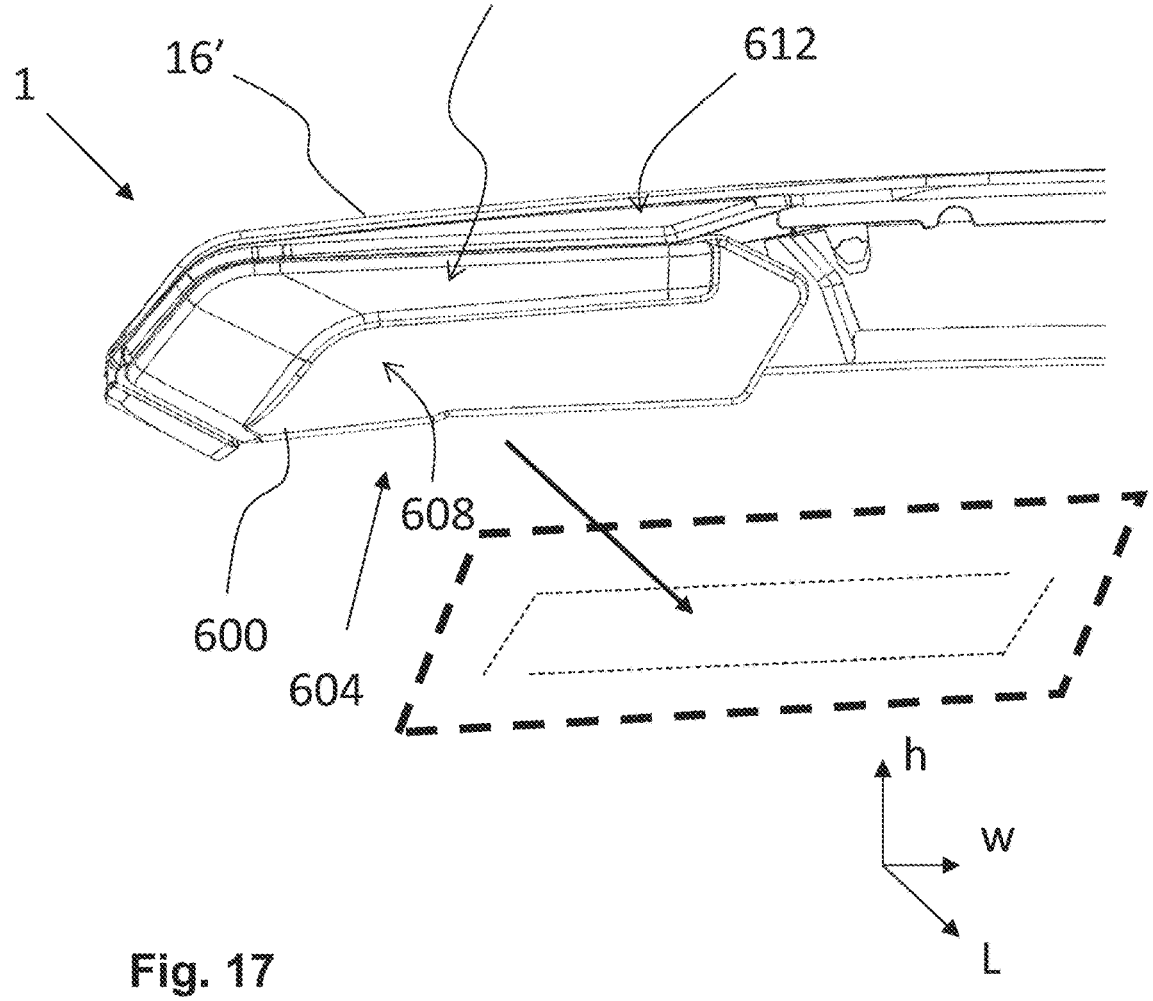
FIG. 17 shows a rearward view of a housing for a light emitting and/or light reflecting member of a load carrier according to an example embodiment of the present disclosure.
Figure 18:
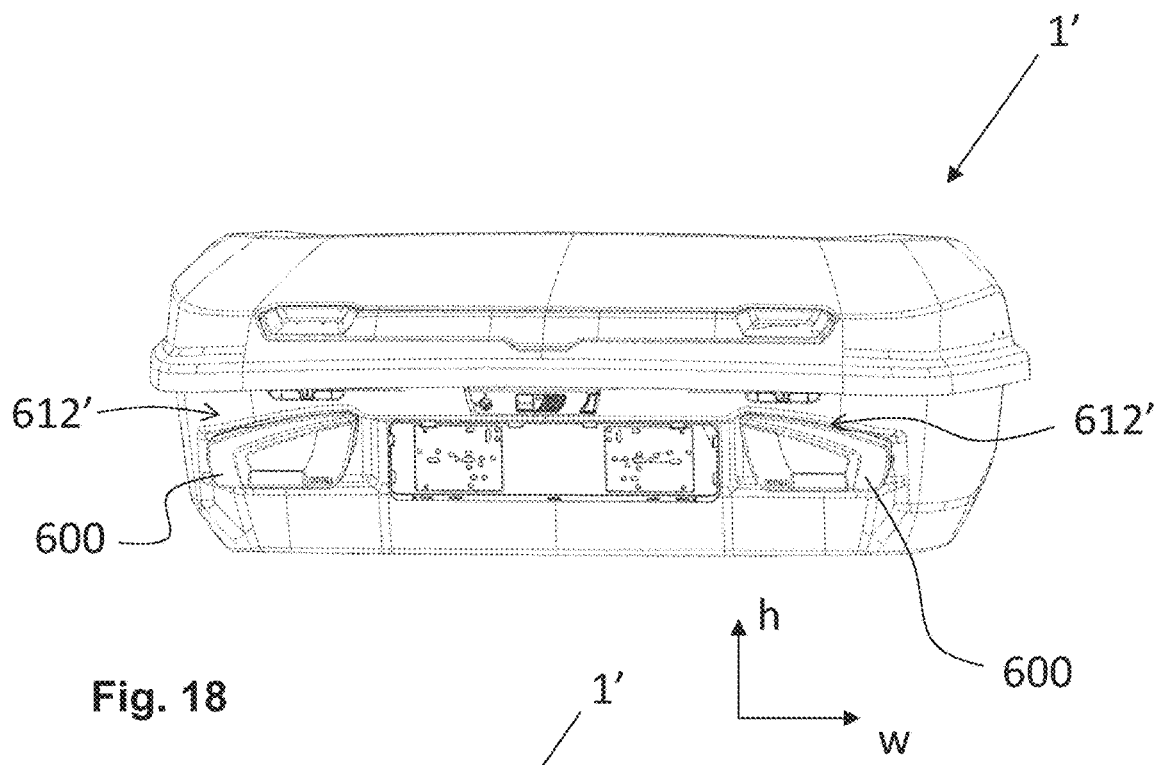
FIG. 18 shows an embodiment of a light emitting and/or light reflecting member of a load carrier according to an example of the present disclosure.
Figure 19:
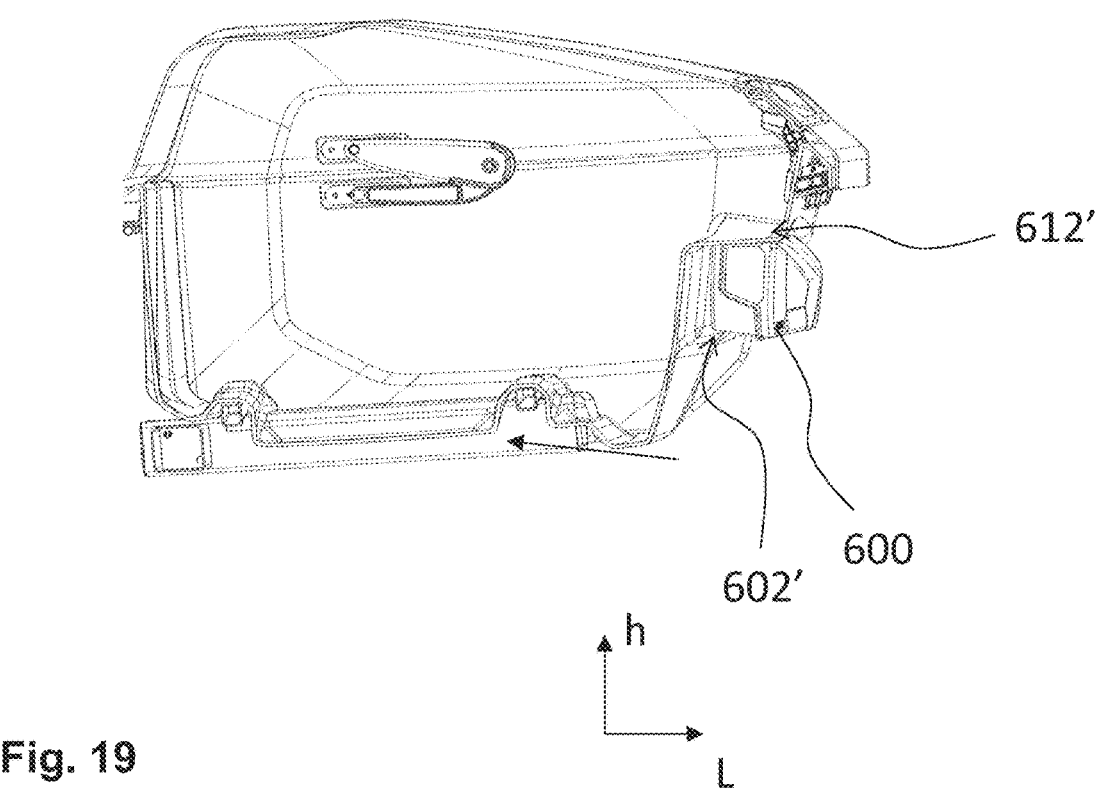
FIG. 19 shows an embodiment of a light emitting and/or light reflecting member of a load carrier according to an example of the present disclosure.

Referring to FIGS. 15-19, load carriers according to the fifth aspect is depicted. The load carrier as shown in FIGS. 15-17 may also here for example be the bike carrier 1 as shown in FIG. 1. Alternatively, the load carrier may be a rear mounted cargo box 1', i.e. a cargo box mounted at the rear of a vehicle, as shown in FIGS. 18-19.

The load carrier has a length extension L, a width extension w and a height extension h, and comprises:
  a housing 600 for a light emitting and/or light reflecting member and a holder 602, 602' (see FIGS. 16 and 19) for the housing 600.

The light reflecting member is in this case LED lights.

The housing 600 comprising a light emitting area 604 which is at least partly directed in a rearward direction of the load carrier 1, 1', corresponding to the length extension L and to a rearward direction of the vehicle when the load carrier 1, 1' is mounted thereto.

The light emitting area 604 is of a three-dimensional shape. More specifically, as shown in FIG. 15B, the light emitting area comprises a first sub area 606 having a first projection 606' in a plane defined by the width extension w and the height extension h and a second projection 606" in a plane defined by the length extension L and the height extension h, thereby forming a first light emitting portion 6061 of the first sub area 606 which is directed in the rearward direction and a second light emitting portion 6062 of the first sub area 606 which is directed in the width extension w and away from the load carrier 1.

Furthermore, as shown and indicated by dashed arrows in FIG. 15A, the first sub area 606 may comprise a continuous surface with a main extension in the width extension w formed by the first light emitting and/or light reflecting portion 6061 and another smaller extension in the length extension L and in the height extension h formed by the second light emitting portion 6062, wherein the first and second light emitting portions 6061, 6062 are connected via an edge 6063, which here is a smooth edge. The edge 6063 is indicated by a dashed line in FIG. 15A. As shown, the extension in the length extension formed by the second light emitting portion 6062 extends backwardly, corresponding to a forward driving direction when the load carrier 1 is mounted to a vehicle.

As further shown, light emitting area 604 may comprise a second sub area 608 which is located below the first sub area 606, as seen in the height extension h, wherein the first and second sub areas 606, 608 are divided by an edge 610. In the embodiment shown in e.g. FIG. 15B, the edge 610 dividing the first and second sub areas 606, 608 extends outwardly from the first and second sub areas in the length extension L such that it forms a second sub area overhang portion 610 which at least partly covers the second sub area 508 from above.

As indicated by dashed lines in FIG. 17, the first and second sub areas 606, 608 may be L-shaped, as seen from behind in the length extension L of the load carrier 1, as shown the L-shapes are oppositely arranged and interconnected sub areas extending in the width extension w. The L-shapes may be formed by the lights which are provided behind a transparent glass. The L-shapes may be provided by using different colours for different lights, such as a braking light, a parking light, a main light, a flashing light.

In the shown embodiments, the light emitting reflecting area 604 is made of transparent glass, and LED lights are provided behind the transparent glass.

As further shown, the load carrier 1, 1' may further comprise an overhang portion 612, 612' provided above the holder 602, 602', as seen in a height extension h of the load carrier 1, 1', which corresponds to a height extension of the vehicle when the load carrier 1, 1' is mounted thereto. The overhang portion 612, 612' protrudes from the holder 602, 602', such that it at least partly covers the light emitting area 604 and the holder 602, 602', from above.

The overhang portion 612, 612' encloses fastening elements (not shown) such that they are not visible when the housing 500 is mounted to the holder 602, 602'. The fastening elements may e.g. be fastening elements for the light emitting area 604, which may be the above-mentioned transparent glass.

As shown in FIGS. 15-17, the load carrier 1 may comprise a load receiving section 16' which is configured to receive and hold a wheel of a bicycle. In the shown embodiment, the load receiving section 16' is a wheel tray, wherein the overhang portion 612 forms part of the load receiving section 16'. Thereby, fewer components can be used for accomplishing the configuration, implying cost-effectiveness.

As further shown in FIGS. 15A-15B, the overhang portion 612 and the housing 600 forms a transition edge 614 therebetween when the housing 600 is mounted to the holder 602, wherein the overhang portion 612 and the housing 600 at the transition edge are shaped such that they are aligned, and/or flush with each other, along the transition edge 614.

The light emitting area 604 may, as shown in FIG. 17 with dashed lines, have an outer contour of a parallelogram, as seen from behind in the length extension L of the load carrier.

The load carrier 1, 1' preferably comprises a second housing for a light emitting member, and a second holder for the housing, wherein the second housing and/or holder is formed as the housing and holder according to any one of the preceding embodiments, and wherein each housing and holder is provided at a respective rear corner portion of the load carrier 1, 1', as shown in FIGS. 1 and 18.

Referring to FIGS. 20-23, a load carrier 1 according to the sixth aspect of the disclosure is depicted. The load carrier 1 as shown may for example be the bike carrier 1 as shown in FIG. 1.

The load carrier 1 is adapted to be mounted to a vehicle for transporting a load. The load carrier 1 has a length extension L, a width extension w and a height extension h, similar to the bike carrier 1 in FIG. 1. Accordingly, when mounted to a vehicle, the load carrier 1 extends out from the vehicle at the vehicle's rear side in the length extension L.

The load carrier 1 comprises:
a base frame portion 700,
a load receiving section 702 for receiving and securing a load to the vehicle,
wherein the load receiving section 702 is movable with respect to the base frame portion 700 such that the load receiving section 702 can be moved away from the vehicle when the load carrier 1 is mounted thereto.

The base frame portion 700 as shown comprises two separate elongated members 704, 706 extending in the length extension L.

The movable load receiving section 702 is pivotable about a pivot axis P3. As shown, the pivot axis may extend along the width extension (w). Thereby the load receiving section 702 can efficiently be pivoted away from the vehicle.

The load receiving section 702 as shown comprises the platform support arrangement 10 as shown in FIG. 1. However, it shall be noted that the load receiving section 702 may have any other suitable configuration for carrying a load, not only for bicycles.

The base frame portion 700 as shown comprises two connection pins 708, 710 for holding and securing the load receiving section 702 in a fixed state with respect to the base frame portion 700.

Figure 21:
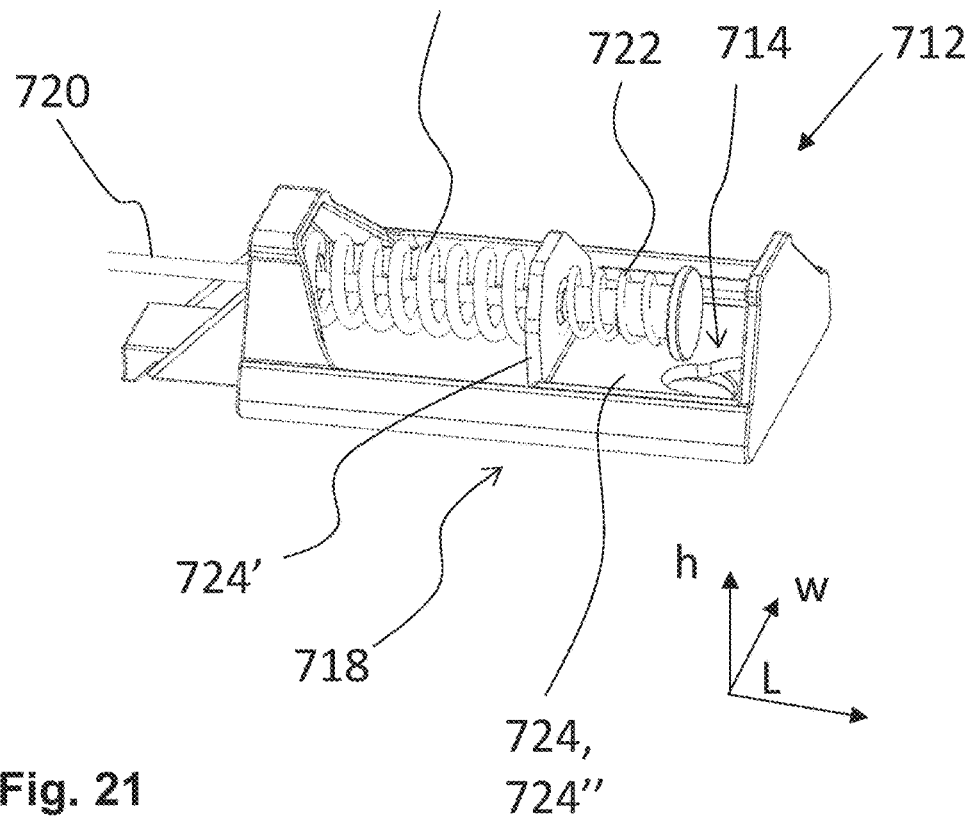
FIG. 21 shows a perspective view of a connection arrangement according to the sixth aspect of the disclosures.
Figure 22:
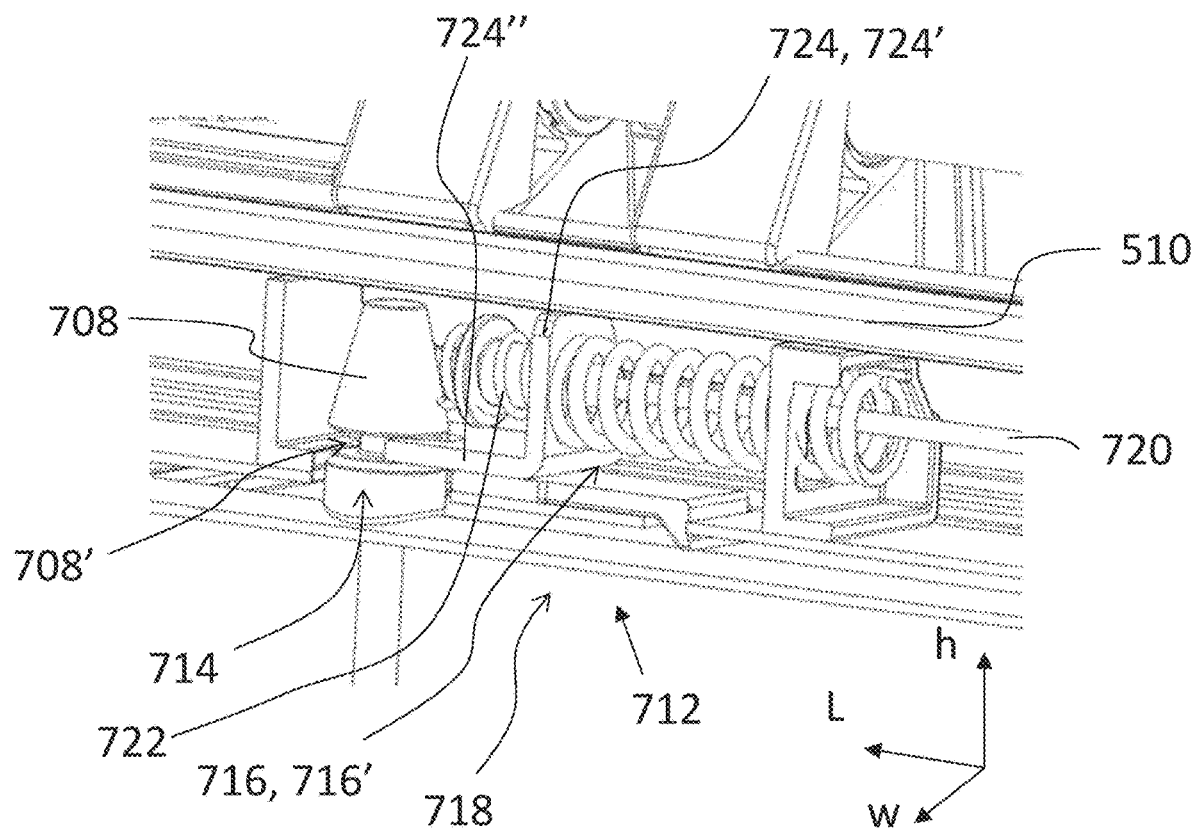
FIG. 22 shows an inside view of a load carrier according to an embodiment of the sixth aspect of the disclosure.

With respect to FIGS. 21 and 22, it is shown that the load receiving section 702 comprises two corresponding connection arrangements 712. Only one connection arrangement for one of the connection pins is shown. The two connections arrangements 712 are here identical and therefore only one of them will be described.

The connection arrangement 712 comprises an aperture 714 for receiving the connection pin 708.

In the shown embodiment, the corresponding connection arrangement 712 comprises a spring-biased locking mechanism 716 for locking the connection pin 708 to the load receiving section 702. In the shown embodiment, the spring-biased locking mechanism 716 comprises a coil spring 716' which extends in the length extension L. The spring-biased locking mechanism 716 is arranged to lock the connection pin 708 to the load receiving section 702 in a locking direction which is substantially perpendicular to a length extension of the at least one connection pin 708. Accordingly, the locking direction is here in the length extension L.

As shown in FIG. 22, the corresponding connection arrangement 712 is concealed in an inner space of the load receiving section 702. In this embodiment, the connection arrangement 712 is concealed in the elongated member 510 as e.g. shown in FIG. 12. Moreover, as shown in FIGS. 21 and 22, the corresponding connection arrangement 712 is provided in a separate cassette housing 718 in the inner space. The cassette housing 718 as shown can be slid into the inner space of the elongated member 510. Thereby the cassette housing 718 can be easily inserted into and removed from the elongated member 510.

The load carrier 1 may as shown further comprise a flexible elongated element 720, which here is a wire, wherein the spring-biased locking mechanism 716 is arranged to be released by a pulling force exerted on the flexible elongated element 720.

The flexible elongated element 720 is connected to the spring-biased locking mechanism 716 via a flexible element spring biasing member 722 which exerts a tensioning force to the flexible elongated element 720. The flexible element spring biasing member 722 is here a coil spring which exerts the tensioning force in the length extension L.

The spring-biased locking mechanism 716 may as shown comprise a slidable plate element 724 for locking the connection pin 708 to the load receiving section 702. The slidable plate element 724 as shown comprises a separating wall 724' which separates the two coil springs 716', 722. The separating wall 724' extends in the height extension h and in the width extension w. The coil spring 716' exerts a pushing force on the separating wall 724' towards the locking position of the connection pin 708. The coil spring 722 exerts a pushing force on the separating wall 724' such that the flexible element 720 is tensioned.

The slidable plate element 724 further comprises a locking wall 724" which exerts the locking force on the connection pin 708. The locking wall 724" extends in the length extension L and the width extension w.

Figure 49:
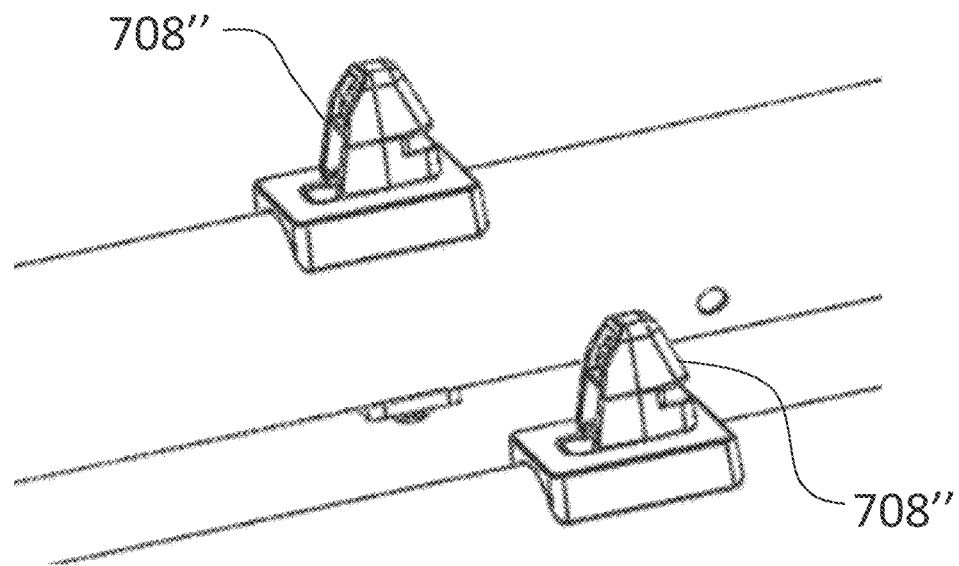
FIG. 49 shows a connection pin according to an example embodiment of the disclosure.

The connection pins 708, 710 have conical shapes which tapers in a direction towards the load receiving section 702. Further, the conical shape has a recess 708' for receiving a locking element, which here is the locking wall 724" of the slidable plate element 724. The locking wall 724" is adapted to partly enclose a waist section of the connection pin 708, i.e. a section in the recess 708', thereby providing a robust clearance free connection. It shall be noted that the connection pin(s) may have other shapes, such as more rectangular and/or triangular shapes rather than the more smooth conical shape as shown. Such configurations should preferably also have a recess, or waist section, for e.g. the slidable plate element 724. An example of another connection pin configuration is shown in FIG. 49, depicting a connection pin 708" with more distinct corners, forming a substantially triangle shaped connection pin.

The base frame portion 700 as shown extends along a base frame portion extension axis A3 in the length extension L of the load carrier 1, wherein the pivot axis P3 is offset from the base frame portion extension axis A3. In the shown embodiment, the pivot axis P3 is provided below the base frame portion extension axis A3 by a distance d1, as seen in the height extension h of the load carrier 1, see FIG. 23. The distance d1 may for example be 1-25 cm, such as 5-15 cm. The base frame portion extension axis A3 is here provided at the same level, seen in the height extension h, as a centre axis of at least one of the elongated members 704, 706.

As further shown, the pivot axis P3 may be provided on a separate member 726 which is attached to the base frame portion 700, such as attached thereto by a plug-in connection. The separate member 726 is here plugged in to the respective elongated members 704, 706 and attached thereto by fastening members 728.

The separate member 726 may for example as shown be a curve-formed member which is curved downwardly in the height extension h from the base frame portion 700, such as shown by two tube-formed curved members connected to each respective elongated member 704, 706. Thereby a relatively large offset can be provided in a rigid and robust manner with respect to the base frame portion 700.

The load carrier 1 may further comprise a stop element (not shown) for preventing the load receiving section 702 to be moved further away from the base frame portion 700 when it has been moved, such as pivoted, a maximum predetermined distance, wherein the stop element may be a flexible elongated element, such as a wire, connecting the base frame portion 700 and the load receiving section 702.

Figure 24A:
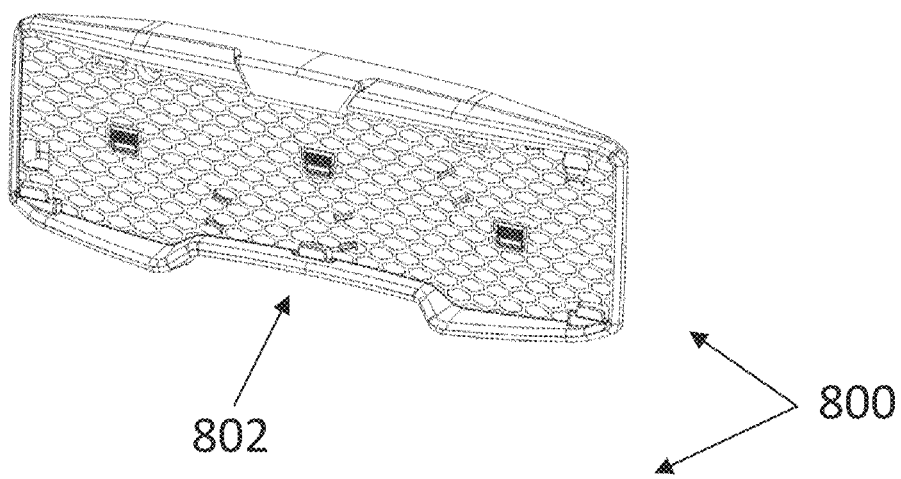
FIG. 24A shows a perspective view of a license plate holder according to an example embodiment of the present disclosure.
Figure 24B:
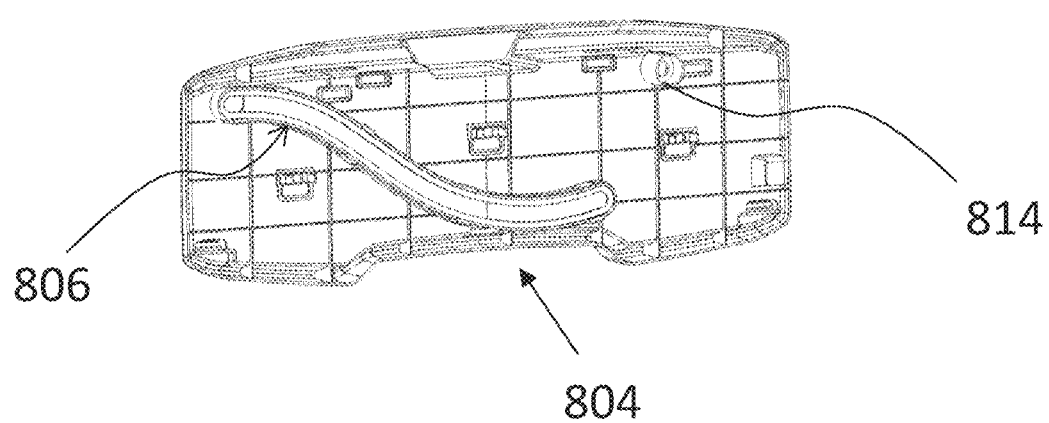
FIG. 24B shows a perspective view of a license plate holder according to an example embodiment of the present disclosure
Figure 25:
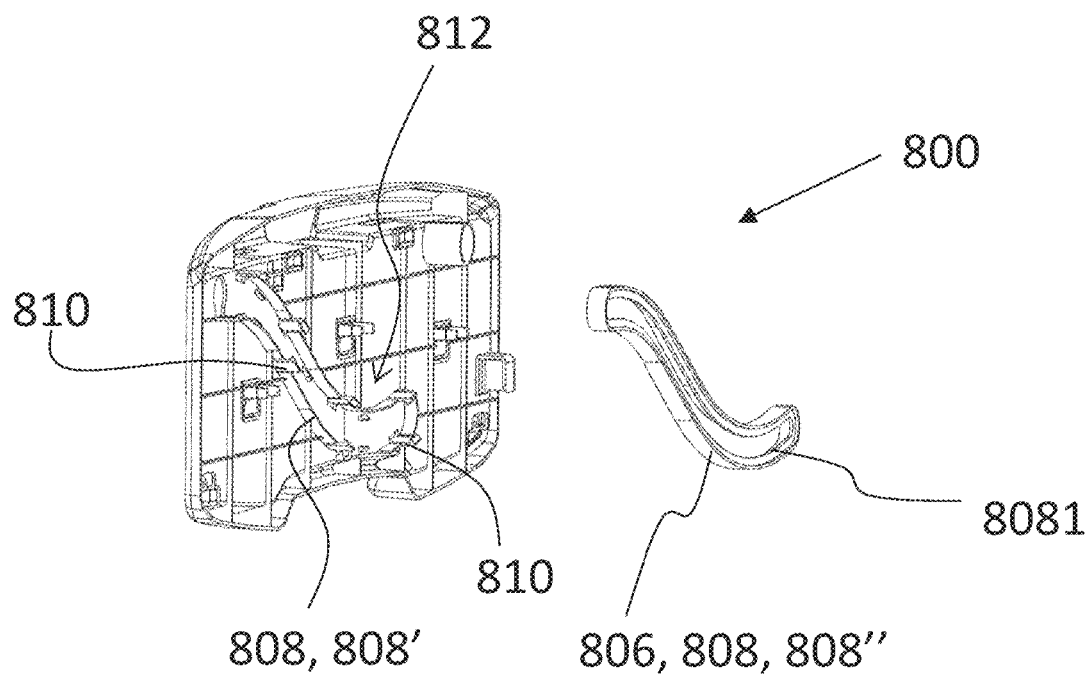
FIG. 25 shows a perspective view of a license plate holder according to an example embodiment of the present disclosure.
Figure 26:
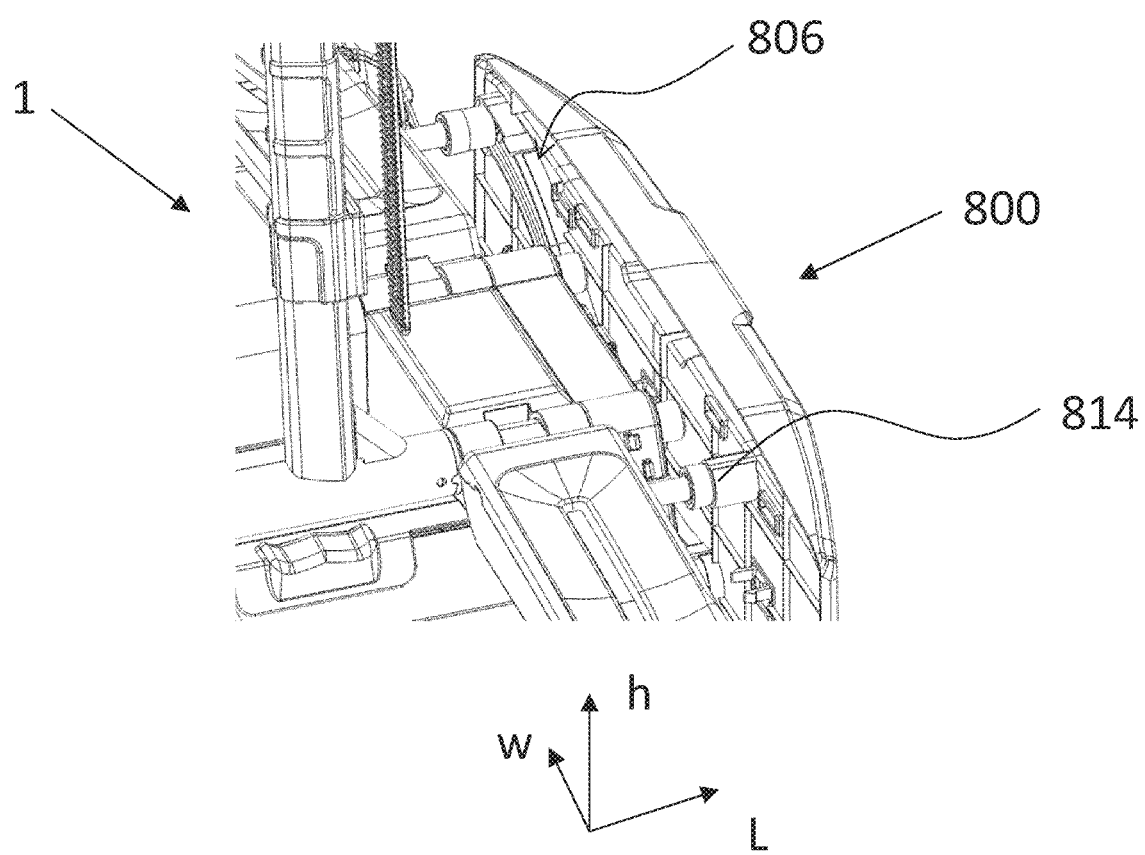
FIG. 26 shows a perspective view of a load carrier with a license plate holder according to an example embodiment of the present disclosure.

Referring to FIGS. 24-26 an example embodiment of a license plate holder 800 according to the seventh aspect is shown. The license plate holder 800 may for example be attached to a bike carrier 1 as shown in FIG. 1.

The license plate holder 800 has a main extension in a license plate holder plane, and comprises:

a license plate attachment side 802 directed out from the license plate holder 800 in a first transversal direction with respect to the license plate holder plane and a load carrier attachment side 804 directed out from the license plate holder 800 in a second opposite transversal direction. The transversal directions may accordingly here extend along the length extension L as shown in FIG. 1.

The load carrier attachment side 804 comprises an attachment guiding track 806 adapted to attach the license plate holder 800 to the load carrier 1 and further adapted such that a pivoting movement of the license plate holder 800 between a stowing position and a use position can be performed with respect to the load carrier 1 when the license plate holder 800 is attached to the load carrier 1. The attachment guiding track 806 is provided on a protruding portion 808 which protrudes out from the load carrier attachment side 804 in the second opposite transversal direction. For example, the protruding portion 808 may protrude out from the load carrier attachment side 804 by 1-5 cm, such as 2-5 or 3-5 cm.

The protruding portion 808 is at least partly an integral portion 808' of the license plate holder 800 and comprises a separate member 808" with respect to the license plate holder 800.

The separate member 808" is attached to the license plate holder 800 by a snap-fit connection, in this case by transversally extending and flexible arm members 810.

As further shown in FIG. 25, the license plate holder 800 may comprise a receiving section 812 for the separate member 808" which is defined by a transversally extending wall which is integral with the license plate holder 800 and at least partly encloses the separate member 808", as seen in the license plate holder plane.

As shown, the separate member 808" may comprise a transversal outer wall extending in the second opposite transversal direction out from the load carrier attachment side 804, wherein the transversal outer wall completely encloses the attachment guiding track 806, thereby forming an at least partly enclosed space for the attachment guiding track 806, as seen in the license plate holder plane.

As further shown, the transversal outer wall 808" may comprise a guiding flange 8081 extending substantially in a direction being perpendicular to the extension of the transversal outer wall and inwardly into the enclosed space, wherein the at least one guiding flange 8081 forms part of a guiding track surface of the attachment guiding track 8W. The guiding flange 8081 is located proximate an outermost end portion, such that the guiding flange 8081 is at least located closer to the outermost end portion than to an innermost end portion which is closer to the license plate holder plane.

As shown, the attachment guiding track 806 extends in the license plate holder plane. Still further, the attachment guiding track 806 is curve-shaped, in this case S-shaped, as seen in the license plate holder plane.

The license plate holder is attachable to the load carrier 1 via the attachment guiding track 806 and via a pivoting connection interface 814.

The license plate holder 800 is preferably made of a lightweight material, such as a polymer and/or aluminium. The license plate holder 800 may comprise a separate light arrangement (not shown) for illuminating the license plate during use. Accordingly, the housing 600 with the light emitting and/or light reflecting member may not be used for this purpose. The separate light arrangement may be provided above, below and/or on the side of the license plate.

In FIG. 26, a load carrier 1 in the form of the bike carrier 1 as disclosed herein is shown, comprising the license plate holder 800.

Figure 27A:
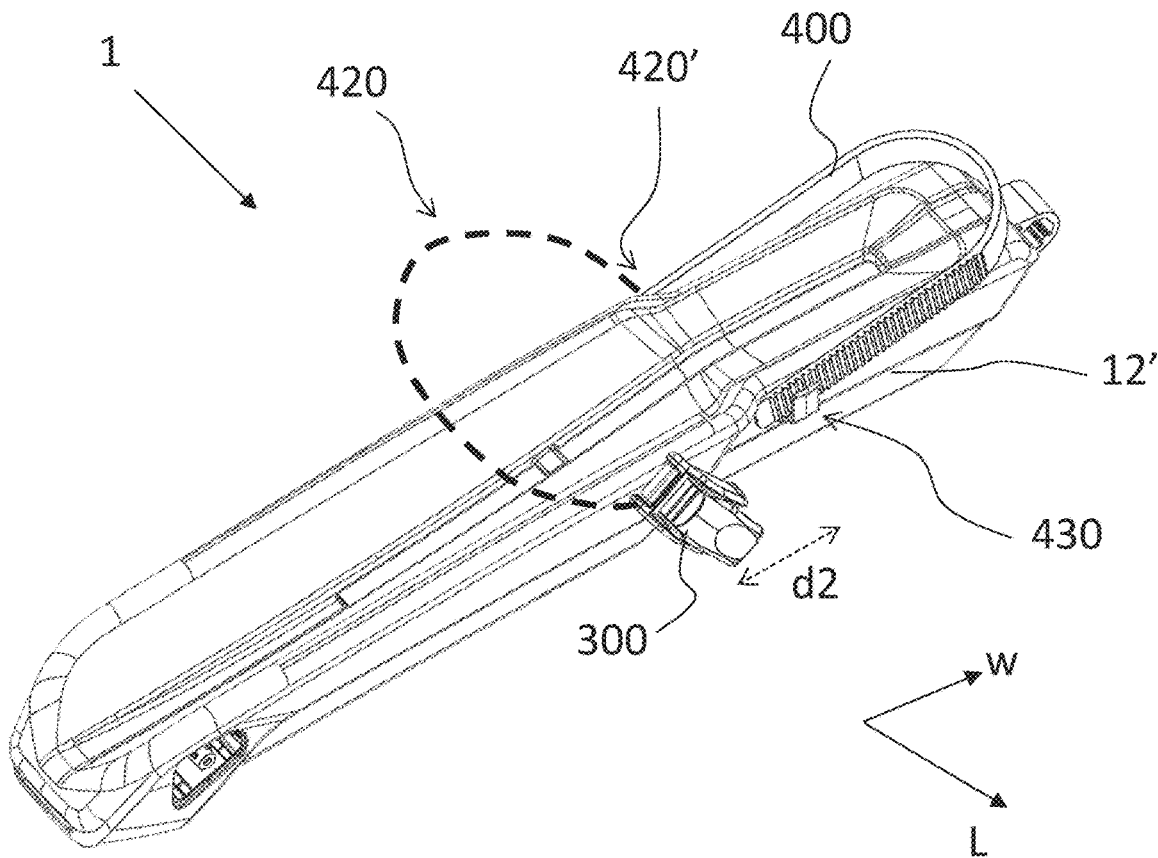
FIG. 27A shows a perspective view of a bike carrier comprising a strap stowing away portion according to an example embodiment of the present disclosure.
Figure 27B:
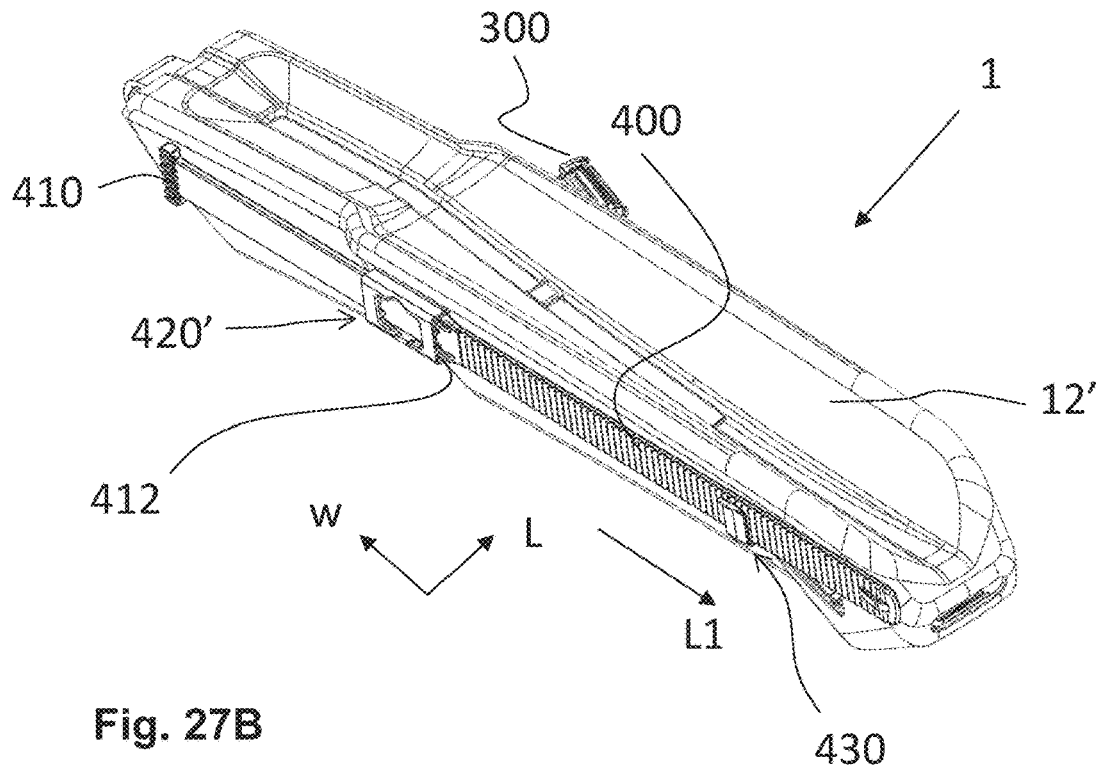
FIG. 27B shows a perspective view of a bike carrier comprising a strap stowing away portion according to an example embodiment of the present disclosure.
Figure 27C:
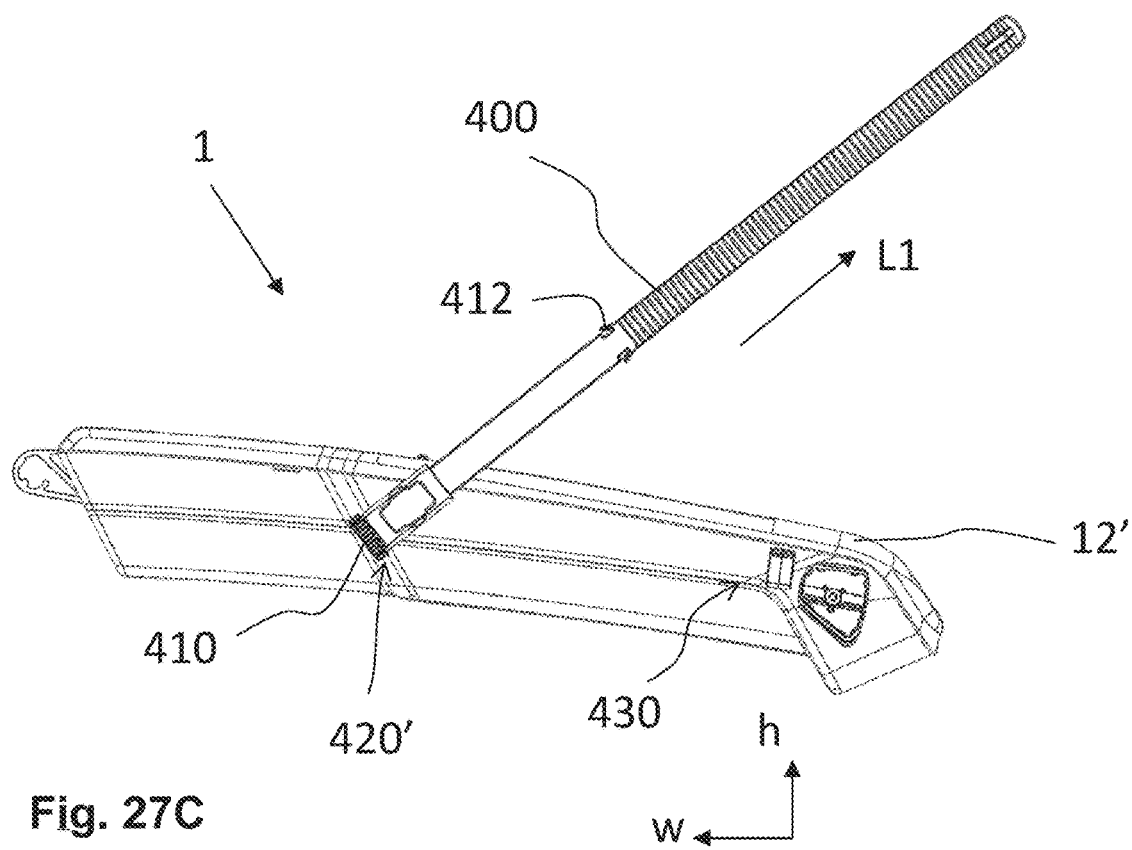
FIG. 27C shows a perspective view of a bike carrier comprising a strap stowing away portion according to an example embodiment of the present disclosure.
Figure 28:
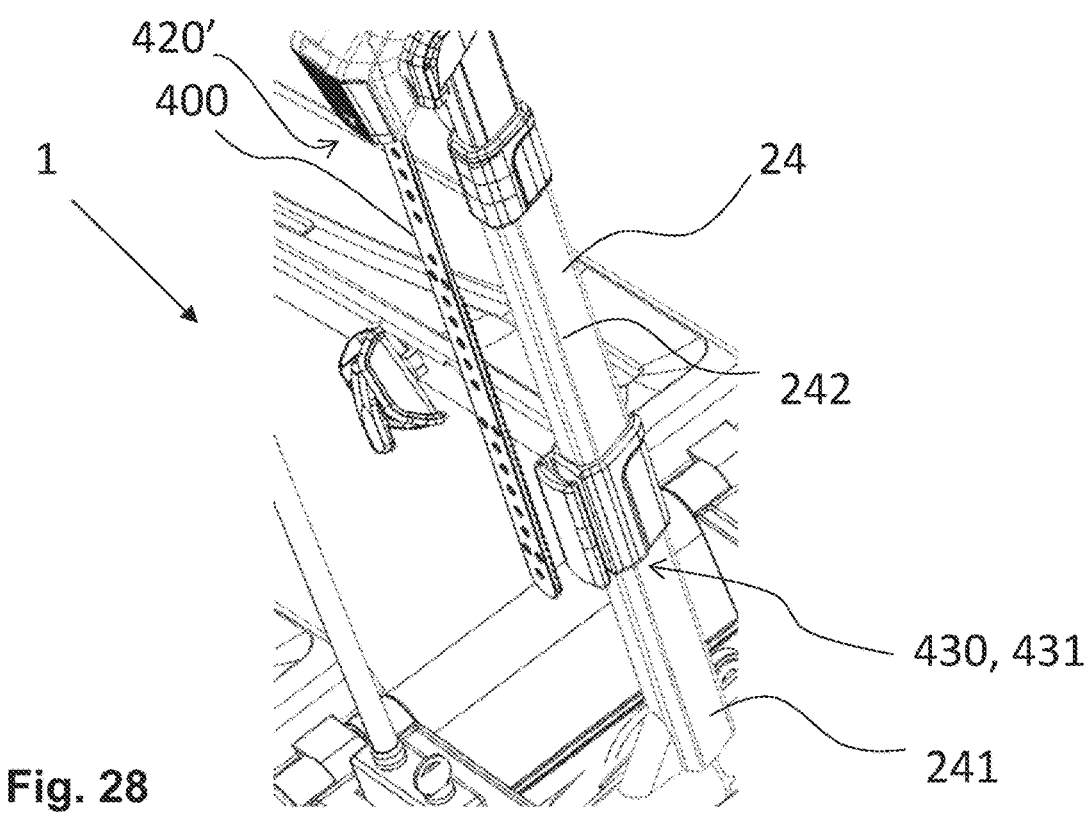
FIG. 28 shows a perspective view of a bike carrier comprising a strap stowing away portion according to another example embodiment of the present disclosure.

Referring now to FIGS. 27 and 28, a bike carrier 1 for a vehicle according to respective example embodiments of the disclosure are depicted. The bike carrier 1 comprises:

at least one strap 400 for securing a bicycle to the bike carrier 1, wherein the bike carrier 1 is adapted such that the strap 400 secures the bicycle to the bike carrier 1 when the strap 400 is in a bicycle securing position 420.

In FIGS. 27A-27C, a wheel receiving section in the form of a wheel receiving member 12' as disclosed herein is shown. In FIG. 28, a bicycle support arm member 24 as disclosed herein is shown.

The bicycle securing position 420 is here provided when the strap 400 is provided in a ratchet buckle 300 as disclosed herein. This is indicated by a dashed line 420 entering the ratchet buckle 300 in FIG. 27A.

As shown in FIGS. 27 and 28, the bike carrier 1 may further comprise a strap stowing away portion 430 which is adapted to temporarily hold the strap 400 in a stow away position which is different from the bicycle securing position 420. For example, in FIG. 27A it can be seen that the strap 400, when being provided in the strap stowing away portion 430 will extend along a path which is different from the bicycle securing position 420. The strap stowing away portion 430 may be a separate part which is attached to the wheel receiving member 12'.

In the shown embodiments, the strap stowing away portion 430 comprises a slot to temporarily hold the strap 400 in the stow away position. The slots are here open slots, such that the strap 400 can enter and exit the slot when the strap 400 is provided in the slot. As such, a closed slot may mean a slot where the strap can only enter the slot, such as a pocket-shaped slot. Accordingly, the stowing away portion may alternatively be a closed slot, such as a pocket-shaped slot. The slot may be adapted such that an entrance direction for the strap 400 along its length extension L1 is aligned with the width extension w or with the height extension h, or somewhere therebetween.

In each one of the shown embodiments, the strap 400 is undetachably coupled to the bicycle support arm member 24 and to the wheel receiving member 12' at respective attachment points 420'. More specifically, the strap 400 is pivotably coupled about a pivot axis which is substantially perpendicular to a length extension L1 and to a width extension w1 of the strap. Additionally, or alternatively, and as shown in FIGS. 27B-27C, the strap 400 may be slidably coupled, allowing a length of the strap 400 around e.g. a bicycle wheel of a bicycle frame to be adjusted. The pivot axis of the strap 400 in FIGS. 27A-27C corresponds to a length extension L of the bike carrier 1. The pivot axis of the strap 400 in FIG. 28 corresponds to the pivot axis of the bicycle support arm member 24.

FIGS. 27B-27C show another configuration where the stowing away portion 430 is provided on the same side as the side of the attachment point 420' of the strap 400. When the strap 400 is in the stowing away portion 430, it is extending along the length extension of the wheel receiving member 12', and also on the side thereof. In this case the side is facing the vehicle when the bike carrier 1 is mounted thereto. It could of course also be on the other opposite side, i.e. the side facing away from the vehicle. Thereby, the strap will not be in the way and disturb when a bicycle is loaded to the wheel receiving member 12'.

In the embodiments shown in FIGS. 27-28, the strap stowing away portion 430, which forms a slot, is configured as a clip in which the strap 400 can be held. According to an example embodiment, the clip is flexible, allowing the strap 400 to be press-fitted into the clip. Thereby, the strap 400 will be reliably held in the stowing away portion 430, reducing the risk that the strap 400 is unintentionally released therefrom.

In the embodiment shown in FIGS. 27B-27C, it is shown that the strap 400 may comprise a first and/or a second stopping portion 410, 412, such as wing-formed members 412, defining end points between which the strap 400 can be slided/adjusted. Thereby, the length of the strap 400, as seen from the attachment point 420' to the free end of the strap 400 can be adjusted, implying increased flexibility.

As shown in FIG. 28, the strap 400 may be arranged to substantially extend along and be aligned with a length extension of the bicycle support arm member 24 when being provided in the stow away position. Thereby, the strap 400 will not be in the way of or interfere with any other parts of the bike carrier 1 when being provided in the stowing away portion 430. Accordingly, the risk of the strap 400 getting stuck when folding/unfolding the bike carrier 1 and its different parts can be efficiently avoided.

As shown in FIG. 28, when the strap stowing away portion 430 is provided on a frame member, the frame member 24 may comprise a sleeve-formed member 431, in this case a separate sleeve-formed member, wherein the strap stowing away portion 430 is provided on the sleeve-formed member 431. As further shown, the sleeve-formed member 431 may optionally enclose a portion of the frame member 24, i.e. in this case the bicycle support arm member. As further shown, the frame member 24 may be a telescoping bicycle support arm member comprising at least a first and a second telescoping arm member 241, 242, wherein the sleeve-formed member 431 is provided proximate or at an intersection between the first and second telescoping arm members 241, 242. Thereby, by e.g. providing a strap 400 with a length corresponding to the length of the second arm member 242 it can be assured that the strap 400 can always be provided in the stowing away portion 430. This configuration further implies a more cost-effective configuration since it will be easier to attach the sleeve-formed member 431 at the intersection between the arm members 241, 242.

As shown in FIG. 27A, the strap stowing away portion 430 may be provided on a user side of the wheel receiving member 12' from which a user is intended to load/unload a bicycle. In this case the strap stowing away portion 430 is provided on a side of the wheel receiving member 12' which is a side comprising the ratchet buckle 300, for holding the strap when it secures a bicycle thereto. As further shown in FIG. 27A, the strap stowing away portion 430 may be separated at a specific distance d2 away from the ratchet buckle 300 as seen along the length extension of the wheel receiving member 12', which here corresponds to the width extension of the bike carrier 1. More specifically, as shown in FIG. 27A, the position and configuration of the strap stowing away portion 430 may be such that it allows the strap 400 to attain a U-shape and further such that the strap 400 is not in the way of a bicycle wheel when loading a bicycle to the bike carrier 1. In the shown embodiment, the strap stowing away portion 430 is provided away from the ratchet buckle 300 a distance d2 such that the strap stowing away portion 430 is provided closer the pivot axis of the wheel receiving member 12'. It shall be noted that alternatively the strap stowing away portion 430 may be provided away from the ratchet buckle 300 a distance such that the strap stowing away portion 430 is provided closer an outer end portion of the wheel receiving member 12'.

As further shown in FIG. 27A, the slot 430 is substantially aligned with the length extension of the wheel receiving member 12', thereby a further improved U-shape of the strap 400 can be provided.

Referring to FIGS. 29-31 and FIGS. 40A-40C, bike carriers 1 comprising a bike stand member 900 according to the ninth aspect of the present disclosure are shown. As in the above, the bike carrier 1 may be the bike carrier as shown in FIG. 1.

The bike carrier is adapted to be mounted to a vehicle for transporting a bicycle, and comprises:
a bike stand member 900 for holding the bicycle BC in a standing position when the bicycle BC is positioned on a ground surface adjacent the vehicle.

Figure 29:
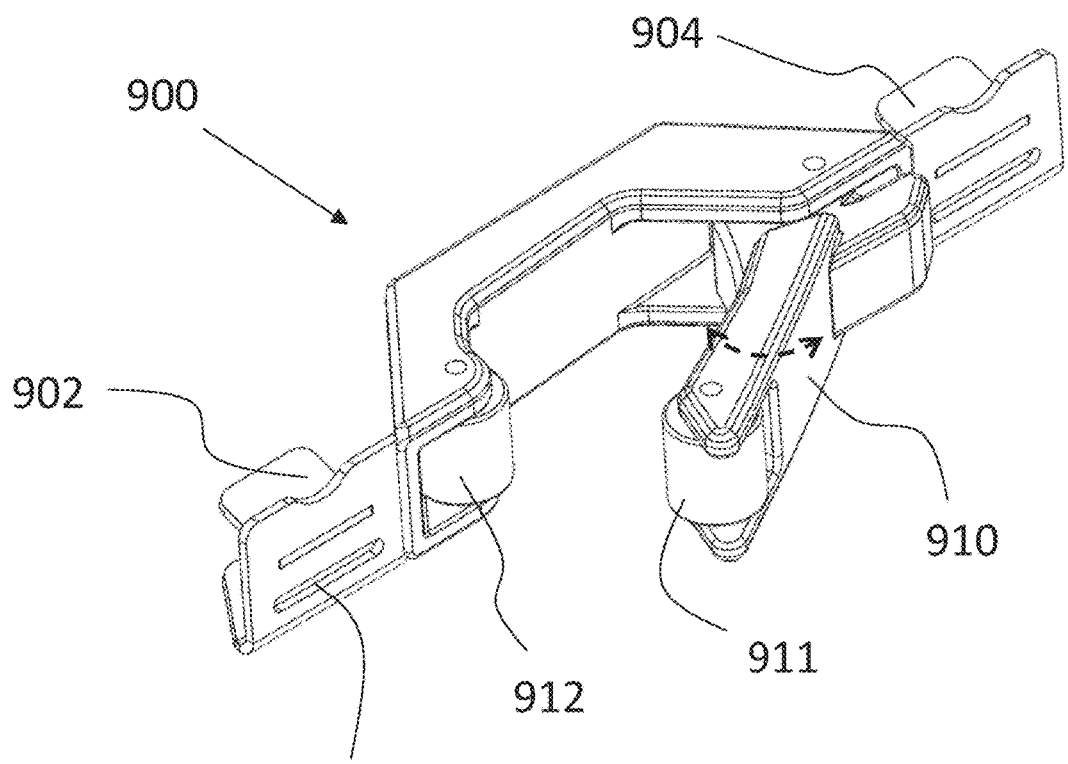
FIG. 29 shows a perspective view of a bike carrier comprising a bike stand member according to an example embodiment of the present disclosure.
Figure 30:
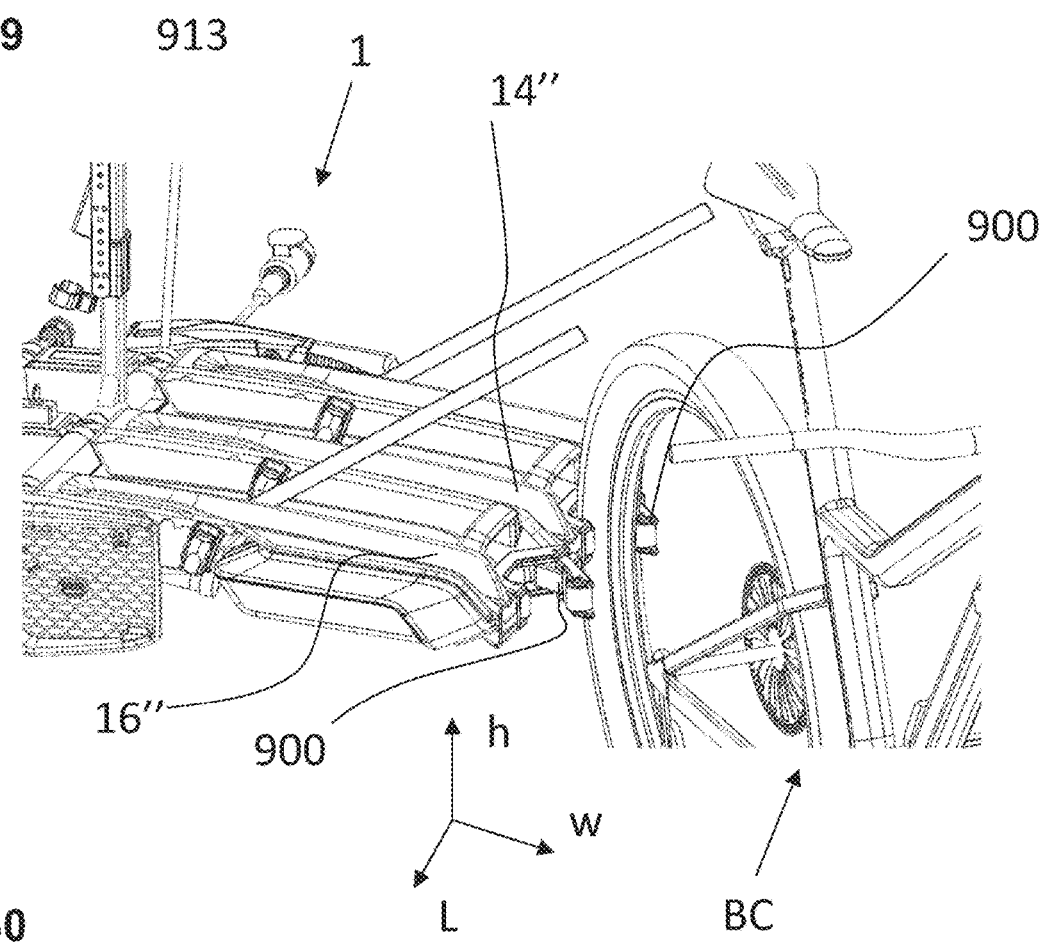
FIG. 30 shows a perspective view of a bike carrier comprising a bike stand member as shown in FIG. 29.

The bike stand member 900 as shown in e.g. FIGS. 29-30 is detachable from the bike carrier 1. More specifically, in the shown embodiment the bike stand member 900 comprises a first and a second attachment portion 902, 904 adapted to attach the bike stand member 900 to two adjacent wheel receiving members 16", 14". For example, at least one of the attachment portions 902, 904 may be adapted to be attached to a wheel ramp receiving portion of one of the respective wheel receiving members 16", 14". The wheel ramp receiving portion(s) (not shown) may be adapted to receive a wheel ramp (not shown), wherein the wheel ramp is used for rolling on a bicycle from the ground surface onto the bike carrier 1 and into the wheel receiving member. Thereby, according to an example embodiment, the bike stand member 900 may comprise at least one wheel ramp receiving portion 913, which here is in the form of a slot, and provided such that the wheel ramp will be aligned with the wheel receiving member 16" when mounted to the bike carrier 1.

The attachment portions 902, 904 as shown are symmetrical, i.e. they are identically configured but mirrored. However, asymmetrical attachment portions are also conceivable. Asymmetrical attachment portions may allow and facilitate for two bike stand members to be mounted next to each other. For example, one attachment portion of one bike stand member may extend above another attachment portion of another adjacent bike stand member, as seen in the height extension h. This may also be denoted as a puzzle configuration. Alternatively, one attachment portion of one bike stand member may overlap another attachment portion of another bike stand member. Thereby, by said example configurations, two bike stand members can be mounted close to each other on one side of the bike carrier 1.

As further shown in e.g. FIG. 30, the bike stand member 900 may be configured to receive and hold a wheel, such as a tyre of the wheel, of the bicycle BC. In the shown embodiment, the bike stand member 900 is U-shaped or V-shaped.

The bike stand member 900 comprises at least one arm member 910, in this case a pivoting arm member with respect to the bike carrier 1. In FIGS. 29-30, the arm member 910 is movable so it can clamp the wheel.

The bike stand member 900 may be configured to be locked to the bike carrier 1 when being attached thereto, such that it is prevented from unwanted removal when being attached.

Figure 40A:
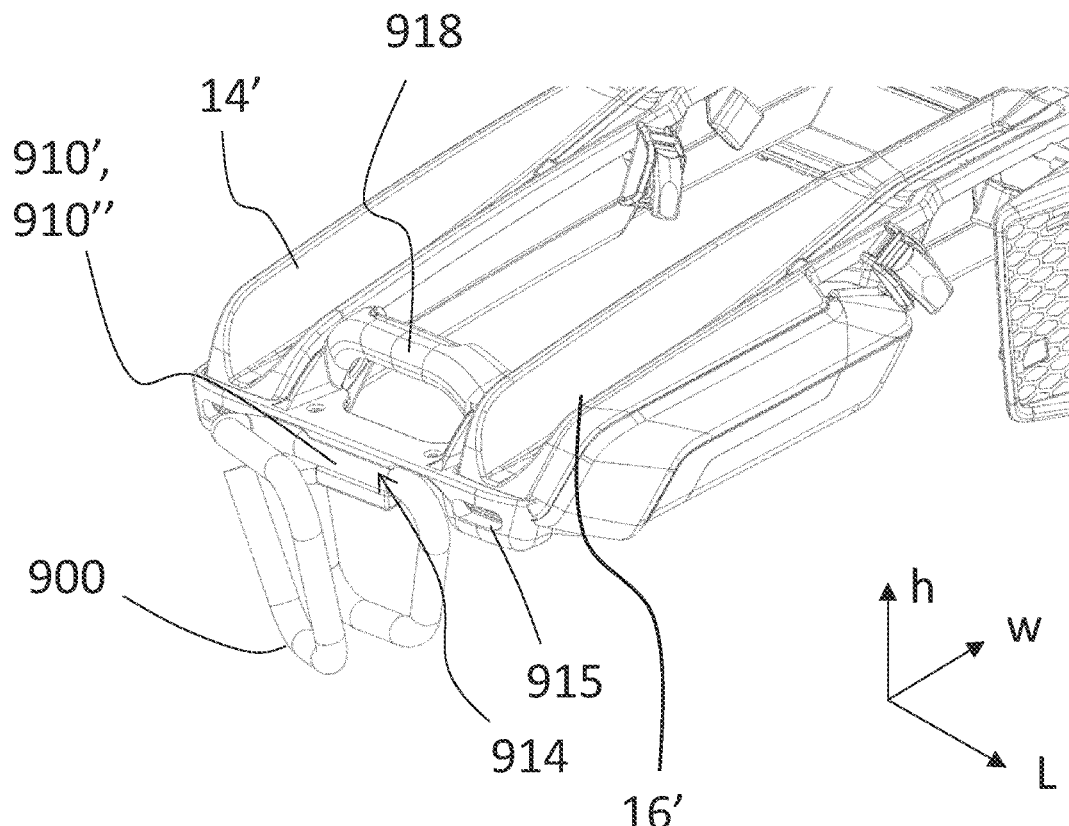
FIG. 40A shows a perspective view of a bike carrier comprising a bike stand member according to an example embodiment of the present disclosure.
Figure 40B:
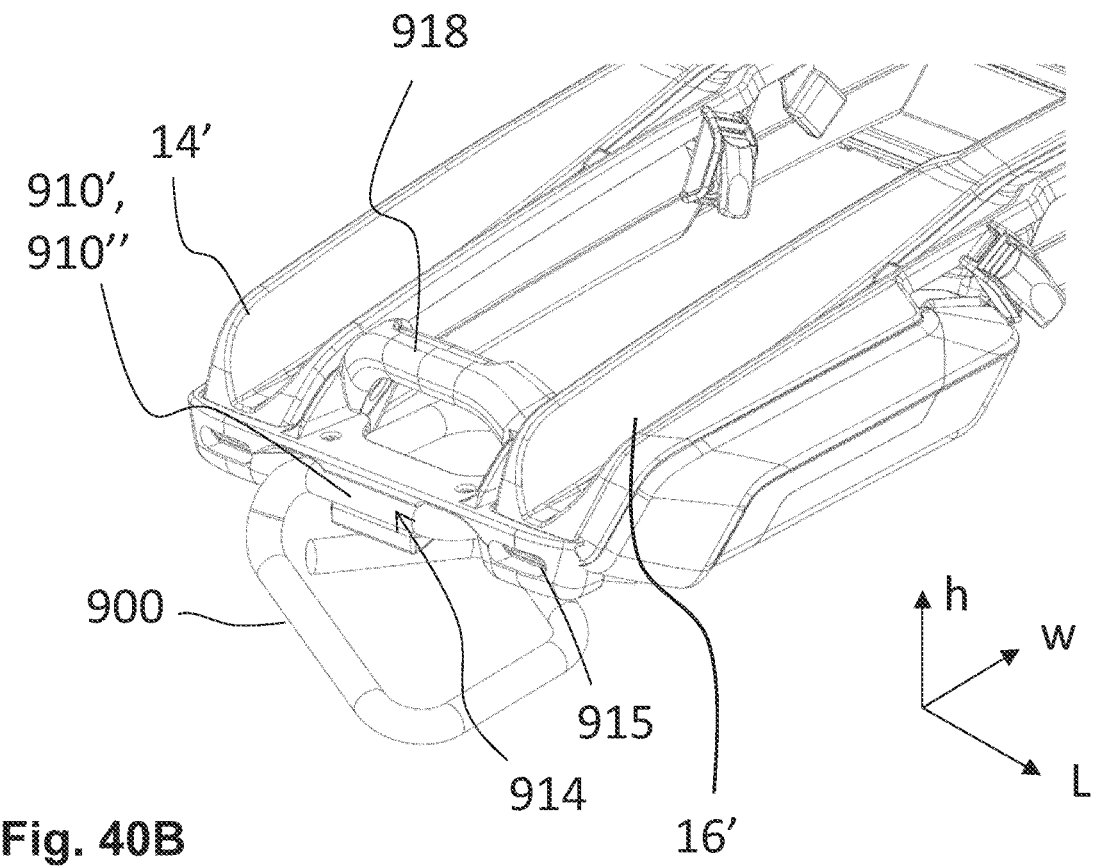
FIG. 40B shows a perspective view of a bike carrier comprising a bike stand member according to an example embodiment of the present disclosure.
Figure 40C:
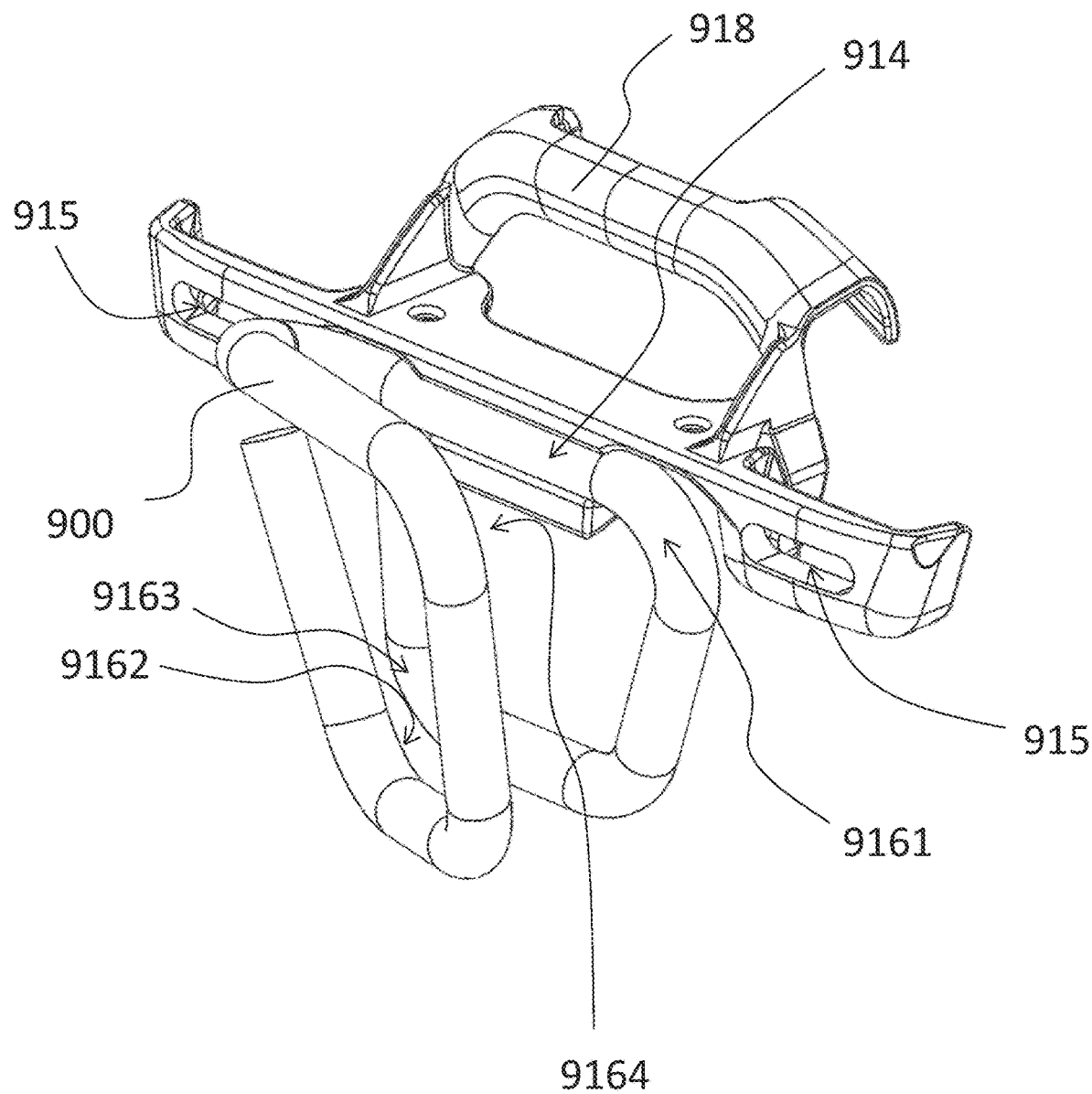
FIG. 40C shows a perspective view of a bike carrier comprising a bike stand member according to an example embodiment of the present disclosure.

As shown in each embodiment, the bike carrier 1 may further comprise a wheel tray 16", 14", 16', 14' for receiving a wheel of a bicycle, wherein the bike stand member 900 is provided on or at the wheel tray, such as at an outer end portion of the wheel tray. In FIGS. 40A-40C, the bike stand member 900 is provided between outer end portions of the wheel trays 16', 14'. For example, as shown, the bike stand member 900 may be symmetrically attached to the bike carrier 1 in-between the outer end portions of the wheel trays 16'. 14'.

Figure 31A:
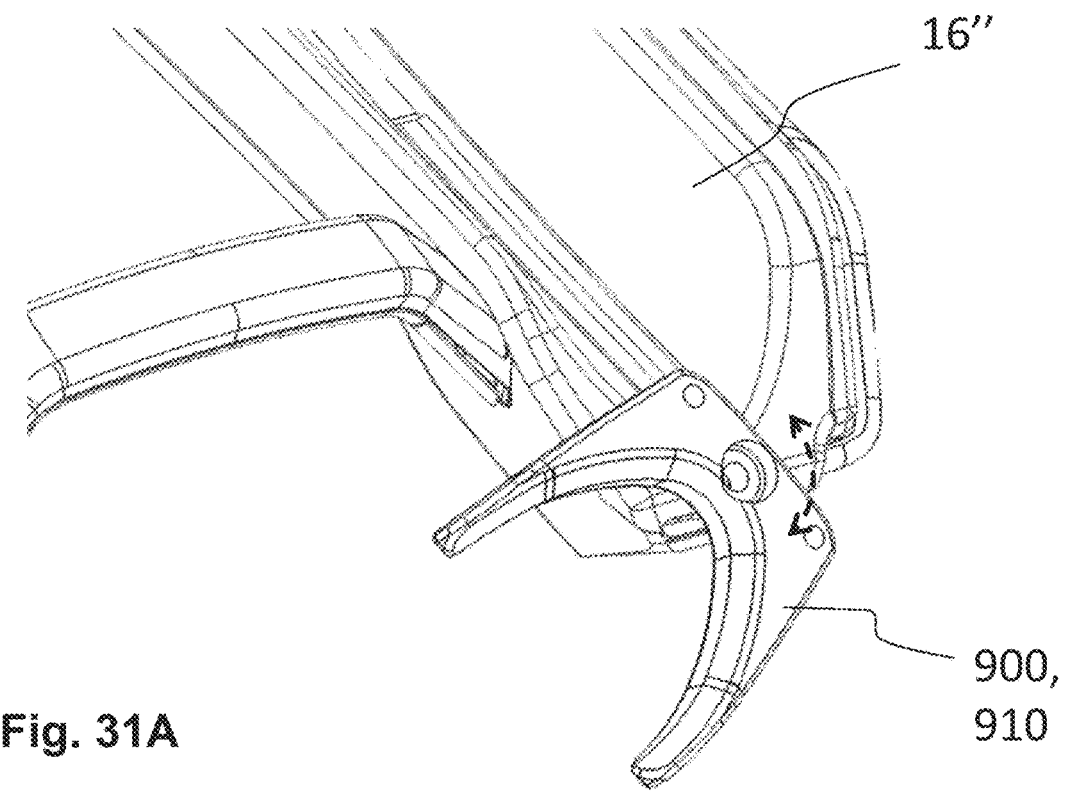
FIG. 31A shows a perspective view of a bike carrier comprising a bike stand member according to another example embodiment of the present disclosure.
Figure 31B:
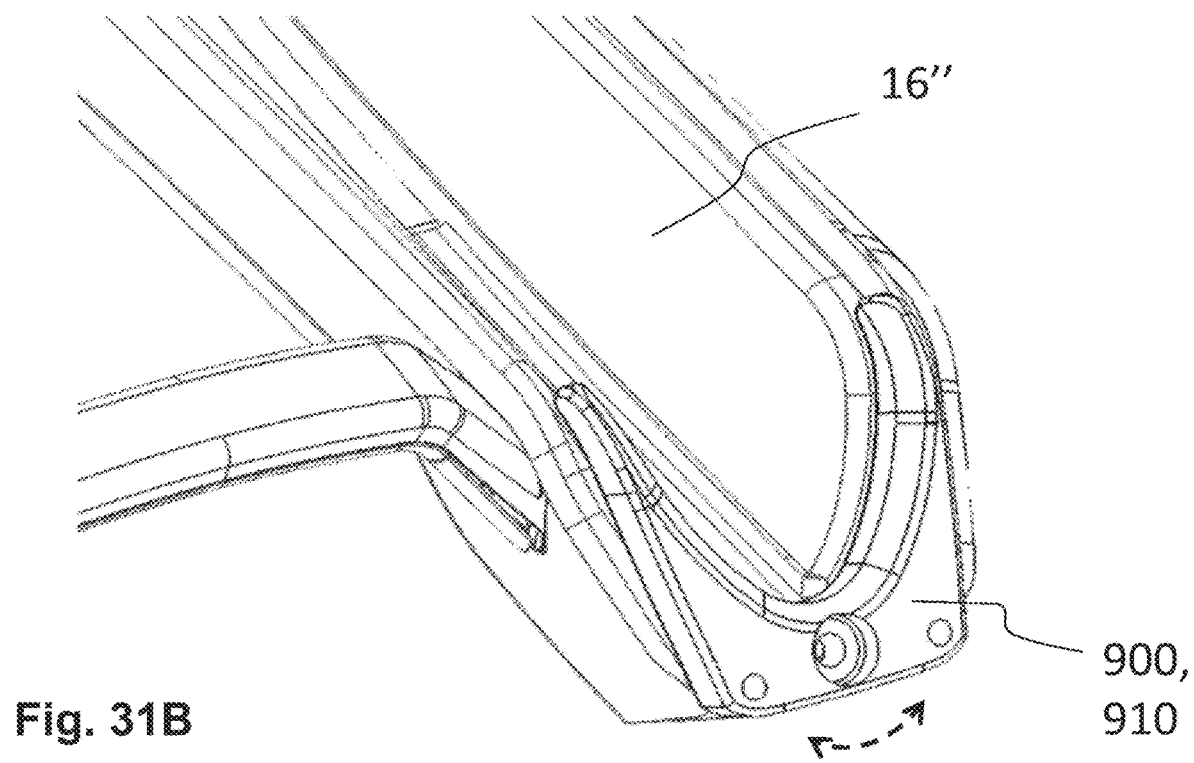
FIG. 31B shows a perspective view of a bike carrier comprising a bike stand member according to another example embodiment of the present disclosure.

In the embodiment shown in FIGS. 31A-31B, the at least one arm member 910, which here is U-shaped, is configured to be pivoted (see dashed arrows) between a non-use position where the at least one arm member 910 is substantially flush with a surface of the bike carrier, in this case flush with a wheel receiving surface of the wheel tray 16" (see FIG. 31B), and a use position where the at least one arm member 910 is extending away from the wheel receiving surface of the wheel tray 16" (see FIG. 31A). In FIG. 31B it is shown that the at least one arm member 910 follows the profile of the wheel tray which is intended to receive a bicycle wheel. Thereby a more appealing and less disturbing position for the bike stand member 900 can be achieved when being in the non-use position.

Figure 23:
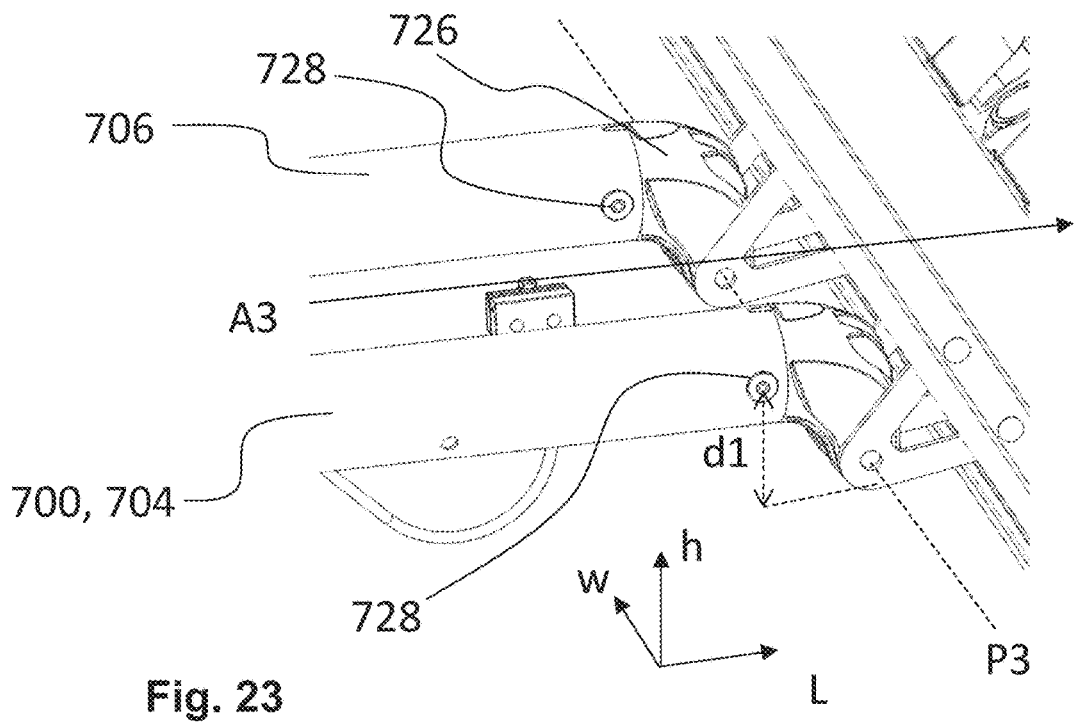
FIG. 23 shows an enlarged perspective view of the load carrier as shown in FIG. 20.

The bike carrier 1 may be configured to be moved, such as pivoted, such that bicycles which are loaded thereon are moved away from the vehicle when the bike carrier is mounted thereto, as e.g. shown in FIG. 23. Therefore, the bike stand member 900 may be configured such that the bicycle which is held by the bike stand member is kept in a standing position when the bike carrier is moved, such as pivoted, away from the vehicle. For example, the bike stand member 900 may be attached to the base frame portion 700.

In FIG. 30 it is shown that the bike stand member 900 may be configured such that the bicycle BC can be held in a position which is substantially at an angle between parallel with the vehicle's travel direction and substantially transversal to the vehicle's travel direction, such that at least a vehicle door can still be opened when the bicycle BC is held by the bike stand member 900. In the shown embodiment, the bicycle BC is held via its rear wheel and such that it extends at an angle (about 45 degrees) in a vehicle rearward direction, corresponding to the length extension L.

The bike stand member 900 as shown in FIG. 29 is adjustable, by pivoting (see dashed arrow) the arm member 910 such that it can hold bicycle wheels of different shapes and/or thickness.

As further shown in FIG. 29, the bike stand member 900 may comprise at least one roller 911, 912, such as a roller 911 provided on an outer portion of the arm member 910, adapted to roll on a bicycle wheel when the bicycle wheel is inserted into the bike stand member 910. The other roller 912 is here provided on a similar but opposite position with respect to the roller 911, defining a wheel entrance of the bike stand member 900.

The arm member 910 may e.g. be spring-biased such that it can provide a clamping force around a portion of a bicycle wheel when the portion of the bicycle wheel is received in the bike stand member 900. Additionally, or alternatively, the arm member 910 may be adjustable to different permanent positions, thereby resulting in a fixed opening gap for bicycle wheels of a specific thickness. For example, a user may by use of a tool (not shown) adjust the position of the arm member 910 such that the distance between the rollers 911, 912 is adjusted. This is of course also feasible if no rollers 911, 912 are present.

With reference to FIGS. 40A-40C, another embodiment of a bike carrier 1 comprising a bike stand member 900 is shown. The shown bike stand member 900 is detachable from the bike carrier 1. Moreover, the bike stand member 900 is configured to receive and hold a wheel, of the bicycle (not shown). In the shown embodiment, the bike stand member 900 is substantially V-shaped so that the wheel of the bicycle can be received therein. The V-shaped bike stand member 900 as shown is thus configured to grasp around a portion of the wheel so that the bicycle is held in a stable position. The V-shape is in this embodiment seen in a plane defined by the length extension L and the width extension w.

The bike stand member 900 is detachably attached to the bike carrier 1 between the outer portions of the wheel trays 14', 16'. In this embodiment, the bike stand member 900 is attached to the bike carrier 1 by a snap-fit connection. As shown, the snap-fit connection may be provided in that the bike stand member 900 is formed by a bent tube formed element 910', wherein a portion 910" of the tube formed element is inserted into an at least partly enclosing receptacle 914 for the tube formed element 910'. The tube formed element 910' and the receptacle 914 are configured to provide the snap-fit connection. In this case, the receptacle 914 has an elasticity which allows an opening of the receptacle 914 to increase in size when the portion 910" of the tube formed element 910' is pressed into the receptacle 914.

The bike stand member 900 as shown in FIGS. 40A-40B is further pivotable between a non-use position (FIG. 40B), or stow away state, and a use position (FIG. 40A), or use state. When the bike stand member 900 is in any one of the use or non-use position, the bike stand member 900 and/or the receptacle may be configured so that it is required to exert a force on the bike stand member 900 which is above a predefined threshold until the bike stand member 900 is pivoted from the use or non-use position. Thereby, unwanted pivoting of the bike stand member 900 can be avoided, such as during travelling of the vehicle when the bike stand member 900 is in the non-use position. For example, the bike stand member 900 and/or the receptacle may have an auxiliary snap-fit functionality (not shown) which prevents the bike stand member 900 from pivoting when provided in any one of the use and non-use position. The pivoting motion is in this example performed about an axis which is parallel, or substantially parallel, to the length extension L of the bike carrier 1. Additionally, or alternatively, the pivoting motion may be performed about an axis which is parallel, or substantially parallel, to the height extension h of the bike carrier 1.

As further shown, in the stow away state for the bike stand member 900, the bike stand member 900 is preferably provided beneath the wheel trays 14', 16', as seen when the bike carrier 1 is in its use state, i.e. when the bike carrier 1 is not in a stowing away state. The bike stand member 900 may be secured in the stow away state by use of a transport security member (not shown).

With reference to FIG. 40C, it is shown that the bike stand member 900 may comprise at least two portions 9161, 9162, which are offset from each other in a width direction of the bike stand member and configured to engage with a bicycle wheel on opposite sides thereof. The width direction of the bike stand member 900 corresponds to the width direction of the bike carrier 1 when the bike stand member 900 is in the use position, i.e. as shown in FIG. 40A. The at least two portions 9161, 9162 are further offset from each other in a height direction of the bike stand member, corresponding to a height direction h of the bicycle, so as to prevent the bicycle from rotating about a longitudinal, or roll, axis of the bicycle.

The bike stand member 900 may as further shown comprise at least two portions 9161, 9162 which are offset from each other in a width direction of the bike stand member and configured to engage with a bicycle wheel on opposite sides thereof, wherein the at least two portions 9161, 9162 are further offset from each other in a length direction of the bike stand member 900, corresponding to a length direction of the bicycle, so as to prevent the bicycle from rotating about a yaw axis of the bicycle. Accordingly, in this example, the same portions 9161, 9162 are also offset in the length direction of the bike stand member 900.

More specifically, in the shown embodiment, the bike stand member 900 comprises at least four portions 9161, 9162, 9163, 9164, wherein two portions 9161, 9163 are configured to engage with the bicycle wheel on one side thereof, and two other portions 9162, 9164 are configured to engage with the bicycle wheel on the other side thereof. The at least four portions 9161, 9162, 9163, 9164 are configured to prevent the bicycle from rotating in any direction about the longitudinal, or roll, axis of the bicycle, and further configured to prevent the bicycle from rotating in any direction about the yaw axis of the bicycle. In the shown embodiment a distance between the inner portions 9162, 9163 is smaller than a corresponding distance between the outer portions 9161, 9164, thereby providing a wedge shaped, or V-shaped, bike stand member 900.

The embodiment in FIGS. 40A-40C further depicts that the bike carrier 1 as disclosed herein may have a handle 918 for a user which can be used for pivoting the wheel receiving members 14', 16'. As shown, the bike stand member 900 may be provided adjacent the handle 918.

The bike stand member 900 may further have a knurled, rugged, or uneven, surface where it is intended to contact with e.g. the bicycle wheel. Thereby, the knurled, rugged, or uneven, surface may further prevent the bicycle wheel from being released from the bike stand member 900. Preferably, the knurled, rugged, or uneven, surface is provided on the inside the V-shaped or U-shaped bike stand member 900 where the bicycle wheel is intended to be received.

As shown in FIGS. 40A-40C, the bike carrier 1 may further comprise apertures 915, or any other connection interface, for receiving a loading ramp arrangement 745. The apertures 915, or connection interfaces, are preferably arranged aligned with the respective wheel receiving member 14', 16'.

Figure 32:
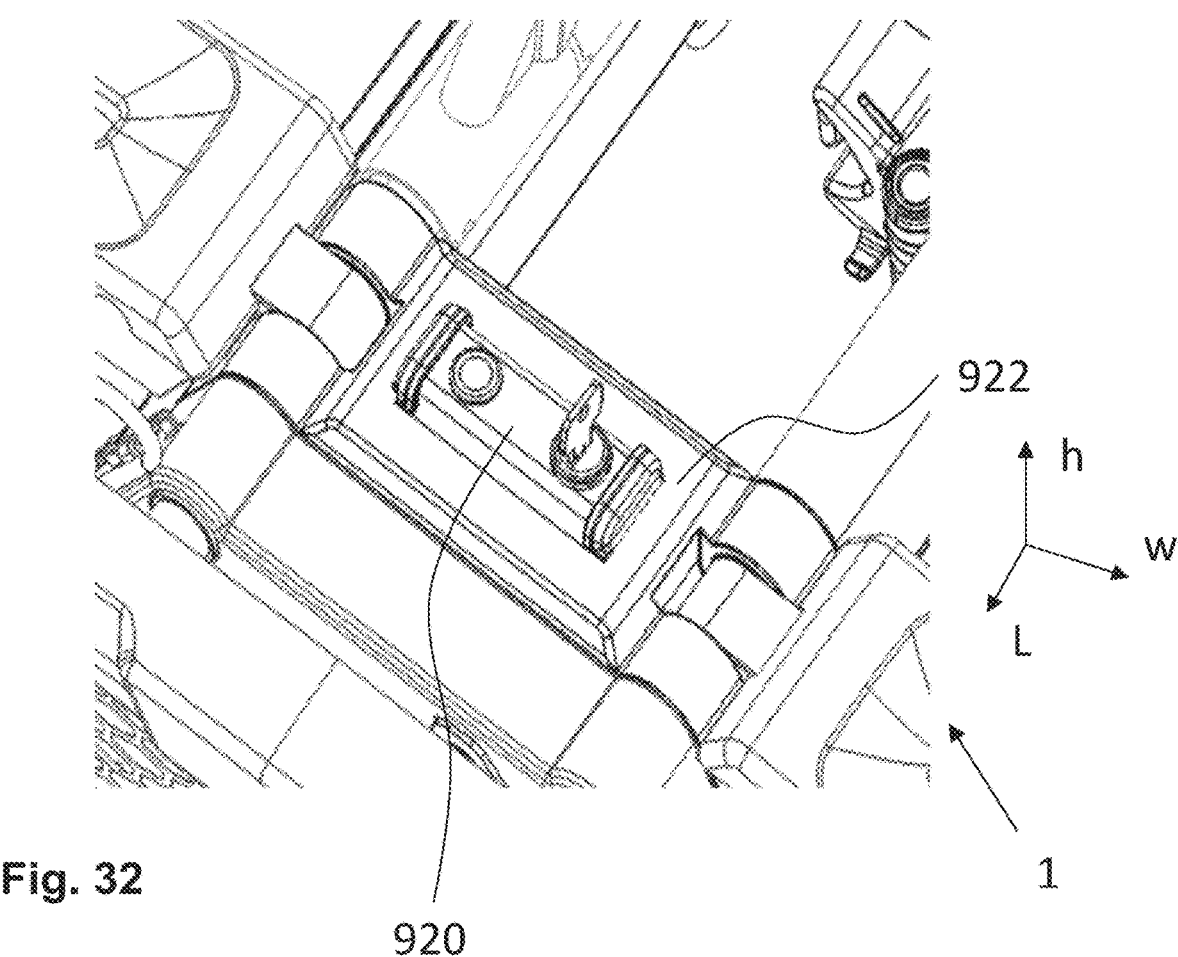
FIG. 32 shows a perspective view of a bike carrier with a locking anchor according to an example embodiment of the present disclosure.
Figure 33:
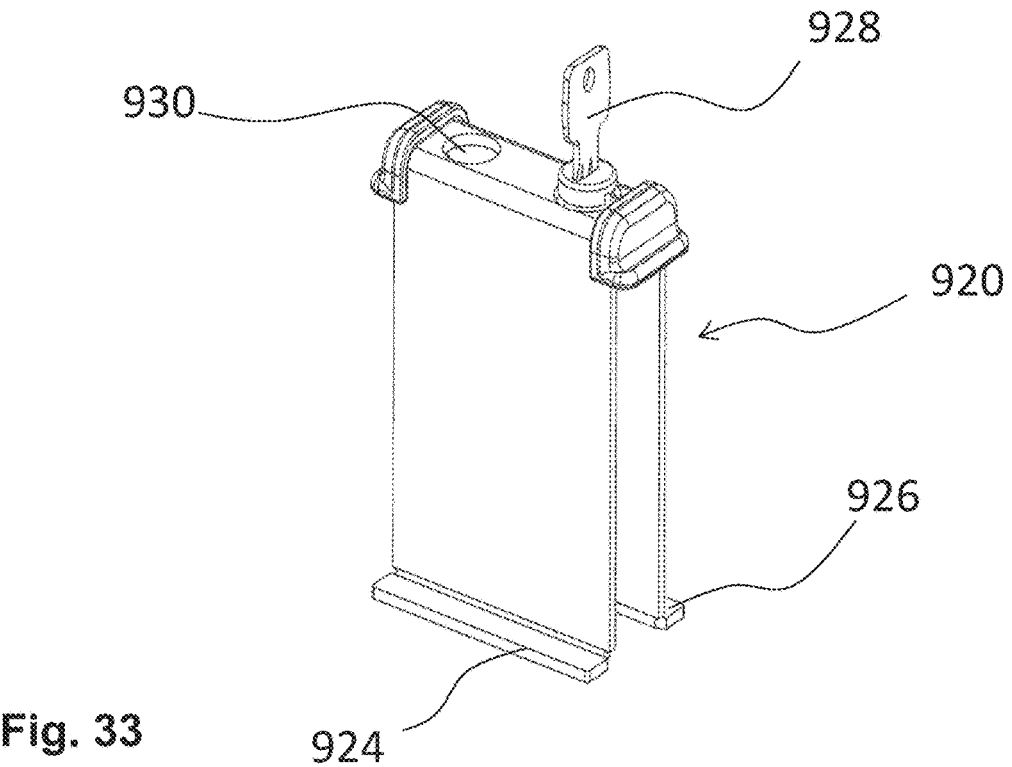
FIG. 33 shows a locking anchor according to an example embodiment of the present disclosure.
Figure 34:
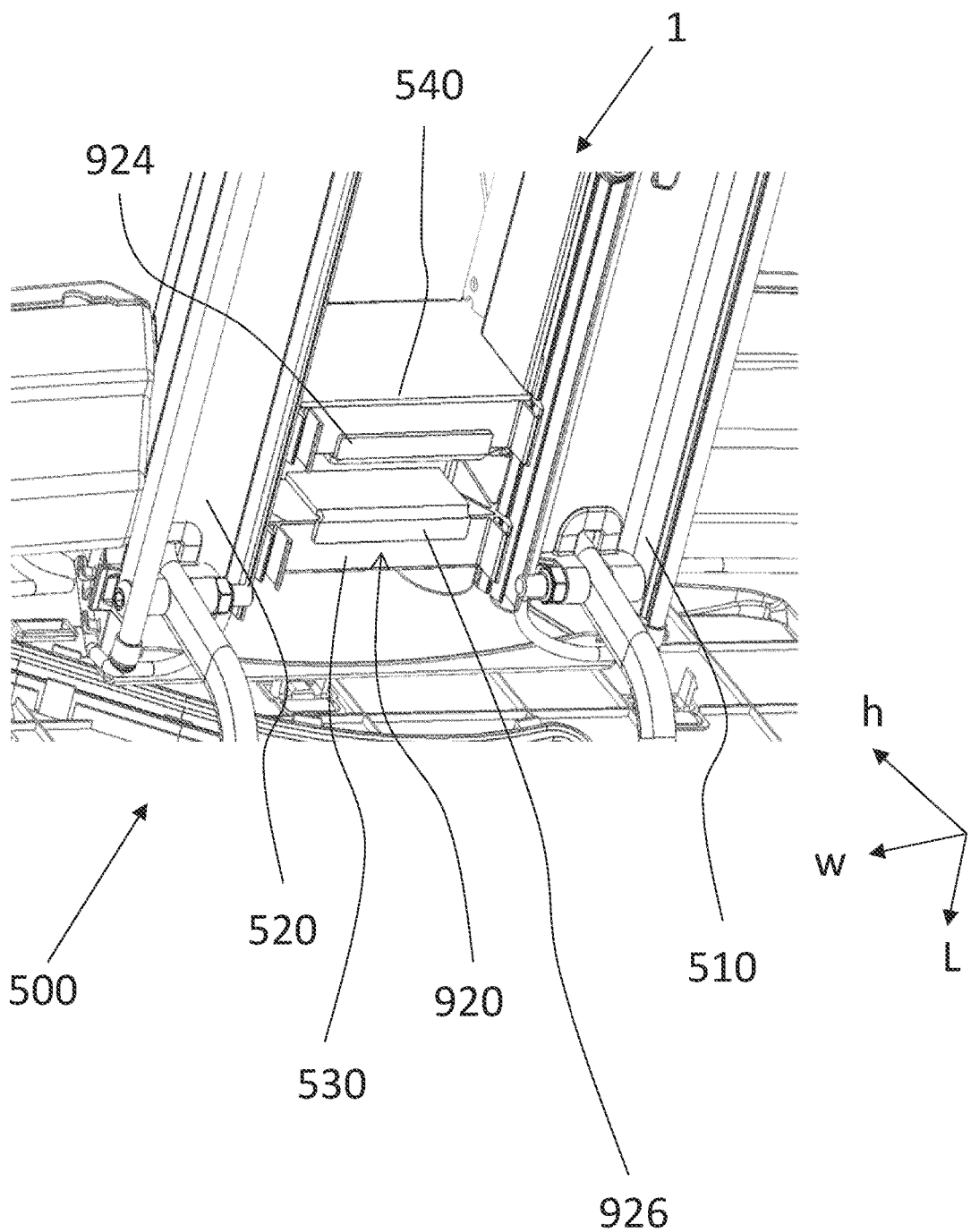
FIG. 34 shows a perspective view from below of a bike carrier as shown in FIG. 32.
Figure 47A:
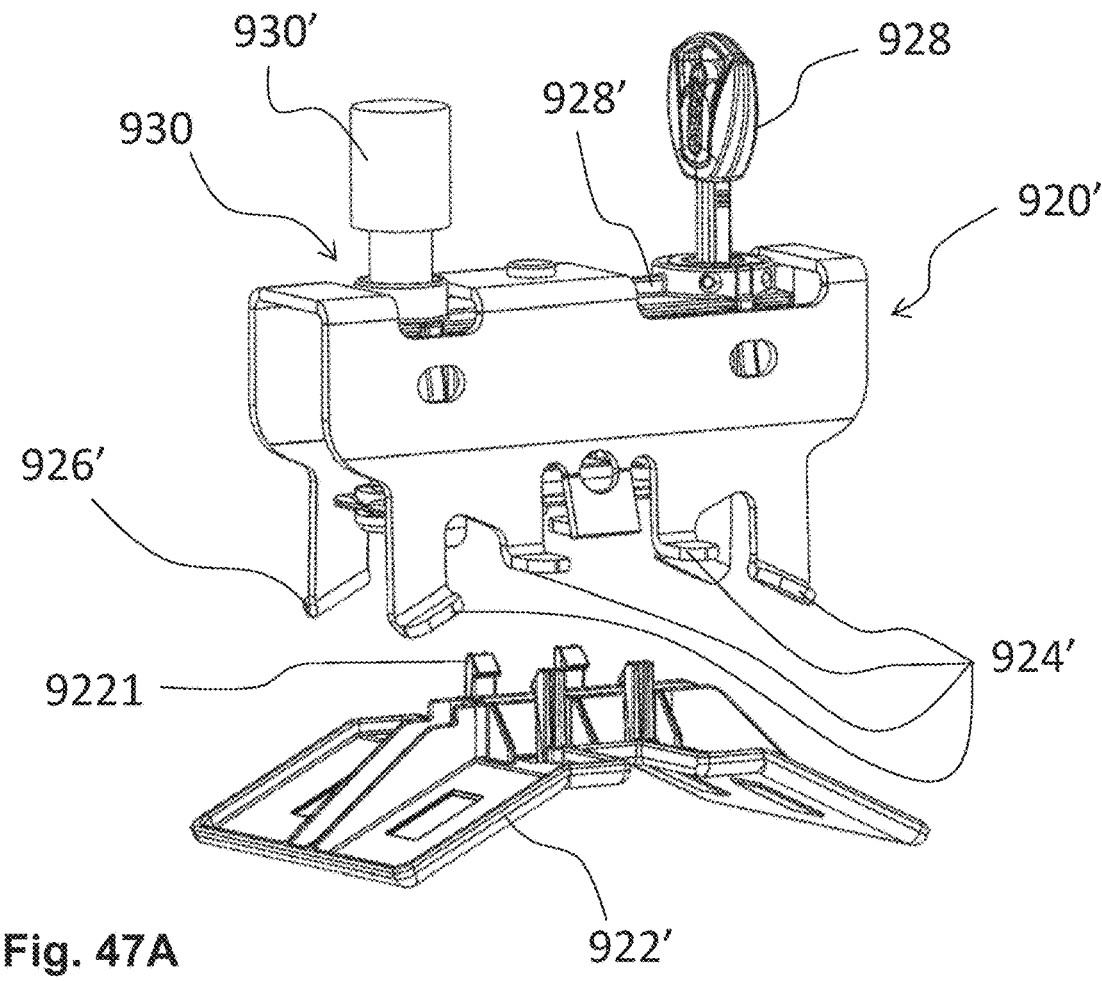
FIG. 47A shows a perspective view of a locking anchor according to an example embodiment of the present disclosure.
Figure 47B:
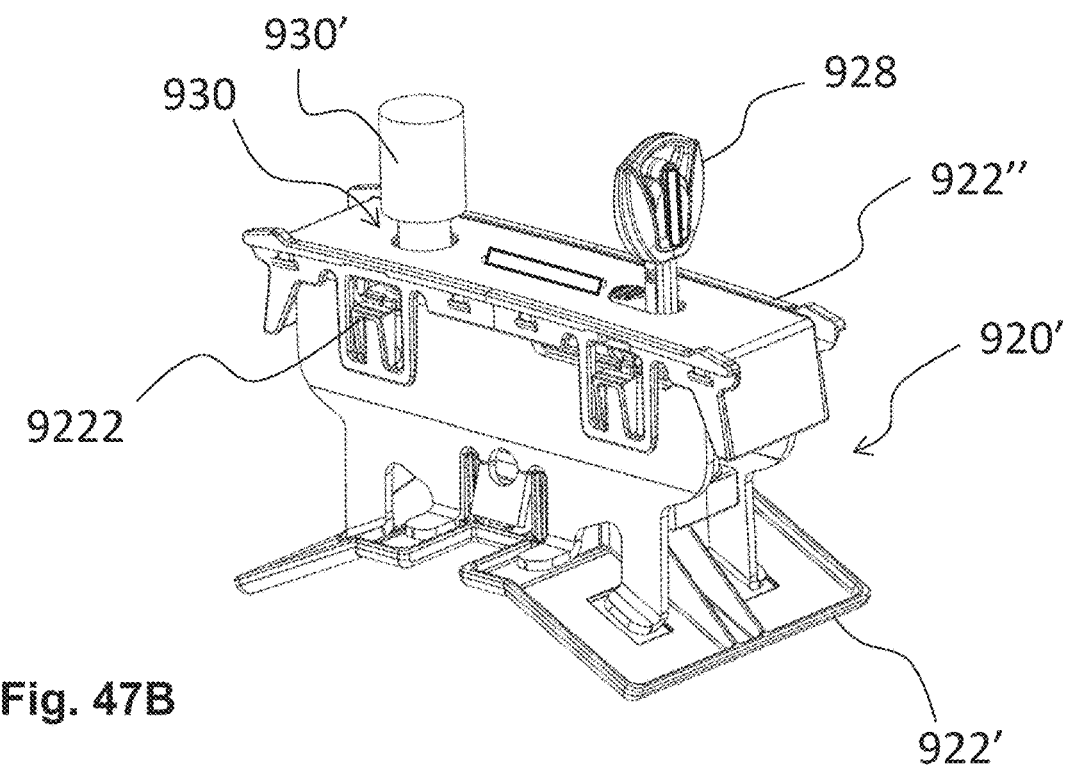
FIG. 47B shows a perspective view of a locking anchor according to an example embodiment of the present disclosure.

Referring to FIGS. 32-34 and to FIGS. 47A-47B, a bike carrier 1 according to example embodiments of the tenth aspect are shown. The bike carrier 1 may be the bike carrier 1 as shown in FIG. 1.

The bike carrier comprises a locking anchor 920 for locking a bicycle to the bike carrier 1.

The locking anchor 920 may as shown comprise a key 928 for locking a locking wire (not shown) in a locking wire opening 930

The locking anchor 920 is detachable with respect to the bike carrier 1. In particular, the locking anchor 920 can be removed from below the bike carrier 1 (see FIG. 34).

The bike carrier 1 may as shown further comprise a base frame 500 having a length extension L, a width extension w and a height extension h. The base frame 500 comprises a first and a second elongated member 510, 520 for carrying a load, wherein the first and a second elongated members 510, 520 are separate from each other and provided substantially parallel with respect to each other along the length extension L. The locking anchor 920 is provided in-between the first and second elongated members 510, 520, as seen in the width extension w.

The bike carrier 1 may as shown further comprise bridging portions 530, 540 provided between the first and second elongated members 510, 520 and coupling the first and second elongated members together. The locking anchor 920 is provided proximate, such as being coupled to, the bridging portions 530, 540. More specifically, the first and second bridging portions 530, 540 are separate and offset from each other as seen in the length extension L of the base frame 500, wherein the locking anchor 920 is provided in-between the first and second bridging portions 530, 540, as seen in the length extension L of the base frame 500.

The bike carrier 1 may as shown further comprise a cover 922, in this case as a polymer cover, which covers the bridging portions 530, 540 from above between the first and second elongated members 510, 520, wherein the cover comprises an aperture, facing upwardly in the height extension, which is adapted to receive the locking anchor 920.

The locking anchor 920 may as shown be adapted to be inserted into a locking anchor opening of the bike carrier, in this case an opening of the base frame 500, seen from below. The locking anchor has a T-shaped profile, and further comprises protruding flanges 924, 926 adapted to engage with a firm portion of the bike carrier 1 to position the locking anchor 920 in a predetermined support position in the locking anchor opening. Thereby, the base frame 500 and the locking anchor 920 are configured such that the locking anchor is prevented from being pulled out when being inserted into the locking anchor opening, in this case prevented from being pulled out in an upward direction.

As shown, the bike carrier 1 may be configured to receive the locking anchor from below, i.e. the locking anchor is insertable from below, in this case between the first and second elongated members 510, 520 of the base frame 500, as seen in the height extension h of the bike carrier 1.

FIGS. 47A-47B depicts an alternative embodiment of a locking anchor 920' according to the tenth aspect of the disclosure. Similar to the above, the locking anchor 920' comprises protruding flanges 924', 926' adapted to engage with a firm portion of the bike carrier 1 to position the locking anchor 920' in a predetermined support position in the locking anchor opening. Thereby, the base frame 500 and the locking anchor 920' are configured such that the locking anchor 920' is prevented from being pulled out when being inserted into the locking anchor opening, in this case prevented from being pulled out in an upward direction. As shown, the protruding flanges 924', 926' may be separated into respective flange sections thereof, herein into four respective flange sections. As further shown, each flange section may be angled to conform with the shape of the base frame 500 and/or to any other portion on the bike carrier 1 when being attached thereto. Still further, as shown, the locking anchor 920, 920' may be made by bent sheet metal, such as bent into a U-shape, as seen in cross sectional view. Thereby, a robust, reliable and cost-effective configuration is achieved.

Alternatively, the locking anchor 920' may be rigidly fixed to the bike carrier 1. Thereby, for example, the flanges 924', 926' may not be required. The locking anchor 920' may for example be rigidly fixed the bike carrier 1 by welding.

The locking anchor 920' may as shown also comprise a lock key arrangement 928' for locking a locking wire 930' in the locking wire opening 930 of the locking anchor 920'. Only a portion of the locking wire 930' is shown herein. As depicted in FIG. 47A, the lock key arrangement 928' for locking the locking wire 930' may be a separate accessory which is attachable to the locking anchor 920'. In the shown embodiment, the lock key arrangement 928' is inserted into a gap, or opening, formed by at least two respective sheet metal portions of the locking anchor 920'. For example, the lock key arrangement 928' may be attachable to the locking anchor 920' by a snap-fit connection, preventing it from falling off when in the unlocked state. The locking anchor 920' may as shown comprise an opening through which the key 928 can access the lock key arrangement 928' for locking and unlocking the locking wire 930' to/from the lock key arrangement 928'.

In the shown embodiment, the lock key arrangement 928' is detachable when the lock key arrangement 928' is in an unlocked state when the locking wire 930' is not locked thereto, and non-detachable when the lock key arrangement 928' is in a locked state when the locking wire 930' is locked thereto.

As further depicted in FIGS. 47A-47B, the bike carrier 1 may further comprise a lower cover 922' for the locking anchor 920', wherein the lower cover 922' covers the locking anchor 920' from below. The lower cover 922' may as shown comprise locking tabs 9221 for locking the cover to the bike carrier 1 and/or to the locking anchor 920', such as locking tabs 9221 with a snap-in functionality. The lower cover 922' may conceal the locking anchor 920' from below. Additionally, or alternatively, the lower cover 922' may be used for preventing the locking anchor 920' from falling down after insertion from below.

As further depicted in FIG. 47B, the bike carrier 1 may as shown further comprise a cover 922", with similar function as the cover 922. The cover 922' comprises locking tabs 9222 for locking the cover to the bike carrier 1 and/or to the locking anchor 920', such as locking tabs 9222 with a snap-in functionality.

Figure 35:
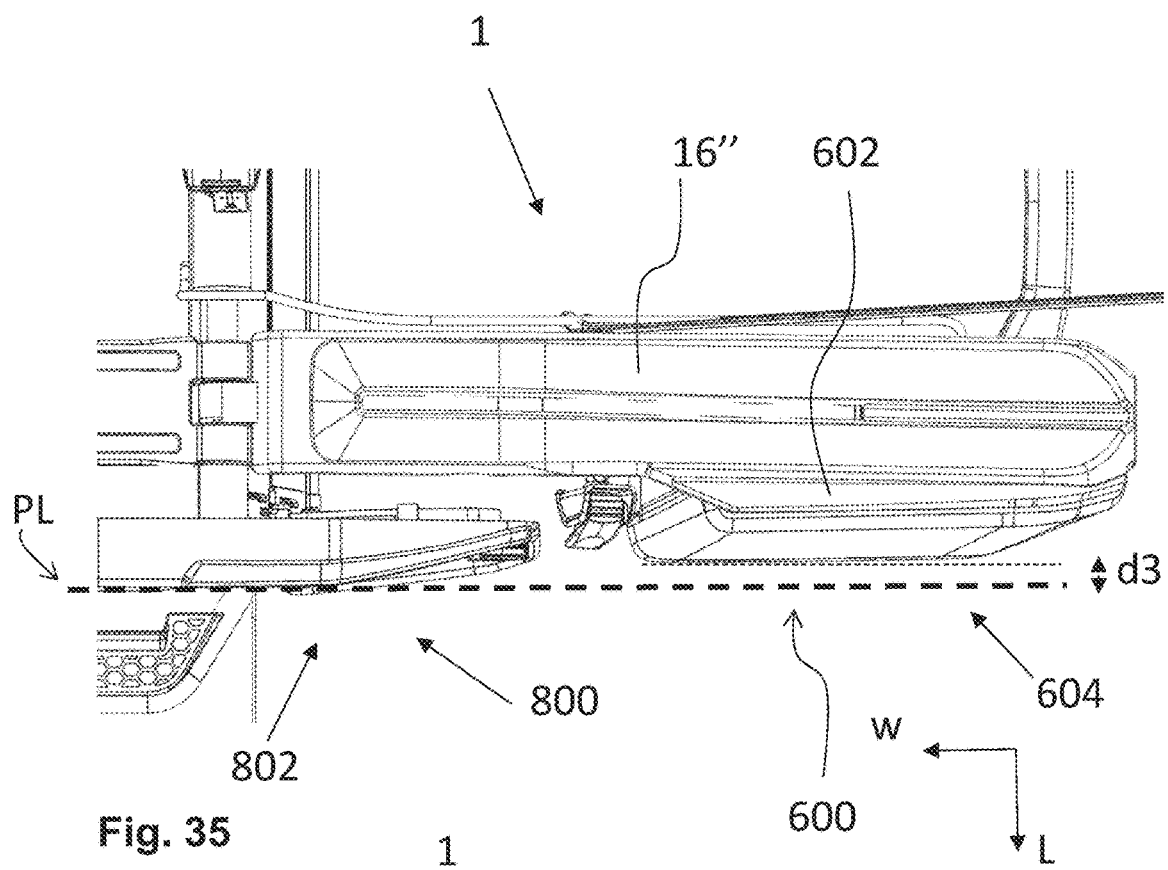
FIG. 35 shows a view from above of a load carrier according to an example embodiment of the eleventh aspect of the disclosure.
Figure 36:
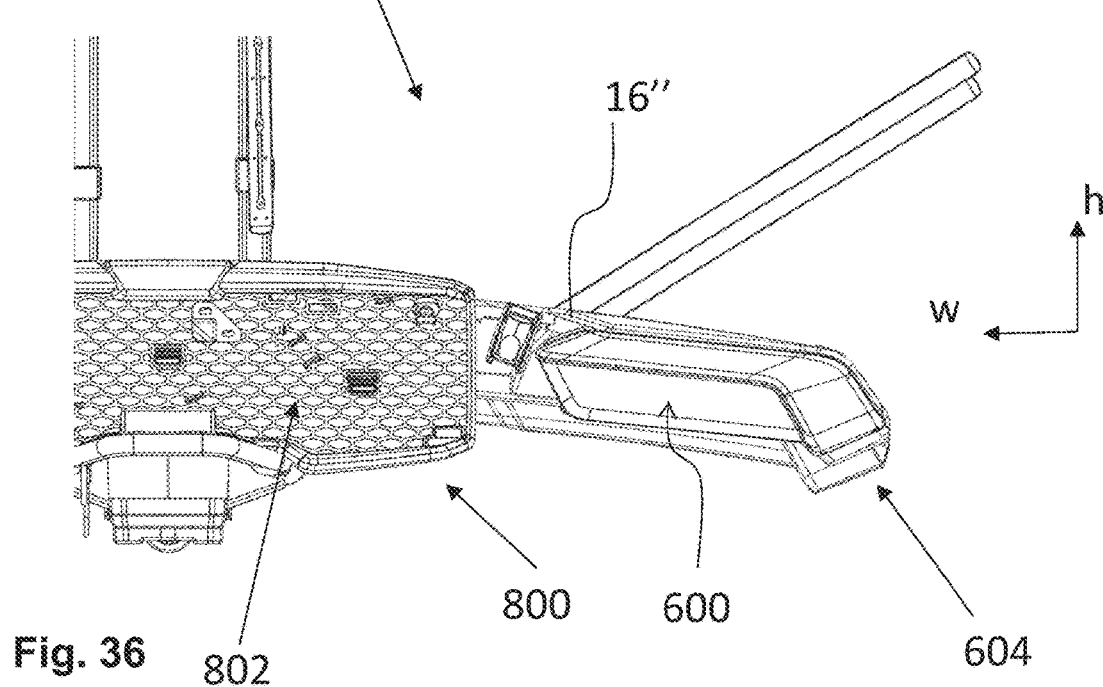
FIG. 36 shows the load carrier in FIG. 35 from behind.

Referring to FIGS. 35 and 36, a load carrier 1, in this case a bike carrier, adapted to be mounted at a rear side of a vehicle, is shown. The load carrier 1 may for example be the load carrier 1 as shown in FIG. 1. Alternatively, the load carrier 1 may be similar to the load carrier 1 shown in FIG. 18.

The load carrier 1 has a length extension L, a width extension w and a height extension h.

The load carrier (1) comprises:
a housing 600 for a light emitting and/or light reflecting member, and a holder 602 for the housing 600.

The housing 600 comprises a light emitting area 604 which is at least partly directed in a rearward direction of the load carrier 1, corresponding to the length extension L and to a rearward direction of the vehicle when the load carrier 1 is mounted thereto.

It further comprises a license plate holder 800. In this case the license plate holder 800 is similar as shown in FIGS. 24-26, i.e. it is pivotable. The license plate holder 800 has a main extension in a license plate holder plane PL. The license plate holder 800 comprises a license plate attachment side 802 directed out from the license plate holder 800 in a first transversal direction with respect to the license plate holder plane PL. In the shown embodiment, the license plate attachment side 802 is directed away in the length extension L, corresponding to a rearward direction of the vehicle when the load carrier 1 is mounted thereto.

The housing and the holder 600, 602 are positioned such that the light emitting and/or light reflecting area 604 is prohibited from emitting and/or reflecting light onto the license plate when the license plate is attached to the license plate holder 800. More specifically, in the shown embodiment, the housing and the holder 600, 602 are positioned such that an outermost portion of the light emitting and/or light reflecting area 604 is located behind the license plate holder plane PL, as seen along the length extension L. The license holder plane PL is here the same plane as a license plate plane when the license plate is attached to the license plate holder 800. As shown, the outermost portion of the light emitting and/or light reflecting area 604 may be located behind the license plate holder plane PL with a separation distance d3, such as a distance of 1-10 cm, as seen along the length extension L.

The load carrier 1 may as shown further comprise a load receiving section 16" which is configured to receive and hold a wheel of a bicycle, for example the load receiving section is a wheel tray, wherein the housing and holder are attached to the load receiving section 16".

As shown, the light emitting and/or light reflecting area 604 may be of a three-dimensional shape, such as shaped as described in the above.

The light emitting and/or light reflecting area 604 is also here made of transparent glass.

Figure 37A:
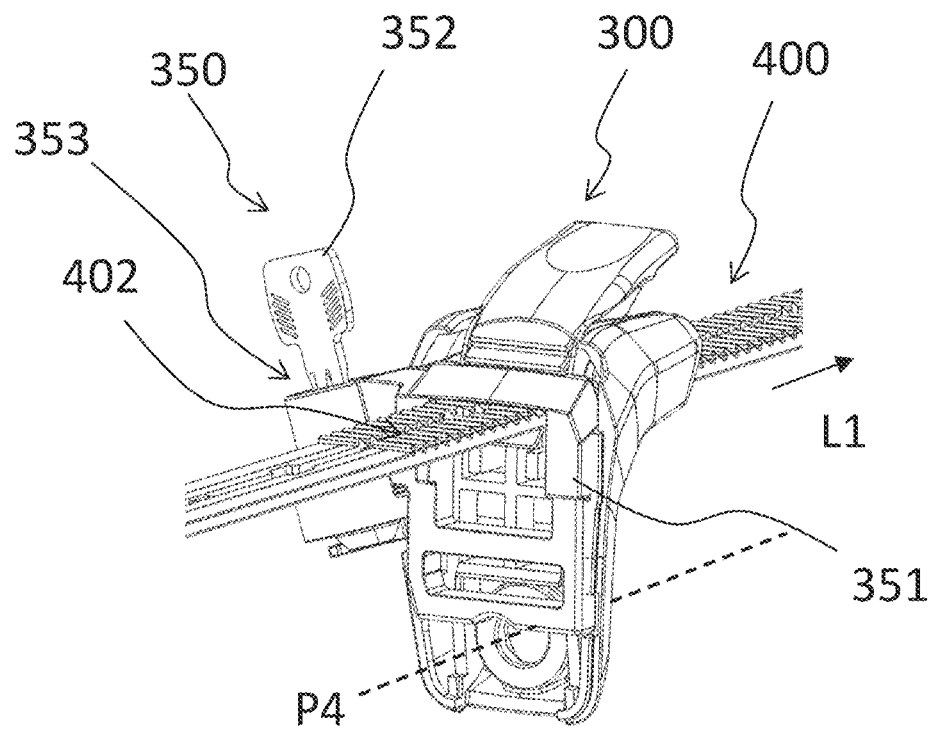
FIG. 37A shows a view of a strap locking arrangement for locking a strap according to an example embodiment of the disclosure.
Figure 37B:
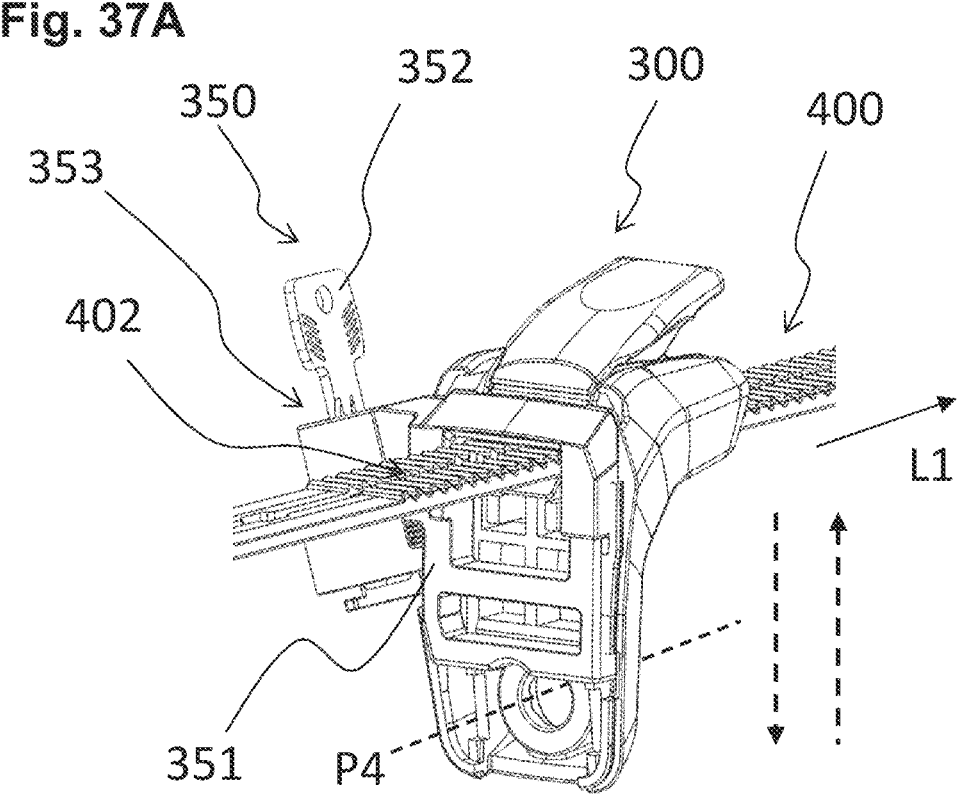
FIG. 37B shows a view of a strap locking arrangement for locking a strap according to an example embodiment of the disclosure.
Figure 37C:
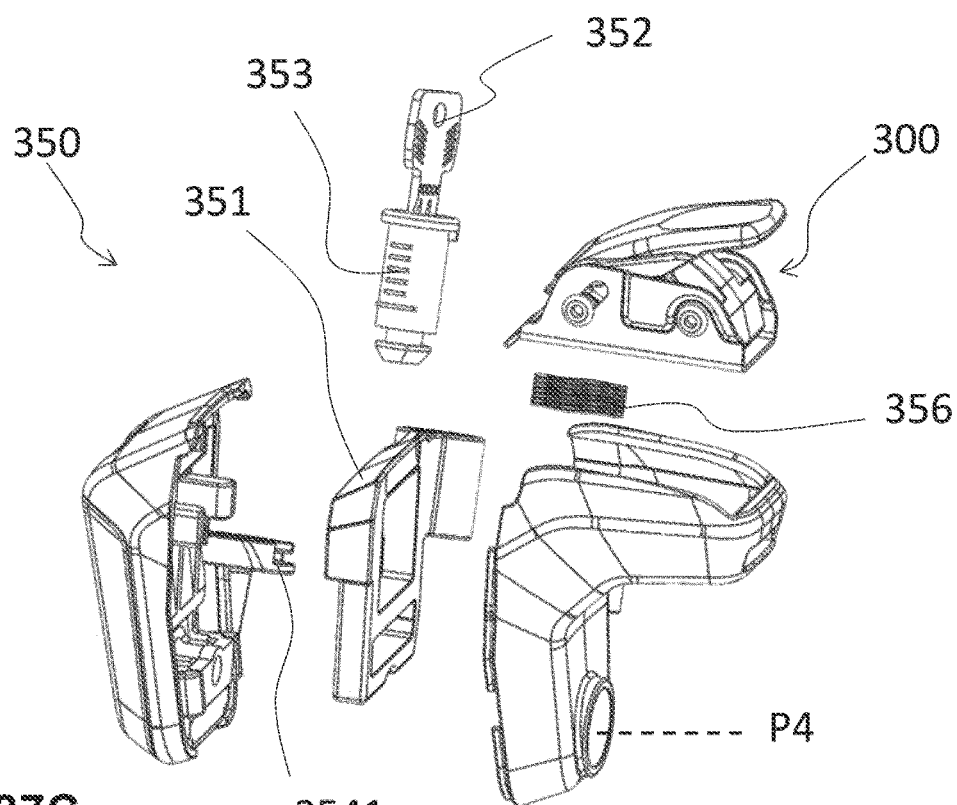
FIG. 37C shows a view of a strap locking arrangement for locking a strap according to an example embodiment of the disclosure.
Figure 37D:
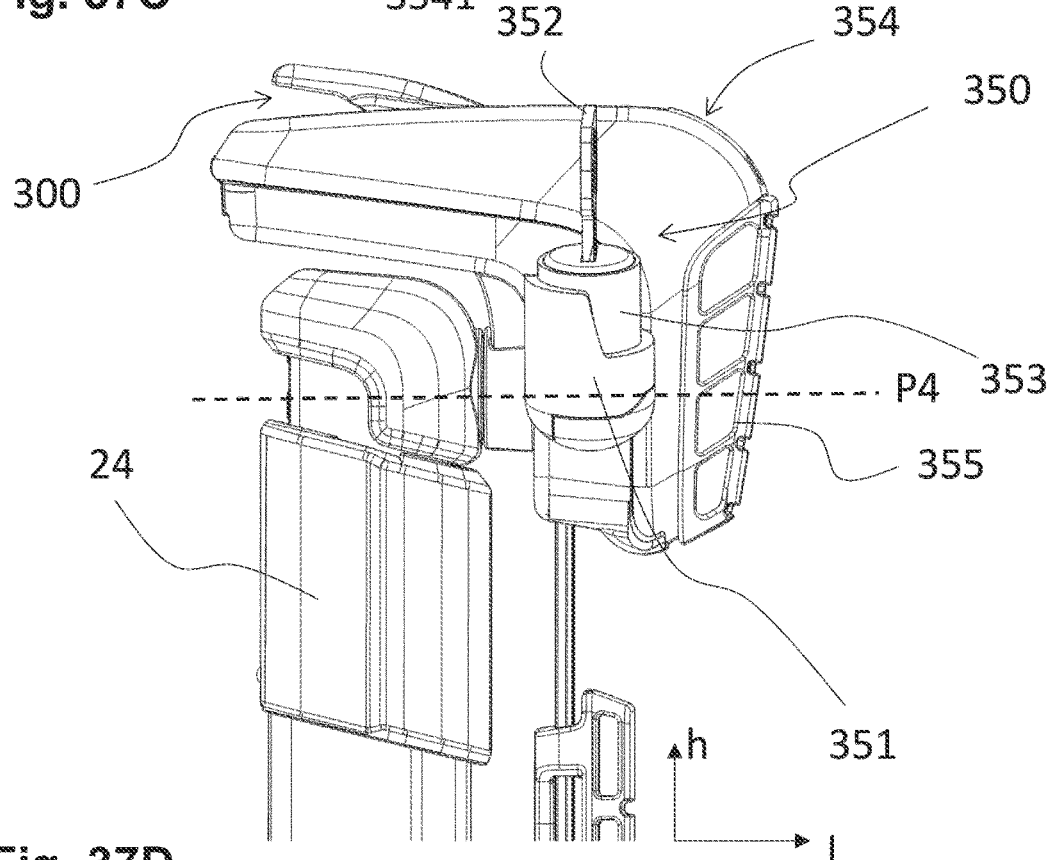
FIG. 37D shows a view of a strap locking arrangement for locking a strap according to an example embodiment of the disclosure.

Referring to FIGS. 37A-37B, perspective views of a strap locking arrangement 350 for locking the strap 400 such that it is prevented from being released from the ratchet buckle 300 is shown. FIG. 37C shows an exploded vied of the strap locking arrangement 350, which preferably is provided on a bicycle support arm member, such as on the bicycle support arm member 24 shown in FIG. 1. FIG. 37D shows a perspective view of the strap locking arrangement 350 when it is provided on a pivotable head 354 of the bicycle support arm member 24. As shown, the strap locking arrangement 350 may comprise a locking element 351 which is arranged to engage with at least one buckle engagement member 402 of the strap 400. The engagement may be provided by a protruding flange, tooth, or the like, (not shown) of the locking element 351, which is configured to engage with the at least one buckle engagement member 402 of the strap so that the strap 400 is prevented from being pulled out from the locking element 351. The locking element 351 may as shown be adapted to engage with the at least one buckle engagement member 402 by sliding the locking element 351 in a locking direction towards the at least one buckle engagement member 402 of the strap 400, indicated by an arrow pointing downwardly towards the strap 400 in FIG. 37B. The locking element 351 may thereafter be locked by use of a key 352 which, after being rotated and released in a keyhole 353 of the locking arrangement 350, prevents the locking element 351 from sliding to an unlocked state, i.e. sliding in an opposite direction with respect to the aforementioned locking direction, i.e. as indicated by the upwardly directed arrow in FIG. 37B. FIG. 37A shows a locked state and FIG. 37B shows an unlocked state where the strap 400 is not locked by the locking element 351. The locking arrangement 350 with the locking element 351 is preferably spring-biased towards the unlocked state, such as by the spring member 356 shown in FIG. 37C. Still preferably, the locking cylinder with the keyhole 353 and the locking element 351 may be arranged to move simultaneously together when the locking arrangement 350 is moved from the unlocked state to the locked state, and vice versa. Thereby a simplified configuration is achieved, implying cost effectiveness.

As further shown, the locking element 351 may be a frame-shaped element, in this case as a square-shaped element, with an opening for receiving the strap 400, wherein preferably, as also shown, a main extension plane of the frame-shaped element 351 is adapted to be substantially perpendicular to a length extension L1 of the strap 400 when the strap 400 is provided through the frame-shaped element 351.

The keyhole 353 may be part of a locking cylinder which as shown may be received in a cylinder portion of the locking element 351. Accordingly, the locking cylinder 353 and the locking element 351 will move simultaneously together when the locking arrangement 350 is moved from the unlocked state to the locked state, and vice versa. In the locked state, the locking cylinder 353 engages with a portion 3541 of the pivotable head 354.

As shown in e.g. FIG. 37D, the strap locking arrangement 350 may be provided at an outer end portion of the bicycle support arm member 24, in this case on a pivotable head 354, wherein optionally the outer end portion, such as the pivotable head, comprises a bicycle support surface 355, such as a firm or cushioned surface, against which a bicycle is intended to rest against when the strap 400 has tensioned the bicycle to the bicycle support arm member 24.

The strap locking arrangement 350 may as shown be provided on a rotatable member, such as on the pivotable head 354, wherein the rotatable member may, as shown, be substantially L-shaped. The rotatable member, i.e. the pivotable head, is pivotable about a pivot axis P4. The pivot axis P4 may as shown extend substantially in the same direction as the length extension L1 of the strap 400 when it is received in the ratchet buckle 300. Further, the pivot axis P4 may, as shown in FIG. 37*d*, additionally or alternatively extend in the length extension L of the bike carrier 1. The L-shaped pivotable head 354 may as shown be at least partly enclosing the outer end portion of the bicycle support arm member 24, wherein one portion of the L-shaped head 354 extends in the length extension of the bicycle support arm member 24 and the other portion of the L-shaped head 354 extends above the outer end portion and in the length extension L of the bike carrier 1. Further, the bicycle support surface 355 may as shown face in a direction away from the vehicle when the bike carrier 1 is attached thereto.

The strap locking arrangement 350 is preferably provided at the strap entrance section of the strap receiving section of the ratchet buckle 300.

Figure 38A:
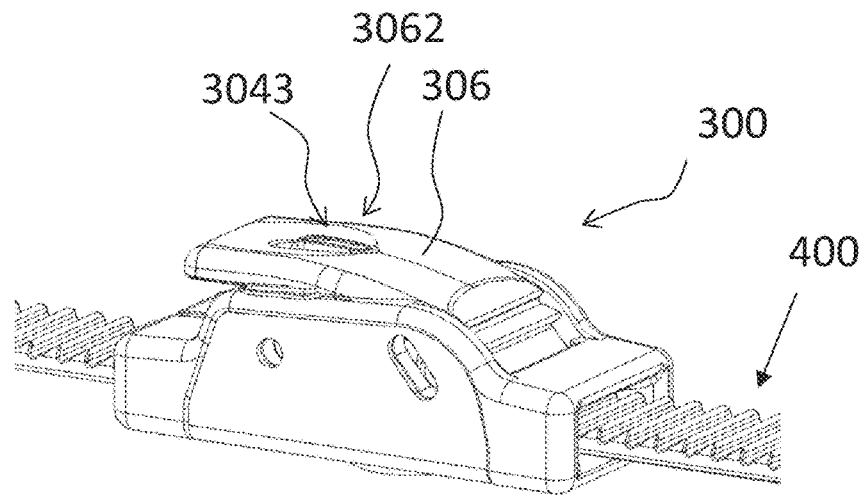
FIG. 38A shows a view of a ratchet buckle according to an example embodiment of the present disclosure.
Figure 38B:
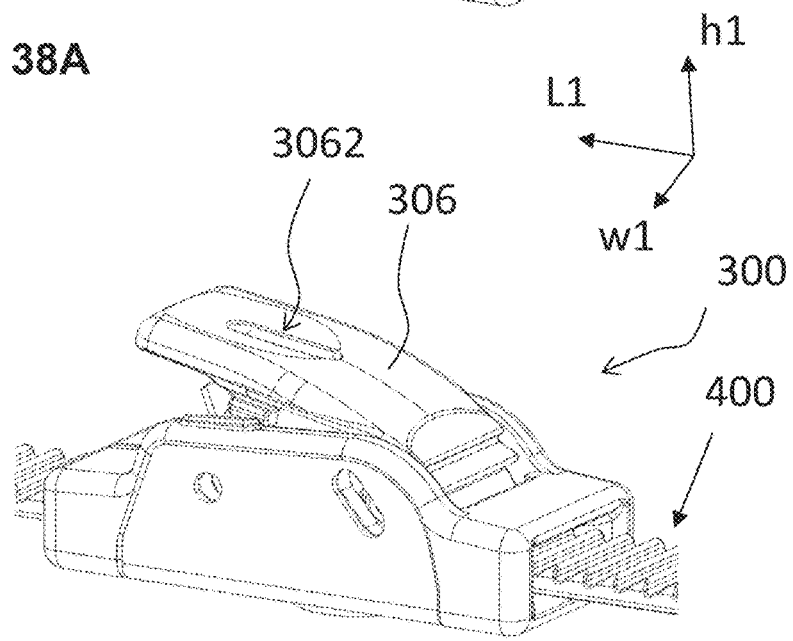
FIG. 38B shows a view of a ratchet buckle according to an example embodiment of the present disclosure.
Figure 38C:
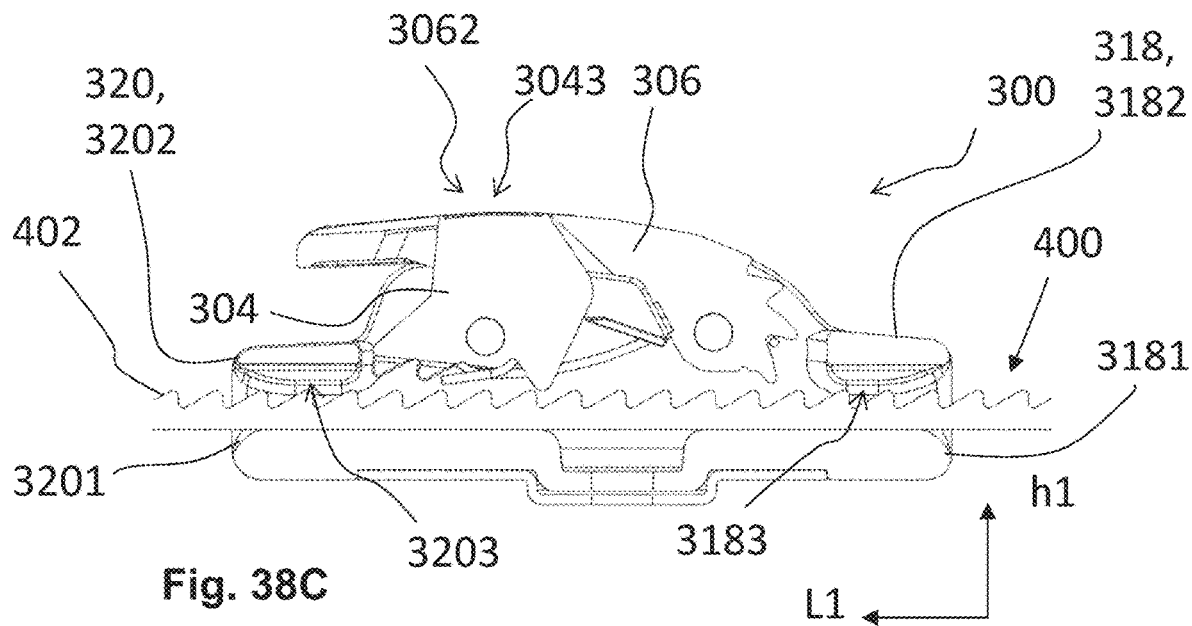
FIG. 38C shows a view of a ratchet buckle according to an example embodiment of the present disclosure.

Referring to FIGS. 38A-38B, perspective views of a ratchet buckle 300 according to an example embodiment of the present disclosure are shown. FIG. 38C shows a cross-sectional view of the ratchet buckle 300 as shown in FIGS. 38A-38B. The cross-section is defined by the height extension h1 and the length extension L1.

The ratchet buckle 30) as shown comprises a visual and/or tactile indicator 3043 which is adapted to indicate for a user when the actuation lever 306 is actuated such that the strap engagement member 304 is in the open state and/or when the actuation lever 306 is actuated such that the strap engagement member 304 is in the engaged state. As shown, the visual and/or tactile indicator 3043 may be provided on the strap engagement member 304. For example, as shown, the ratchet buckle 300 may be configured such that the visual and/or tactile indicator 3043, when being provided on the strap engagement member 304, is extending through an aperture 3062 of the actuation lever 306 when the strap engagement member 304 is in the open state, see FIGS. 38A and 38C. Preferably, the ratchet buckle 300 may be configured such that the visual and/or tactile indicator 3043 is extending through the aperture 3062, such that it is visible for a user and/or such that it can be touched by a hand/finger of a user, when the strap engagement member 304 is in the open state. Further, when the strap engagement member 304 is in the other state, in this case the engaged state as shown in FIG. 38B, the ratchet buckle 300 may be configured such that the visual and/or tactile indicator 3043 is not visible for a user and/or such that it cannot be touched by a hand/finger of a user. At least such that is not as visible and/or tactile as in the other state, i.e. it is preferably less visible and/or tactile in the other state. As shown, when the visual and/or tactile indicator 3043 is provided on the strap engagement member 304, it may rotate with the strap engagement member 304 when the strap engagement member 304 is pivoted between the open state and engaged state. As such, the visual and/or tactile indicator 3043 may be rotated away from the aperture 3062 when the strap engagement member 304 is pivoted towards the engaged state, and towards the aperture 3062 when the strap engagement member 304 is pivoted towards the open state. The opposite configuration is of course also feasible. Thereby, it will be easier for a user to understand when the actuation lever 306 is in the open state or engaged state. The visual indicator 3043 may for example be colored with a different color than the actuation lever 306, such as in red. The tactile indicator may for example comprise a knurled surface.

With reference to e.g. FIGS. 41-45, example embodiments of a load carrier 1 for a vehicle comprising a ratchet buckle 300 according to the thirteenth aspect of the disclosure are depicted. The load carrier 1 may accordingly be a load carrier as shown in FIG. 1. However, other load carrier configurations could also be used, such as other types of rear mounted load carriers and different types of roof mounted load carriers.

Figure 41A:
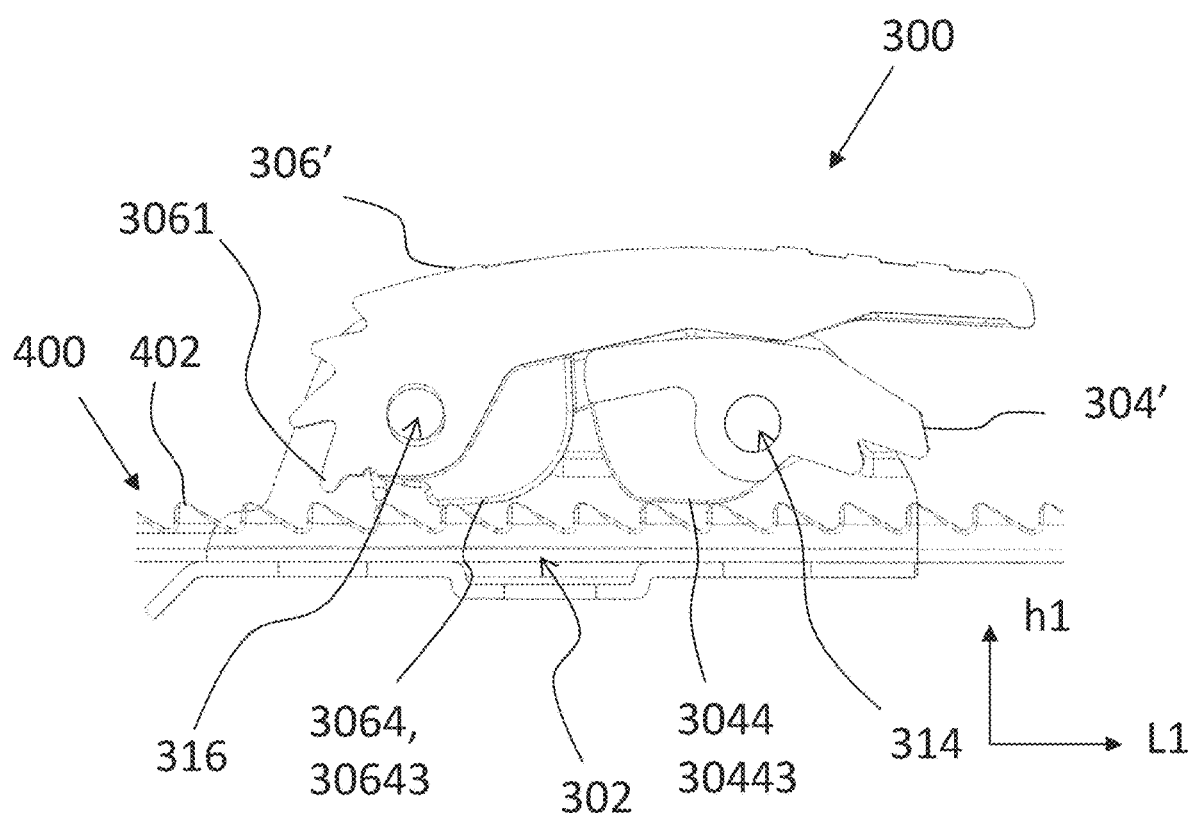
FIG. 41A shows a sectional view of a ratchet buckle according to an example embodiment of the present disclosure.
Figure 41B:
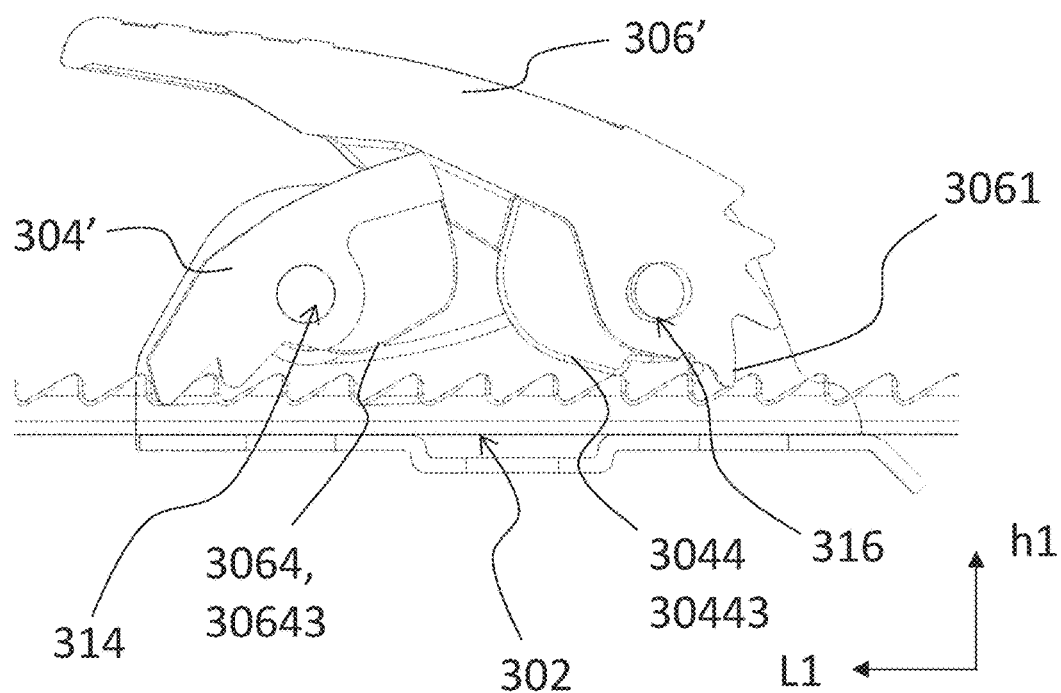
FIG. 41B shows a sectional view of a ratchet buckle according to an example embodiment of the present disclosure.
Figure 42:
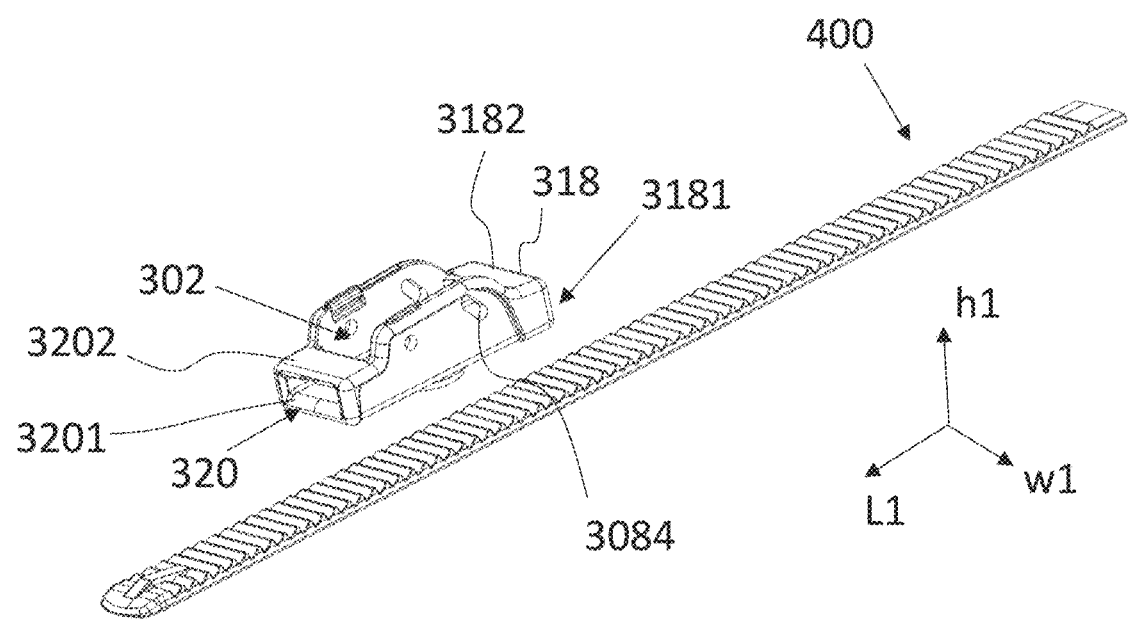
FIG. 42 shows a perspective view of a ratchet buckle and a strap according to an example embodiment of the present disclosure.

The ratchet buckle 30) as shown in e.g. FIGS. 41A-41B comprises:
  a strap receiving section 302. The strap receiving section 302 has a length direction L1 corresponding to a length direction of the strap 400 when it is received therein. It further has a width direction w1 and a height direction h1. In other words, the length direction L1, the width direction w1 and the height direction h1 correspond to the above-mentioned length extension L1, width extension w1 and height extension h1 of the ratchet buckle 300.

The ratchet buckle 3M) further comprises a strap engagement member 304' configured to engage with at least one buckle engagement member 402 of the strap 400 to thereby hold the strap 400 in the strap receiving section 302. In the shown embodiment, the buckle engagement members 402 of the strap 400 are configured as plurality of teeth.

The ratchet buckle 300 further comprises an actuation lever 306' for a user. The actuation lever 306' is configured to actuate the strap engagement member 304' between an open state in which the strap 400 is freely movable in the strap receiving section 302 and an engaged state in which the strap engagement member 304' is configured to be engaged with the at least one buckle engagement member 402 of the strap 400.

Furthermore, any one of the strap engagement member 304', the actuation lever 306' and a ratchet buckle housing 308 (see FIG. 45) of the ratchet buckle 300 comprises a strap guiding element 3044, 3064, 3066 which is configured to, in the open state, prevent a portion of the strap 400 which is in the strap receiving section 302 from being bent upwardly in the height direction h.

For example, as shown in e.g. FIGS. 41A-41B, the strap guiding elements 3044, 3064 may be configured to, in the open state, push downwardly on the portion of the strap 400, as seen in the height direction h1.

As further depicted in e.g. FIGS. 41A-41B, the ratchet buckle 3M) may further comprise the strap 400 with the buckle engagement members 402. The strap guiding elements 3044, 3064 may as shown be configured to contact the at least one buckle engagement member 402 in the open state so that the portion of the strap 400 which is in the strap receiving section 302 is prevented from being bent upwardly in the height direction h1. By contacting the buckle engagement members 402, the ratchet buckle 300 can especially be made compact in the width direction w1 while at the same time providing a reliable and robust guiding of the strap 400.

As can be further gleaned from e.g. FIGS. 41A-41B, the strap guiding elements 3044, 3064, as seen in a sectional plane defined by the height and length directions h1, L1, have a respective perimeter surface 30643, 30443, herein a respective curve-shaped perimeter surface, and more particularly a respective curve-shaped perimeter surface with a varying radius. Moreover, as shown, at least a portion of the respective perimeter surface 30643, 30443 is configured to, in the open state, prevent the portion of the strap 400 which is in the strap receiving section 302 from being bent upwardly in the height direction h1. In the shown embodiment, the portion of the respective perimeter surface 30643, 30443 is configured to, in the open state, contact and/or push on at least two buckle engagement members 402 of the strap 400. Thereby, improved guiding is achieved. e.g. reducing the risk of the strap 400 getting stuck when it is moved in the strap receiving section 302.

Figures 43A, 43B:
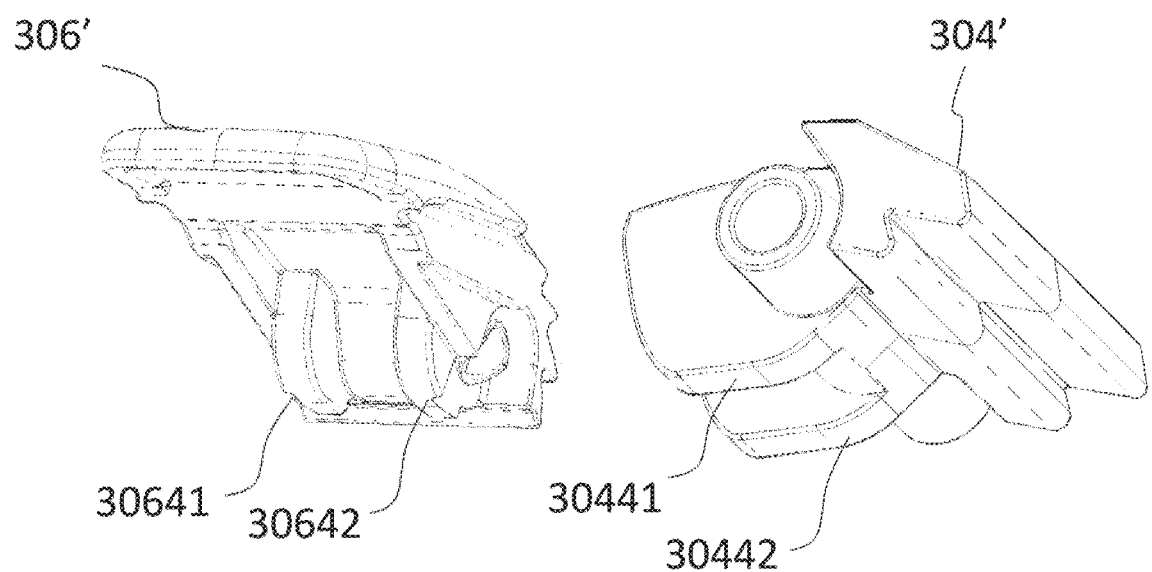
FIG. 43A shows a perspective view of a part of a ratchet buckle according to example embodiments of the present disclosure.
FIG. 43B shows a perspective view of a part of a ratchet buckle according to example embodiments of the present disclosure.

FIGS. 43A-43B depict examples of an actuation lever 306' and strap engagement member 304', respectively. In the shown embodiments, the strap guiding elements 3044, 3064 comprises at least a respective first and a second guiding portion 30441, 30442, 30641, 30642 which are offset from each other, as seen in the width direction w1. This enables for reliable and robust guiding, while at the same time a light-weight configuration is achieved. The respective first and a second guiding portions 30441, 30442, 30641, 30642, are preferably configured to contact the buckle engagement member 402 in the open state.

As can be further gleaned from FIGS. 41A-41B, the respective strap guiding elements 3044, 3064 may be offset from each other, as seen in the length direction L1 of the strap receiving section 302. In this embodiment, the strap engagement member 304' and the actuation lever 306' are separate parts with respective separate connection interfaces for connection to the ratchet buckle 300, herein respective separate pivot axes 314, 316. The respective separate pivot axes are offset from each other, as seen in the length direction L1 of the strap receiving section 302.

As further shown in FIGS. 41A-41B, the respective strap guiding elements 3044, 3064 may be provided in-between the respective separate connection interfaces 314, 316. Thereby, a compact configuration is achieved, which also provides a more reliable and robust guiding of the strap 400 in the open state, preventing the risk of unwanted bending of the srap 400 in the strap receiving section 302.

As further depicted in FIGS. 41A-41B, the strap guiding element 3064 of the actuation lever 306' may be configured to be moved, in this case pivoted, together with the actuation lever 306' between the open state and the engaged state. In a similar manner, as shown, the strap guiding element 3044 of the strap engagement member 304' may also be configured to be moved, in this case pivoted, together with the strap engagement member 304' between the open state and the engaged state. In this embodiment, the strap guiding elements 3044, 3046 are configured to not contact the buckle engagement members 402 when the ratchet buckle 30) is in the engaged state.

The actuation lever 306' may as shown in FIGS. 41A-41B comprise a strap engagement portion 3061 configured to engage with at least one buckle engagement member 402 of the strap 400, wherein the actuation lever 306' is configured to be moved, in this case pivoted, with respect to the ratchet buckle 300 such that the strap engagement portion 3061 moves the strap in a strap tightening direction in the strap receiving section 302. This configuration is also described in the above with respect to e.g. FIGS. 11A-11F.

The actuation lever 306' is in the embodiment shown in e.g. FIGS. 41A-41B spring-biased towards a default position, in this case spring-biased towards the engaged state in which the strap engagement member 304' is configured to be engaged with the at least one buckle engagement member 402 of the strap 400. As further shown, the strap engagement member 304' may be spring-biased towards the engaged state in which the strap engagement member 304' is configured to be engaged with the at least one buckle engagement member 402 of the strap 400. This configuration may also comprise a spring 312 as shown in e.g. FIG. 9.

The ratchet buckle 300 may further comprise a strap guide portion 318, 320 provided at a strap entrance section of the strap receiving section 302 and/or at a strap exit section of the strap receiving section 302, wherein the strap guide portion 318, 320 is an extension of the strap receiving section 302 and/or a widened section of the strap receiving section 302. In the embodiment shown in FIG. 42, the strap guide portions 318, 320 are at least an extension of the strap receiving section 302, i.e. as seen in the length direction L1. More specifically, in the shown embodiment, the strap guide portions 318, 320 comprises a respective floor section 3181, 3201 and a respective ceiling section 3182, 3202 for the strap 400, as seen in the height direction h1. As may be gleaned in e.g. FIG. 38C, any one of the strap guide portions 318, 320 may e.g. have an extension so that it can contact two buckle engagement members 402 simultaneously. It shall be noted that any one of the embodiments of the ratchet buckle 300 as disclosed herein can be combined with any one of the other embodiments of the ratchet buckle 300. The strap guide portions 318, 320 comprises respective guide surfaces 3183, 3203 which are arranged to face the strap 400 and the buckle engagement members 402.

Figure 44A:
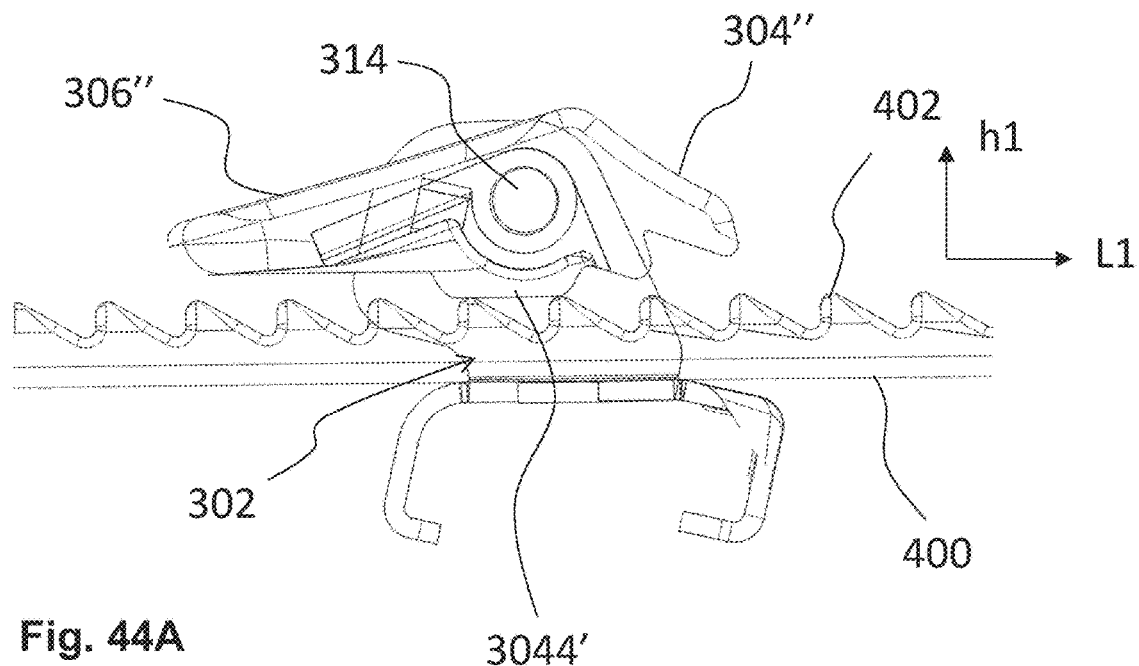
FIG. 44A shows a sectional view of a ratchet buckle according to another example embodiment of the present disclosure.
Figure 44B:
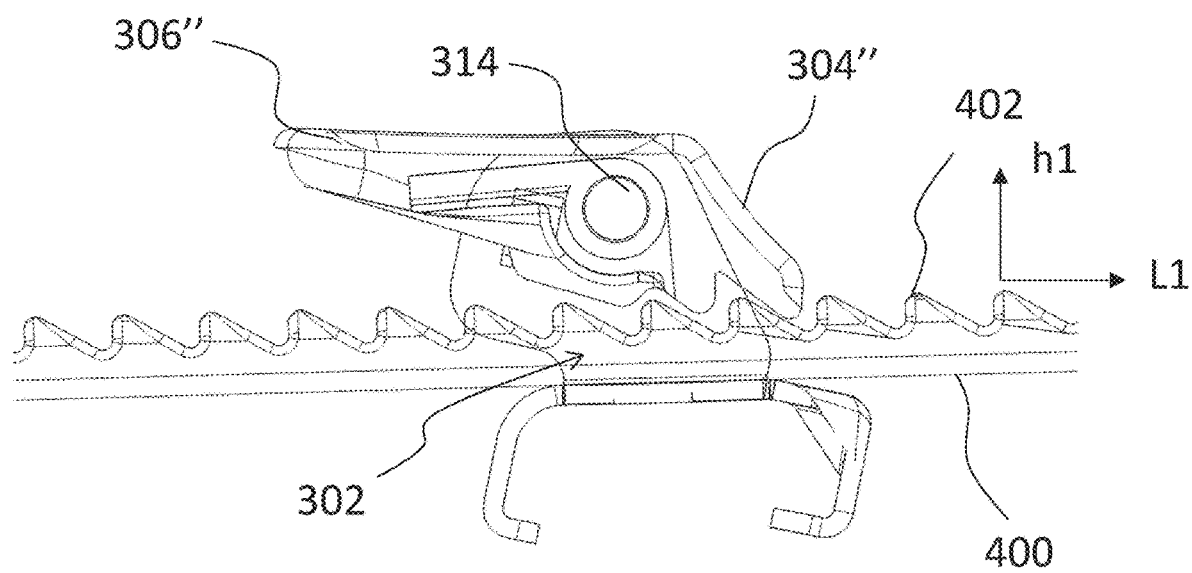
FIG. 44B shows a sectional view of a ratchet buckle according to another example embodiment of the present disclosure.

FIGS. 44A-44B depict sectional views of an alternative ratchet buckle 300 according to the thirteenth aspect of the disclosure. In this example, no separate actuation lever is provided. Instead, an actuation lever 306" is integrated with a strap engagement member 304'. The integrated actuation lever 306" and strap engagement member 304' comprises a strap guiding element 3044'. This element may be configured as explained in the above with respect to the other embodiments. In FIG. 44A, the ratchet buckle 300 is the open state, and in FIG. 44B it is in the engaged state.

Figure 45:
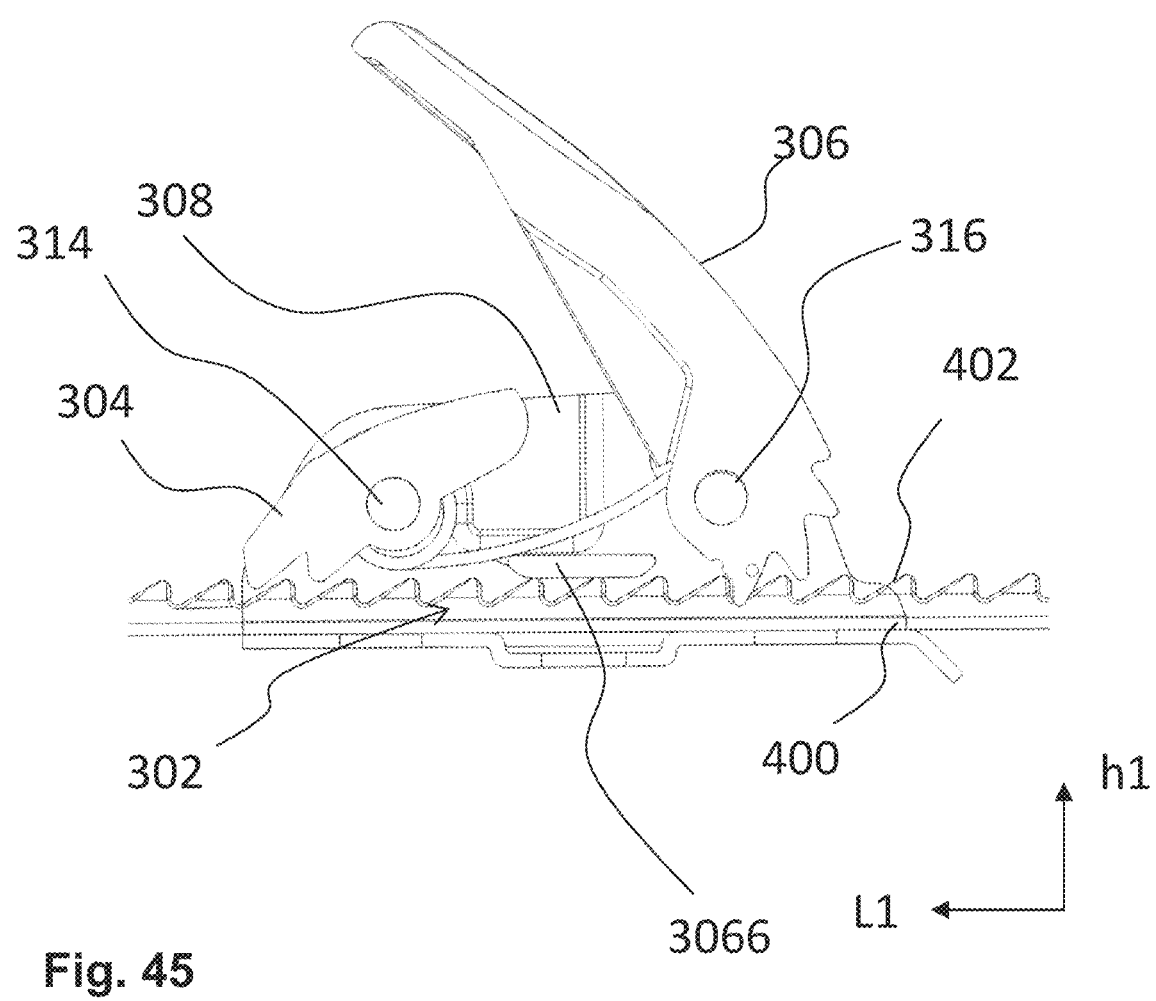
FIG. 45 shows a sectional view of a ratchet buckle according to another example embodiment of the present disclosure.

FIG. 45 depicts a sectional view of a yet further example embodiment, comprising a strap guiding element 3066 which is attached to the ratchet buckle housing 308 and provided in-between the connection interfaces 314, 316 for the strap engagement member 304 and the actuation lever 306, as seen in the length direction L1.

Figure 46A:
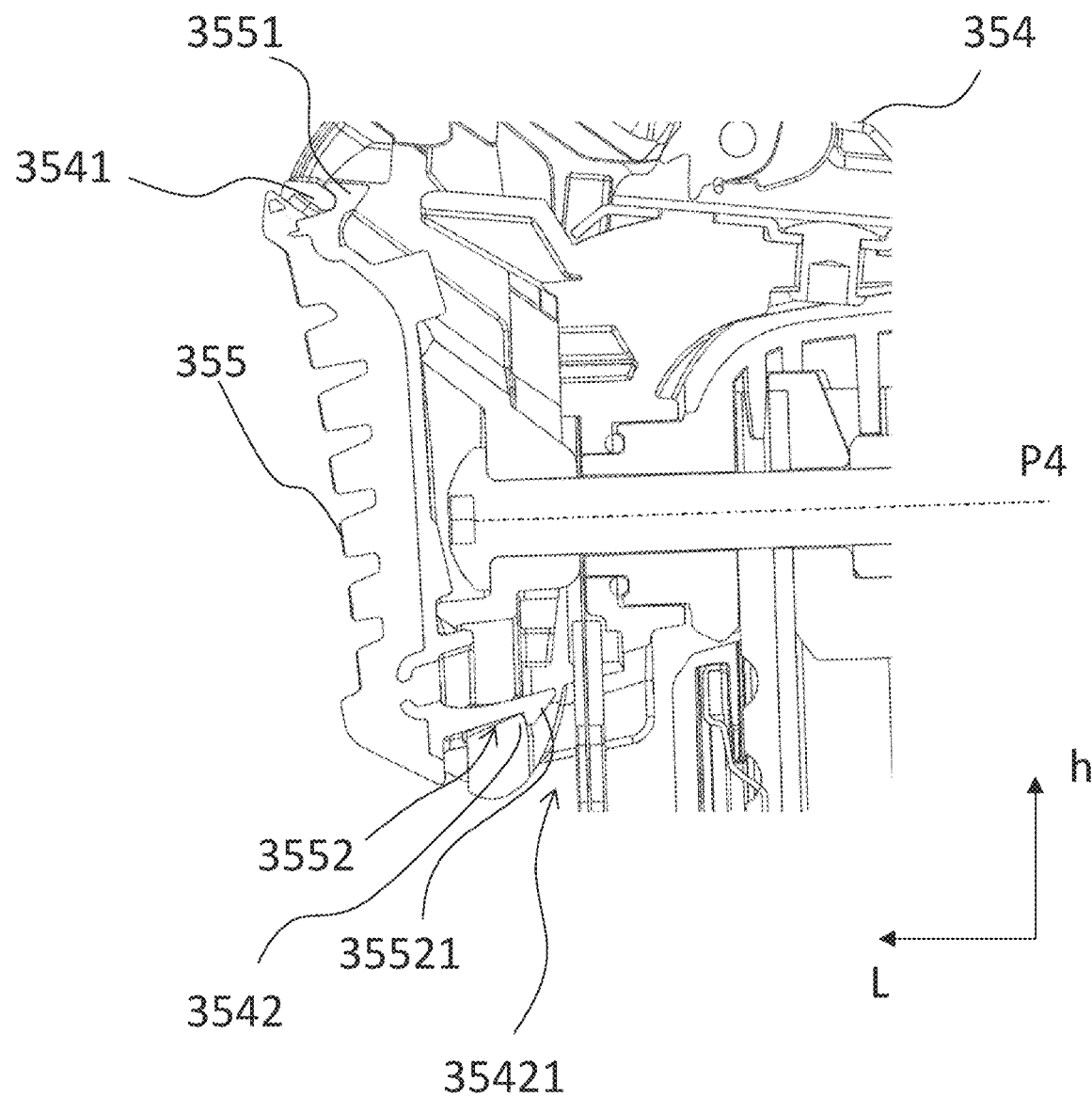
FIG. 46A shows a sectional view of a load carrier according to an example embodiment of the fourteenth aspect of the disclosure.
Figure 46B:
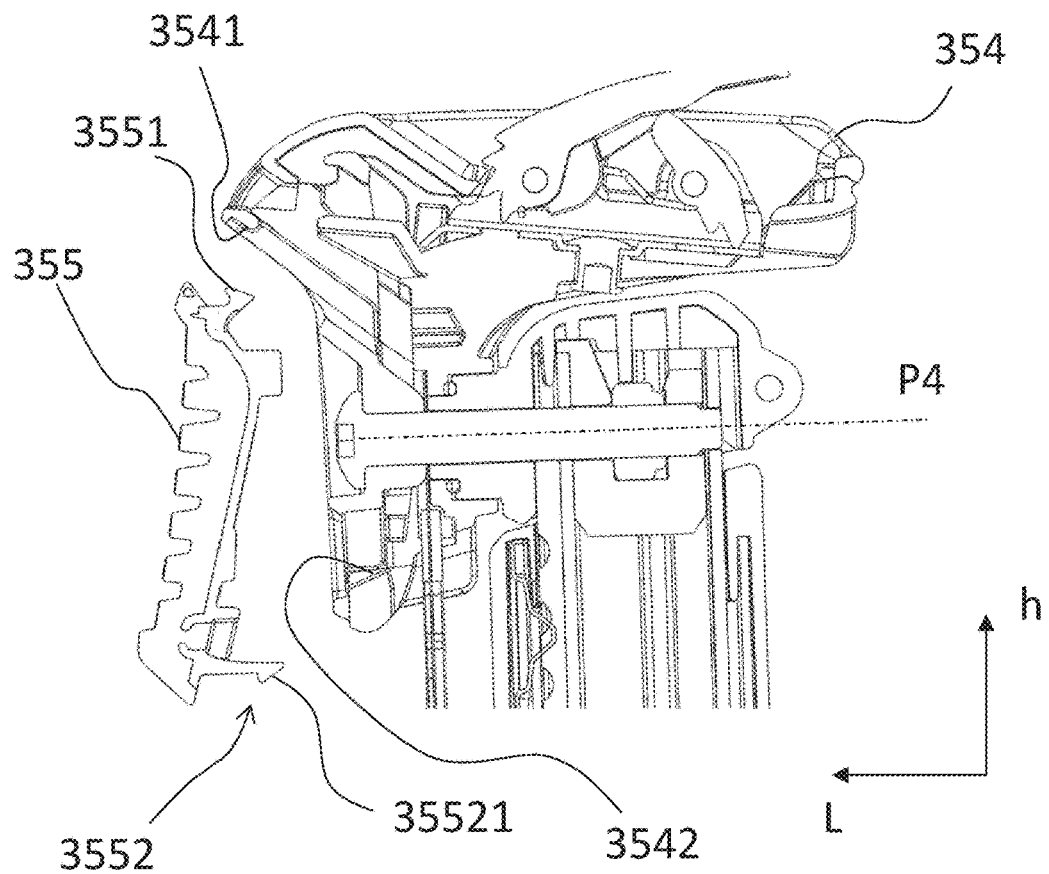
FIG. 46B shows a sectional view of a load carrier according to an example embodiment of the fourteenth aspect of the disclosure.
Figure 46C:
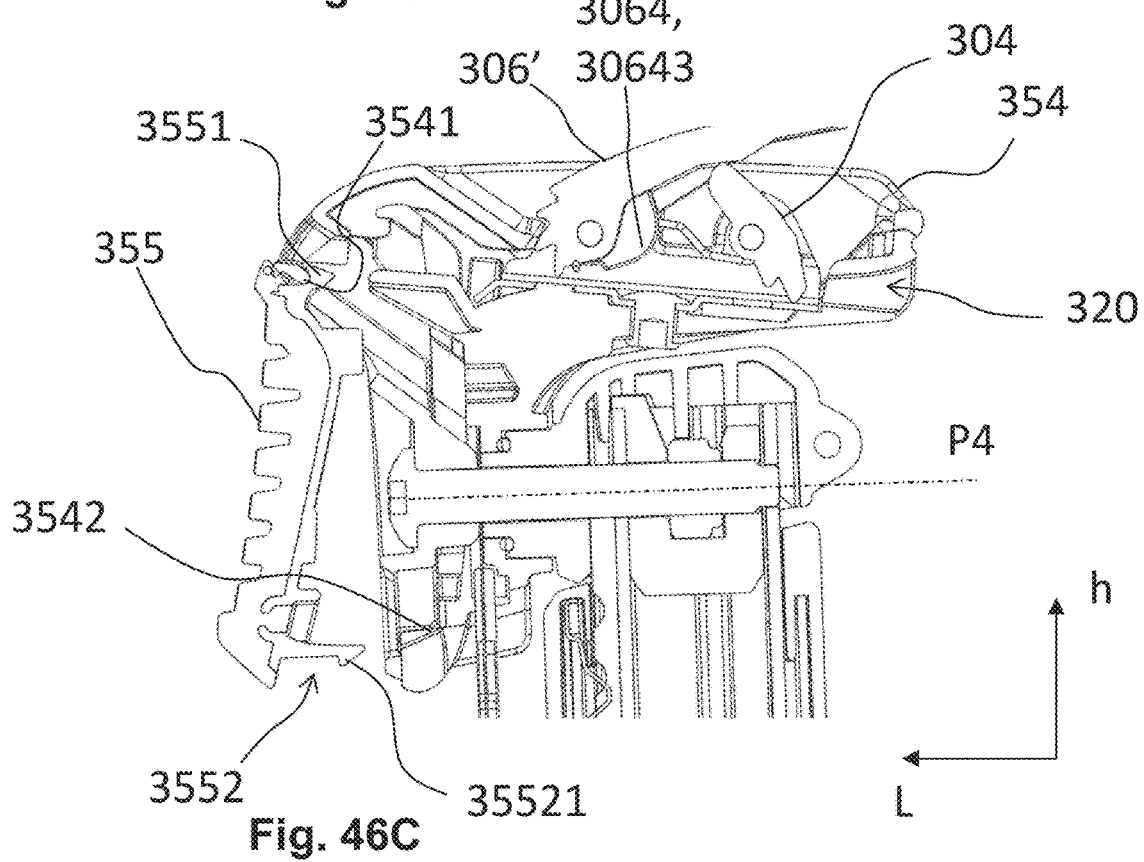
FIG. 46C shows a sectional view of a load carrier according to an example embodiment of the fourteenth aspect of the disclosure.

With reference to FIGS. 46A-46C, an example embodiment of a load carrier 1 according to the fourteenth aspect of the disclosure is depicted. The load carrier may e.g. be the load carrier 1 as shown in FIG. 1, even though other load carrier configurations are also possible.

The load carrier 1 comprises a bicycle support pad 355 against which a bicycle is intended to rest when the bicycle is mounted to the load carrier 1. The bicycle support pad 355 is releasably mounted to the load carrier 1. In the shown embodiment, the bicycle support pad 355 is releasably mounted to the above mentioned pivotable head 354.

As will be further described in the below, the bicycle support pad 355 is releasably mounted to the load carrier 1 by a snap-fit connection 3552, 3542.

The bicycle support pad 355 comprises a first and a second mounting member 3551, 3552 for releasably mounting the bicycle support pad 355 to the load carrier 1, and the load carrier 1 comprises corresponding first and second holding members 3541, 3542 for holding the first and second mounting members 3551, 3552.

In the example shown, the bicycle support pad 355 and the first and second holding members 3541, 3542 are configured so that the bicycle support pad 355 is releasably mounted to the load carrier 1 by first engaging the first mounting member 3551 with the first holding member 3541 whereafter the bicycle support pad 355 is pivoted with respect to the first mounting member 3551 until the second mounting member 3552 engages with the second holding member 3542. This can for example be seen in FIG. 46C.

Alternatively, not shown, the first and second mounting members and the corresponding first and second holding members may be configured so that the bicycle support pad is releasably mounted to the load carrier 1 by simultaneously engaging the first and second mounting members with the corresponding first and second holding members.

In the shown embodiment, the second mounting member 3552 and the second holding member 3542 are configured as a snap-fit connection. In addition, the first mounting member 3551 and the first holding member 3541 are configured as a hinge connection, i.e. they are relatively pivotable when connected to each other.

As further shown, the bicycle support pad 355 may comprise a releasing portion 35521 which is configured to be actuated for releasing the bicycle support pad 355 from the load carrier 1 when it is mounted thereto. The releasing portion 35521 is concealed by the load carrier 1 so that a user is prevented from accessing the releasing portion 35521 without the use of a separate tool. In the shown embodiment, the releasing portion 35521 is accessible through an aperture 35421 of the load carrier 1. The aperture may have a width or diameter which is less than 15 mm, for example less than 10 mm, and/or such as an aperture with a length from an opening thereof to the releasing portion 35521 which is greater than 5 mm, for example greater than 10 mm.

The bicycle support pad 355 may comprise a first material which forms a surface against which a bicycle is intended to rest when the bicycle is mounted to the load carrier 1, and further it may comprise a second material which forms a mounting interface for mounting to the load carrier 1, wherein preferably the first material is softer than the second material. For example, the first material is a thermoplastic elastomer, such as thermoplastic polyurethan, and/or the second material is a glass fibre reinforced polymer, such as glass fibre reinforced polyamide.

Even though the bicycle support pad in this example is provided on a pivotable head 354, it shall be noted that in other embodiments the bicycle support pad 355 may be provided on any one of a bicycle support arm 20, 24, 26, a wheel receiving member 14', 16', or a gripping claw (not shown herein) of the load carrier.

Figure 48A:
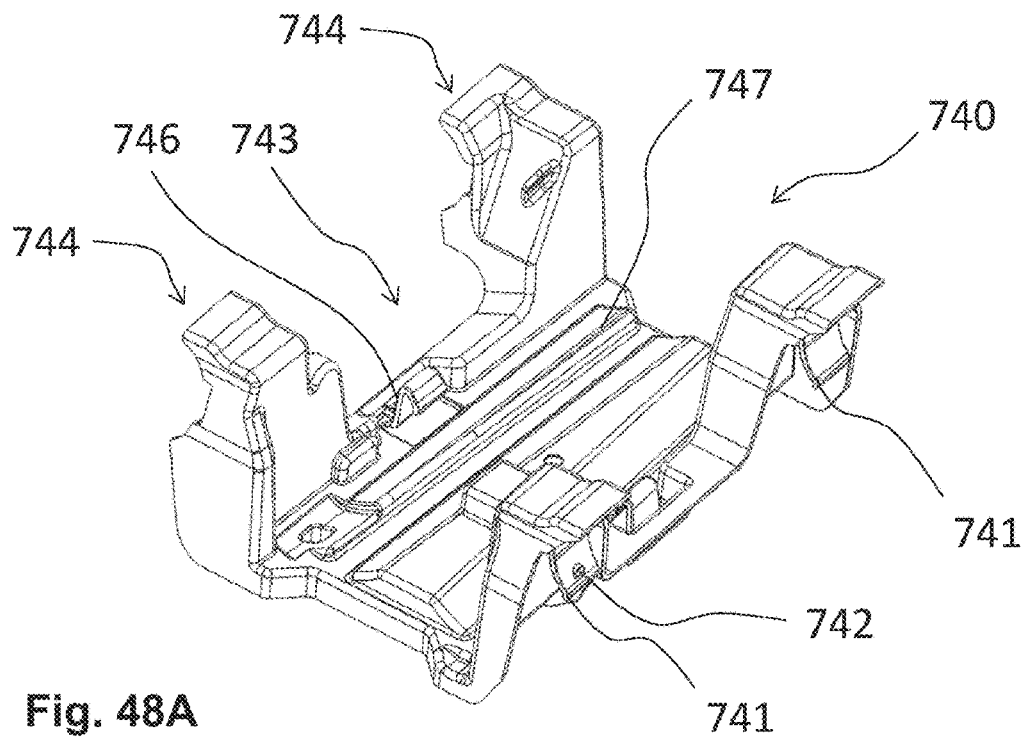
FIG. 48A shows a perspective view of a load carrier according to an example embodiment of the fifteenth aspect of the disclosure.
Figure 48B:
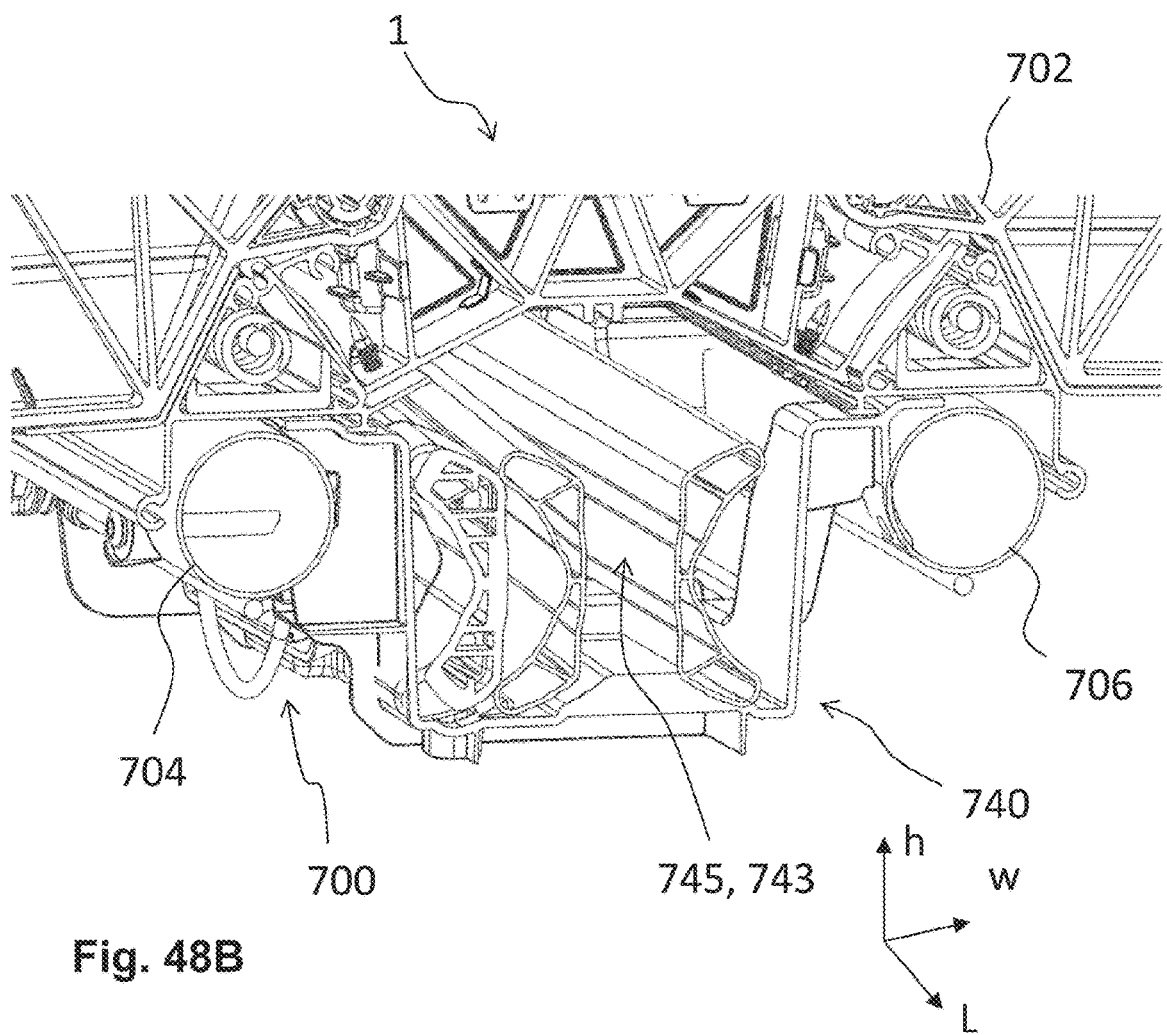
FIG. 48B shows a perspective view of a load carrier according to an example embodiment of the fifteenth aspect of the disclosure.

With reference to FIGS. 48A-48B, a load carrier 1 according to an example embodiment of the fifteenth aspect of the disclosure is shown. FIG. 48A depicts a holder 740 for holding auxiliary equipment in perspective view and FIG. 48B depicts a load carrier 1 in cross sectional view, defined by a plane extending in the width w and height h extension. The load carrier 1 may e.g. be a bike carrier 1 as shown in FIG. 1.

Accordingly, the load carrier 1 is adapted to be mounted to a vehicle for transporting a load. The load carrier has a length extension L, a width extension w and a height extension h. The load carrier 1 comprises.

a base frame portion 700, such as a base frame portion 700 mentioned in the above, a load receiving section 702 for receiving and securing a load to the vehicle, such as a load receiving section 702 as mentioned in the above.

The base frame portion 700 comprises two separate elongated members 704, 706 which extends in the length extension L. The two separate elongated members 704, 706 are offset from each other in the width extension w, and the load carrier 1 further comprises a holder 740 for holding auxiliary equipment, such as for holding a loading ramp arrangement 745 for a bicycle. The holder 740 for holding auxiliary equipment is releasably attached to the load carrier 1 in-between the separate elongated members 704, 706. As shown in FIG. 48B, the loading ramp arrangement 745 may be folded into a folded state when it is received in a receptacle 743 of the holder 740.

The holder 740 for holding auxiliary equipment may as shown be releasably attached to the load carrier 1 below the load receiving section 702, as seen when the load carrier 1 is mounted to a vehicle which is provided on a flat horizontally extending surface.

Figure 20:
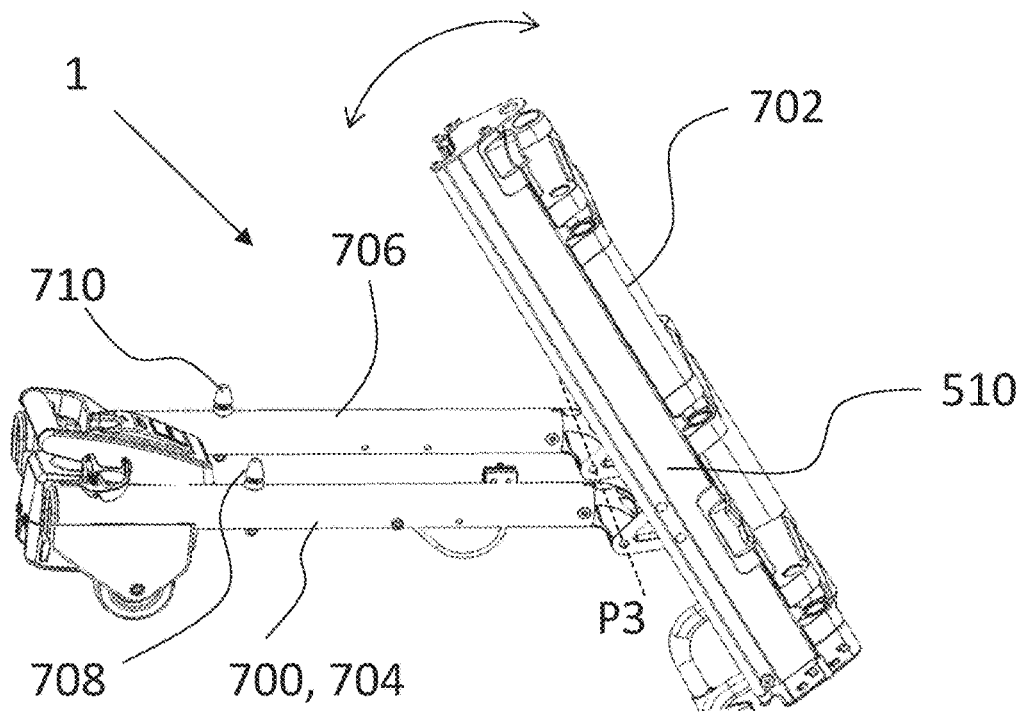
FIG. 20 shows a perspective view of a load carrier according to an example embodiment of the sixth aspect of the disclosure.

Furthermore, as shown in e.g. FIG. 20, the load receiving section 702 may be movable with respect to the base frame portion 700 such that the load receiving section 702 can be moved away from the vehicle when the load carrier 1 is mounted thereto. For example, as shown, the movable load receiving section 702 may be pivotable about a pivot axis P3, herein a pivot axis which substantially extends along the width extension w.

As further depicted, the load carrier 1 and/or the holder 740 for holding auxiliary equipment is/are arranged so that the holder 740 for holding auxiliary equipment is attachable to the load carrier 1 from above, herein when the load receiving section 702 has been moved away from the vehicle, as seen when the load carrier 1 is mounted to a vehicle which is provided on a flat horizontally extending surface.

The holder 740 for holding auxiliary equipment may as shown be attached to the two separate elongated members 704, 706 by a snap-fit connection 741. In the shown embodiment, the snap-fit connection 741 is provided by two flexing elements 741 of the holder 740, and by two corresponding support portions 744 of the holder 740. The flexing elements 741 and the support portions 744 are arranged to connect the holder 740 to the two separate elongated members 702, 706, which herein are cylindrically shaped beam elements. For each flexing element 741, a support portion 744 is provided on the other side of the holder 740. The flexing elements 741 and the support portions 744 are arranged to grasp around a portion of the circumference of the cylindrically shaped beam elements 702, 706. Each pair of flexing element 741 and support portion 744 is arranged to connect the holder 740 in-between the two separate elongated members 704, 706 by exerting a pushing force on the respective elongated member 704, 706. In other words, the holder 740 is clamped in-between the two elongated members 704, 706 by each pair of flexing element 741 and support portion 744. In an alternative embodiment, the support portions 744 may be replaced by flexing portions.

Furthermore, as shown, at least one of the two separate elongated members 702, 706 and/or the holder 740 for holding auxiliary equipment comprises a fixing member 742, such as a pin member 742, for fixing the holder 740 for holding auxiliary equipment so that the holder 740 for holding auxiliary equipment is prevented from being moved along the length extension L. In the shown embodiment, the pin member 742 is provided on one of the flexing members 741 and intended to be inserted into a matching aperture (not shown) of the elongated member 706.

The load carrier 1 and/or the holder 740 for holding auxiliary equipment is/are configured so that the holder 740 for holding auxiliary equipment is attachable to the load carrier 1 by substantially simultaneously attaching the holder 740 for holding auxiliary equipment to each one of the two separate elongated members. In the shown embodiment, the holder 740 can be attached to the elongated members 704, 706 by moving the holder 740 downwardly towards the elongated members 704, 706 so that the flexing members 741 and the support portions 744 attach the holder 740 to the two elongated members substantially simultaneously. In other words, any rotational movement of the holder 740 is not required during the attachment procedure.

The holder 740 for holding auxiliary equipment may as shown further comprise snap-in portions 746 and/or guide surfaces 747 for securing the auxiliary equipment 745 therein. This may assist user with alignment and securing the auxiliary equipment in its storage, i.e. in the receptacle 743. As further shown, the holder 740 may have a substantially U-shaped cross section, thereby forming a receptacle 743 therein.

Figure 50A:
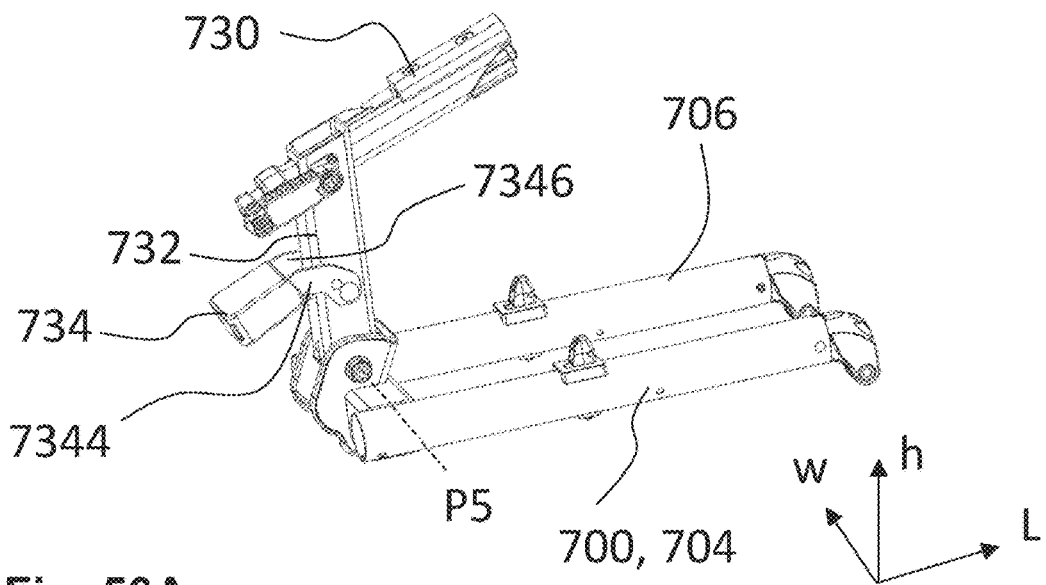
FIG. 50A shows a base frame portion with a vehicle coupling interface according to an example embodiment of the present disclosure.
Figure 50B:
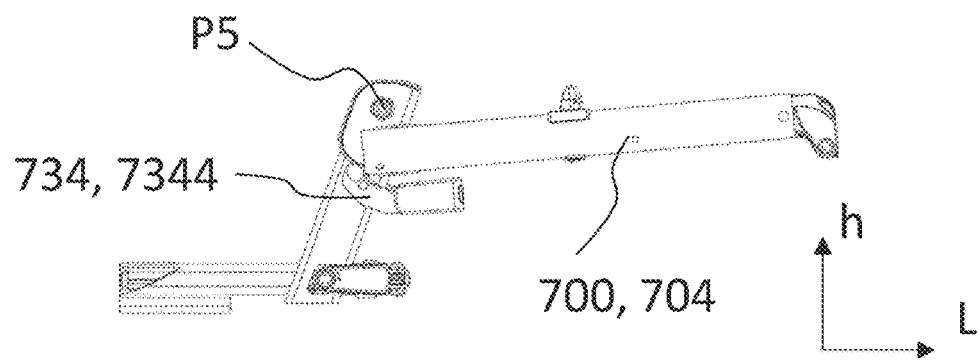
FIG. 50B shows a base frame portion with a vehicle coupling interface according to an example embodiment of the present disclosure.
Figure 50C:
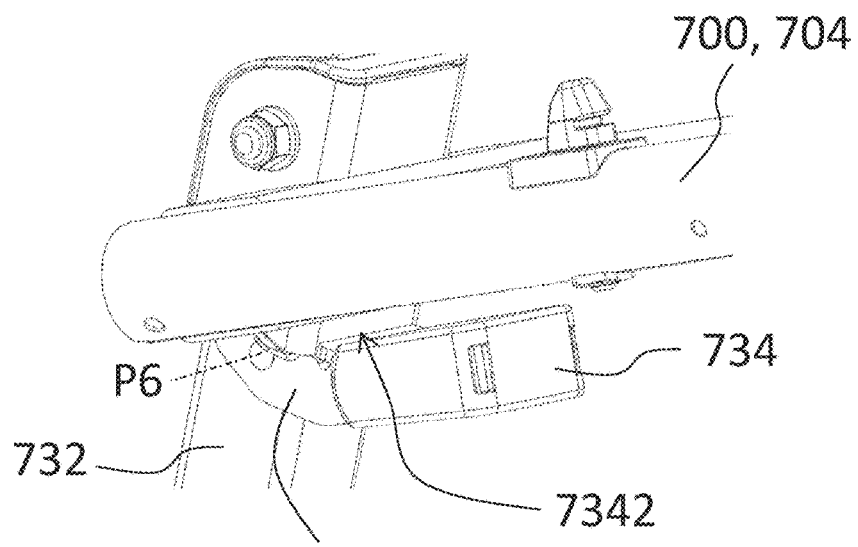
FIG. 50C shows a base frame portion with a vehicle coupling interface according to an example embodiment of the present disclosure.

FIGS. 50A-50C depict an example embodiment of a base frame portion 700 of a bike carrier 1 according to an example embodiment of the disclosure. The base frame portion 700 is similar to e.g. the base frame portion 700 shown in FIG. 20, with the difference that it further comprises a vehicle coupling arrangement 730 in the form of a stinger coupling member. The stinger coupling member 730 is configured to be inserted into a coupling element (not shown) of the vehicle when attached thereto. The stinger coupling member 730 is coupled to the base frame portion 700 via an intermediate arm member 732. The intermediate arm member 732 is in this case configured as a tube member. The intermediate arm member 732 is pivotably coupled to the base frame portion 700 about a pivot axis P5 which extends in the width direction w, or width extension w, of the bike carrier 1. A handle for a user 734, which additionally or alternatively functions as a lock for locking the pivotable connection P5 in a use position, is attached to the intermediate arm member 732. The handle 734 is movable, such as pivotable about a pivot axis P6 which also extends in the width extension w, with respect to the intermediate arm member 732 for unlocking the pivotable connection P5 from the use position. The handle 734 is preferably biased, such as spring-biased, towards the locked position. In FIG. 50B, the stinger coupling member 730 is folded down to the use position when the bike carrier 1 is mountable to the vehicle. In FIG. 50A, the stinger coupling member 730 is folded up to a non-use position when the bike carrier 1 is not intended to be mounted to the vehicle. As shown, the handle 734 may comprise a first and a second arm member 7344, 7346. The arm members 7344, 7346 extend outside and at least partly enclose the intermediate arm member 732. In other words, the arms 7344, 7346 connect from the outside of the tube member 732, avoiding e.g. a need to protrude through the wall of the tube 732. Thereby, a robust and reliable connection to the intermediate arm member 732 is achieved. In other words, slots, cut-outs, or the like, are not required on the intermediate arm member 732 for receiving the arm members 7344, 7346. As further shown in FIG. 50C, the handle 734 may comprise a stop surface 7342 for the locking function which is configured to abut and contact a portion of the base frame portion 700 when in the use position. Thereby, when the stop surface 7342 contacts the portion of the base frame portion 700, the stinger coupling member 730 is prevented from rotating about the pivot axis P5. As shown, the stop surface 7342 preferably extends in the width extension w between outer edges of the intermediate arm member 732 so that a line contact is achieved between the stop surface 7342 and the contacting portion of the base frame portion 700. Thereby, a robust connection which can accommodate large forces is achieved.

The invention claimed is:

1. A bicycle support arm for a bicycle carrier, comprising:
a first arm rotatably coupled to the bicycle carrier;
a second arm slidably coupled to the first arm; and
a pivotable head coupled to the second arm and configured to secure a bicycle to the bicycle carrier,
wherein the pivotable head at least partially encloses a distal end of the second arm; and
wherein the pivotable head is pivotable about a head axis extending substantially perpendicular to a length direction of the second arm.

2. The bicycle support arm of claim 1, further comprising a ratchet buckle coupled to the pivotable head and configured to receive and hold a strap.

3. The bicycle support arm of claim 2, further comprising a strap locking arrangement associated with the ratchet buckle and configured to lock the strap to prevent the strap from being released from the ratchet buckle.

4. The bicycle support arm of claim 3, wherein the strap locking arrangement is disposed on the pivotable head.

5. The bicycle support arm of claim 1, wherein the pivotable head is spaced apart from the distal end of the second arm.

6. The bicycle support arm of claim 1, wherein the pivotable head comprises a bicycle support surface against which a bicycle rests when a strap has tensioned the bicycle to the bicycle support arm.

7. The bicycle support arm of claim 1, wherein the pivotable head is L-shaped.

8. The bicycle support arm of claim 1, wherein the pivotable head comprises a bicycle support portion extending in a length direction of the bicycle support arm and a buckle support portion extending at least partially over the distal end of the second arm.

9. The bicycle support arm of claim 8, wherein the bicycle support portion comprises a bicycle support surface configured to contact the bicycle when the bicycle is secured to the bicycle support arm.

10. The bicycle support arm of claim 1, further comprising a strap configured to secure the bicycle to the pivotable head, wherein a proximal end of the strap is fixably coupled to the pivotable head and extends in a direction parallel to a length direction of the bicycle support arm, and wherein a distal end of the strap is releasably coupled to a buckle coupled to the pivotable head.

11. A load support arm for a load carrier configured to secure a load to the load carrier, the load support arm comprising:
an elongated arm; and
a load securement head moveably coupled to the elongated arm, wherein the load securement head comprises:
a load support surface configured to contact the load and extending in a length direction of the elongated arm, and
a buckle support portion extending at least partially over a distal-most end of the elongated arm in a first orientation such that the buckle support portion intersects a longitudinal axis extending through the elongated arm in the length direction.

12. The load support arm of claim 11, wherein the elongated arm is rotatably coupled to the load carrier and configured to rotate about an arm rotation axis,
wherein the load securement head rotates about a head axis, and
wherein the head axis extends parallel to the arm rotation axis.

13. The load support arm of claim 11, wherein the buckle support portion is spaced apart from the distal-most end of the elongated arm.

14. The load securement arm of claim 11, wherein the elongated arm comprises a front side and a lateral side, and wherein the buckle support portion extends at least partially over the lateral side in a second orientation, and wherein the load support surface is disposed adjacent to the front side in the first orientation and the second orientation.

15. A load support arm for a load carrier configured to secure a load to the load carrier, the load support arm comprising: an elongated arm; a load securement head moveably coupled to the elongated arm, wherein the load securement head comprises: a load support surface configured to contact the load and extending in a length direction of the elongated arm, and a buckle support portion extending at least partially over a distal-most end of the elongated arm in a first orientation; and a strap configured to secure the load to the load securement head.

16. The load support arm of claim 15, wherein a proximal end of the strap is fixably coupled to the load support surface.

17. The load support arm of claim 16, wherein the proximal end of the strap extends away from the load support surface in a direction approximately parallel to the length direction of the elongated arm.

18. The load support arm of claim 15, wherein a distal end of the strap is releasably coupled to a ratchet buckle disposed on the buckle support portion.

19. The load support arm of claim 18, wherein the distal end of the strap extends in a direction approximately perpendicular to the length direction of the elongated arm.

* * * * *